US011882118B2

(12) United States Patent
Larson et al.

(10) Patent No.: US 11,882,118 B2
(45) Date of Patent: Jan. 23, 2024

(54) IDENTITY VERIFICATION AND MANAGEMENT SYSTEM

(71) Applicant: artius.iD, Inc., Austin, TX (US)

(72) Inventors: Steven Allen Larson, West Linn, OR (US); Dominic John O'Dierno, Portland, OR (US); Mark Robert Johnson, Hillsboro, OR (US)

(73) Assignee: artius.iD, Inc., Austin, TX (US)

( * ) Notice: Subject to any disclaimer, the term of this patent is extended or adjusted under 35 U.S.C. 154(b) by 160 days.

(21) Appl. No.: 16/885,980

(22) Filed: May 28, 2020

(65) Prior Publication Data

US 2020/0366671 A1 Nov. 19, 2020

Related U.S. Application Data

(62) Division of application No. 16/416,096, filed on May 17, 2019, now Pat. No. 10,693,872.

(51) Int. Cl.

*H04L 9/40* (2022.01)
*G06F 9/451* (2018.01)

(52) U.S. Cl.

CPC .......... *H04L 63/0861* (2013.01); *G06F 9/451* (2018.02); *H04L 63/0478* (2013.01); *H04L 63/0838* (2013.01)

(58) Field of Classification Search

CPC ............. H04L 63/0861; H04L 63/0478; H04L 63/0838; H04L 9/3228; H04L 9/3231;

(Continued)

(56) References Cited

U.S. PATENT DOCUMENTS

| | | | |
|---|---|---|---|
| 6,779,721 | B2 | 8/2004 | Larson et al. |
| 8,536,976 | B2 | 9/2013 | Headley et al. |

(Continued)

FOREIGN PATENT DOCUMENTS

| | | | |
|---|---|---|---|
| EP | 2515500 | A1 | 10/2012 |
| GB | 2381641 | A | 5/2003 |

OTHER PUBLICATIONS

Roy et al., "Biometrics Data Security Techniques for Portable Mobile Devices", INAE Lett, Aug. 16, 2017 (Year: 2017).*

(Continued)

*Primary Examiner* — Henry Tsang
(74) *Attorney, Agent, or Firm* — Cowan, Liebowitz & Latman, P.C.; Mark Montague

(57) ABSTRACT

Disclosed embodiments include identity verification and management services in which users authenticate their identities during an enrollment process, and may access and modify their identity information via a secure portal. The enrollment process includes collecting various identifying data and biometric data of a user. A live interview portion during the enrollment process is used to check the liveness and verify the collected identifying data and biometric data. Once the user is enrolled, the user's identity can be verified for multiple entities using the same enrolled identity, and the user can manage the specific data used to verify their identity with different entities. This provides users with the ability to use their authenticated/verified identity across various industries, markets, locations, and the like, while keeping their identifying data private. Other embodiments may be described and/or claimed.

38 Claims, 69 Drawing Sheets

(58) Field of Classification Search
CPC .......... G06F 9/451; G06F 21/31; G06F 21/32; G06F 21/45; H04W 12/06
See application file for complete search history.

(56) References Cited

U.S. PATENT DOCUMENTS

| | | | | |
|---|---|---|---|---|
| 9,262,613 | B1 | 2/2016 | Harding | |
| 9,426,151 | B2 | 8/2016 | Richards et al. | |
| 9,430,629 | B1 * | 8/2016 | Ziraknejad | G06F 16/583 |
| 9,590,969 | B2 | 3/2017 | Reno | |
| 9,684,813 | B2 | 6/2017 | Clausen | |
| 9,727,866 | B2 | 8/2017 | Kenderov | |
| 9,740,926 | B2 | 8/2017 | Hagen et al. | |
| 9,774,453 | B2 | 9/2017 | Baldwin et al. | |
| 10,019,561 | B1 | 7/2018 | Shelton | |
| 10,142,338 | B2 | 11/2018 | Hall | |
| 10,218,695 | B1 | 2/2019 | Jain | |
| 2007/0078668 | A1 | 4/2007 | Pathria et al. | |
| 2009/0309698 | A1 | 12/2009 | Headley et al. | |
| 2011/0231651 | A1 | 9/2011 | Bollay | |
| 2013/0133055 | A1 | 5/2013 | Ali et al. | |
| 2014/0279516 | A1 * | 9/2014 | Rellas | G06Q 30/0185 705/318 |
| 2014/0310786 | A1 | 10/2014 | Harding | |
| 2015/0106216 | A1 | 4/2015 | Kenderov | |
| 2016/0065558 | A1 * | 3/2016 | Suresh | G06F 21/32 726/7 |
| 2016/0078451 | A1 | 3/2016 | Evans et al. | |
| 2016/0087977 | A1 * | 3/2016 | Durkan | H04L 63/0861 726/6 |
| 2016/0219046 | A1 | 7/2016 | Ballard et al. | |
| 2016/0381560 | A1 | 12/2016 | Margaliot | |
| 2017/0124312 | A1 * | 5/2017 | Inoue | H04L 9/32 |
| 2017/0236230 | A1 | 8/2017 | Thomas | |
| 2018/0089412 | A1 | 3/2018 | Kopikare et al. | |
| 2019/0080065 | A1 * | 3/2019 | Sheik-Nainar | G06V 40/40 |
| 2019/0114593 | A1 | 4/2019 | Champaneria | |

OTHER PUBLICATIONS

Zareen, et al.; BAMCloud: A Cloud Based Mobile Biometric Authentication Framework, IEEE; Dec. 31, 2016; 15 pages.

Talreja, et al.; Multibiometric Secure System Based On Deep Learning; West Virginia University, Morgantown, USA; Aug. 7, 2017; 5 pages.

Verifyme; Biometric Multi-Factor Authentication; retrieved from http://www.verifyme.com/digital-solutions on Sep. 21, 2018; 5 pages.

Telesign; Score; retrieved from https://www.telesign.com/products/score/ on Sep. 21, 2018; 9 pages.

Roy, et al., "Biometrics Data Security Techniques for Portable Mobile Devices" INAE Letters vol. 2, No. 3, Aug. 16, 2017; pp. 123-131.

Govindarajan, "Feature-level fusion in multimodal biometrics" (2004) Graduate Theses, Dissertations and Problem Report, 1489. Retrieved from the Internet <https://researchrepository.wvu.edu/cgi/viewcontent.cgi?article=2492&context=etd>.

* cited by examiner

Figure 6
605
610
SERVICE
12:45 PM
100%
Now align your face in the outline below.
630
635
Success!
630
640

Figure 48
4800
< All applications
Isabel Iglesias
1:24
Q5id database
ID comparison
Online presence
ID/Fraud risk
Video interview
Get help >
4805
4831
0
Alicia Alma
DOB: 01/01/1992
SEX: FEMALE
1234 ELM ST
SAN DIEGO, CA
92101
4808
4809
Review identity/fraud warnings
4810
Category
Details
Action
No warnings found
Conclusion
Low-risk
4814
Modify age:
Now
4835
4825
V05

IDENTITY VERIFICATION AND MANAGEMENT SYSTEM

RELATED APPLICATIONS

The present application is a divisional application of U.S. application Ser. No. 16/416,096, filed on May 17, 2019, the contents of which are hereby incorporated by reference in their entirety.

FIELD

The present disclosure generally relates to the fields of computing, and in particular, to identity verification and information security technologies.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Identity verification services are often used by businesses and/or government agencies to ensure that information provided by users is associated with the identity of a real person. Businesses or government agencies may verify the identity of the real person using identity information indicated by physical identifying documents (e.g., driver's license, passport, identity cards, etc.), or they may verify identity information against authoritative sources (e.g., credit bureaus, government database(s), corporate database(s), etc.).

In order to authenticate a user's identity, many identity verification services utilize identity information from physical identifying documents, images or videos of physical identifying documents, authentication or authorization credentials, identity scores, biometric data, or knowledge-based authentication (KBA) data. The identity information may be provided to the identity verification service (directly or through the businesses/government agencies) physically or electronically (e.g., entering and submitting identity information to an authentication mechanism via a web form). Some identity verification services employ or otherwise utilize identity management systems to manage individual identities, authentication, authorization, roles, and privileges within or across one or more organizations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

Each of FIGS. 3, 4, 5, 6, 7, 8, 9, 10, 11, 12, 13, 14, 15, 16, 17, 18, 19, 20, 21, 22, 23, and 24 illustrate example user interfaces for an identity enrollment process according to various embodiments. Each of FIGS. 25 and 26 illustrate example user interfaces of a user portal according to various embodiments. Each of FIGS. 27A, 27B, 28, 29 and 30 illustrate example user interfaces for an identity authentication process according to various embodiments.

DETAILED DESCRIPTION

Figure 1:
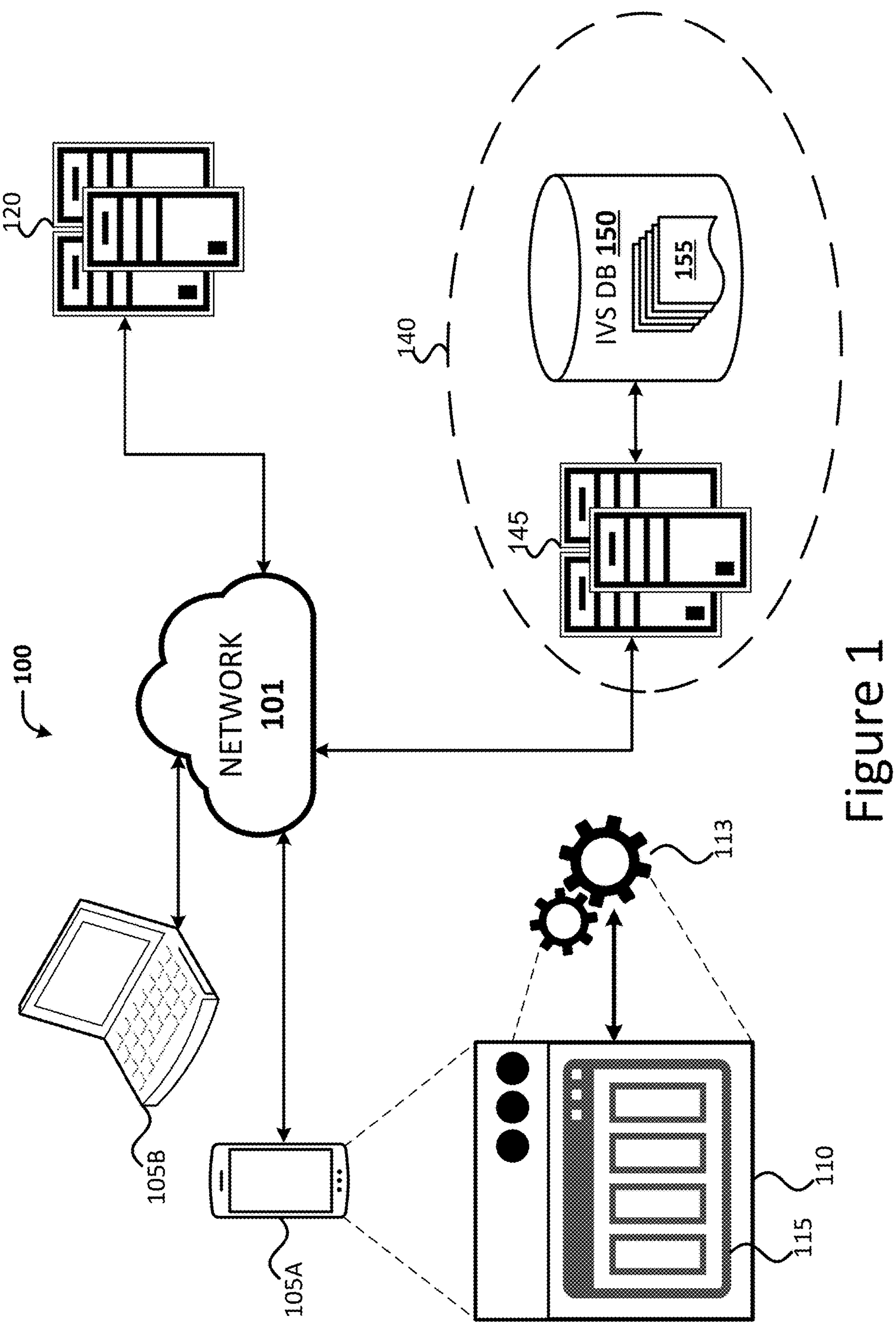
FIG. 1 depicts an environment in which various embodiments discussed herein may be practiced.

Embodiments described herein are related to identity verification and information security technologies. Identity verification services may utilize identity information from physical identifying documents, images or videos of physical identifying documents, authentication or authorization credentials, identity scores, biometric data, and/or knowledge-based authentication (KBA) data to authenticate a user's identity. Conventional identity verification systems require users to provide identity information electronically by submitting identity information to an authentication mechanism via user interface(s). In many cases, users have to enter their identity information into a web form, or scan or otherwise capture biometric data using a camera or other like device. Additionally, many service providers require their users to enter/scan and submit user identifying information in order for those users to access their platforms. This means that users often have to enter/scan and submit the same identity information to multiple service providers. Requiring users to provide identity information to individual service providers not only consumes a significant amount of the users' time, but also results in increased computational, storage, and network resource consumption. Furthermore, repeatedly sending identity information to different service providers, each of which may implement different security technologies, may increase the likelihood that the identity information is stolen in transit or due to security failures at a service provider system.

In disclosed embodiments, an identity management system is provided in which users authenticate their identities during an enrollment process, and may access and modify their identity information via a secure portal. The proven identity management system performs "identity enrollment," which is a holistic approach to enrolling users into the proven identity management system to secure their identities and to verify their identity in the process. In embodiments, individual users may own or otherwise be associated with an identity profile (also referred to as a "user profile") that describes the depth and quality of the individual users' identity. Individual users can update and improve the quality of the collected identifying information using the secure portal. In one example, users may provide updated or new biographic or demographic data as new life events take place (e.g., name changes due to marriage, new addresses when a user moves to a residence, etc.). In another example, users may provide updated biometric data as their appearance changes (e.g., due to aging, dying hair, new piercings; scars on face, hands, or other body parts; new acquired tattoos; etc.). The secure portal also allows users to provide new updated or new biometric data as the system evolves with new biometric capturing technologies. The secure enrollment portal also allows the users to review and edit information and collected data (or data being collected) for accuracy. The secure enrollment portal also allows the users to review potential opportunities with third party service provider platforms to participate in offers or opportunities being provided by those platforms, or to opt in to data collection. In some embodiments, the secure portal indicates when a user's identity has been tracked or when an authentication has been attempted. In these ways, individual user may update and enhance the completeness of their identity profiles for a more seamless identity verification process when attempting to obtain products or services from third party service providers, and for enhancing user privacy and preventing identity theft or other malicious identity-based abuses.

In various embodiments, a live video interview takes place during an enrollment process to assess both true identity and user liveness. The live interview may be performed by a human interviewer or an autonomous software agent, such as a virtual assistant, chatbot, artificial intelligence (AI) agent, and/or the like. During the live interview, biometric data (e.g., facial data, hand/palm data, voice data, etc.) is/are collected and/or compared with previously collected biometric data for identity validation and authentication. For example, images of an applicant captured during the enrollment process may be cross checked using various algorithms to check against images captured during the on-screen enrollment, user-supplied selfie images, image(s) from scanned identity documents, and/or screenshot(s) captured during the live interview. The biometric data collected during the live interview may also be compared with other collected data such as the validated authentication identity documents (e.g., driver's license photo, passport photo, etc.) and/or prior collected biometric data.

In some embodiments, the biometric data collected during the live interview is processed using "age reversing" technologies to compare against other user data to verify that the person in the live interview is not using a "synthetic identity" (e.g., by creating a fake online persona and/or using fraudulent identity documents). For example, facial images captured during the live interview may be age reversed and compared against images obtained from social media platforms, high school yearbooks, images from government agency databases (e.g., DMV, police, FBI, etc.), or other publicly available sources.

In various embodiments, other information/data is collected and stored to determine or detect fraudulent activity. This information/data may include, for example, whether the user's device has been associated with identity fraud in the past, the geolocation of the user's device at the time of the live interview (e.g., GPS coordinates or the like), other location information associated with the user's device (e.g., location based on IP addresses even if hidden behind hidden proxies and VPNs), amount of time that the user's identity profile has existed (e.g., to detect recently established identities that are correlated with fraudulent activity), known associates or associations of the user and whether or not they are associated with fraudulent incidences, rate of change in identifying information that may indicate a fraudulent identity, and/or other like information.

In embodiments, this other information/data is used to detect fraudulent activity or otherwise determine a likelihood of fraudulent activity. For example, the geolocation and other location information may be compared against a list of location data of known fraudsters. A "fraudster" may be persons intending to use another person's identity or a synthetic identity for illegal and/or fraudulent purposes. A "synthetic" identity may be a created identity that is not associated with an actual, living person. In some embodiments, the collected biographic data is run against multiple attributes and/or variables to verify that the biographic information collected during the enrollment is accurate and/or to determine a probability that the enrollee identity is a synthetic identity. Multiple other fraud risk indices are searched to determine a probability that the enrollment is a synthetic identity, an attempt to compromise a real identity, whether an identity is being intentionally manipulated, whether a user is at risk for identity fraud by an unauthorized user/entity, and/or whether a user's identity has previous high risk activity. In some embodiments, the collected information data may be compared with one or more credit bureaus and other publicly available databases (e.g., electoral records, property records, utility data, etc.) to verify the accuracy of the provided and/or collected information.

In some embodiments, knowledge-based assessment or knowledge-based authentication (KBA) questions are generated based on the collected information, which are then used during the live interview. KBA is a method of authenticating a user's identity, which requires the knowledge of private information of the user to prove that the person providing the identity information is the actual owner of the identity. KBA-generated questions may be static KBAs or dynamic KBAs. Static KBAs are based on a pre-agreed set of shared secrets, such as place of birth, mother's maiden name, name of first pet, and/or the like. Dynamic KBAs are based on questions generated from a wider base of personal information such as account numbers, loan amounts, tax payment amounts, etc. The live interview may be used to determine whether the KBA answers are actually known by the enrollee. For example, the live interviewer may check whether the enrollee is referring to printed documents or searching for information to answer a KBA question. Other embodiments are described and/or claimed. In some embodiments, a One-Time Password (OTP) may be used instead of a set of KBAs for enrollees who do not show signs of fraudulent activity with respect to their enrollment (e.g., low risk enrollments).

I. Identity Verification and Management Embodiments

In various embodiments, an identity verification service (IVS) provides a "proven identity" for enrolled users. Each user enrolls with the IVS using multiple identity metrics, such that the cumulative power of multiple authentication factors results in a Proven Identity. The IVS protects a user's proven identity behind their own unique biometrics, ensures their identity can only be used by that user, and continues to protect their identity during computer/network-based interactions and transactions. The IVS also allows identities to be effectively enrolled in the IVS, proven, and authenticated for any type of transaction and at any location. The IVS also prevents identity theft and other fraudulent activities by identifying the tactics used by identity thieves and other malicious actors, and blocks the fraudulent activities and/or notifies potential victims of the fraudulent activities. In addition, the IVS saves businesses hundreds of millions of dollars in identity (ID) fraud losses annually. The IVS also provides significant value to organizations as it relates to the customer and branding. Companies that offer identity protection services through the IVS will provide frictionless customer service experiences and will also secure both sides of customer transactions.

The IVS includes a comprehensive, low friction enrollment process using a dedicated application to quickly enroll individuals/users in the IVS system. Individuals that partake in the enrollment process are referred to as "applicants," "enrollees," or the like. Upon successful completion of enrollment process, applicants are considered to have proven their identities and become active IVS users ("active users" or "authenticated users") enabling them to use an IVS authentication application (App) to confirm their identity for subsequent interactions and transactions (referred to as "authenticated transactions") between active users and any IVS-participating organizations (orgs), apps, and/or services. In various embodiments, a single app is used for enrolling new users and for authenticating active users; this application may be referred to as an IVS app, authentication app (authApp), and/or the like.

For active users, the authApp is the initial process intrinsic to (and integrated with) the enrollmentApp. For orgs (e.g., businesses, enterprises, governmental agencies, regulatory bodies, etc.), the authApp is a separate, standalone application used to request and/or receive identity authentications from active users, enabling authenticated interactions and transactions for virtually any situation.

Enrollment into the IVS solves these issues through its integrated, robust design and world-class features as detailed herein and is further enhanced using unique dynamic decisioning algorithms, artificial intelligence, and machine teaming techniques. The IVS takes full advantage of the information collected through biometric, identity authentication and intelligence processes, device and digital persona assessments, knowledge-based assessments, and live interviews. The result—confidence in proven identity and the ability to quickly authenticate user identity in any transaction.

Additionally, the architecture of the IVS allows the IVS to integrate new innovative technologies and solutions as they become available. Perfect intelligence is only useful if it is actionable. The challenge for evolving digital businesses trying to solve identity issues on their own is that they are often working with legacy systems that are cumbersome and data sources that are outdated, static and siloed from other data sources and processes.

Referring now to the figures, FIG. 1 shows an arrangement 100 suitable for practicing various embodiments of the present disclosure. As shown in FIG. 1, arrangement 100 includes a client system 105A and 105B (collectively referred to as a "client systems 105" or "client system 105"), service provider platform (SPP) 120, identity verification service (IVS) 140, and network 101. According to various embodiments, the client system 105A is configured to operate a client application 110, which may be used to interact with the IVS 140 for identity verification services. Aspects of these embodiments are discussed in more detail infra.

The client systems 105 (also referred to as a "client device," "user system," "user device," or the like) include physical hardware devices and software components capable of accessing content and/or services provided by the SPP 120 and IVS 140. In order to access the content/services, the client systems 105 include components such as processors, memory devices, communication interfaces, and the like. Additionally, the client system 105 may include, or be communicatively coupled with, one or more sensors (e.g., image capture device(s), microphones, etc.), which is/are used to capture biometric data. As discussed in more detail infra, the captured biometric data is then provided to the IVS 140 for identity verification purposes. The client systems 105 communicate with SPP 120 and the IVS 140 to obtain content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), Secure RTP (SRTP), and/or Real-time Streaming Protocol (RTSP); Real-Time Communication (RTC) and/or WebRTC; Secure Shell (SSH); Extensible Messaging and Presence Protocol (XMPP); WebSocket; and/or some other communication technology such as those discussed herein. In this regard, the client system 105A may establish a communication session with the SPP 120 and/or the IVS 140. As used herein, a "session" refers to a persistent interaction between a subscriber (e.g., client system 105A) and an endpoint that may be either a relying party (RP) such as SPP 120 or a Credential Service Provider (CSP) such as IVS 140. A session begins with an authentication event and ends with a session termination event. A session is bound by use of a session secret (e.g., a password, digital certificate, etc.) that the subscriber's software (a browser, application, or OS) can present to the RP or CSP in lieu of the subscriber's authentication credentials. A "session secret" refers to a secret used in authentication that is known to a subscriber and a verifier. The client systems 105 can be implemented as any suitable computing system or other data processing apparatus usable by users to access content/services provided by the SPP 120 and IVS 140. In the example of FIG. 1, the client system 105A is depicted as a mobile cellular phone (e.g., a "smartphone") and the client system 105B is depicted as a laptop computer; however, the client systems 105 can be any other suitable computer system such as desktop computers, work stations, tablet computers, portable media players, wearable computing devices (e.g., smart watches and/or the like), or some other computing systems/devices.

The SPP 120 includes one or more physical and/or virtualized systems for providing content and/or functionality (e.g., services) to one or more clients (e.g., client system 105) over a network (e.g., network 101). For purposes of the embodiments discussed herein, the SPP 120 may be a relying party (RP), which is an entity that relies upon a subscriber's (e.g., user of client system 105A) authenticator(s) and credentials or a verifier's (e.g., IVS 140) assertion of a claimant's identity, typically to process a transaction or grant access to information or a system. The physical and/or virtualized systems include one or more logically or physically connected servers and/or data storage devices distributed locally or across one or more geographic locations. Generally, the SPP 120 is configured to use IP/network resources to provide web pages, forms, applications, data, services, and/or media content to client system 105. As examples, the SPP 120 may provide banking and/or financial services, social networking and/or microblogging services, internet forums, content (media) streaming services, e-commerce services, search engine services, cloud analytics services, immersive gaming experiences, on-demand database services, web-based customer relationship management (CRM) services, and/or other like services. In other examples, the SPP 120 may represent an intranet, enterprise network, or some other like private network that is unavailable to the public. In some embodiments, the SPP 120 may be associated with a mobile network operator (MNO), and in such embodiments, the SPP 120 may be configured to support communication services such as Voice-over-Internet Protocol (VoIP) sessions, Push-to-Talk (PTT) sessions, group communication sessions, and the like for the client system 105 via the network 101.

In order to provide content and/or services to the client systems 105, the SPP 120 may operate web servers and/or applications servers. The web server(s) serve static content from a file system of the web server(s), and may generate and serve dynamic content (e.g., server-side programming, database connections, dynamic generation of web documents) using an appropriate plug-in (e.g., a ASP.NET plug-in). The application server(s) implement an application platform, which is a framework that provides for the development and execution of server-side applications as part of an application hosting service. The application platform enables the creation, management, and execution of one or more server-side applications developed by the SPP 120 and/or third-party application developers, which allow users and/or third-party application developers to access the SPP 120 via respective client systems 105. The client system 105 may operate the client application 110 to access the dynamic content, for example, by sending appropriate HTTP messages or the like, and in response, the server-side application(s) may dynamically generate and provide source code documents to the client application 110, and the source code documents are used for generating and rendering graphical objects 115 (or simply "objects 115") within the client application 110. The server-side applications may be developed with any suitable server-side programming languages or technologies, such as PHP; Java™ based technologies such as Java Servlets, JavaServer Pages (JSP), JavaServer Faces (JSF), etc.; ASP.NET; Ruby or Ruby on Rails; and/or any other like technology that renders HyperText Markup Language (HTML), such as those discussed herein. The applications may be built using a platform-specific and/or proprietary development tool and/or programming languages.

The IVS 140 includes one or more IVS servers 145 and a Q5ID database (DB) 150. The IVS servers 145 may be virtual or physical systems that provide identity verification services to individual users (e.g., using a client system 105) and/or for customer platforms (e.g., SPP 120). In some embodiments, some or all of the identity verification services may be provided by or accessed from third party systems/services, and in some of these embodiments, the information provided by the third party systems/services may be enhanced or amended using information collected by the IVS 140. The virtual and/or physical systems may include application servers, web servers, and/or other like computing systems, which may be the same or similar to those discussed herein with respect to the SPP 120. The particular identity verification services provided by the IVS servers 145 may depend on the architecture or implementation of the IVS 140, and may vary from embodiment to embodiment. In one example, each IVS server 145 may operate as an application server and may provide each type of identity verification service (e.g., object/facial recognition, voiceprint recognition, AI truthfulness/lie detection, etc.) as separate processes, or by implementing autonomous software agents. In another example, individual IVS servers 145 may be dedicated to perform separate identity verification services, and application servers may be used to obtain requests from client systems 105 and provide information/data to the IVS servers 140 to perform their respective identity verification services. Examples of the identity verification services are discussed in more detail infra.

As alluded to previously, the client system 105 is configured to run, execute, or otherwise operate client application 110. The client application 110 is a software application designed to generate and render objects 115, which include various types of content. At least some of the objects 115 include graphical user interfaces (GUIs) and/or graphical control elements (GCEs) that enable interactions with the SPP 120 and/or the IVS 140. In some embodiments, the client application 110 is an application container 110 in which an SPP 120 application operates. For example, the objects 115 may represent a web application that runs inside the client application 110, and the client application 110 may be an HTTP client, such as a "web browser" (or simply a "browser") for sending and receiving HTTP messages to and from a web server of the SPP 120. In this example, the IVS component 113 is a browser extension or plug-in configured to allow the client application 110 to render objects 115 that allow the user to interact with the IVS 140 for identity verification services according to the embodiments discussed herein. Example browsers include WebKit-based browsers, Microsoft's Internet Explorer browser, Microsoft's Edge browser, Apple's Safari, Google's Chrome, Opera's browser, Mozilla's Firefox browser, and/or the like.

In some embodiments, the client application 110 is an application specifically developed or tailored to interact with the SPP 120. For example, the client application 110 may be a desktop or native (mobile) application that runs directly on the client system 105 without a browser, and which communicates (sends and receives) suitable messages with the SPP 120. In this example, the IVS component 113 is a separate application that communicates with the client application 110 via a suitable Application Programming Interface (API), middleware, software glue, etc., or the IVS component 113 is a plug-in configured to allow the client application 110 to render user interface objects 115 for interacting with IVS 140. In another embodiment, the client application 110 is an application specifically developed or tailored to interact with the IVS 140 for identity verification services. In these embodiments, the client application 110 includes the same or similar functionality as discussed herein with respect to IVS component 113.

The client application 110 and the IVS component 113 may be developed using any suitable programming languages and/or development tools, such as those discussed herein or others known in the art. The client application 110 may be platform-specific, such as when the client system 105 is implemented as a mobile device, such as a smartphone, tablet computer, or the like. In these embodiments, the client application 110 may be a mobile web browser, a native application (or "mobile app") specifically tailored to operate on the mobile client system 105, or a hybrid application wherein objects 115 (or a web application) is embedded inside the native application 110. In some implementations, the client application 110 and/or the web applications that run inside the client application 110 is/are specifically designed to interact with server-side applications implemented by the application platform of the provider system (discussed infra). In some implementations, the client application 110, and/or the web applications that run inside the client application 110 may be platform-specific or developed to operate on a particular type of client system 105 or a particular (hardware and/or software) client system 105 configuration. The term "platform-specific" may refer to the platform implemented by the client system 105, the platform implemented by the SPP 120, and/or a platform of a third-party system/platform.

In the aforementioned embodiments, the client system 105 implementing the client application 110 is capable of controlling its communications/network interface(s) to send and receive HTTP messages to/from the SPP 120 and/or IVS 140, render the objects 115 in the client application 110, request connections with other devices, and/or perform (or request performance) of other like functions. The header of these HTTP messages includes various operating parameters and the body of the HTTP messages include program code or source code documents (e.g., HTML, XML, JSON, and/or some other like object(s)/document(s)) to be executed and rendered in the client application 110. The client application 110 executes the program code or source code documents and renders the objects 115 (or web applications) inside the client application 110.

The rendered objects 115 (or executed web application) allows the user of the client system 105 to view content provided by the SPP 120, which may include the results of a requested service, visual representations of data, hyperlinks or links to other resources, and/or the like. The rendered objects 115 also include interfaces for interacting with the SPP 120, for example, to request additional content or services from the SPP 120. In an example, the rendered objects 115 may include GUIs, which are used to manage the interactions between the user of the client system 105 and the SPP 120. The GUIs comprise one or more GCEs (or widgets) such as buttons, sliders, text boxes, tabs, dashboards, etc. The user of the client system 105 may select or otherwise interact with one or more of the GCEs (e.g., by pointing and clicking using a mouse, or performing a gesture for touchscreen-based systems) to request content or services from the SPP 120.

In many cases, the user of client system 105A may be required to authenticate their identity in order to obtain content and/or services from the SPP 120, and the IVS 140 provides identity verification services for the user of client system 105A so that the user can access the content/services from the SPP 120. To provide the identity verification services to the user, the client application 110 (or component 113) may be, or may include, a secure portal to the IVS 140. The secure portal may be a stand-alone application, embedded within a web or mobile application provided by SPP 120, and/or invoked or called by the web/mobile application provided by SPP 120 (e.g., using an API, Remote Procedure Call (RPC), and/or the like). In these cases, graphical objects 115 rendered and displayed within the client application 110 may be a GUI and/or GCEs of the secure portal, which allows the user to share data (e.g., biographic data, biometric data, etc.) with the IVS 140.

In one example use case, the SPP 120 may be a social networking platform that provides microblogging, messaging, and/or other like services, and a user of the client system 105 may attempt to create a user profile with the SPP 120. In this example, the client application 110 may be a browser and a web application for accessing the SPP 120 may invoke a suitable API to call the secure portal to the IVS 140 to verify the identity of the user during a sign-up process for creating the user profile with the SPP 120. In one alternative, the browser may include an IVS component 113 that allows the user of the client system 105 to access and permit the IVS 140 to provide identity verifying information to the SPP 120 during the sign-up process. In another alternative, the client application 110 may be a mobile app that allows a user of the client system 105 to interact with the social network, and the mobile app may include an IVS component 113 that accesses the IVS 140 to perform the identity verification process during the sign-up process.

In another example use case, the SPP 120 may be a mobile network operator (MNO) that provides financing options to enable customers to purchase smartphones, tablet computers, wearable devices, laptop computers, etc., that are capable of accessing the mobile network. In this example, the user may enter a brick-and-mortar retail store associated with the MNO, and a store employee may assist the user in applying for financing using a tablet computer owned by the retail store and/or MNO. An application on the tablet may be a mobile app specifically tailored to allow users to apply for financing (either online or in a retail store), which at some point during the financing application process, triggers execution or initialization of the IVS component 113 or the client application 110 specifically tailored to interact with the IVS 140 to verify the identity of the user. In one alternative, the client application 110 may be a browser and a web application that allows users to apply for financing and may invoke a suitable API to call the secure portal to the IVS 140 to verify the identity of the user.

In any of the aforementioned embodiments and example use cases, the secure portal allows individual users to enroll with the IVS 140 for identity verification purposes. The enrollment process involves collecting various forms of identifying information and biometric data, as well as a live interview. The secure portal also allows enrolled users to access and manage their identity verification information. For example, the secure portal may provide access to a dashboard GUI that allows users to see the depth and quality of their identity information, update and improve the quality of the collected identity information and collected biometrics, and provide new biographic, identity, and/or biometric data to the IVS 140 (including when the IVS 140 evolves to include new biometric, data collection, and/or identification validation technologies). Additionally, the dashboard GUI may include GCEs that allow individual users to release or send identity verification indicators to selected SPPs 120. In some embodiments, the IVS 140 may implement a blockchain for individual users to allow the individual users to select who (e.g., which third-party platforms) may access or obtain identity verification indicators. The user may also select the particular identity verification indicators that are accessible by respective third-party platforms. In some embodiments, the identity verification indicators may be one-time authorization codes generated using, for example, a pseudorandom number generator, hash function, or the like, where the one-time authorization codes are linked to (or have a relationship with) one or more identity data items. In some embodiments, the dashboard GUI may include GCEs that allow individual users to identify where their identity information or verification has been requested or tracked by SPPs 120, and/or where their identity information has been involved in fraud or identity theft attempts. In some embodiments, the dashboard GUI may include GCEs that allow individual users to subscribe to different SPPs 120 to participate in various offers provided by the SPPs 120 through the IVS 140.

As discussed previously, the IVS 140 may provide one or more identity verification services for individual users (e.g., a user of client system 105A) and/or users of third-party platforms (e.g., SPP 120). A first example identity verification service provided by the IVS 140 may include a biographic data collection service. This service may involve one or more IVS servers 145 collecting biographic data of a user directly from the client system 105A. For example, the client application 110 may enable the user of client system 105A to scan various identity documents (e.g., driver's license, passport, birth certificate, medical insurance card, etc.) using embedded or accessible sensors (e.g., cameras, etc.), which may then be transmitted to the one or more IVS servers 145.

Additionally, the client application 110 may collect various data from the client system 105A without direct user interaction with the client application 110. For example, the client application 110 may cause the client system 105 to generate and transmit one or more HTTP messages with a header portion including, inter alia, an IP address of the client system 105 in an X-Forwarded-For (XFF) field, a time and date that the message was sent in a Date field, and/or a user agent string contained in a User Agent field. The user agent string may indicate an operating system (OS) type/version being operated by the client system 105, system information of the client system 105, an application version/type or browser version/type of the client application 110, a rendering engine version/type implemented by the client application 110, a device and/or platform type of the client system 105, and/or other like information. These HTTP messages may be sent in response to user interactions with the client application 110 (e.g., when a user submits biographic or biometric data as discussed infra), or the client application 110 may include one or more scripts, which when executed by the client system 105, cause the client system 105 to generate and send the HTTP messages upon loading or rendering the client application 110. Other message types may be used and/or the user and/or client system 105 information may be obtained by other means in other embodiments.

In addition to (or alternative to) obtaining information from HTTP messages as discussed previously, the IVS servers 145 may determine or derive other types of user information associated with the client system 105. For example, the IVS servers 145 may derive a time zone and/or geolocation in which the client system 105 is located from an obtained IP address. In some embodiments, the user and/or client system 105 information may be sent to the IVS servers 145 when the client system 105 loads or renders the client application 110. For example, the login page may include JavaScript or other like code that obtains and sends back information (e.g., in an additional HTTP message) that is not typically included in an HTTP header, such as time zone information, global navigation satellite system (GNSS) and/or Global Positioning System (GPS) coordinates, screen or display resolution of the client system 105, and/or other like information. Other methods may be used to obtain or derive such information in other embodiments.

The first example identity verification service may also involve the one or more IVS servers 145 collecting biographic data of the user from one or more external sources such as, for example, governmental databases (e.g., DMV, police, FBI, electoral records, property records, utility data, etc.), credit bureaus, social media platforms, and/or the like. This service may also involve the one or more IVS servers 145 using the data collected from the client system 105 and the external data to verify additional information such as, for example, whether the user's device (e.g., client system 105A) been associated with identity fraud in the past; the location (e.g., GNSS or other like geolocation) of the user's device (e.g., client system 105A) at the time of enrollment or at the time of the live interview; other location information (e.g., using triangulation, LTE/5G location services, WiFi positioning, IP address location correlations, etc.); comparing biographic and/or user agent data against a list of known fraudsters listed in one or more blacklists; time that the user's identity information has existed, for example, to detect recently established identities that are typically fraudsters; identify known associates of the user and whether or not the known associates are associated with high fraud incidences; a rate of change in address or other biographic information that may indicate a fraudulent identity; run collected biographical data against over 1 to 900 variables and/or attributes to verify biographical information collected during the enrollment is accurate; searching multiple other fraud risk indices to determine if the enrollment is likely for a synthetic identity, an attempt to compromise a real identity, whether the identity is being intentionally manipulated, whether the real person is at risk for being a victim of identity fraud by a third party, and/or whether their identity has previous high risk activity; and/or comparing the collected data from the external sources to verify the information provided by other external sources. Furthermore, the first example identity verification service may also involve the one or more IVS servers 145 generating, using the user and/or client system 105 data and the external data, various sets of KBA questions to ask during the live interview portion of the enrollment process (discussed infra).

A second example identity verification service provided by the IVS 140 may include object recognition services, wherein one or more IVS servers 145 are configured to identify a user based on image or video data. The object recognition services may include an enrollment phase and an evaluation phase. During the enrollment phase, an enrollee provides image or video data from which one or more object features are extracted. An object feature may be any region or portion of an image, such as edges, ridges, corners, blobs, and/or some defined regions of interest (ROI). A feature may also be an attribute of an object, such as size, color, shape, relation to other objects, and/or the like. The features used may be implementation specific, and may be based on, for example, the objects to be detected and the model(s) to be developed and/or used.

In some embodiments, the one or more of the IVS servers 145 may implement geometric object recognition algorithm(s), wherein features are identified by analyzing the relative position, size, and/or shape of extracted landmarks/features, such as the eyes, nose, cheekbones, jaw, lips, and/or other facial features of a human face; palmar skin patterns (e.g., lines, creases, mounts (or bumps) on the palm of a human hand); friction ridges or fingerprint patterns on fingers or the palm of a human hand; and/or the like. In embodiments where infrared (or near-infrared) light/image capture devices are used by the client system 105A, palm/hand and/or facial vein geometry, or portions thereof, may be used as one or more features. The evaluation phase also involves creating an object model for the new enrollee/applicant using the extracted features. The object model may include or indicate facial, palm, finger, etc. characteristics of the enrollee/applicant. In some embodiments, the enrollment phase may include utilizing aging or reverse aging protocols on the provided image/video data so that different feature sets may be extracted for different ages (or predicted future or previous aging) of the enrollee. In this way, multiple feature sets corresponding to different ages of the enrollees may be included in the object recognition model. The object identification models and the image/video data itself may be stored in database objects (DBOs) 155 (discussed infra).

The evaluation phase involves identifying a user by comparing query image/video data with existing object models created during the enrollment phase. During the evaluation phase, features extracted from the query image/video data are compared to the object identification models using a suitable pattern recognition technique. For example, various operators may be applied to an object model and various features may be identified for forming one or more hypotheses. Using the detected features, a probability may be assigned to each potential object in the object model to produce candidate objects, and one or more other object models may be used to verify the hypotheses and refine the probability assigned to the objects. The object models may be qualitative or functional descriptions, geometric surface information, and/or abstract feature vectors, and may be stored in a suitable database (e.g., IVS DB 150) that is organized using some type of indexing scheme to facilitate elimination of unlikely object candidates from consideration. For each candidate object, one or more objects is/are selected from an object model with a highest probabilities as the detected object(s). In one implementation, a set of multiple objects with the highest probabilities among the stored objects are selected using primary biometric data, and then the process may be repeated using second biometric data to select a single object from the set of objects as the highest probability match. Machine learning (ML) and/or deep learning techniques may be used for pattern recognition, which may include, for example, clustering, anomaly detection, neural networks (NNs), deep neural networks (DNN), Bayesian networks (BNs), and/or some other ML or deep learning technology, including those discussed elsewhere in the present disclosure. In some embodiments, the evaluation phase may include utilizing aging or reverse aging protocols on the query image/video data prior to feature extraction. According to various embodiments, the evaluation phase involves comparing the one or more features extracted during the enrollment phase with features extracted from image/video data captured during a live interview to determine whether the enrollee is the same person as the person performing the live interview (within some margin of error).

In order to detect and extract the features from the image/video data, the one or more of the IVS servers 145 may use one or more known object recognition feature detection techniques such as edge detection, corner detection, blob detection, a ML approach (e.g., principle component analysis (PCA), scale-invariant feature transform (SIFT), histogram of oriented gradients (HOG), and/or the like), a deep learning approach (e.g., fully convolutional neural network (FCNN), region proposal convolution neural network (R-CNN), single shot multibox detector, "you only look once" (YOLO) algorithm, and/or the like), or some other suitable technique.

A third example identity verification service provided by the IVS 140 may include speaker recognition (or speaker verification) based on voiceprints. Speaker verification involves determining an identity of a speaker who claims to have a certain identity. A voiceprint is a set of measurable characteristics of the applicants' voice that is used to uniquely identify the applicant. The characteristics may be or may include phonetic features extracted from acoustic signals. The characteristics and/or phonetic features may be based on the physical configuration of a speaker's mouth, throat, etc. when speaking. The voiceprint can be expressed as a mathematical formula, a vector of values, and/or some other representation. A spectrogram or other like graphical representation may be used to display the characteristics and/or phonetic features of the user/enrollee's voice while being recorded by the enrollmentApp. In some implementations, this spectrogram may not include the file format/container of the audio recording (e.g., Waveform Audio File Format (WAV), MPEG-4 part 14 (mp4), Apple® Lossless (.m4a), etc.). Some of these technologies may utilize a spectrogram to create the container that is processed and stored (collected), or may otherwise include (or generate) a spectrogram that could be rendered and displayed for the enrollee/user. In these implementations, the audio recording file/container may be stored though the images themselves may or may not be stored. In some implementations, the enrolleeApp may utilize a suitable plug-in or the like to generate, render, and display the spectrogram of the enrollee/user voice during the recording phase.

The speaker recognition service may be text-dependent (also referred to as "active recognition") or text-independent (also referred to as "passive recognition"). Text-dependent speaker recognition services require speakers to repeat the same phrase, whereas text-independent speaker recognition services have no restrictions on user utterances. In general, active recognition systems/services involve matching a specific phrase to a higher level of certainty, whereas passive recognition systems/services involve comparing the general acoustic qualities of a person's voice against an acoustic profile stored for that person. Both text-independent or text-dependent speaker recognition services may include three phases including a development (or training) phase, an enrollment phase, and an evaluation phase. Some active recognition systems/services can establish a voiceprint of an enrollee without the evaluation phase (e.g., without requiring the user to recite a phrase or otherwise speak three times). These active recognition systems/services utilize a passive recognition system/service for future recognitions. Once a user's voiceprint is generated and stored for future authentication, only one spoken phrase or utterance is required for comparison against the voiceprint. However, redundancies may be built into the system such that a user may be required to speak/utter additional phrases if an initial comparison fails or when the initial phrase or utterance for comparison is recorded poorly or not recorded properly.

The development (or training) phase involves creating a background model for capturing speaker-related information. The background model is generated using a training dataset of speaker utterances. Examples of background models include Gaussian mixture model (GMM) based Universal Background Models (UBMs), Joint Factor Analysis (JFA) based models, Probabilistic Linear Discriminant Analysis (PLDA) models, BNs, DNNs, etc.

In the enrollment phase, speaker models are created for new enrollees/applicants using the background model. New speakers are enrolled by deriving speaker-specific information to obtain speaker-dependent models. The speaker-dependent models may be referred to as "voiceprints," and may include or indicate various speech characteristics of a speaker such as frequency, pitch, duration, intensity dynamics, and/or other like characteristics. In some implementations, utterances produced by the new enrollees/applicants are not among the training dataset used to create the background model. Since text-independent systems have no restrictions on the content spoken by the user, text-independent systems may require use of a speech recognition technology (e.g., Hidden Markov model, Gaussian Mixture model, dynamic time wrapping, convolutional neural networks (CNNs), DNNs, deep feed-forward neural networks (FNNs), Locally Connected Networks (LCNs), end-to-end automatic speech recognition models, and/or the like) to build the speaker-dependent models. The speaker-dependent models (or voiceprints) are stored as individual DBOs 155 in the IVS DB 150 (discussed infra). In various embodiments, during the enrollment phase, the speaker-dependent model (or voiceprint) of an enrollee is compared with multiple other voiceprint records (e.g., stored in or as DBOs 155) to determine whether the enrollee's voiceprint is associated with any other users.

The evaluation phase involves identifying a user by comparing query utterances with existing speaker models created in the enrollment phase. During the evaluation phase, a query test sample is compared to the speaker models using a suitable pattern recognition technique, for example, a score function, cosine similarity, a suitable neural network (e.g., CNNs, DNNs, deep FNNs, LCNs, etc.), and/or the like. Where NNs are used for the evaluation phase, the NN may be trained until the NN is capable of identifying matches between utterances of the same speaker (within some margin of error), and capable of distinguishing between speech of different speakers.

In each of the aforementioned phases, utterances are captured as analog signal(s) by a sensor, such as a microphone. In particular, during the enrollment and evaluation phases, a microphone or other like sensor embedded in, or communicatively coupled with, the client system 105A may be used to capture the voice of the enrollee/applicant. The client system 105 or the one or more IVS servers 145 convert (e.g., using an analog-to-digital (ADC) converter or the like) the analog signals into a digital signal using samples of the analog signals of a suitable quantization level. The one or more IVS servers 145 extract features of the speakers' voices from the digital signals. The features extracted from the digital signal may include, for example, Mel-Frequency Cepstral Coefficients (MFCC), Perceptual Linear Prediction (PLP) features, Deep Features, Power-Normalized Cepstral Coefficients (PNCC), and/or the like. A suitable neural network (e.g., a DNN, CNN, etc.) may be used as a feature extractor to extract the features from the digital signals.

A fourth example identity verification service provided by the IVS 140 may include liveness detection services. The liveness detection services may be used to determine if a particular biometric being captured (such as the image/video or voice biometric data discussed previously) is an actual measurement from a living person who is present at the time of capture. For example, the liveness detection service may be used to determine when a user is attempting to use fake or prosthetic hands or fingers, high resolution images/video, face masks, contact lenses, voice recordings, fake physiological data, etc. during the enrollment or evaluation phases discussed previously. In some embodiments, the liveness detection services for object recognition based on image or video data may include, for example, using texture analysis (e.g., analyzing differences between skin surfaces and/or skin elasticity of real and fake faces or hands), motion analysis (e.g., detecting eye blinks; head, lip, or hand movements, etc.), three-dimensional reconstruction, defocusing techniques, and/or other like techniques. In some embodiments, the liveness detection services for speaker recognition based on audio data may include, for example, using noise detection techniques (e.g., attempting to identify additional channel noise introduced in audio recordings), identical sample detection techniques (e.g., comparing a query voice sample with stored voice samples to detect whether the query voice sample has been obtained before), phoneme sound localization techniques (e.g., measuring a time-difference-of-arrival (TDoA) of phoneme sounds from different microphones), and/or other like techniques. In some embodiments, the liveness detection services for speaker recognition based on audio data may include requiring the user to recite a random word or statement in addition to system-generated content or a passphrase. In some embodiments, the liveness detection services may include capturing physiological biometrics while other biometrics (e.g., face, hand, voice, etc.) are captured. Examples of the physiological biometrics may include, inter alia, pulse, electrocardiogram, pulse oximetry, or the like. Any combination of the aforementioned liveness detection techniques, or any other liveness detection techniques, may be used in other embodiments. In various embodiments, the liveness detection services may take place during the live interview portion of the enrollment process. In some embodiments, the liveness detection services may take place or be operated by the application 110 on the client system 105A without involvement of the IVS servers 145.

A fifth example identity verification service provided by the IVS 140 may include lie (or truthfulness) detection services, which are used to evaluate the truthfulness of the person during the live interview. Data of existing and/or publicly available videos and audio samples that depict or are otherwise representative of untruthfulness or deception are cross-referenced with collated video data of both failed and successful enrollment attempts on the secure enrollment platform (e.g., IVS 140) to build algorithms on key attributes of deceptiveness, for example, body movements, eye misdirection, voice alterations, and changes in behavior. These key attributes are logged and are then applied to assist a liveness check-in adviser (e.g., the live interviewer discussed herein) as to whether an enrollee is lying or not. The lie (or truthfulness) detection services may involve analyzing the image/video data and the voice data discussed previously for micro-expressions and/or linguistic patterns associated with deceptive behaviors. Analysis of the image/video data and the voice data discussed previously for micro-expressions may be accomplished using any suitable AI, machine-learning, and/or deep learning techniques, such as any of those discussed herein and/or variants or combinations thereof. The one or more IVS servers 145 may perform the lie (or truthfulness) detection services during the live interview portion of the enrollment process.

A sixth example identity verification service provided by the IVS 140 may include identity proofing services wherein the one or more IVS servers 145 calculate identity scores or ratings, confidence scores, trust authenticators, max ID scores, and/or the like for each enrollee/applicant (hereinafter referred to as an "identity score" or the like). The identity scores may be probabilities or scalar values indicating an uncertainty regarding the true identity of an enrollee/applicant. In other words, the identity scores indicate the likelihood that an identity does (or does not) belong to a particular individual. In embodiments, the particular attributes, weight factors, algorithms, etc., used to calculate the identity scores may vary from embodiment to embodiment based on client/customer (e.g., SPP 120) needs. In some embodiments, each client/customer platform of the IVS 140 may configure how they would like identity scores to be calculated. For example, a first client platform (e.g., a web-based real estate database company) may choose to obtain identity scores that emphasize fraudulent/suspicious real estate activities of potential users, and a second client platform (e.g., a mobile network operator) may choose to have identity scores that emphasize fraudulent/suspicious telecommunications activities of potential users. In these embodiments, the IVS 140 may add and/or omit certain data components/attributes, and/or may weight different data components/attributes for calculating the identity scores differently depending on a particular identity scoring configuration for a particular client platform. In some embodiments, an identity score for a potential user may be tied to a particular transaction, and/or a transaction may be tied to the proper authentication of both parties to that transaction. In some of these embodiments, the transactions may be tracked or accounted for using a suitable blockchain database. Once calculated, the identity scores can be compared with a threshold uncertainty value, which may then be used as a basis to reject or accept enrollees' access to different content/services. In some embodiments, a third party scoring system (e.g., LexisNexis® InstantID® or the like) may be used to provide an identity score. In such embodiments, the third party identity scores may be enhanced with the values of other attributes that are collected or computed by the IVS 140. In embodiments, a user's identity score may be used as a basis to offer specific types or classes of content, services, or promotions offered from different third-party platforms (e.g., SPP 120). In various embodiments, users may submit additional or alternative biographic and/or biometric data to the IVS 140 in order to increase their identity score. Additionally, the identity scores may be compared against other data items to identify or predict fraudulent activity.

The identity scores may be calculated based on the biographic, biometric, and/or other data collected during the enrollment process, the live interview portion of the enrollment process, and/or any attempt to validate a user's identity. In one example, a trust score may be determined for each piece of data provided by an enrollee during the enrollment process, and the identity score may be based on a combination of the trust scores. In another example, the identity score may be based on how often the same or similar identity data appear in DBOs 155 of different individuals, a number of conflicting identity data points appear for a particular user, a number of identity verification attempts including successful or unsuccessful identity authentications, an amount of time for a user to provide identity data in response to prompts, and/or the like. External data may also be used in calculating the identity score. For example, the identity score may be based at least in part on collected/mined social network profile data and/or social network connection data, wherein this social network data is analyzed against various factors and social network behaviors that tend to show whether a user's identity is real or synthetic Any suitable algorithm may be used to determine or calculate the identity score; for example, multi-layer FNNs, DNN selective classification algorithms, CNN Monte Carlo algorithms, Social Matrix Factorization (SMF) techniques, and/or the like may be used for confidence scoring. The manner in which the identity scores are calculated (e.g., the particular algorithm(s)), and the weights assigned to different data points, can be application dependent and vary from embodiment to embodiment.

A seventh example identity verification service provided by the IVS 140 may include conversational interface services, which may be used to conduct a live interview portion of the enrollment process. The live interview portion of the enrollment process is used to evaluate the liveness of the enrollee and the authenticity of the enrollee's identity. The live interview portion is also used to collect the same or similar identifying biographic and biometric data that was collected prior to the live interview, which is/are also used for the identity verification purposes. In some embodiments, the conversational interface services may involve one or more IVS servers 145 providing communication interfaces between client systems 105 used by enrollees/applicants (e.g., client system 105A in the example of FIG. 1) and client systems 105 used by human interviewers (e.g., client system 105B in the example of FIG. 1).

Where a live interview is conducted with a human interviewer, the client system 105A may establish a videotelephone or videoconferencing connection with the client system 105B via the IVS 140 using a suitable videotelephone technology. Examples of such videotelephone technologies include, inter alia, International Telecommunications Union (ITU) H.320 (Public Switched Telephone Network (PTSN)), H.264 (Scalable Video Coding (SVC)), and V.80 (videoconferencing) standards. In one example, ITU H.264 and Advanced Audio Coding (AAC) may be used for video and audio encoding, respectively, while SIP with RTP or SRTP may be used to setup and stream the encoded audio and video for the video call. In these embodiments, the IVS servers 145 may include or implement, depending on the particular protocol(s) used, proxy server(s), redirect server(s), gateway(s) (e.g., WebRTC gateways, SIP gateways, etc.), XMPP server(s), signaling server(s), network address translation (NAT) server(s) (e.g., Session Traversal Utilities for NAT (STUN) server(s), Traversal Using Relays for NAT (TURN) server(s), SIP session border controller(s), etc.), login server(s) (e.g., for Skype protocol based implementations), and/or the like. In some of these embodiments, the live interview may only be enabled for an upload capability. In some implementations, the IVS servers 145 (or application servers) may be configured to establish and maintain secure channels between the IVS 140 (or individual IVS servers 145) and various client systems 105. The secure channels may allow the client systems 105 to provide sensitive information (e.g., identity information, biometric data, etc.) to the IVS 140 in a secure manner.

After establishing respective secure channels with client systems 105A and 105B, the IVS 140 may pass messages between the client system 105A and the client system 105B such that it appears, from the perspective of the client systems 105, as though there is an secure channel between the client systems 105A and 105B (not shown by FIG. 1). In some embodiments, at least one of the IVS servers 145 may be implemented to translate and pass messages between the client systems 105A and 105B by performing port forwarding or mapping, NAT, packet routing, bridging, etc. A secure channel may also be established between the client system 105A and an IVS server 145 to enable the client system 105A to upload or otherwise provide personally-identifying information (PII) during an enrollment process. The secure channels may be established using any suitable cryptographic and/or tunneling protocol(s) that use encryption algorithm(s) to (re)package data traffic for communication between computer systems/devices. Examples of such tunneling protocols may include Internet Protocol Security (IPSec), Secure Socket Layer (SSL), Transport Layer Security (TLS), Pretty Good Privacy (PGP) and/or OpenPGP, SSH, Kerberos, and/or the like. The secure channels may allow the client systems 105 to provide sensitive information (e.g., identity information, biometric data, etc.) to the IVS 140 in a secure manner.

The secure channel refers to any secure means of communication. The term, "channel" refers to any means for bidirectional communication between two entities or elements, and the term "secure channel" may refer to any means for transferring data over a channel that is resistant to overhearing and/or tampering. In other words, a "secure channel" refers to employing data confidentiality and data integrity protection measures to data being communicated over a channel. In one example implementation, communications may take place over a network (e.g., the Internet) using Secure Socket Layer (SSL) or Transport Layer Security (TLS) between one device (e.g., client system 105A-B)

and software processor(s) or nodes in the IVS cloud 140. Additionally or alternatively, a suitable point-to-point encryption (P2PE) or end-to-end encryption (E2EE) mechanism may be used, which involves endpoint applications handling the encryption and decryptio of messages on their own. In this implementation, the endpoints can encrypt data using a pre-shared secret (e.g., as in Pretty Good Privacy (PGP)) or a one-time secret derived from such a pre-shared secret (e.g., using a derived unique key per transaction (DUKPT)). In another example implementation, end-to-end encrypted tunnels (EETs) may be established using any suitable tunneling protocol that uses an encryption algorithm to (re)package data traffic for communication between computer systems/devices. EETs may generally refer to communications traveling over a virtual private network (VPN) or communications using Internet Protocol Security (IPsec). Any suitable cryptographic protocol may be used for the secure channel including SSL, TLS, IPsec, PGP and/or OpenPGP, SSH, Kerberos, and/or the like. For purposes of the present disclosure, the terms "end-to-end encrypted tunnel," "secure channel," "encrypted channel," "point-to-point encryption," "end-to-end encryption," and the like may be used interchangeably throughout the present disclosure even though these terms may refer to different concepts.

As mentioned previously, the conversational interface services may involve the IVS servers 145 operating a virtual assistant, chatbot, autonomous AI agent, and/or the like (collectively referred to as an "bot" or "bots"). The bots may be implemented using a suitable bot framework (e.g., Botkit, Rasa NLU, Azure® Bot Service and/or Microsoft® Bot Framework, Apache® OpenNLP™, Apache® Spark NLP™, and/or the like), or an AI service (e.g., Wit.ai® provided by Facebook®, Dialogflow™ (formerly API.ai) provided by Google®, Microsoft® Language Understanding Intelligent Service (LUIS), IBM® Watson®, Amazon® Lex®, and/or the like). In these embodiments, a bot may be operated within the client application 110 on the client system 105A, and the IVS servers 145 may implement semantic processor(s), voice-based query processor(s), and/or other like stream processor(s) (collectively referred to as "stream processor" or "stream processors") that may utilize various online acoustic/language, grammar, and/or action models to handle voice, text, and/or image-based requests obtained via the bot. Resources of the stream processors may be distributed over multiple IVS servers 145, such as when the IVS 140 is implemented as a cloud computing service using cloud infrastructure. In some implementations, individual semantic processor(s), voice-based query processor(s), etc., handle one or more bots being operated by respective client systems 105A. In these embodiments, the client system 105A is configured to operate an instance of a bot within the client application 110, and requests obtained via that bot instance are handled by a particular stream processor.

In some embodiments, the bot may be graphically represented by one or more graphical objects 115 (hereinafter referred to as "bot 115"). In some implementations, the bot 115 may be an avatar with facial animations that substantially correspond to auditory outputs provided by the stream processors. In other implementations, the bot 115 may take the form of a user in a messaging application wherein the bot 115 comprises textual outputs provided by the stream processors. In operation, the bot obtains voice, text, or image inputs (or simply "inputs") from the user via a suitable input device of the client system 105A, and forwards the inputs to the IVS servers 145. Where voice inputs are used, the bot (or application 110) may include a streaming voice-to-text module that receives voice input (or a digital recording of the voice input), and converts the digital audio data into one or more textual words or phrases (also referred to as "tokens") on a token-by-token basis in real time or near-real time. In some implementations, one or more locally-stored or remotely accessible language models, which map relationships between audio signals and phonetic units and/or word sequences, are used to generate the tokens. In some implementations, an audio recording of voice input may be streamed or otherwise sent to the IVS servers 145 without generating tokens at the client system 105A.

The IVS servers 145 operate the semantic processor(s), voice-based query processor(s), etc., to discern the semantics or meaning of the received inputs and formulate an appropriate response. In some embodiments, the semantic processor(s), voice-based query processor(s), etc., parse the inputs into an internal representation (e.g., a set of tokens arranged in a suitable data structure) according to a lexicon, vocabulary, and/or grammar rules, and apply the internal representation to a suitable Natural Language Processing (NLP) and/or Natural Language Understanding (NLU) ML model (e.g., a Recurrent Neural Network (RNN), CNN, and/or some other ML model, such as those discussed herein). In some implementations, the NLP/NLU models may be trained on context-reply pairs. The context in a context-reply pair is one or more sentences that precede a reply of that context-reply pair, and the reply may also include one or more sentences. Each sentence comprises a sequence of tokens constructed based on the lexicon, vocabulary, and/or grammar rules. Based on the internal representation (or set of tokens) of the inputs, the semantic processor(s), voice-based query processor(s), etc., select appropriate replies, and send the selected replies to the bot operated by the client system 105A. In other implementations, the NLP/NLU models may be trained on entities and intents. The entities are mappings of natural language word combinations to standard phrases conveying their unobscured meaning, and intents are mappings of the unobscured meanings to corresponding bot actions. Actions are responses to corresponding intents, which may be in the form of text or voice outputs or executable functions, which may take optional parameters or contextual information.

The bot operated by the client system 105A receives responses from the IVS servers 145, and controls/manages outputting the responses visually within the application 110 and/or using another output device of client system 105A, such as audio or haptic output devices. Where voice outputs are used, the bot (or application 110) may utilize the streaming voice-to-text module to convert text data (or set of tokens) in the responses into one or more audio signals on a token-by-token basis in real time or near-real time, which are then output by an audio output device of the client system 105A.

Regardless of whether the live interview is performed by a human interviewer or a bot, biographic and/or biometric data may be collected during the live interview for both identity and liveness verification. In some embodiments, the biographic and/or biometric data collected during the live interview may be compared with biographic/biometric data collected prior to the live interview (e.g., the first through third example identity verification servers discussed previously) and/or compared with biographic/biometric data collected during previous live interviews (e.g., in implementations where multiple interviews are conducted with a same user). The comparison of this data may be performed in a same or similar manner as discussed previously. In some embodiments, an age reversing protocol may be utilized to age reverse the image/video data of the user captured during the live interview against images of the user with known dates prior to the live interview, which may be used to verify that the user is not using a synthetic identity. In some embodiments, the biographic/biometric data collected during the live interview may be compared with reference images obtained from external sources, such as those discussed previously with respect to the first identity verification service.

During the live interview the bot or human interviewer may ask various questions generated based on the data collected prior to the live interview (e.g., the KBA questions generated by the first example identity verification servers discussed previously). The bot or human interviewer may analyze how the user answers the KBA questions to verify if the user does indeed know the answers. Various data may be collected in order to analyze how the user answers the KBA questions. For example, the amount of time the user takes to answer a question, a number of times the user changes his/her answer to a question, image/video data for analyzing micro-expressions, audio data for analyzing linguistic patterns, and/or the like. For example, the bot or human interviewer may ask, "How many bathrooms do you have in your home on Johnson Street," and the interviewer can check to see if the answer is not readily known by the user, such as if the user refers to printed documents or if the user is using the client system 105A to search for the correct answer.

An eighth example identity verification service provided by the IVS 140 may include identity asset management services in which one or more IVS servers 145 create a portable data asset using the identity information of authenticated users. A "data asset" may refer to data or data sets that are organized and managed as a single entity, and a data asset based on identity information may be referred to as an "identity asset." These identity assets can be linked to, or communicated with, other platforms for identity verification purposes. For example, in some embodiments, an identity verified user may utilize his/her identity asset as authentication credentials and/or as a user profile for other websites or platforms, such as SPP 120. In these embodiments, the user may access their identity asset through the SPP 120 (e.g., using APIs, etc.) when attempting to access content/services from the SPP 120 or through the secure portal provided by the IVS 140 (discussed infra). In these embodiments, the IVS server(s) 145 may package or format the identity asset in a particular format suitable for consumption by the SPP 120. In some embodiments, the IVS server(s) 145 may package or format the identity asset based on user selected criteria. For example, a user may select a particular combination of biographic and/or biometric data to verify his/her identity for access to the SPP 120, and the IVS server(s) 145 may generate an identity verification indicator based on the combination of biographic and/or biometric data, which may then be sent to the SPP 120. In this way, third party platforms/websites do not need to use their own computational and/or storage resources for authenticating users and/or managing user profiles.

In some embodiments, the identity asset may be linked or otherwise associated with an identity access certificate, which may be used to access identity information of the identity asset. For example, the client system 105A may obtain an identity access certificate of a verified user from the IVS servers 145 by, for example, downloading the identity access certificate to its local memory, accessing the identity access certificate using a web resource or URL, or using some other data transfer mechanism. When the user wishes to have his/her identity verified, the client system 105A may provide the identity access certificate to the SPP 120 using, for example, an upload component, submitting the web resource or URL of the identity access certificate via a web form, or using some other data transfer mechanism. The SPP 120 may then provide the identity access certificate, with suitable credentials, digital certificates, and/or the like, to the IVS 140 in order to obtain identity information of the user. In some embodiments, different identity access certificates may be linked or otherwise associated with different combinations of identity information, and a user may provide a specific access certificate (or access token) to the SPP 120 based on the amount of information that the user is willing to provide to the SPP 120. For example, a first identity access certificate may only indicate that the user's identity has been verified (e.g., a "verified identity indicator") and a second identity access certificate may include a verified identity indicator and various types of biographic data (e.g., name, address, Social Security number, etc.). In this example, the user may provide the first identity access certificate to the SPP 120 for identity verification purposes only, and may provide the second identity access certificate to the SPP 120 when the user wishes to set up a user account with the SPP 120. The SPP 120 may then provide the first or second identity access certificate, with suitable credentials, digital certificates, and/or the like, to the IVS 140 in order to obtain identity information of the user. In these ways, privacy and information security concerns may be alleviated since users may control the dissemination of their personally-identifying information (PII). Furthermore, using identity access certificates may also allow users to set up user accounts with SPPs 120 without requiring users to enter their information into web forms, which saves time (from the users' perspective) and could protect against some types of key logger malware applications. This is because the identity authentication/authorization processes discussed herein only require an enrollee to provide their PII during the enrollment process, and may then provide a one-time authorization code into web forms for various SPPs 120. Thus, even if a malware key logger captured the one-time authorization code, it would be of no value.

In various embodiments, the one or more IVS servers 145 may implement or operate individual artificial intelligence (AI) agents to perform respective identity verification services of the identity verification services discussed previously, or portions thereof. The AI agents are autonomous entities configured to observe environmental conditions and determine actions to be taken in furtherance of a particular goal and based on learnt experience (e.g., empirical data). The particular environmental conditions to be observed, the actions to be taken, and the particular goals to be achieved may be based on an operational design domain (ODD) and/or may be specific or individualized based on the subsystem itself. An ODD includes the operating conditions under which a given AI agent, or feature thereof, is specifically designed to function. An ODD may include operational restrictions, such as environmental, geographical, and time-of-day restrictions, and/or the requisite presence or absence of certain conditions or characteristics.

To observe environmental conditions, the AI agents is/are configured to receive, or monitor for, collected data from client systems 105, IVS servers 145, SPP 120, and/or other sources. The act of monitoring may include, for example, polling (e.g., periodic polling, sequential (roll call) polling, etc.) client systems 105 and/or other IVS servers 145 for identity/biometric data for a specified/selected period of time. In other embodiments, monitoring may include sending a request or command for identity/biometric data in response to an external request for identity/biometric data. In some embodiments, monitoring may include waiting for identity/biometric data from various client systems 105 based on triggers or events. The events/triggers may be AI agent specific and may vary depending on a particular embodiment. In some embodiments, the monitoring may be triggered or activated by an application or subsystem of the IVS 140 and/or by a remote device, such as or server(s) of SPP 120.

To determine actions to be taken in furtherance of a particular goal, each of the AI agents are configured to identify a current state (context) of a live interview session or instance and/or the AI agent itself, identify or obtain one or more models (e.g., the various models discussed previously with respect to the example identity verification services), identify or obtain goal information, and predict a result of taking one or more actions based on the current state (context), the one or more models, and the goal information. The one or more models may be any algorithms or objects created after an AI agent is trained with one or more training datasets, and the one or more models may indicate the possible actions that may be taken based on the current state (context). The one or more models may be based on the ODD defined for a particular AI agent. The current state (context) is a configuration or set of information collected by the IVS 140 and/or one or more IVS servers 145. The current state (context) is stored inside an AI agent and is maintained in a suitable data structure. The AI agents are configured to predict possible outcomes as a result of taking certain actions defined by the models.

The goal information describes outcomes (or goal states) that are desirable given the current state (context). Each of the AI agents may select an outcome from among the predicted possible outcomes that reaches a particular goal state, and provide signals or commands to various other subsystems of the IVS 140 to perform one or more actions determined to lead to the selected outcome. In addition, the AI agents may also include a learning module configured to learn from an experience with respect to the selected outcome and some performance measure(s). The experience may include state (context) data collected after performance of the one or more actions of the selected outcome. The learned experience may be used to produce new or updated models for determining future actions to take.

The AI agent(s) is/are implemented as autonomous software agents, implemented using individual hardware elements, or a combination thereof. In an example software-based implementation, the AI agents may be developed using a suitable programming language, development tools/environments, etc., which are executed by one or more processors of one or more IVS servers 145. In this example, program code of the AI agents may be executed by a single processor or by individual processing devices. In an example hardware-based implementation, each AI agent may be implemented in a respective hardware accelerator (e.g., FPGA, ASIC, DSP, etc.) that are configured with appropriate bit stream(s) or logic blocks to perform their respective functions. The aforementioned processor(s) and/or hardware accelerators may be specifically tailored for operating AI agents and/or for ML functionality, such as computer vision (CV) and/or deep learning (DL) accelerators, a cluster of AI GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

In various embodiments, the IVS servers 145 (or application servers) are configured to serve one or more instructions or source code documents to client systems 105, which may then be executed within a client application 110 to render one or more objects 115 (e.g., graphical user interfaces (GUIs)). The GUIs comprise graphical control elements (GCEs) that allow the client systems 105 to perform various functions and/or to request or instruct the IVS 140 to perform various functions. For example, the IVS servers 145 may provide interfaces that allow an applicant/enrollee operating client system 105A to capture various forms of biometric data, enter or record identity information, upload various documents and/or content items, and submit the biometric data, identity information, and/or uploaded content to the IVS 140 for identity verification or other compliance purposes. In some embodiments, these or other interfaces may also allow the applicant/enrollee user of the client system 105A to generate identity verification indicators based on different combinations of the biometric, identity information, and/or other content. The identity verification indicators may be Boolean indicators (e.g., yes/no, true/false, or the like), codes or data indicating or including identity data (e.g., for autocompletion of web forms), or include code or data for accessing identity data (e.g., the one-time use authorization codes mentioned previously). These or other interfaces may also allow the applicant/enrollee user of the client system 105A to distribute verified identity indicators to selected or identified recipient systems or devices (e.g., SPP 120, other client systems 105, etc.). In another example, where the client system 105B is operated by an interviewer user, the IVS servers 145 may provide interfaces that allow the client system 105B to access captured biometric and/or identity data, revise or comment on individual data items, and/or search various databases within or outside of the IVS 140 for various information/data about applicants/enrollees. These or other interfaces may also allow the interviewer user of the client system 105B to accept or reject users attempting to access content and/or services from SPP 120, and provide indications of the acceptance/rejection to selected/dentified recipient systems or devices (e.g., SPP 120, client system 105B, etc.). The IVS servers 145 may also provide various other interfaces as discussed herein. The interfaces may be developed using website development tools and/or programming languages (e.g., HTML, Cascading Stylesheets (CSS), JavaScript, Jscript, Ruby, Python, etc.) and/or using platform-specific development tools (for example, Android® Studio™ integrated development environment (IDE), Microsoft® Visual Studio® IDE, Apple® iOS® software development kit (SDK), Nvidia® Compute Unified Device Architecture (CUDA)® Toolkit, etc.). The term "platform-specific" may refer to the platform implemented by the client systems 105 and/or the platform implemented by the IVS servers 145. Example interfaces are shown and described with regard to FIGS. 3-55.

The IVS DB 150 may be stored in one or more data storage devices or storage systems that act as a repository for persistently storing and managing collections of data according to one or more predefined DB structures. The data storage devices/systems may include one or more primary storage devices, secondary storage devices, tertiary storage devices, non-linear storage devices, and/or other like data storage devices. In some implementations, at least some of the IVS servers 145 may implement a suitable database management system (DBMS) to execute storage and retrieval of information against various database object(s) in the IVS DB 150. These IVS servers 145 may be storage servers, file servers, or other like computing systems. The DBMS may include a relational database management system (RDBMS), an object database management system (ODBMS), a non-relational DBMS (e.g., a NoSQL DB system), and/or some other DBMS used to create and maintain the IVS DB 150. The IVS DB 150 can be implemented as part of a single database, a distributed database, a collection of distributed databases, a database with redundant online or offline backups or other redundancies, etc., and can include a distributed database or storage network. These IVS server(s) 145 may utilize a suitable query language to store and retrieve information in/from the IVS DB 150, such as Structure Query Language (SQL), object query language (OQL), non-first normal form query language (N1QL), XQuery, and/or the like. Suitable implementations for the database systems and storage devices are known or commercially available, and are readily implemented by persons having ordinary skill in the art.

As shown by FIG. 1, the IVS DB 150 stores a plurality of database objects (DBOs) 155. The DBOs 155 may be arranged in a set of logical tables containing data fitted into predefined or customizable categories, and/or the DBOs 155 may be arranged in a set of blockchains or ledgers wherein each block (or DBO 155) in the blockchain is linked to a previous block. Each of the DBOs 155 may include data associated with individual users, such as biographic data collected from individual users; biometric data collected from individual users; data collected from various external sources; identity session identifiers (IDs); identity scores, survey assessment scores, etc.; and/or other like data. Some of the DBOs 155 may store information pertaining to relationships between any of the data items discussed herein. Some of the DBOs 155 may store permission or access-related information for each user. These DBOs 155 may indicate specific third parties that are permitted to access identity data of a particular user. In some implementations, the permission or access-related DBOs 155 for each user may be arranged or stored as a blockchain to control which third parties can access that user's identity data. In these embodiments, the blockchain(s) do not actually store user biometric and/or biographic data, but instead are used to authorize specific third party platforms to access specific identity data items and to track or account for the accesses to the identity data items.

As an example, one or more IVS servers 145 may generate a block that includes block data or block content such as, for example, a blockchain identifier, a user identifier (user_id), a third party identifier (ID) or organization ID (org_id), one or more selected identity data types (e.g., name, address, facial biometric data, voice data, etc.), authentication credentials (e.g., user name/password, key information, digital signatures, digital certificates, etc.), timestamp, a current block identifier (cb_id), a previous block identifier (pb_id), and/or other like content or information. To generate a block, the one or more IVS servers 145 may encipher the block content to obtain a cb_id and pb_id. In embodiments, the cb_id may be an identifier of a current block, which may be a hash that is generated using a cryptographic hash algorithm, such as a function in the Secure Hash Algorithm (SHA) 2 set of cryptographic hash algorithms (e.g., SHA-226, SHA-256, SHA-512, etc.), SHA 3, etc. Other hash algorithms or cryptographic functions may be used, such as any type of keyed or unkeyed cryptographic hash function and/or any other function discussed herein. The pb_id is a hash that is generated using the same or similar cryptographic hash algorithm as is used to generate the cb_id, but may be used to reference a previous block in the blockchain (referred to as a "parent block," "previous block," "top block," and the like). In this way, a sequence of identifiers linking each block to its parent block may create a chain going back all the way to a genesis block (e.g., the first block in a blockchain). Furthermore, the one or more IVS servers 145 may digitally sign and/or encrypt the block prior to transmission using, for example, an elliptic curve cryptographic (ECC) algorithm, Elliptic Curve cryptography Digital Signature Algorithm (ECDSA), Rivest-Shamir-Adleman (RSA) cryptography, Merkle signature scheme, advanced encryption system (AES) algorithm, a triple data encryption algorithm (3DES), any of the SHAs discussed previously, and/or the like. Moreover, a different IVS server 145 than the IVS server 145 that generated the block may validate or verify the block before adding it to the blockchain using a suitable consensus algorithm such as a proof-of-work (PoW) system, a proof-of-stake (PoS) algorithm, proof-of-burn algorithm, proof-of-activity algorithm, proof-of-capacity algorithm, a practical byzantine fault tolerance (PBFT) algorithm, a Ripple protocol based algorithm, and/or the like.

Some of the DBOs 155 may store information pertaining to third party attempts to obtain identity verification for a particular user and/or attempted uses of a particular identity, including, for example, the number of times identity verification attempts are made, the type of information provided for identity verification purposes, and/or the like. These data items may be compared against other data items to determine or predict fraudulent activity. Some of the DBOs 155 may store information pertaining to user interactions with the IVS 140 (e.g., during the enrollment process, with the secure portal, etc.) and/or the SPP 120 including, for example, an amount of time a user takes to provide identity data in response to prompts, the number of incorrect answers provided to each question, a number and/or speed of log-in attempts with the IVS 140 and/or the other platforms (e.g., SPP 120), etc.

Some of the DBOs 155 may store information obtained from external sources, including SPP 120 or other like systems/platforms. In these embodiments, at least some of the IVS servers 145 may implement data integration mechanisms, such as extract-load-transform (ELT) and/or extract-transform-load (ETL), to extract/transfer raw data from external data source(s) to the IVS DB 150 or some other data storage system within the IVS 140, and convert/transform the data into a suitable form or format for use by the IVS 140, if necessary. These IVS servers 145 may obtain the data from the external data sources using APIs, web/data scraping techniques, and/or some other suitable mechanism.

In some embodiments, the IVS 140 and/or the SPP 120 may be implemented as respective cloud computing services. The cloud computing services (or "clouds") include networks of physical and/or virtual computer systems (e.g., one or more servers), data storage systems/devices, etc. within or associated with a data center or data warehouse that provide access to a pool of computing resources. The one or more servers in a cloud include individual computer systems, where each of the servers include one or more processors, one or more memory devices, input/output (I/O) interfaces, communications interfaces, and/or other like components. The servers may be connected with one another via a Local Area Network (LAN), fast LAN, message passing interface (MPI) implementations, and/or any other suitable networking technology. Various combinations of the servers may implement different cloud elements or nodes, such as cloud manager(s), cluster manager(s), master node(s), one or more secondary (slave) nodes, and the like. The one or more servers may implement additional or alternative nodes/elements in other embodiments Either of the clouds may be a private cloud that offers cloud services to a single organization; a public cloud that provides computing resources to the general public and shares computing resources across all customers platforms; or a hybrid cloud (or virtual private cloud), which uses a portion of resources to provide public cloud services while using other dedicated resources to provide private cloud services. For example, the hybrid cloud may include a private cloud service that also utilizes one or more public cloud services for certain applications or customer platforms, such as providing identity verification services according to the embodiments discussed herein. In this regard, the cloud may provide an Infrastructure as a Service (IaaS) or a Platform as a Service (PaaS) cloud service model. Either of the clouds may include a common cloud management platform (e.g., implemented as various virtual machines and applications hosted across each cloud), and may coordinate the delivery and retrieval of data from various cloud nodes such that client systems 105 may not be aware that the cloud exists.

In some implementations, at least some of the servers in the cloud (e.g., servers that act as secondary nodes) may implement application server and/or web server functionality, which includes, inter alia, obtaining various messages from the client systems 105; processing data contained in those messages; routing data to other nodes in the cloud for further processing, storage, retrieval, etc.; generating and communicating messages including data items, content items, program code, renderable webpages and/or documents (e.g., including the various GUIs discussed herein), and/or other information to/from client systems 105; and/or other like application server functions. In embodiments where the IVS 140 is a cloud, at least some of the servers in the cloud may implement identity verification functionality as discussed herein. In this way, various combinations of the servers may implement different cloud elements/nodes configured to perform the embodiments discussed herein.

The network 101 may represent the Internet, one or more cellular networks, a LAN, a wide area network (WAN), a wireless LAN (WLAN), TCP/IP-based network, or combinations thereof. In some embodiments, the network 101 may be associated with a network operator who owns or controls equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), a proprietary and/or enterprise network, a non-TCP/IP based network, and/or the like. The network 101 comprises computers, network connections among various computers (e.g., between the client system 105, IVS 140, and SPP 120), and software routines to enable communication between the computers over respective network connections. In this regard, the network 101 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 101 may be via a wired or a wireless connection using the various communication protocols discussed infra. More than one network may be involved in a communication session between the illustrated devices. Connection to the network 101 may require that the computers execute software routines that enable, for example, the seven layers of the OSI model of computer networking or equivalent in a wireless (or cellular) phone network.

Figure 2A:
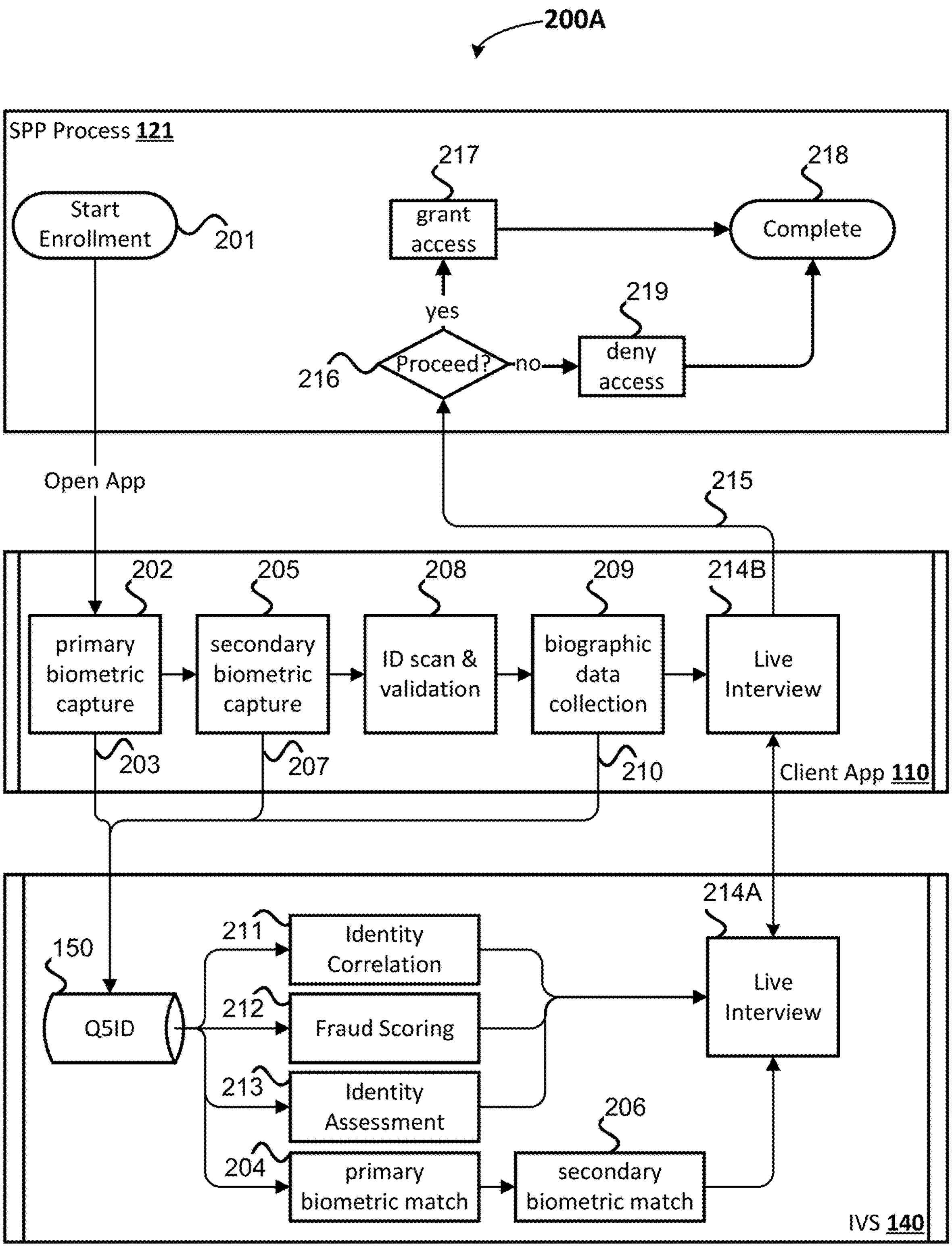
FIG. 2A illustrates an example data flow of an enrollment process according to various embodiments.

FIG. 2A illustrates an example data flow of an enrollment process 200A according to various embodiments. In this example, the enrollment process may be initiated when a user of a client system 105A attempts to access content and/or services of SPP 120 through an SPP process 121 provided by the SPP 120. The enrollment process 200A begins at operation 201 where the enrollment process 200A is triggered to begin. As an example, the enrollment process 200A may be triggered in response to predefined user interactions with the SPP 120. The enrollment process 200A being started by the SPP 120 at operation 201 causes the client application 110 to be executed or initialized.

At operation 202, a primary biometric is captured by the client application 110. In this example, the primary biometric may be the applicant's face, wherein the face scan may include capturing images or video of the enrollee's face. The applicant's face may be scanned using an embedded camera or other like sensor(s) of the computing system 105A. In some embodiments, the client application 110 may prompt the applicant to perform one or more gestures for liveness verification (e.g., blink a number of times or the like). At operation 203, the applicant's facial data is securely sent to the IVS 140 for storage in the IVS DB 150 and for real-time processing by the IVS server(s) 145. The facial data may include, for example, feature descriptors of one or more features extracted from the scanned face. The feature descriptors may describe (e.g., as a vector of values) characteristics such as shape, color, texture, and/or motion of a feature. The feature descriptors may also indicate the location of the feature within an image, as well as the size and scale of the feature.

At this point the primary biometric data has been securely sent to the IVS 140 for processing. Once received, one or more of the IVS servers 145 may control storage of the primary biometric data in the IVS DB 150, and may immediately create a new identity session. In other embodiments, the one or more IVS servers 145 may immediately create a new identity session upon receipt of an indication that the application 110 has been initialized on the client system 105, which may take place prior to collecting the primary biometric data. At operation 204, the IVS 140 performs a primary biometric match wherein one or more IVS servers 145 attempt to match the obtained primary biometric with the primary biometric obtained from other users or collected from other sources. The primary biometric match may be a one-to-many (1:N) comparison with other identity DBOs 155, which may be initiated as soon as an IVS server(s) 145 obtain(s) the primary biometric from the enrollee. In these embodiments, the facial data of the enrollee is compared with the facial data of other active users. In one implementation, the IVS server(s) 145 return ten users who's primary biometric is the most similar to the enrollee's primary biometric from among the user identities stored in the DBOs 155. For example, where the primary biometric is image data of a human face, the IVS server(s) 145 may return the ten user identities having the most similar faces to the enrollee's face. All returned primary biometric matches are associated with the applicant's identity session ID, and are then evaluated during the live interview. The live interviewer (either human or AI agent) will have the opportunity to determine if any of the potential matches are actual matches during the live interview portion 214A-B of the enrollment process 200A.

While the primary biometric match is being performed at operation 204, the client application 110 captures a secondary biometric at operation 205. In this example, the secondary biometric may be a voiceprint, wherein the client application 110 prompts the applicant to record their voiceprint at operation 205. In this example, the client application 110 may prompt the applicant to speak a predefined phrase a predefined number of times, and may utilize an embedded or external microphone (e.g., using drivers, libraries, APIs, etc.) to record the applicant's voice while the applicant is speaking the phrase. The client application 110 may then extract voice features from the recorded voice, and generate the voiceprint using the extracted voice features. At operation 207, the secondary biometric data (e.g., the applicant's voiceprint) is securely sent to the IVS 140 for storage in the IVS DB 150 and real-time processing. In some embodiments where voice biometric data is used, the recorded voice itself may be sent to the IVS 140 and one or more IVS servers 145 may generate a voiceprint for storage in the IVS DB 150 and identity verification purposes.

Since the probability of one or more matches being returned increases with the number of enrollments or active users in the IVS 140, a secondary biometric match is performed at operation 206. The secondary biometric match is performed to refine the primary biometric match results of operation 204. In this example, the secondary biometric match is a voiceprint recognition process wherein the one or more IVS servers 145 match the voiceprint of the enrollee against the voiceprints of the users returned during the primary biometric match. Although the example of FIG. 2A only uses two different biometrics to authenticate the enrollee's identity, in other embodiments, any number and combination of biometric data may be collected and used to authenticate the enrollee's identity. For example, the secondary biometric data collected at operation 205 (or tertiary biometric data collected before or after the secondary biometric data (not shown by FIG. 2A)) may be palm/hand image data, which may be compared with stored palm/hand images in a same or similar manner as the facial image data discussed previously. The ability to confirm an identity goes up exponentially by acquiring a second biometric (namely, the palm/hand image data as in this example). For example, the false acceptance rate (FAR) of using facial biometrics is around 1:200,000, while the FAR of using palm/hand biometrics is only 1:20,000,000. Here, the "false acceptance rate" or "FAR" refers to a measure of the likelihood that a biometric security system will incorrectly accept an access attempt by an unauthorized user; the FAR is represented as the ratio of the number of false acceptances divided by the number of identification attempts. Incorporating only a primary biometric (e.g., the facial biometric data in this example) and a secondary biometric data (e.g., a single palm biometric in this example) together results in a FAR of 1:20,000,000. By including both palm/hands for the secondary biometric data, then the aforementioned FAR would be multiplied by 20 million.

Additionally, in some embodiments, the IVS 140 may issue a user account number to the enrollee once it has collected all biometric data of the enrollee (e.g., both the primary and secondary biometric in this example). In some embodiments, if the enrollee fails to properly capture any of the biometric data before quitting the enrollment process 200A, the IVS 140 may store the existing biometric data but may be configured to not store the user's place in the enrollment process 200A, for example, as a saved partial enrollment. Instead, in these embodiments the individual would have to start the enrollment process 200A again as a new enrollee. Waiting to issue a unique account number until all biometric data is/are captured may ensure that the IVS 140 is able to categorize the individual into one of a new enrollee, a resuming enrollee, or an existing IVS 140 member.

At operation 208, the client application 110 performs an identity document scan and validation process. For example, operation 208 may involve the user of client system 105 (the "applicant" or "enrollee") using an embedded camera to scan a driver's license and/or some other identity document(s)(e.g., government issued ID, passport, student ID, organization/enterprise ID, etc.). Other devices may be used to scan the applicant's identity document(s), such as peripheral cameras or image capture devices, document scanners, photocopy machines, and/or other like devices. The client application 110 may access and use the camera using suitable drivers, libraries, APIs, and/or the like. The validation process may involve determining whether the correct document was scanned properly.

At operation 209, biographic (or demographic) data is collected. In some implementations, operation 209 is performed just after the enrollee's ID documents are scanned at operation 208. In some embodiments, the client application 110 prompts the enrollee to input biographic information into a web form or the like. For example, the enrollee may enter the last four digits of their Social Security number (SSN), their cell phone number, their email address, physical mailing address, mother's maiden name, etc. In some embodiments, biographic data may be identified from the identity documents scanned at operation 208 such as by performing optical character recognition (OCR) or the like on the scanned documents. In some embodiments, biographic information may be collected or mined from other applications implemented by the client system 105 using suitable APIs, for example. Other data collection techniques may be used in other embodiments. In some embodiments, the enrollee may also edit the collected biographic/demographic data using suitable GCEs.

Figure 2B:
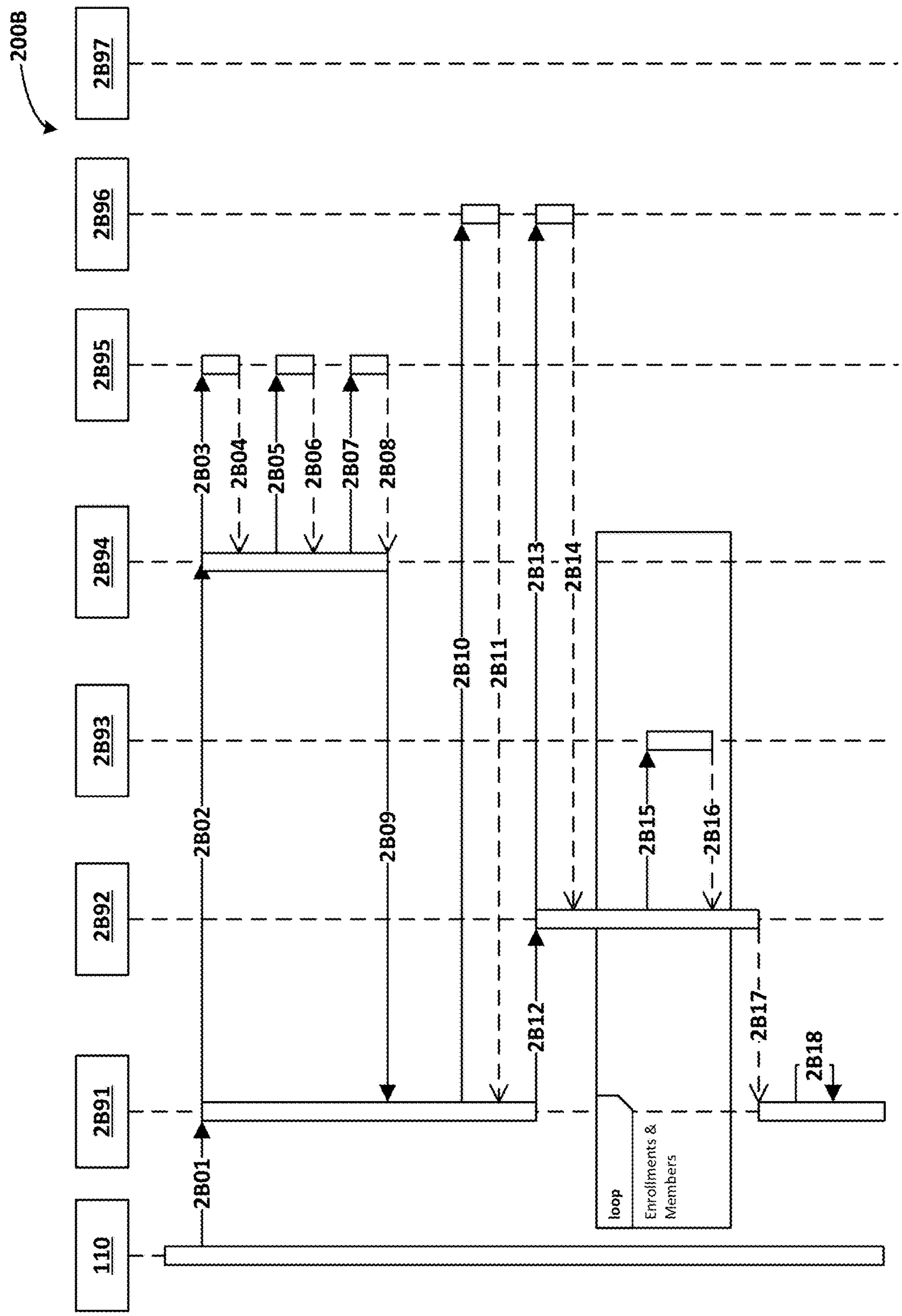
FIG. 2B illustrates another example data flow of an enrollment process according to various embodiments.
Figure 2B:
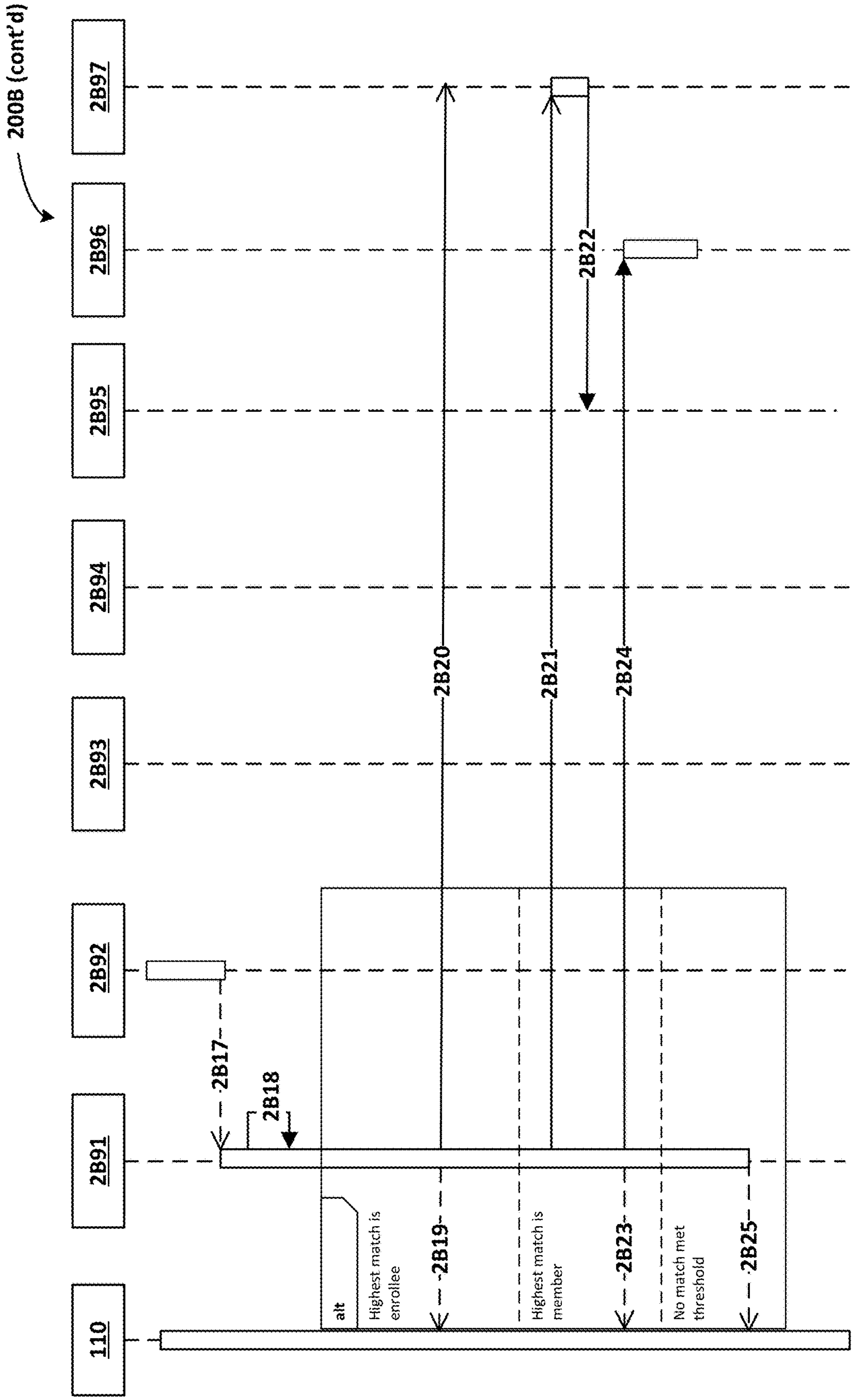

At operation 210, the collected biographic data is securely transmitted (e.g., either synchronously or asynchronously) to the IVS 140 for storage in the IVS DB 150 and an identity session is created (not shown by FIG. 2). In embodiments, the collected data at operation 209 and the information scanned at operation 208 is collectively used for an identity assessment, which involves corroborating the enrollee's identity through the various identity and fraud database searches. The identity assessment is performed by pinging one or more third party identity and/or fraud databases. Additionally or alternatively, an identity/fraud database implemented by the IVS 140 may be used for the identity assessment. The identity assessment is performed to ensure that the data collected in operations 208 and 209 can be verified as belonging to the enrollee.

In this example, for the identity assessment the IVS server(s) 145 use the biographic data to perform several real-time checks 211, 212, and 213 using the biographic data (e.g., driver's license number, SSN, name, address and other identifying data). The check 211 is an identity correlation process that involves discovering and linking disparate biographical information from multiple platforms or institutions that potentially belong to the enrollee; discovering inconsistencies in the biographic data provided by the enrollee (whether intentional or unintentional); identifying defunct identity information that is potentially associated with the enrollee (e.g., former names, former addresses, and the like); and/or the like. The check 212 is a fraud scoring process, which is a predictive fraud detection model used to determine a likelihood that the biographic data provided by the enrollee is synthetic or includes fraudulent identity information. The check 213 is an identity assessment process where the biographic data is compared with other sources, for example, comparing the provided name, birth date, address(es), and/or SSN against Social Security Administration records, death records, birth certificates, and other publicly available data to determine whether the provided SSN corresponds with the provided name or some other name(s), and the like. Some other checks that may be performed include criminal background checks, credit checks, financial fraud checks, and others. The results of these checks are associated with the applicant's identity session and will be presented to the interviewer for review during the live interview.

In some embodiments, a device authentication or assessment is also performed also via third party services and/or a device assessment service provided by the IVS 140. For example, the client app 110 may execute a suitable script to obtain a user agent string contained in a User Agent field of an HTTP header, mine for device/system properties using various APIs, and/or the like, to collect device information such as an IP address of the client system 105, browser version/type, rendering engine version/type, OS type and/or version, a device type of the client system 105, device serial numbers, system information of the client system 105, location information indicating a location of the device during the enrollment process, and/or other like information. In one example, the device location can be derived from the IP address. In another example, the location information may be GPS coordinates obtained from positioning circuitry of the system 105 or from some other application (e.g., a mapping or navigation app). This information may be compared against the information disclosed or otherwise obtained at operations 208 and 209 to verify location of the enrollee during the enrollment process. Additionally or alternatively, the device assessment can be used to determine whether or not the device belongs to the enrollee, or has potentially been compromised (e.g., cloned, hacked, forwarded, SIM swapped, etc.).

After all the biometrics have been collected and analyzed, the live interview begins on the IVS 140 and client application 110 at operations 214A and 214B, respectively. In some embodiments, the live interview 214A-B may take place with the checks 211-213 are being performed. In some embodiments, process 200A may include generating one or more KBAs and obtaining answers to the KBAs from the applicant prior to conducting the live interview. In some embodiments, an interviewer using a client system 105B will be connected with the client system 105A that the applicant is using for enrollment. In these embodiments, the interviewer's video image is displayed to the applicant through the client application 110, and the applicant's video image is displayed to the interviewer through another client application running on the client system 105B. In other embodiments, an AI agent operated by at least one of the IVS servers 145 will be connected with the client system 105A that the applicant is using for enrollment. In these embodiments, the interviewer may be represented as a virtual assistant or chatbot avatar that is displayed to the applicant through the client application 110, and the applicant's video image is recorded and analyzed by the AI agent operated by the at least one IVS server 145. The live interviewer (either human or AI agent) will decide whether the applicant is recommended to proceed in the enrollment process.

During the interview 214A-B, the interviewer has access to all of the applicant's biometric and biographic data. The results of all the real-time checks 211, 212, 213 are presented to the interviewer. In some embodiments, an overall trust score based on the real-time checks 211, 212, 213 and biometric checks 204, 206 may be presented to the interviewer. In some implementations, the interviewer may use this information to initiate a friendly dialog with the applicant by verbally asking the applicant one or more questions. The interview question(s) may involve having the applicant verify some biographic data that was provided at operation 204 or otherwise answer KBA type questions. In some embodiments, non-PII data may be verified for privacy reasons, such as when the enrollee is in a public space within earshot of others.

In some implementations, the live interview is a hybrid experience in which actual questions and answers are user interface interactions with the client application 110, which are verbally prompted by the interviewer. For example, the interviewer may state, "Please answer the question displayed on the screen" where text of a question (e.g., "What are the last four digits of your SSN?", "In what year did you live at <address>?") is displayed on the display device of the client system 105A. Upon the applicant verbally answering the question, the video data is sent to the IVS servers 145 for validation, and provided to the interviewer (e.g., updated on the display device of the client system 105B where human interviewers are used). The GUI at the client application 110 may include a text box where the answer is displayed to the applicant. In some embodiments, multiple choice radio buttons may be displayed during the interview, where the applicant has to select the correct answer, and the selected information is sent to the IVS servers 145 for validation, and provided to the interviewer. Any number and combination of questions may be asked during the interview.

In some cases, the interviewer may initiate an additional primary or secondary biometric capture during the interview 214A-B. For example, the interviewer may initiate another facial scan if the interviewer determines that the facial data was not of sufficient quality, such as when the applicant was wearing a hat or glasses (or sunglasses in some implementations), in a low light or over exposure setting, facial features being out of frame, the first image is out of focus or blurry, and the like. In this case, after the new biometric data is captured, the new biometric data is sent to the IVS 140 as discussed previously with respect to operations 202-207, identity matching is performed as discussed previously with respect to operations 208-213, and the results of the match are provided to the interviewer along with all potential matching identities.

Using the information gathered and the answers given (and the manner in which the answers are given) by the enrollee, the interviewer will then make a decision of whether to approve or deny the applicant. In some embodiments, the approval decision is generally an automatic answer based on the overall score of the applicant and a configured threshold.

In other implementations, whether or not the interviewer asks questions during the live interview may depending on whether the overall trust score is at or above a threshold score and/or if the IVS 140 indicates issues with the identity (e.g., one or more indicators have failing or review type conditions indicated). For example, if the overall trust score is at or above the threshold score (or no other issues are raised by the system), the IVS 140 or the interviewer may simply verify that the enrollee is the same person who started the process without asking any follow-up questions. In this example, if the overall trust score is below the threshold score (or one or more indicators have failing or review type conditions indicated), the enrollee may then be asked follow-up (e.g., KBA) questions.

After the live interview 214A-B, at operation 215 the client application 110 (or the IVS 140) will invoke the SPP process 121, and passes back the approval/denial recommendation and any additional biometric data that was collected to the SPP 120. Additionally, the client application 110 may be taken to a screen where they will wait for the decision by the interviewer. At operation 216, the SPP process 121 determines whether to proceed with granting the enrollee access to the SPP 120. If the enrollee is accepted at operation 216, the SPP process 121 proceeds to grant the enrollee access to the SPP 120 content/services at operation 217, and then the enrollment process is complete at operation 218. If the enrollee is declined at operation 216, the SPP process 121 proceeds to deny the enrollee access to the SPP 120 content/services at operation 219, and then the enrollment process is complete at operation 218. In some embodiments, when the applicant is declined, the applicant's biographic data may be added to a black list maintained by the SPP 120, which may be used to immediately deny content/services from SPP 120 if the applicant attempts to reapply for access to the SPP 120. In some embodiments, the SPP 120 may send an indication of the acceptance or non-acceptance of the enrollee, which may be used for future identity verification purposes.

FIG. 2B illustrates an example consolidated enrollment and sign-on process 200B according to various embodiments. In FIG. 2B, a message being conveyed from one entity to another entity is represented by solid or dashed line between the two entities with an arrowhead at one end of the line. The end of the line without the arrowhead is the source entity (or transmitter) and the end with the arrowhead is a target entity (or receiver). A solid line with a solid (filled-in) triangle arrow represents a message being conveyed from one entity to another entity. A solid line with an open arrowhead may represent an asynchronous message being conveyed from one entity to another entity. A dashed line with an open arrowhead may represent a return message being conveyed from one entity to another entity.

The consolidated enrollment and sign-on process 200B provides a single user interface to allow users to sign into the IVS 140 and/or perform an authentication process. Both the sign on and authentication procedures involve a user of client system 105A scanning or otherwise collecting their biometric data using the IVS client application 110. A sign on (or sign in) occurs when the IVS 140 determines, based on the scanned biometric data, that the user is an existing member of the IVS 140 (or has already had their identity verified by the IVS 140). After the member signs into the IVS 140, the member may use the client application 110 to access their identity data via the secure portal discussed previously. An authentication occurs when the IVS 140 determines, based on the scanned biometric data, that the user is attempting to verify/authenticate their identity for accessing services provided by an SPP 120 (e.g., a financial institution, etc.). In some embodiments, the authentication process may be the same or similar to the enrollment process discussed herein, and may involve starting or resuming such an enrollment process. In embodiments, the client application 110 may enter an authentication mode to perform the authentication in response to receipt of a message (e.g., an SMS message, email, and/or the like) from the IVS 140 and/or the SPP 120 via the client application 110 or separate from the client application 110. This message may be sent to the client system 105A based on interactions with a separate application operated by the client system 105A (e.g., an application built for accessing the SPP 120). This message may include a link or other like GCE that, when selected by the user, causes the client application 110 to enter the authentication mode. When the IVS 140 authenticates the user's identity, the IVS 140 sends another message (e.g., an SMS message, email, and/or the like) to the client system 105A via the client application 110 or separate from the client application 110. This message may include an authentication code that the user may enter or otherwise provide to the SPP 120 to prove that the user's identity has been authenticated by the IVS 140.

Process 200B begins at operation 2B01, where the client application 110 sends primary biometric data and secondary biometric data to a web service 2B91. As an example, the primary biometric data may be face image data and the secondary biometric data may be palm biometric data (or a single palm model). The biometric data may be collected in a same or similar manner as discussed elsewhere herein. The web service 2B91 may be a web service or platform provided by the SPP 120, or a web service or platform provided by the IVS 140 (or a portion thereof). At operation 2B02, the web service 2B91 sends the primary biometric data (e.g., face image collected by the client application 110) to a primary biometric service provider 2B94 (e.g., a FaceProvider) with a command/instruction to identify potential matches (GetIdentityMatches).

At operation 2B03, the primary biometric service provider (PBSP) 2B94 requests identity detection services from a primary biometric identity detection service (PBIDS) 2B95. Continuing with the previous example, the PBIDS 2B95 may be a 1:n facial recognition service (provided by one or more IVS servers 145 or a third party service provider), where n is a number of potential matches that may be provided by the PBSP 2B94. At operation 2B04 the PBIDS 2B95 responds with a primary biometric identifier (pb_id) to the PBSP 2B94. Continuing with the previous example where the PBSP 2B94 is the FaceProvider, the pb_id may be a face identifier (FaceId) provided to the FaceProvider. At operation 2B05, the PBSP 2B94 sends one or more identity enrollments to the PBIDS 2B95, and at operation 2B06, the PBIDS 2B95 provides enrollment pb_ids (e.g., FaceIds) back to the PBSP 2B94. At operation 2B07, the PBSP 2B94 sends one or more member identities to the PBIDS 2B95, and at operation 2B08, the PBIDS 2B95 provides member pb_ids (e.g., FaceIds) back to the PBSP 2B94. At operation 2B09, the PBSP 2B94 sends a set of all matching member and/or enrollment pb_ids to the web service 2B91.

At operation 2B10, the web service 2B91 sends, to a DB 2B96, a batch retrieve query for enrollments and members with pb_ids (e.g., FaceIds) matching those included in the matching member and enrollment pb_ids (e.g., FaceIds) obtained at operation 2B09. The DB 2B96 may be the same or similar as the DB 150 of FIGS. 1 and 2B. At operation 2B11, the DB 2B96 provides enrollments and members' identity IDs back to the web service 2B91.

At operation 2B12, the web service 2B91 sends, to a secondary biometric service provider (SBSP) 2B92, the collected secondary biometric data along with the enrollments and member IDs obtained at operation 2B11. Continuing with the previous example, the SBSP 2B92 may be a palm processing service provider. At operation 2B13, the SBSP 2B92 sends, to the DB 2B96, a batch retrieve query for enrollments/members with matching PersonIds. At operation 2B14, the DB 2B96 provides enrollments/members data back to the SBSP 2B92 based in part on the matching PersonIds. In embodiments, the enrollments/members' data provided at operation 2B14 may indicate that a secondary biometric model (e.g., a palm model) is needed.

Process 200B continues to a loop block, which includes operations 2B15 and 2B16 that are performed for each collected secondary biometric data/model. At operation 2B15, the SBSP 2B92 calls a secondary biometric identity detection service (SBIDS) 2B93 to compare the collected secondary biometric data/model with the retrieved secondary biometric data (e.g., as obtained from DB 2B96 at operation 2B14). At operation 2B16, the SBIDS 2B93 generates and sends a confidence score to the SBSP 2B92. Continuing with the previous example, the SBIDS 2B93 may be a palm biometric identity verification service and/or a palm software development kit (SDK) (provided/operated by one or more IVS servers 145 or a third party service provider).

Process 200B proceeds to operation 2B17 after a confidence score is calculated for each collected secondary biometric data/model. At operation 2B17, the SBSP 2B92 provides matched member and enrollment IDs back to the web service 2B92, and at operation 2B18, the web service determines a highest matching member/enrollment ID that meets a threshold. Process 200B (cont'd) proceeds to alternative block (alt), which includes operations 2B19-2B25. The alt indicates a choice between two or more message sequences, which may or may not be mutually exclusive. Each of the alternatives of the alt are separated by dashed lines inside of the alt.

As shown by FIG. 2B (continued), a first alternative of the alt includes operations 2B19 and 2B20 and takes place when the highest member/enrollment ID that met the threshold is an enrollee. At operation 2B19, the web service 2B92 sends a resume enrollment message (ResumeEnrollment) to the client application 110 to resume the enrollment/authentication process. In embodiments, the ResumeEnrollment may include command(s)/instruction(s)/source code document(s)/data to assist or cause the client application 110 to continue the enrollee's enrollment process. For example, the ResumeEnrollment may indicate a point in the enrollment process that was completed by the enrollee, which may cause the client application 110 to render and display a GUI associated with that point in the enrollment process with any user-supplied data (e.g., text populated in text fields or text boxes, or the like). Subsequently or simultaneously, at operation 2B20, the web service 2B92 sends an enrollment indicator message (PartialEnrollmentFoundEvent) to bus 2B97 (or SPP 120).

A second alternative of the alt includes operations 2B21-2B24 and takes place when the highest member/enrollment ID that met the threshold is an existing member of the IVS 140. At operation 2B21, the web service 2B92 sends a member authentication indicator message (MemberAuthenticatedEvent) to bus 2B97 (or SPP 120), and at operation 2B22, the bus 2B97 (or SPP 120) provides an audit authentication message to the PBIDS 2B95. Additionally or alternatively, the bus 2B97 (or SPP 120) provides the audit authentication message to the PBPS 2B94 or stores the audit authentication message in the DB 2B96. Meanwhile, at operation 2B23, the web service 2B92 sends a member indicator message (ExistingMember) to the client application 110. In embodiments, the ExistingMember may include command(s)/instruction(s)/source code document(s)/data to cause the client application 110 to render and display secure portal GUI/GCEs or other GUI/GCEs as discussed herein, which allows the member to access and utilize his/her identity data. At operation 2B24, the web service 2B92 sends a query to store (or write) the primary and secondary biometric data in the DB 2B96. Additionally or alternatively, the web service 2B92 send the primary and secondary biometric data to the PBIDS 2B95 and/or PBSP 2B94.

A third alternative of the alt includes operation 2B25 and takes place when none of the member/enrollment IDs meet the threshold. At operation 2B25, the web service 2B92 sends a new enrollment indicator message (NewEnrollment) to the client application 110. In embodiments, this message may include command(s)/instruction(s)/source code document(s)/data to render and display GUIs for starting the authentication/enrollment process as discussed herein. After the operations of one of the alternatives of alt is/are completed, process 200B may end or repeat as necessary. In any of the embodiments discussed herein, if a user (as an enrollee or active user) attempts the authentication/verification process and presents a fake identity and the IVS 140 our system confirms their true identity as being different than the fake identity, the IVS 140 may always return the name of the authenticated identity, regardless of use case and/or type of authentication/verification. Additionally or alternatively, any third-party platforms using the IVS 140 to verify a user's identity may be alerted when the presented identity does not match the authenticated/verified identity. In these embodiments, regardless of application, the IVS 140 does not inadvertently authenticate someone for a different identity than what was being attempted to authenticate. In other words, the IVS 140 does not just authenticate that the user exists in the IVS 140, but that the user is authenticated/verified as being the person they are representing themselves to be. For example, where a user is attempting to verify their identity for a financial transaction, the IVS 140 may tie a name on the user's credit card to the name/dentity being authenticated. In this way, the IVS 140 does not authenticate the user just because they have an enrolled identity and are now trying to complete a transaction under a different identity. In these embodiments, the user may register or otherwise store various payment cards (e.g., credit or debit cards) with the IVS 140, and the IVS 140 may match them to the user's identity since accounts at financial institutions or other business may use a variety of names for the same person.

II. Example User Interfaces

Referring now to FIGS. 3-26, which illustrate example interfaces facilitated by a remote system (e.g., SPP 120 and IVS 140 of FIG. 1) according to various techniques described herein. In particular, each of FIGS. 3-26 illustrate example interfaces that may be displayed on a client system 105A or 105B (such as the various GUIs and GCEs discussed previously). The example interfaces of FIGS. 3-26 may be displayed or rendered by the client application 110 and altered by the component 113. While particular example interfaces are illustrated, in various embodiments, other interfaces may be utilized.

Figure 30:
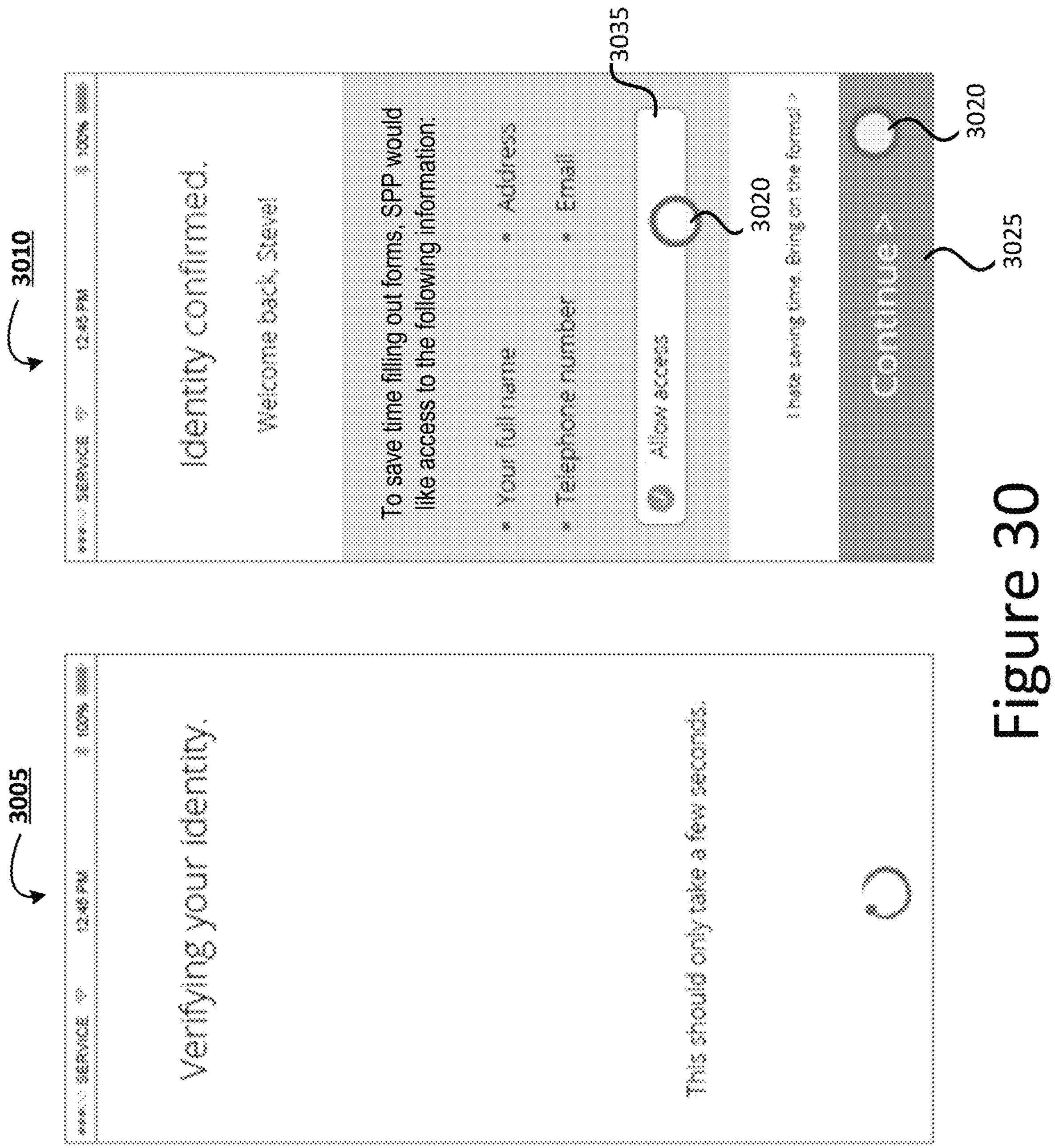
Figure 31:
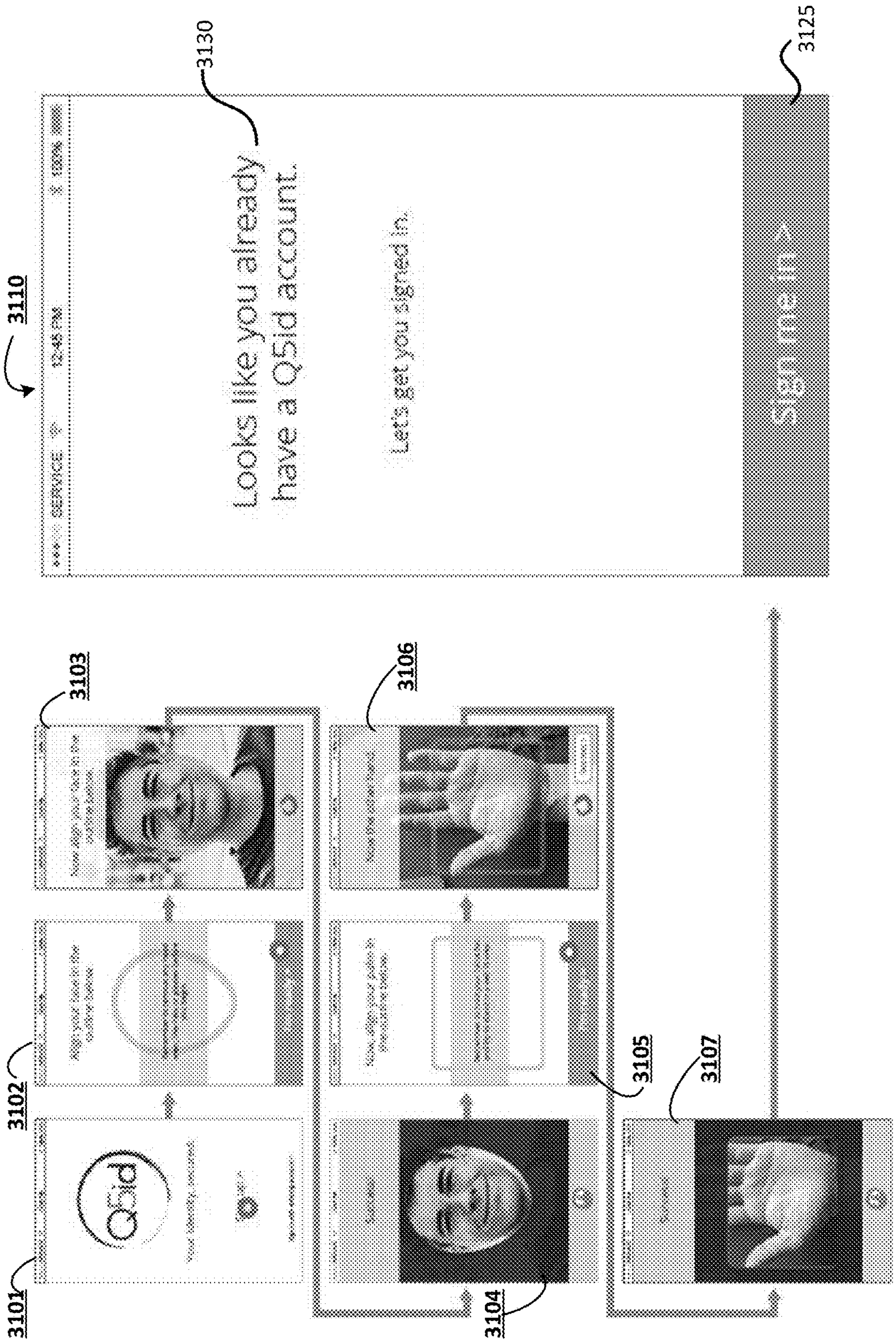
FIGS. 31 and 32 show example user interfaces related to a fraud prevention process according to various embodiments. Each of FIGS. 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, and 63 illustrate example user interfaces for verifying user identities according to various embodiments.
Figure 32:
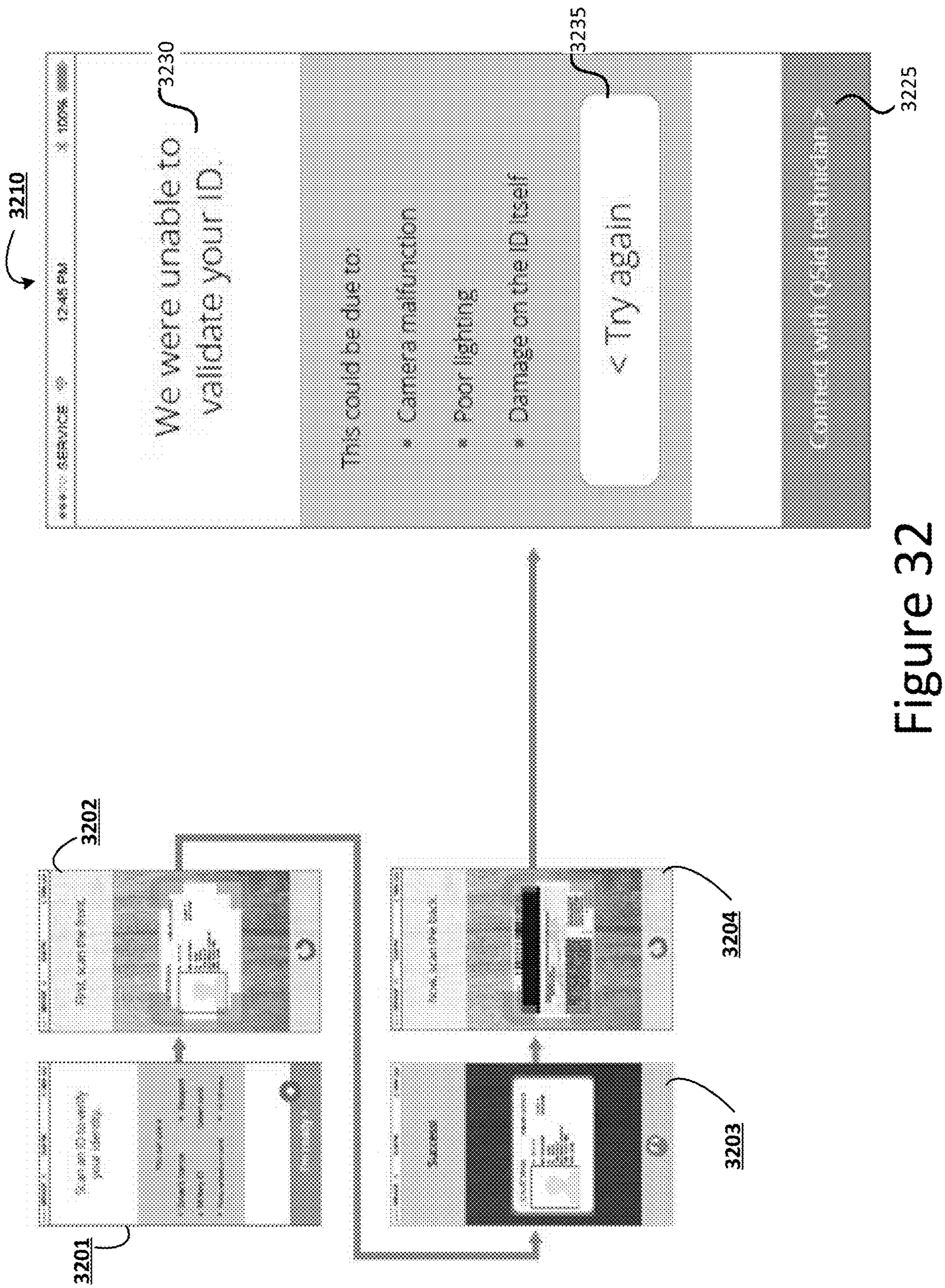

FIGS. 3-25 illustrate example user interfaces that may be displayed by a client system 105A within a client application 110 for enrollment with the IVS 140, in accordance with various embodiments. FIGS. 27-26 illustrate example user interfaces that may be displayed by a client system 105A within a client application 110 after a user enrolls in the IVS 140 or logs into the IVS 140. FIGS. 28-30 illustrate example user interfaces that may be displayed by a client system 105A within a client application 110 for identity verification with the IVS 140 through SPP 120, in accordance with various embodiments. FIGS. 31-32 illustrate example user interfaces that may be displayed by a client system 105A within a client application 110 related to fraud prevention, in accordance with various embodiments. The GUIs of FIGS. 3-32 allow the applicant to onboard at any experience level and provide enrollees with a plurality of options to onboard (referred to as "multi-modal onboarding"). In the example GUIs of FIGS. 3-32, the client system 105A is a smartphone or a tablet computer with a touchscreen interface.

Figure 3:
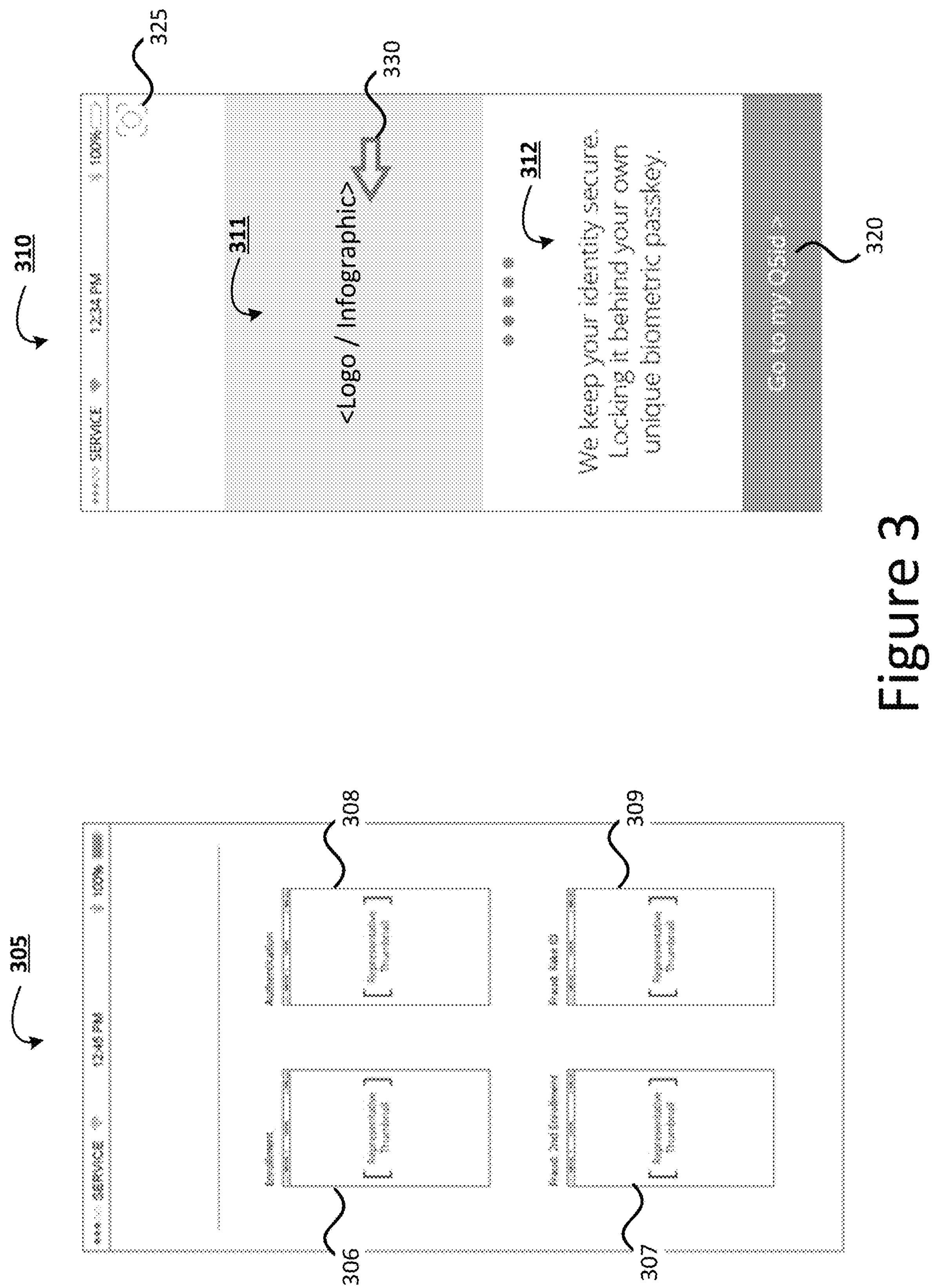

FIG. 3 illustrates example home screen GUIs 305 and 310 in accordance with some embodiments. One of the home screen GUIs 305 and 310 is displayed in the client application 110 when or after the application 110 is initialized, such as when the user of the client system 105A performs a tap gesture on an icon associated with the application 110 (not shown by FIG. 3). The first example home screen GUI 305 includes GCEs 306-309, including a GCE 306 for starting an enrollment process (e.g., process 200A of FIG. 2A), a GCE 307 for performing a fraud check (or a second enrollment process), a GCE 308 for performing an authentication procedure, and a GCE 309 for performing an identity fraud check. A suitable thumbnail or icon may be included in (or as) the GCEs 306-309. In this example, the enrollee may perform a tap gesture on GCE 306 to begin the enrollment process. After selecting the GCE 306, the client application 110 may display one or more GUIs for performing the enrollment process, such as those discussed infra. The second example home screen GUI instance 310 includes a carrousel of infographics 311 and/or text 312 that describe various aspects of the IVS 140. The carrousel may advance automatically on a periodic basis (e.g., every 4-5 seconds or the like). The user may also perform a swipe gesture 330 (either left or right) to scroll through the images 311 or text 312 of the carrousel. The GUI instance 310 also includes small authentication GCE 325 in the top right of the GUI instance 310, which may be used for in-person enrollment procedures, such as in a retail store. The GCE 325 may be used by staff/employees to navigate to a customer specific authentication tool. In this example, the GCE 325 is deliberately made to be inconspicuous since the staff/employees may know to look for the GCE 325 based on employee training or the like. In this example, the enrollee may perform a tap gesture on GCE 320 to begin the enrollment process. After selecting the GCE 320, the client application 110 may display one or more GUIs for performing the enrollment process, such as those discussed infra with respect to FIGS. 27A-29.

Figure 4:
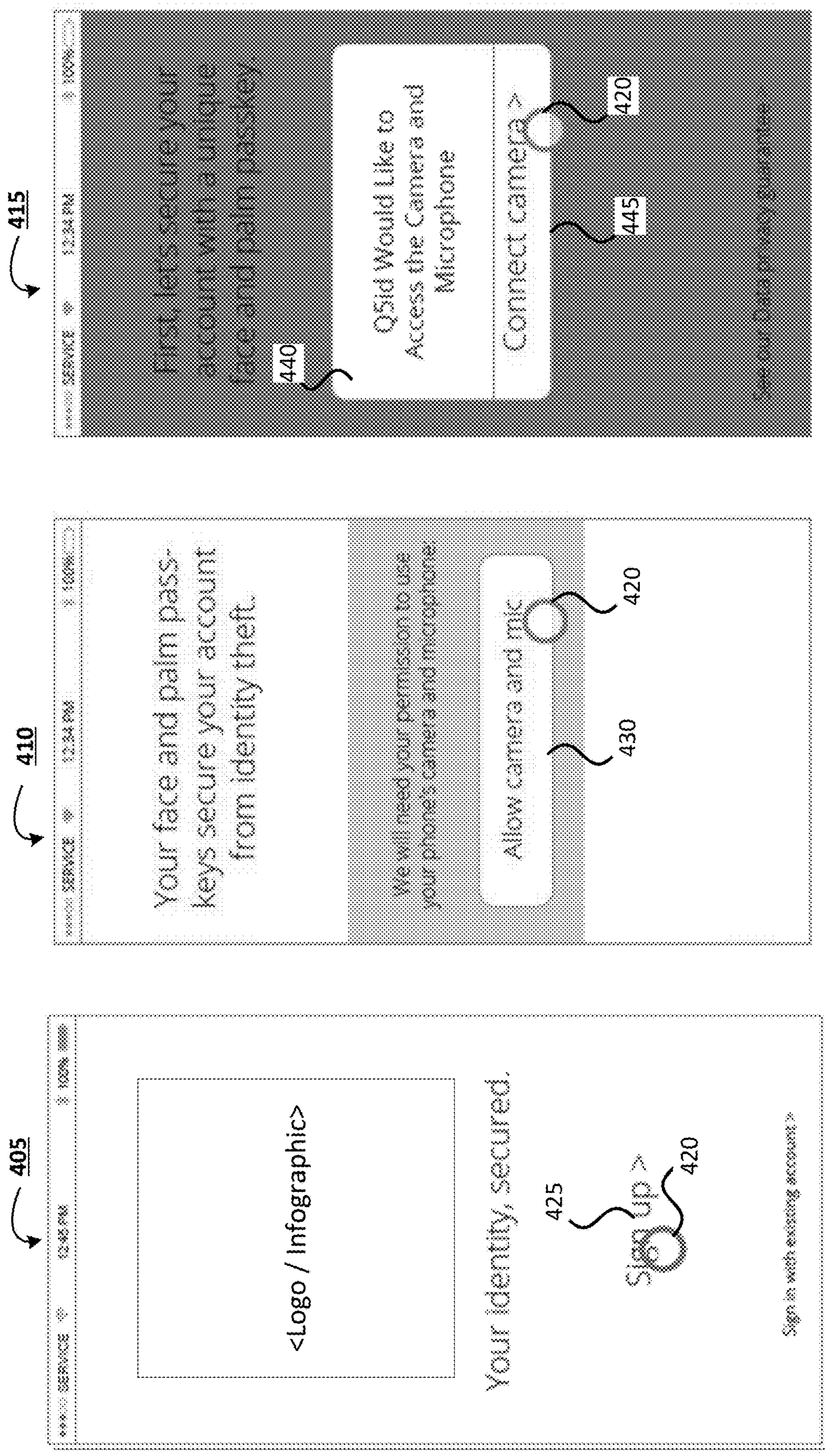

FIG. 4 illustrates an example sign up GUI 405 in accordance with some embodiments. The sign-up GUI 405 is displayed in the client application 110 after the enrollee selects the GCE 306 or GCE 320 of FIG. 3, or instead of the GUI 305/310 such as when the client application 110 is executed on the client system 105A for the first time. In this example, the enrollee may perform a tap gesture 420 on a GCE 425 (the "Sign up" button in FIG. 4) to begin the enrollment process (e.g., enrollment process 200A discussed previously). After selecting the GCE 425, the client application 110 may display an access permission GUI 410 where the enrollee may perform a tap gesture 420 on a GCE 430 (the "Allow camera and mic" button in FIG. 4) to grant the application 110 access to an embedded or peripheral camera and microphone. After selecting the GCE 430, the client system 105A may display a GUI 415 including prompt 440 notifying the enrollee that the client application 110 would like to access the microphone and camera. The enrollee may perform a tap gesture 420 on a GCE 445 to grant access as shown by FIG. 4. In other embodiments, the GUI 415 may include another GCE to deny access to the camera and/or microphone (not shown by FIG. 4).

Figure 5:
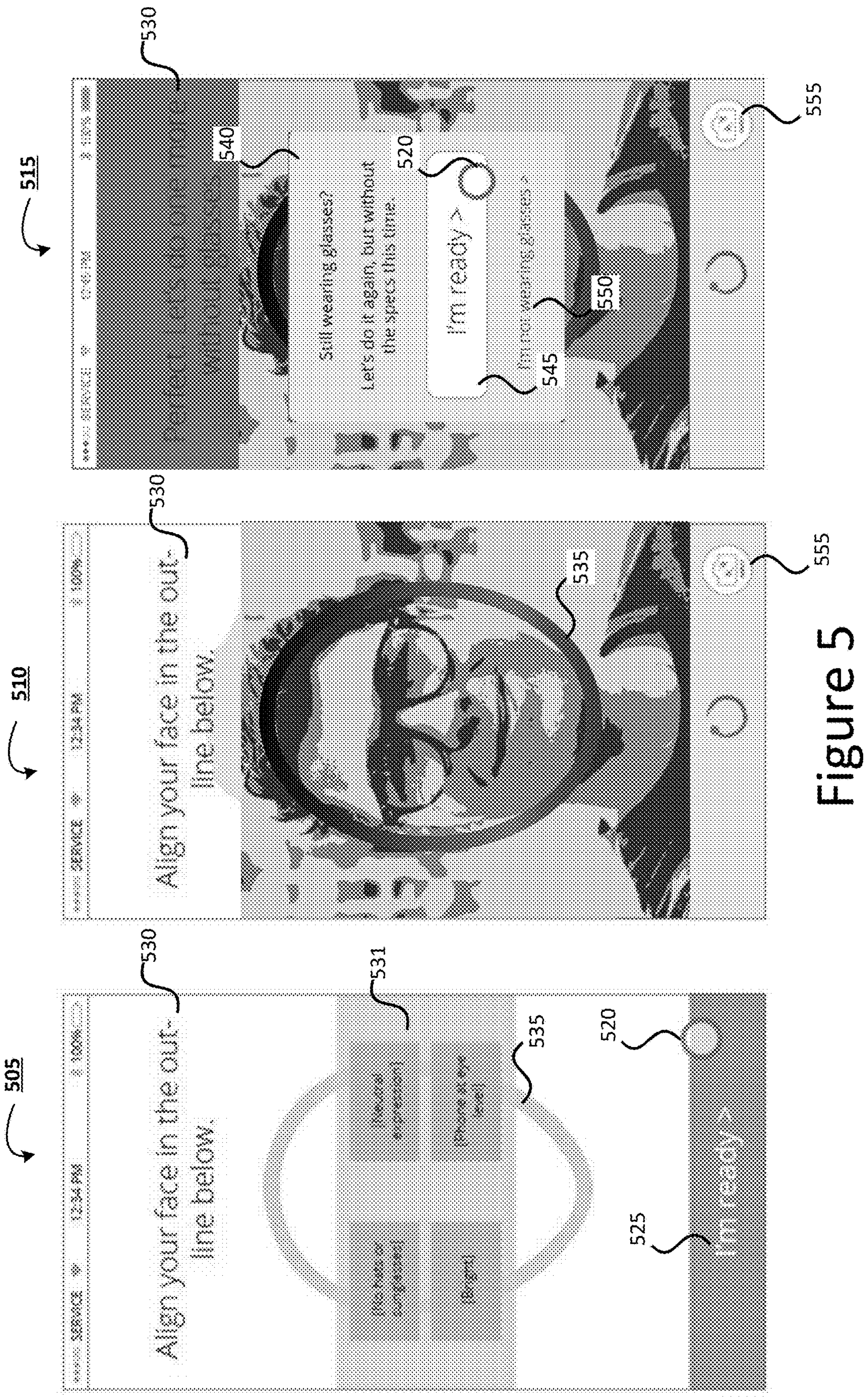
Figure 6:

FIGS. 5-6 illustrate example instances of a face scan GUI in accordance with some embodiments. In FIG. 5, the face scan GUI instance 505 notifies the enrollee that their face is to be scanned. The face scan GUI instance 505 includes instruction text 530 providing instructions on how the enrollee is to perform the face scan. In this example, the instruction text 530 in GUI instance 505 instructs the enrollee to align his/her face in the face outline 535. Additionally, before face scanning takes place, the user is shown visual representations 531 of best practices for capturing facial images including, for example, not to wear headwear or glasses (or sunglasses), having a neutral expression, capturing the image in a relatively bright environment, holding the image capture device at (or near) eye level, and/or the like. The enrollee may perform a tap gesture 520 on a GCE 525 to begin the face scanning process. In face scan GUI instance 510 the camera is enabled and an image of the enrollee is shown in the face scan GUI instance 510, and the enrollee has aligned his face within the face outline 535. In this example, a front-facing (or touchscreen-facing) camera may be enabled by default when the GUI instance 510 is loaded or rendered, and the user may select a GCE 555 to switch to or enable a back-facing camera, if available. This may be used to allow another person to capture the facial image of the user, such as during an in-person enrollment process where a store employee/staff member may scan the user's face with the back-facing camera. Additionally in this example, an image of the enrollee's face is automatically captured by the client application 110; however, in other embodiments, a GCE may be provided that allows the enrollee to capture the facial image. In this example, the client application 110 (or an IVS server 145) detects that the enrollee is wearing glasses (or sunglasses), which may inhibit facial features from being extracted properly from the captured image. Detecting the glasses (or sunglasses) may cause the face scan GUI instance 515 to be displayed, which includes an interface 540 superimposed or overlaid on top of the GUI instance 515 that notifies the enrollee of the detected glasses (or sunglasses) and asks the enrollee to remove the glasses (or sunglasses) for the face scan. The instruction text in GUI instance 515 also instructs the enrollee to remove the glasses (or sunglasses). The enrollee may perform a tap gesture 520 on a GCE 545 to indicate that the glasses (or sunglasses) have been removed and that the face scan may continue. Additional types of issues that may be auto-detected may include, for example, low light levels (e.g., as compared to a preconfigured threshold light level), wearing headwear/header gear, image capture device not being close enough to face (e.g., as compared to a preconfigured threshold distance), image capture device not being at or near eye level (e.g., as compared to a preconfigured threshold eye level), and/or the like. In these embodiments, suitable GUI instances may be displayed to notify the enrollee of the detected issue, and these GUI instances may include suitable GCEs that allow the enrollee to (re)perform the face scan. Alternatively, the enrollee may perform a tap gesture 520 on a GCE 550 to indicate that the client application 110 (or IVS server 145) incorrectly detected glasses (or sunglasses) in the image data. In FIG. 6, the enrollee has removed his glasses (or sunglasses) and aligned his face within the face outline 635 of face scan GUI instance 605, which may be the same or similar as GUI instance 510. Upon properly scanning the enrollee's face, the face scan GUI instance 610 may be displayed with text 630 and/or icon 640 indicating the successful face scan. In some embodiments, additional GUI instances may be provided to perform a left-side face scan and a right-side face scan. In some embodiments, the application 110 may auto-advance from the face scan GUI instance 610 after a predetermined time period (e.g., 2-3 seconds) to a next GUI, such as GUI instance 705 of FIG. 7. Additionally in some embodiments, if the application 110 detects or determines that the user's face image has not been captured within a predefined time period (e.g., 10 seconds), the application 110 may auto-navigate to face scan trouble-shooting GUI or the like.

Figure 7:
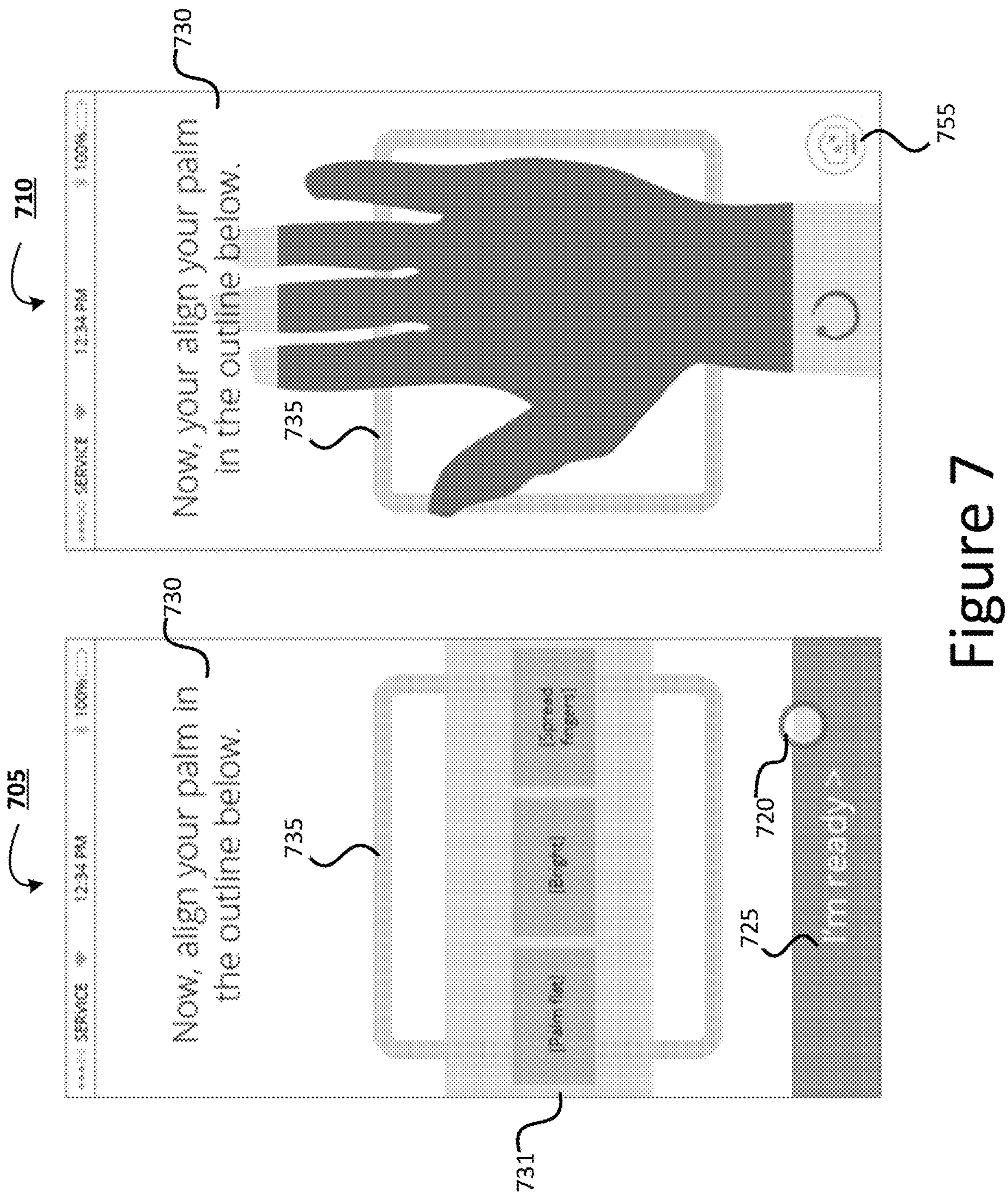
Figure 8:
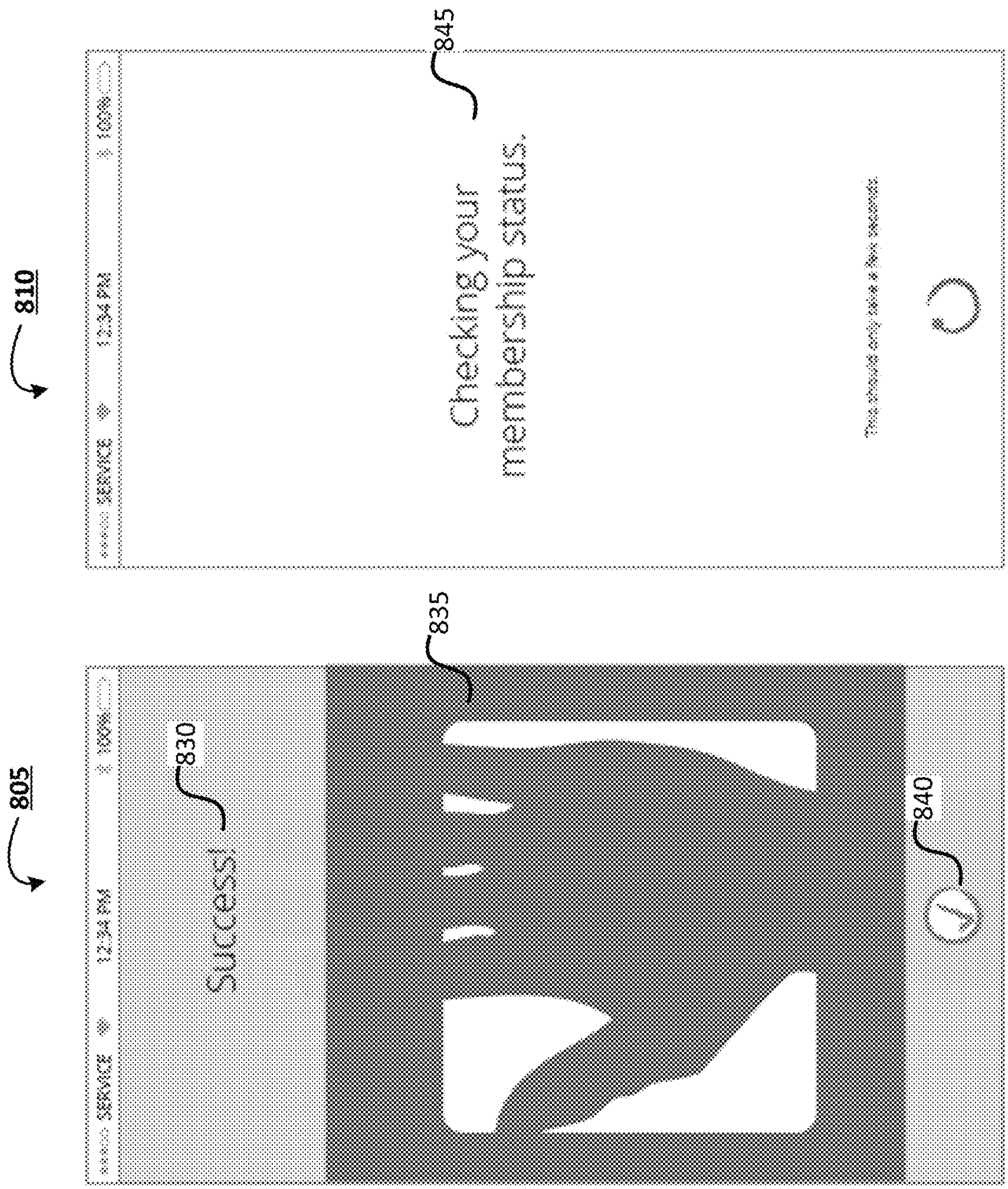

FIGS. 7-10 show example instances of a palm scan GUI in accordance with some embodiments. In FIG. 7, the palm scan GUI instance 705 notifies the enrollee that their palm is to be scanned. The palm scan GUI instance 705 includes instruction text 730 providing instructions on how the enrollee is to perform the palm scan. In this example, the instruction text 730 in GUI instance 705 instructs the enrollee to align his/her palm in the palm outline 735. Additionally, before palm scanning takes place, the user is shown visual representations 731 of best practices for palm capture including, for example, holding the palm flat on a surface (e.g., a table), ensuring that the image is captured in a relatively bright environment, spreading the fingers apart, and/or the like. The enrollee may perform a tap gesture 720 on a GCE 725 to begin the palm scanning process. In palm scan GUI instance 710 the camera is enabled and an image of the enrollee's palm is shown in the GUI instance 710, and the enrollee has aligned his palm within the palm outline 735. Unlike the face scanning example discussed previously, in this example, the application 110 may automatically enable a back-facing camera of the client system 105A by default when the GUI instance 705 is loaded and/or rendered/displayed, and the user may select a GCE 755 to switch to or enable the front-facing camera. In this example, an image of the enrollee's palm is automatically captured by the client application 110; however, in other embodiments, a GCE may be provided that allows the enrollee to capture the palm image. At FIG. 8, the enrollee has aligned his/her palm within the palm outline 835 of palm scan GUI instance 805, which may be the same or similar as GUI instance 710. Upon properly scanning the enrollee's palm, the palm scan GUI instance 810 may be displayed with text 830 and/or icon 840 indicating the successful palm scan. The application 110 may auto-advance from the palm scan GUI instance 805 after a predefined time period (e.g., 2-3 seconds) to a next GUI, such as GUI instance 810, which includes text area 845 indicating that the backend IVS 140 is analyzing the collected biometric data to determine if the enrollee is already enrolled with the IVS 140. Additionally in some embodiments, if the application 110 detects or determines that the user's palm image has not been captured within a predefined time period (e.g., 10 seconds), the application 110 may auto-navigate to palm scan troubleshooting GUI or the like. Furthermore, similar to the face scan example discussed previously, the application 110 may include auto-detection functionality to determine whether the palm image is captured properly. Example types of issues that may be auto-detected may include, for example, low light levels (e.g., as compared to a preconfigured threshold light level), fingers being too close together or spread too far apart, image capture device not being close enough to the palm (e.g., as compared to a preconfigured threshold distance), the incorrect palm/hand being in the field of view of the image capture device (e.g., the right hand/palm being in the field of view when the left hand/palm should), and/or the like. In these embodiments, suitable GUI instances may be displayed to notify the enrollee of the detected issue, and these GUI instances may include suitable GCEs that allow the enrollee to (re)perform the palm scan. When the application 110 obtains an indication of the enrollee's enrollment status from the IVS 140, the application 110 may auto-advance from the palm scan GUI instance 810 to GUI instance 905 of FIG. 9.

Figure 9:
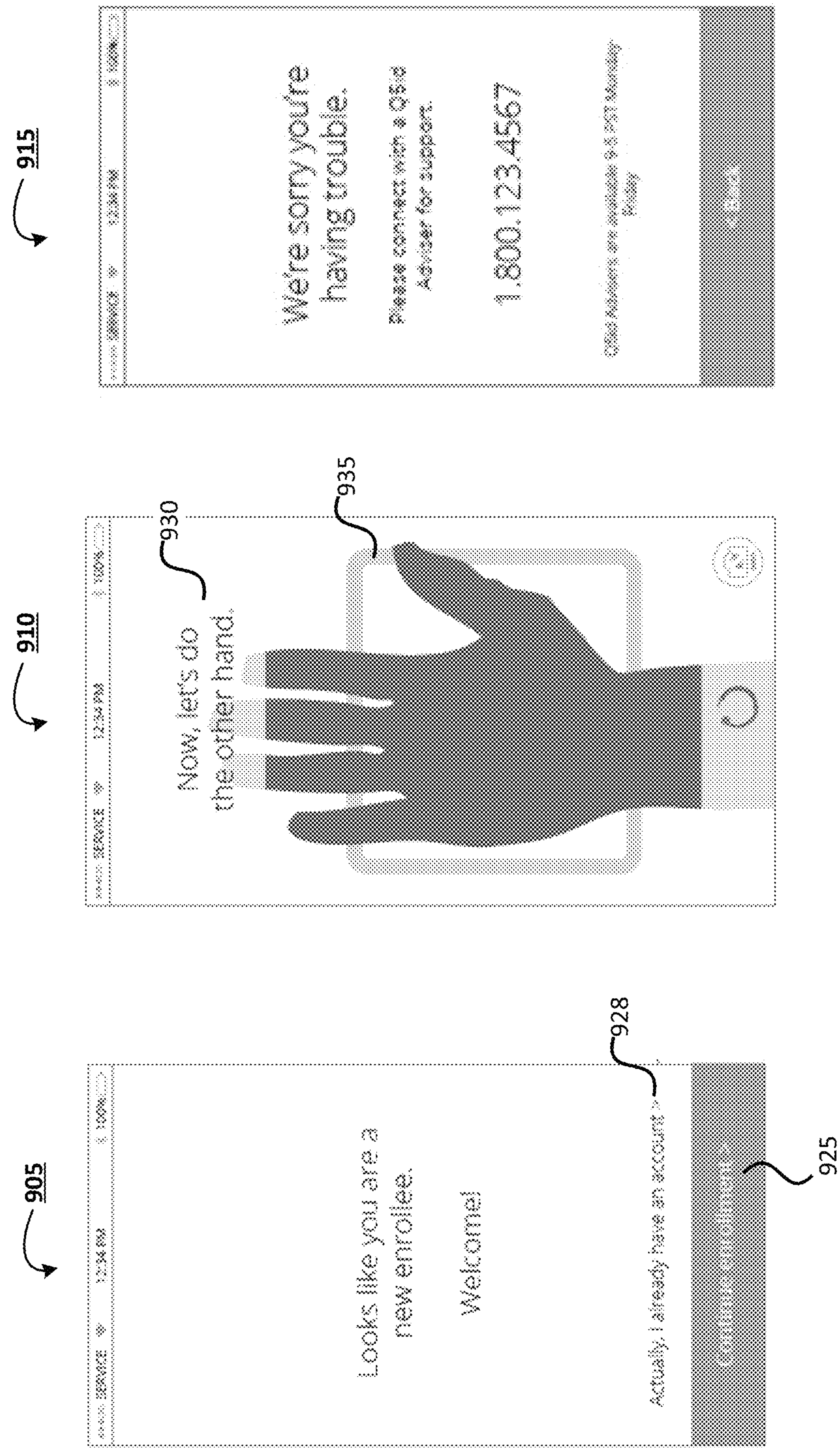
Figure 10:
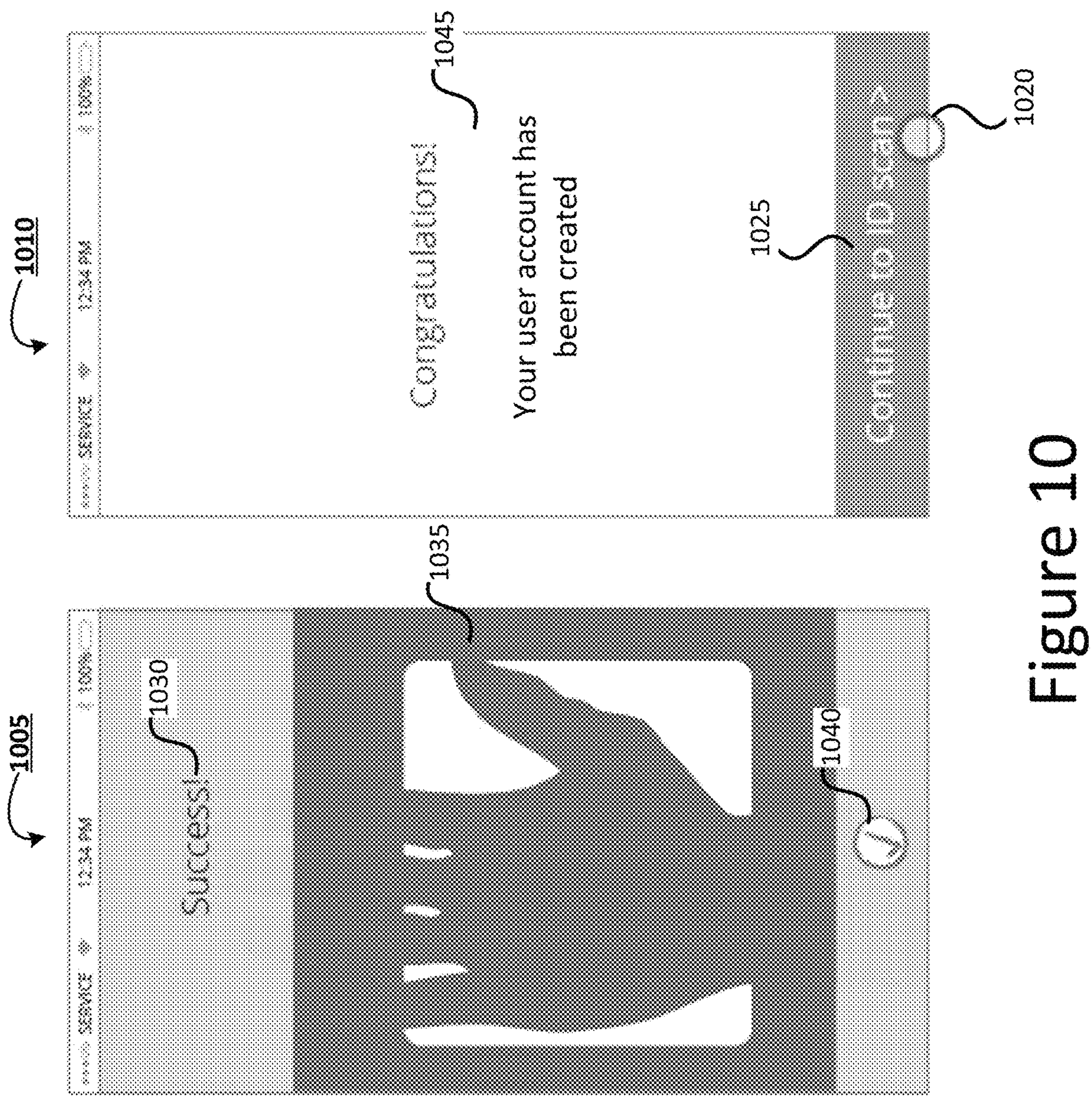

FIG. 9 shows a GUI instance 905 indicating an enrollment status of the enrollee based on an analysis of the enrollee's captured biometric data, which may be performed by the IVS 140 as discussed previously. In this example, the IVS 140 determined that the enrollee is not currently enrolled in the IVS 140. In some embodiments, the enrollee may be assumed to be a new enrollee if/when the IVS 140 determines that the enrollee's face and palm biometric data does not match existing facial and palm biometric data (within a certain margin of error). The GUI instance 905 includes a GCE 928, which may be selected by the enrollee to indicate that the enrollee already has an account with the IVS 140. When the GCE 928 is selected by the enrollee, the application 110 may display/render troubleshooting GUI instance 915. The GUI instance 905 also includes a GCE 925, which when selected by the enrollee, proceeds to GUI instance 910 that is used to perform a palm scan of the enrollee's other hand by aligning the other palm/hand within the outline 935 in a same or similar manner as discussed previously. Additionally, the GUI instance 910 includes a text area 930 to indicate the particular hand/palm that should be captured (e.g., left or right palm/hand). Upon successfully scanning and capturing the enrollee's other palm/hand, the application 110 may proceed to render and display GUI instance 1005 of FIG. 10, which indicates completion of a successful palm scan in a same or similar manner as GUI instance 805 of FIG. 8, and includes text 1030, palm outline 1035, icon 1040 and text 1045, which are the same or similar as text 830, palm outline 835, icon 840, and text 845 of FIG. 8, respectively. The application 110 may auto-advance to GUI instance 1010 after a predetermined period of time (e.g., 2-3 seconds), which indicates that the palm/hand scans have been completed and that a user account has been created for the enrollee. The GUI instance 1010 includes a GCE 1025, and when the enrollee performs a tap gesture 1020 on the GCE 1025, the application 110 may proceed with the enrollment process.

Figure 11:
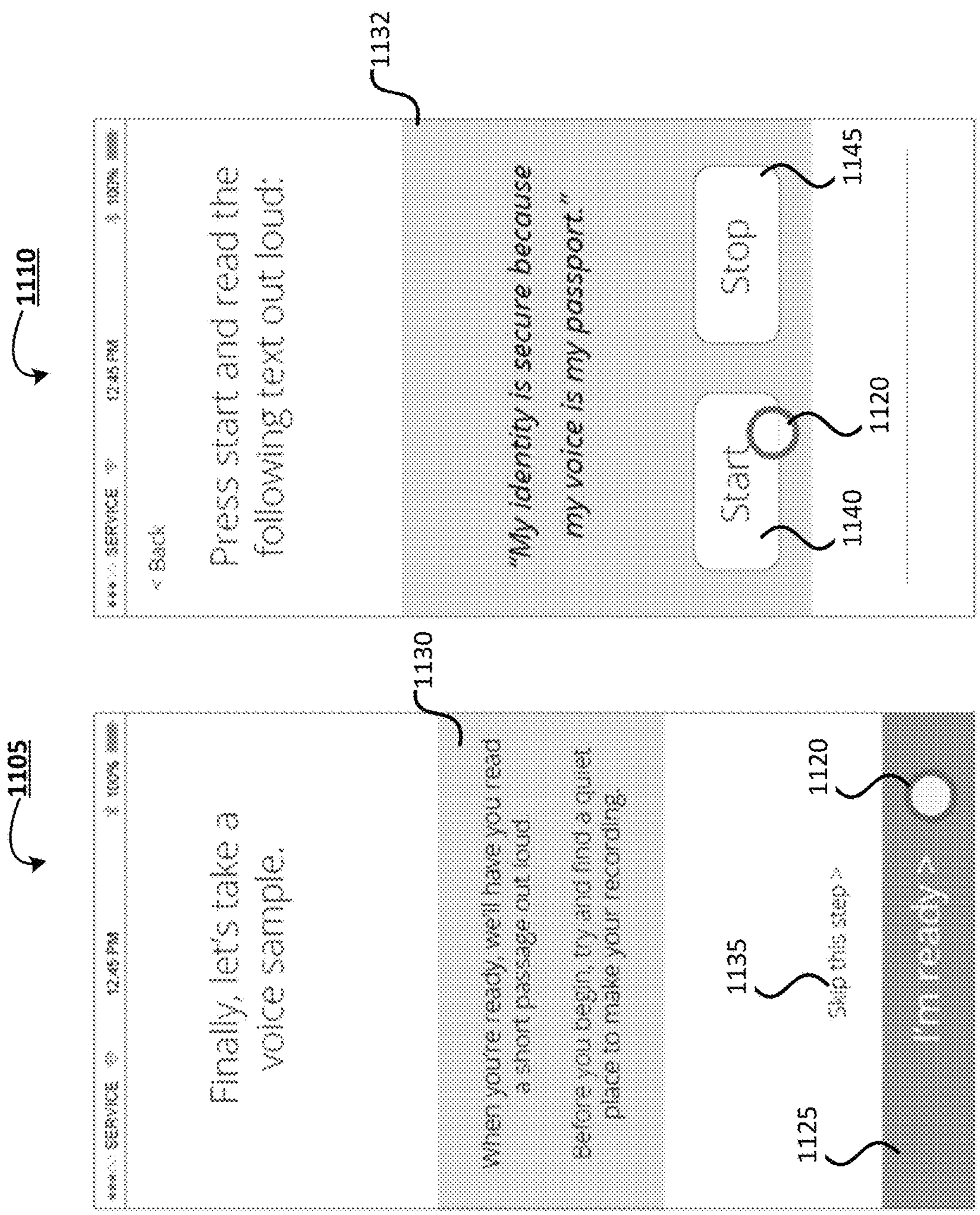
Figure 12:
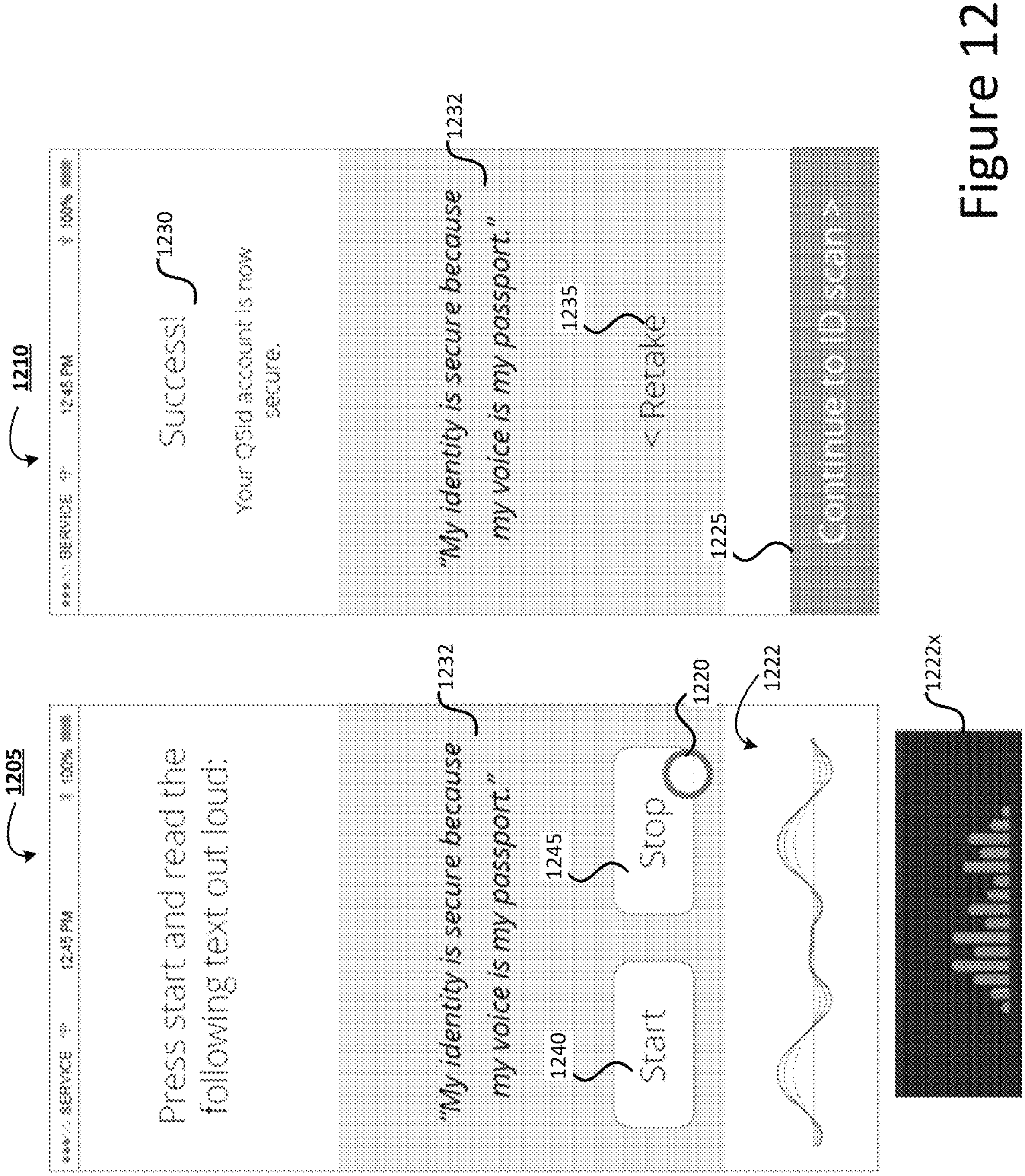

FIGS. 11-12 show example instances of a voiceprint GUI in accordance with some embodiments. FIG. 11 shows a voiceprint GUI instance 1105 which notifies the enrollee that their voiceprint is to be recorded. The voiceprint GUI instance 1105 includes instruction text 1130 providing instructions on how the enrollee is to perform the voice recording. In this example, the instruction text 1130 in GUI instance 1105 instructs the enrollee to read a sentence to be displayed by GUI instance 1110 aloud. The enrollee may perform a tap gesture 1120 on a GCE 1125 to begin the voice recording process. Alternatively, the enrollee may perform a tap gesture 1120 on a GCE 1135 to terminate the voice recording process. In voiceprint GUI instance 1110 the microphone is enabled and GCE 1140 is lightened or otherwise highlighted to indicate that the GCE 1140 may be selected to start the voice recording. The GCE 1145 is greyed out, indicating that this GCE cannot be selected. In alternative embodiments, rather than providing GCEs 1140-1145, the application 110 may automatically begin recording the enrollee's voice after the enrollee selects GCE 1125, and automatically stops recording after the desired phrase is completed as recognized by the IVS 140 and/or after a predefined period of time. Additionally, voiceprint GUI instance 1110 shows instruction text 1132 indicating a sentence that the enrollee is to read aloud while recording his/her voice. The enrollee may perform a tap gesture 1120 on a GCE 1140 when the enrollee is ready to begin recording his/her voice.

FIG. 12 shows a voiceprint GUI instance 1205, which is displayed after the enrollee has begun the voice recording process in response to selecting the GCE 1240 (which corresponds to the GCE 1140 of FIG. 11). The voiceprint GUI instance 1205 also includes spectrogram object 1222, which shows the frequency/amplitude changes in the enrollee's voice as the enrollee reads the displayed text out loud. In this example, spectrogram object 1222 shows a line graph graphical representation of the user's voice. Alternatively, spectrogram object 1222*x*, which is a bar graph graphical representation of the user's voice, could be used. Other graphical representations could be used in other implementations. The voiceprint GUI instance 1205 also shows the GCE 1145/1245 is lightened or otherwise highlighted to indicate that the GCE 1145/1245 may be selected to stop the voice recording, and the GCE 1140/1240 is greyed out, indicating that this GCE cannot be selected. After the enrollee has finished reading the displayed text out loud, the enrollee may perform a tap gesture 1220 on a GCE 1145/1245 to stop recording his/her voice (or the application 110 may automatically stop recording after a predefined period of time or when the IVS 140 detects the end of the phrase 1232). Once the voice recording has been stopped, the voiceprint GUI instance 1210 may be displayed to show success or failure of the voice recording in text area 1230. The enrollee may select the GCE 1235 to re-record his/her voice or may select the GCE 1225 to proceed to capture another biometric, which in this example is an identity document scan.

In some embodiments, the instruction text 1132/1232 may also indicate a number of times that the enrollee is to read the displayed text out loud. The displayed text may be the same or different for different enrollees, including longer or shorter sentences. The displayed text may be randomly generated, selected from a set of sentences or other groupings of words, or generated using some other technique. In some embodiments, rather than providing start and stop GCEs 1140 and 1145, the GUI instance 1110 may include a timer (e.g., a countdown timer) element during which the enrollee is to record his/her voice. Additionally or alternatively, the IVS 140 may automatically recognize when to stop the recording after the IVS 140 determines that the phrase has been uttered the predefined number of times.

Figure 13:
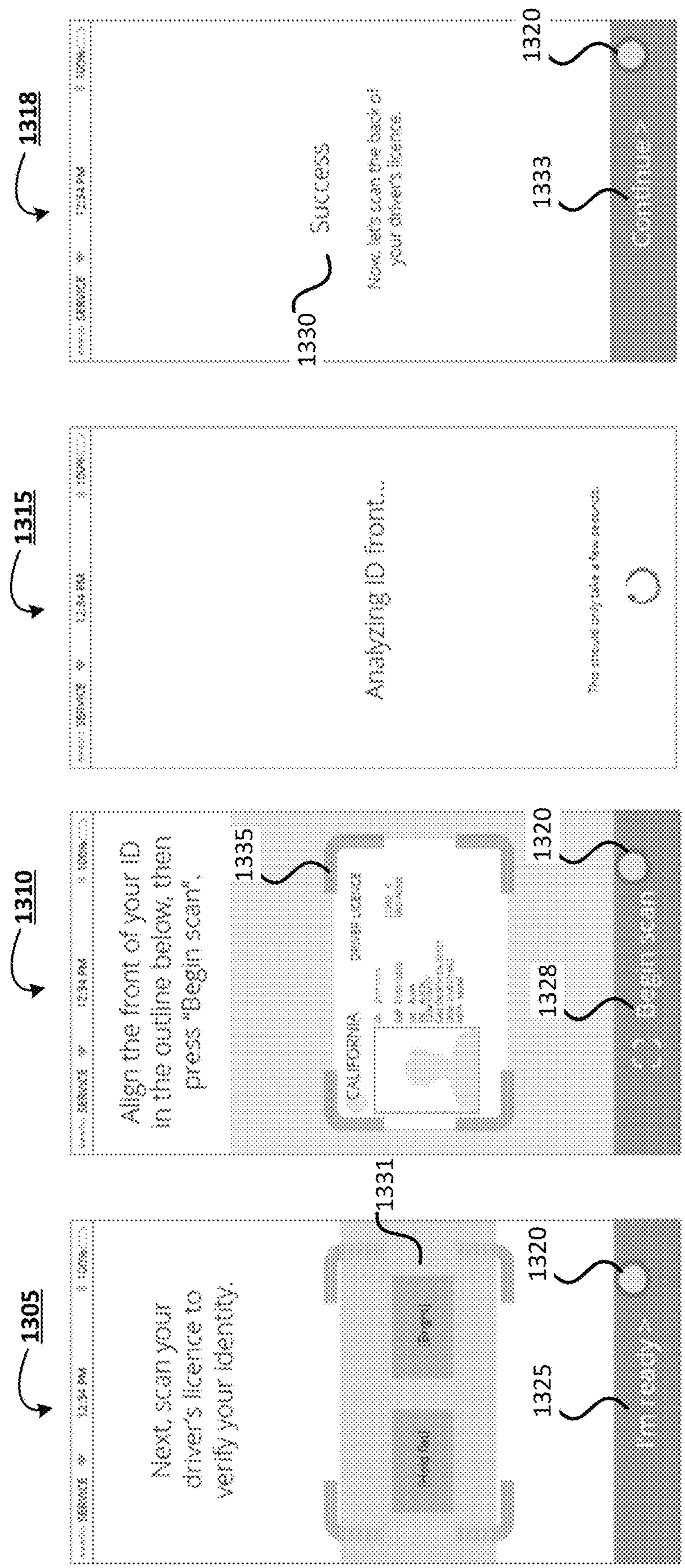
Figure 14:
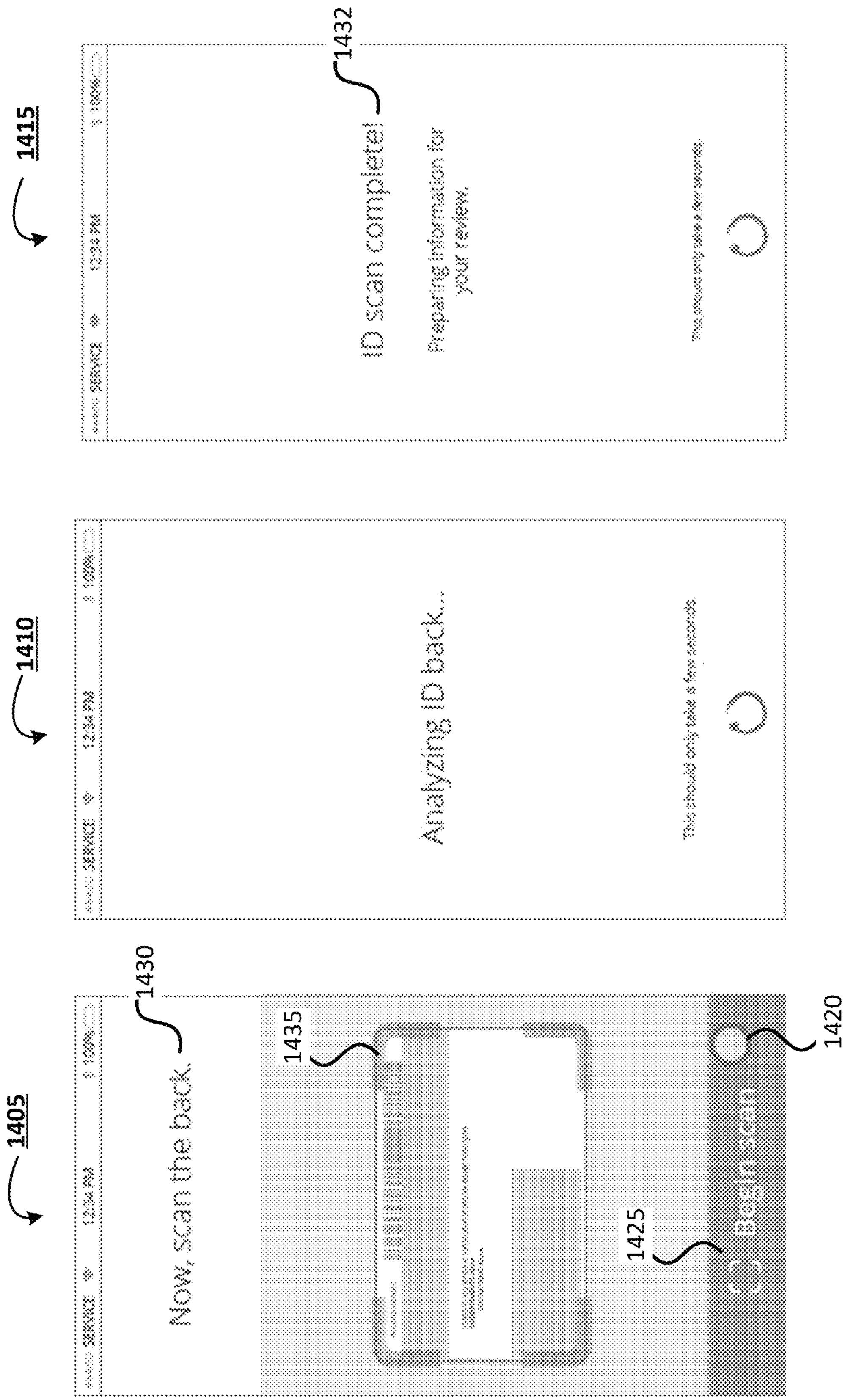

FIGS. 13-14 show example instances of an identity (ID) scan GUI in accordance with some embodiments. FIG. 13 shows an ID scan GUI instance 1305 which notifies the enrollee that a specific ID document is to be scanned. The ID scan GUI instance 1305 includes instruction text 1331 indicating best practices for scanning the ID documents, for example, holding the document flat (or placing the document on a flat surface) and capturing the image in a relatively bright environment. In some embodiments, the instruction text 1331 may also provide instructions regarding the types of ID documents that may be scanned (e.g., driver's license, military ID, naturalization card, passport, green card, or H-1B visa). The enrollee may perform a tap gesture 1320 on a GCE 1325 to begin the ID scanning process. In ID scan GUI instance 1310 the back-facing camera is enabled and an image of an ID document is shown in the GUI instance 1310, which the enrollee has aligned within the document outline 1335. In this example, the ID document chosen by the enrollee is a driver's license. Additionally, in this example, the enrollee may perform a tap gesture 1320 on a GCE 1328 to begin the ID document scan, and an image of the enrollee's ID document is automatically captured by the client application 110. In other embodiments, a GCE may be provided that allows the enrollee to capture the image of the ID. The automatic detection and capture of the ID document by the client application 110 may cause the ID scan GUI instance 1315 to be displayed, which indicates that the scanned ID document is being analyzed by the IVS 140. In response to receipt of an indication of the analysis results from the IVS 140, the application 110 may render and display GUI instance 1318, which indicates success or failure of the ID scan in text area 1330. In some embodiments, if the latency in verifying the image quality of the scanned ID document is less than a predefined period of time (e.g., 1 second), the GUI instance 1315 may be skipped. In this example, the GUI instance 1318 indicates that the ID document scan was successful. If the ID document scan was not successful, or if the IVS 140 triggers a fake ID alert, the application 110 may automatically navigate to an ID document scan troubleshooting GUI (not shown). Additionally, unlike face and palm/hand scan examples discussed previously, the GUI instance 1318 does not show the resulting image on the "Success" screen. The user may then proceed by selecting the "Continue" GCE 1333. The ID scan GUI instance 1405 of FIG. 14 may then be automatically rendered and displayed, indicating in text area 1430 that the enrollee is to scan the other side of the ID document. Similar to ID scan GUI instance 1310, the enrollee may align the other side of the ID document in the outline 1435, which may be automatically detected and captured by the client application 110 when the enrollee performs a tap gesture 1420 on GCE 1425. The automatic detection and capture of the ID document by the client application 110 may cause the ID scan GUI instance 1410 to be rendered and displayed, which indicates that the scanned other side of the ID document is being analyzed by the IVS 140. This analysis may be performed in a same or similar manner as discussed previously. In response to receipt of an indication of the analysis results from the IVS 140, the application 110 may render and display GUI instance 1415, which indicates success or failure of the ID scan in text area 1432.

Figure 15:
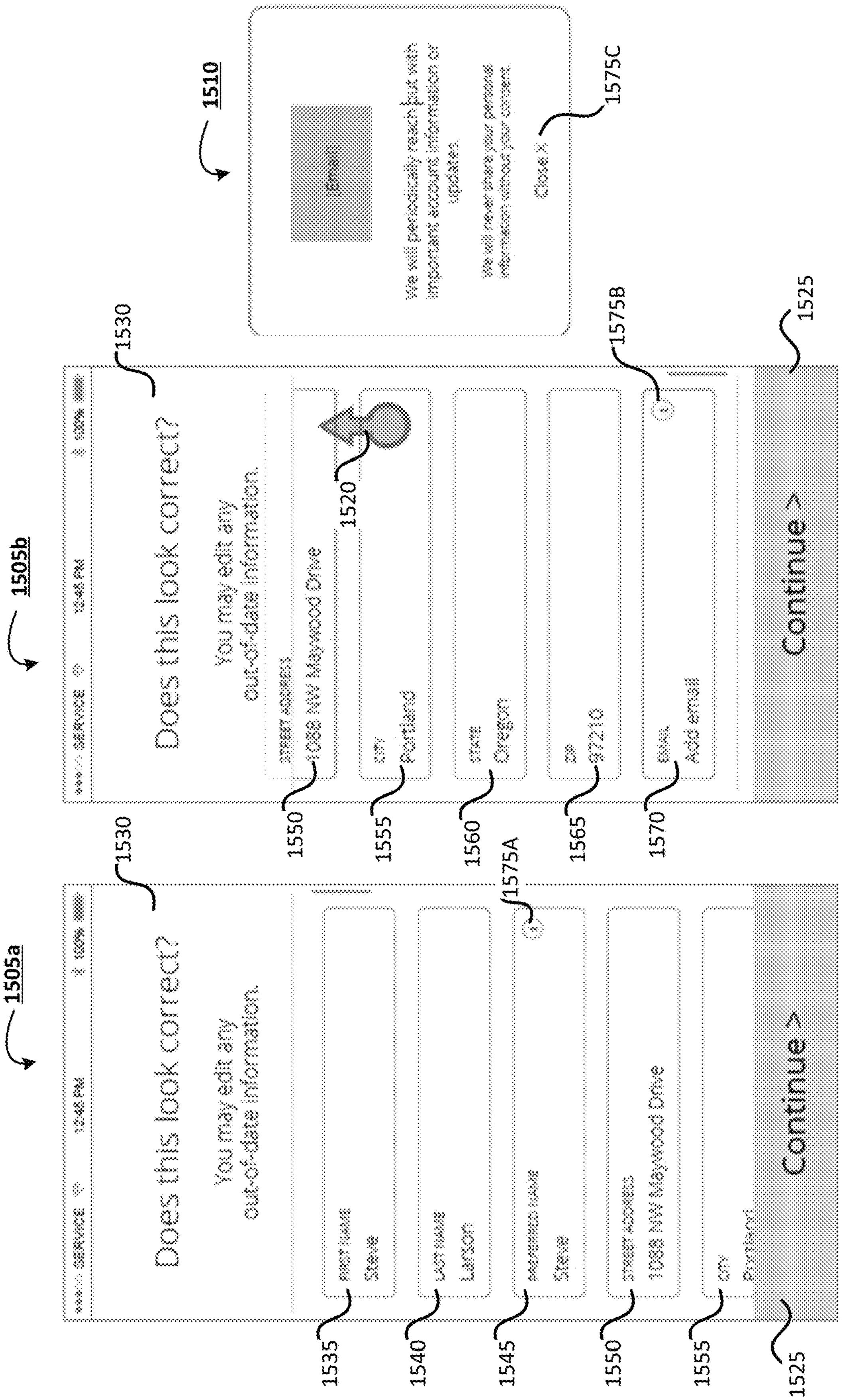
Figure 16:
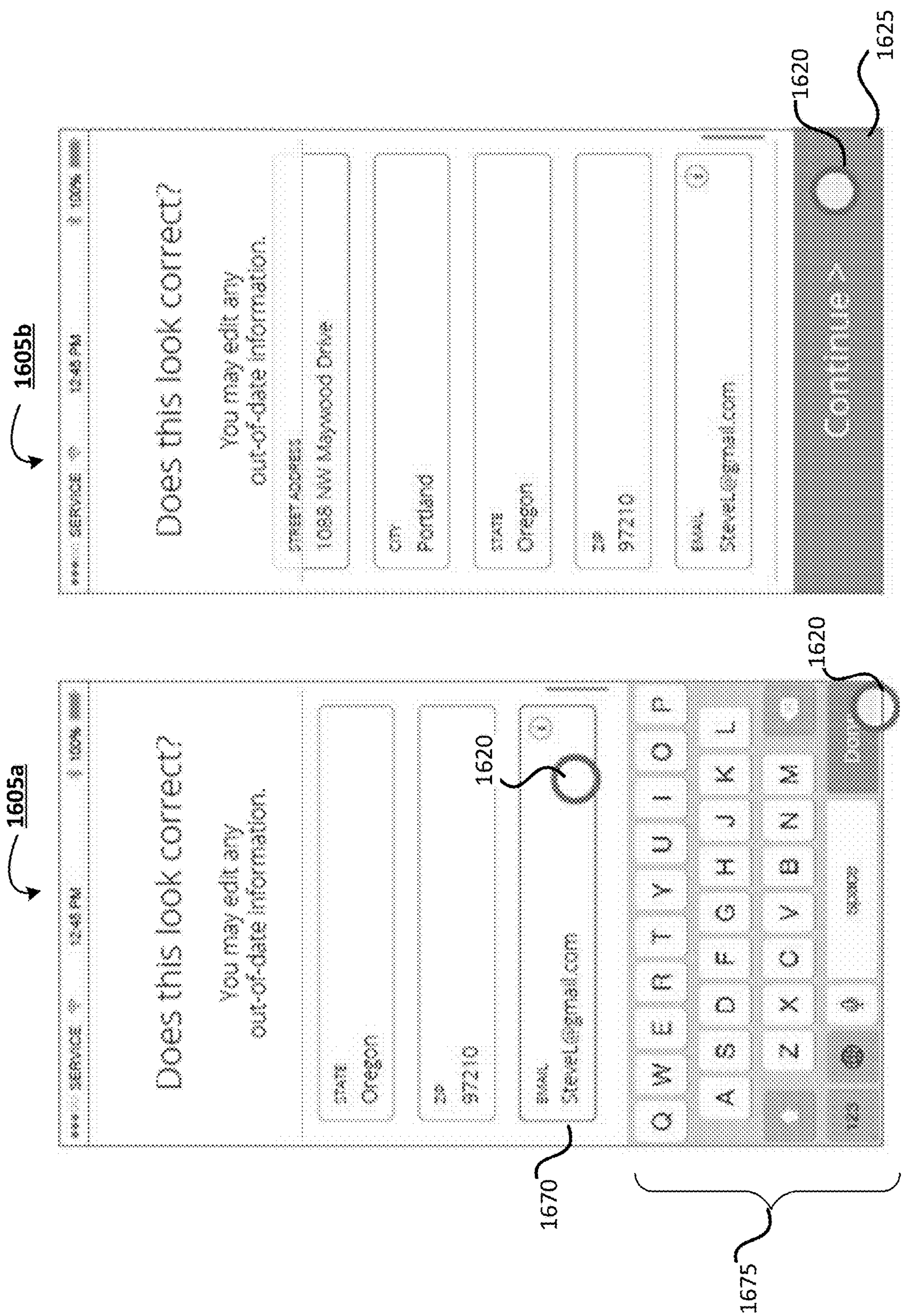
Figure 17:
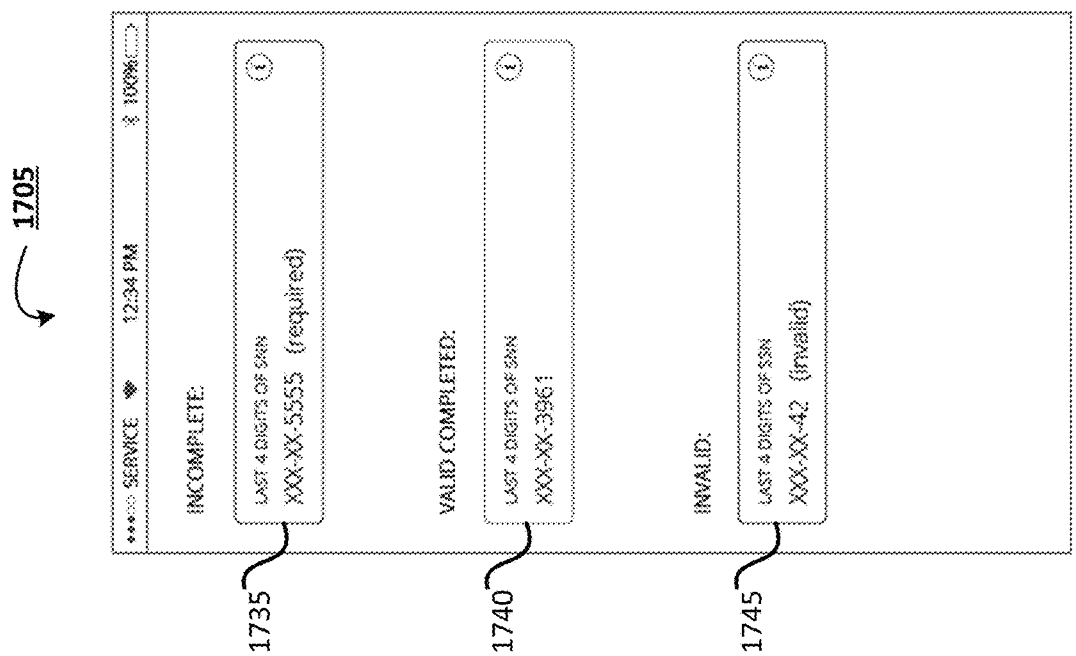

FIGS. 15-17 illustrate example instances of a biographic data review GUI in accordance with some embodiments. FIG. 15 shows a biographic data review form GUI instance 1505 (including both GUI instance screens 1505*a* and 1505*b*), which indicates in text area 1530 that the enrollee should review the biographic data extracted from the scanned ID documents for accuracy. The GUI instance 1505 includes text boxes 1535, 1540, 1545, 1550, 1555, 1560, 1565, and 1570 indicating respective biographic data items. The biographic data items may be extracted or otherwise identified based on an OCR of the scanned ID document.

The enrollee may perform a drag gesture 1520 to scroll from GUI screen 1505*a* to GUI screen 1505*b*. In particular, text box 1535 indicates an extracted first name, text box 1540 indicates an extracted last name, text box 1545 indicates an extracted or determined preferred name, text box 1550 indicates an extracted street address, text box 1555 indicates an extracted city, text box 1560 indicates an extracted state, text box 1565 indicates an extracted zip code, and text box 1570 indicates an extracted email address. In this example, the scanned ID document did not include an email address, and therefore, the text box 1570 does not include any data. An icon 1570 may be used to indicate that the enrollee should or must manually enter this data. Additionally, the GCE 1525 is greyed out, indicating that the enrollee cannot continue with the enrollment process until data is entered in the text box 1570. GUI instance 1505 also includes GCEs 1575A-B, which when selected by the enrollee (e.g., by performing a tap gesture on a GCE 1575A or 1575B) causes the application 110 to render and display an overlay GUI that describes why the requested information is needed for enrollment and/or identity verification purposes. GUI instance 1510 is an example of such an overlay GUI that may be displayed when the GCE 1575B is selected. This overlay GUI may be closed by performing a tap gesture on the "Close X" GCE 1575C or by performing a tap gesture in any area outside of the border of the overlay GUI. In FIG. 16, the enrollee may perform a tap gesture 1620 on the text box 1670/1570, which causes a virtual keyboard GCE 1675 to be overlaid on top of the GUI screen 1605*a*. After entering data into the text box 1670/1570, the user may select the "Done" GCE in GUI instance 1605*a*, which closes the virtual keyboard GCE 1675 and displays the GUI instance 1605*b*. In the GUI instance 1605*b*, the GCE 1625/1525 is highlighted or otherwise enabled, indicating that the enrollee may continue with the enrollment process by performing a tap gesture on the GCE 1625/1525. In some embodiments, the GUI instances 1505/1605 may allow users to suggest corrections to data captured from the scanned ID document. In such embodiments, the data extracted from the scanned ID documents may be stored by the IVS 140 independent of the "corrected data," which the IVS 140 may subsequently verify since a fraudster could potentially use such a feature to mask fraudulent activity.

FIG. 17 shows GUI instance 1705, which includes examples of graphical representations of visual indicators used to indicate when the enrollee has entered invalid and/or incomplete information into the GUI instance(s) 1505/1605. In FIG. 17, GCE 1735 is an example graphical representation of an incomplete field where the enrollee is required to enter additional data (e.g., digits or characters) into the field. As shown, GCE 1735 includes a visual indicator of "(required)" to indicate that the field includes an incomplete value. GCE 1745 is an example graphical representation of an invalid field where incorrect data was entered by the enrollee. As shown, GCE 1745 includes a visual indicator of "(invalid)" to indicate that the field includes an invalid value. GCE 1740 is an example graphical representation of a valid and complete field where data was properly entered by the enrollee. In embodiments, other types of indicators may be used to graphically represent the incomplete and invalid fields, such as by outlining or filling the incomplete GCE 1735 and the invalid GCE 1745 with a predefined color (e.g., red) that is different than the outline or fill color of the valid and complete GCE 1740 (e.g., blue). Any other mechanism may be used to distinguish the incomplete and invalid fields including, for example, bolding text, italicizing text, rendering and displaying popup or overlay GUIs, providing animations, and/or the like.

Figure 18:
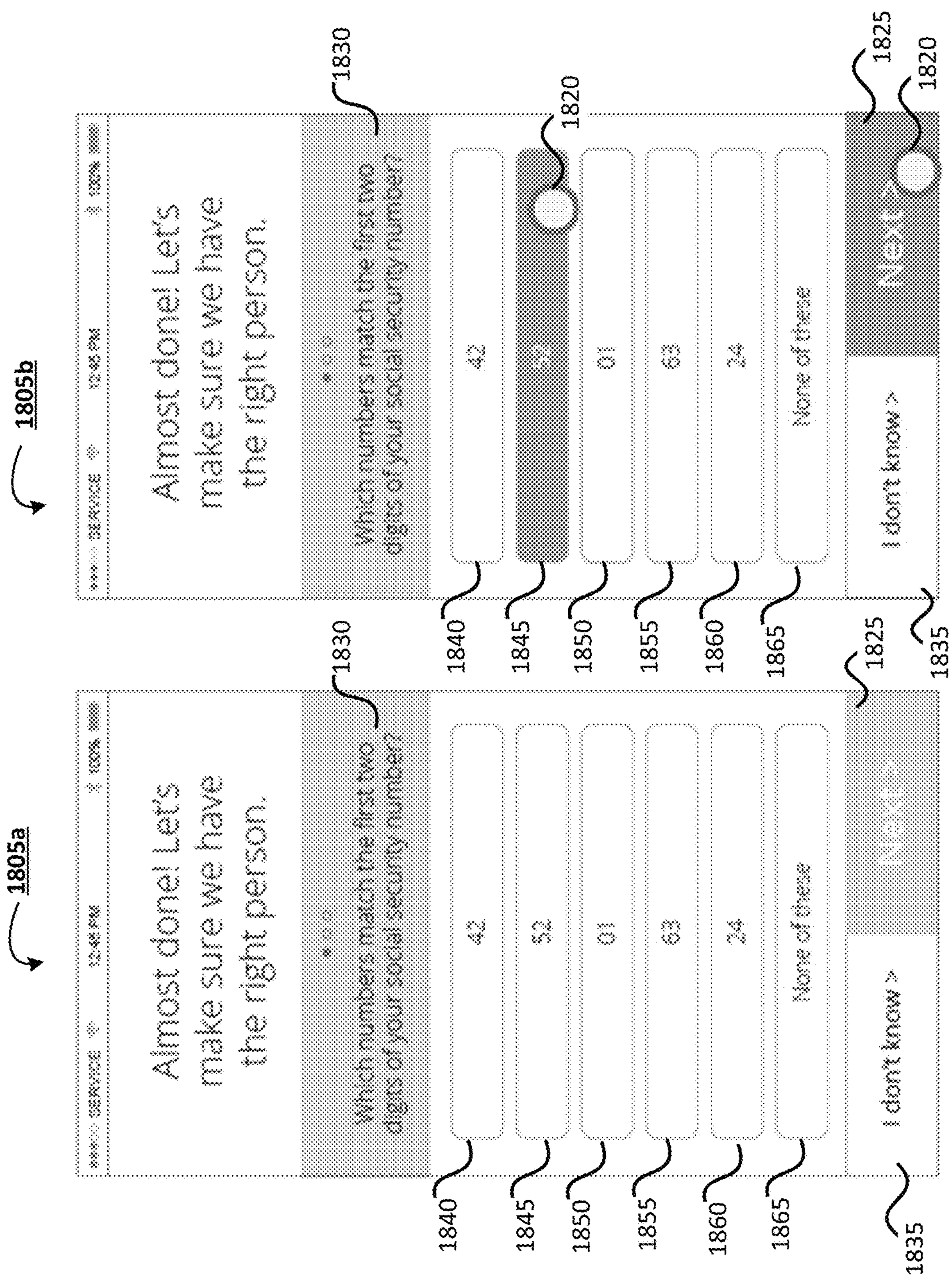
Figure 19:
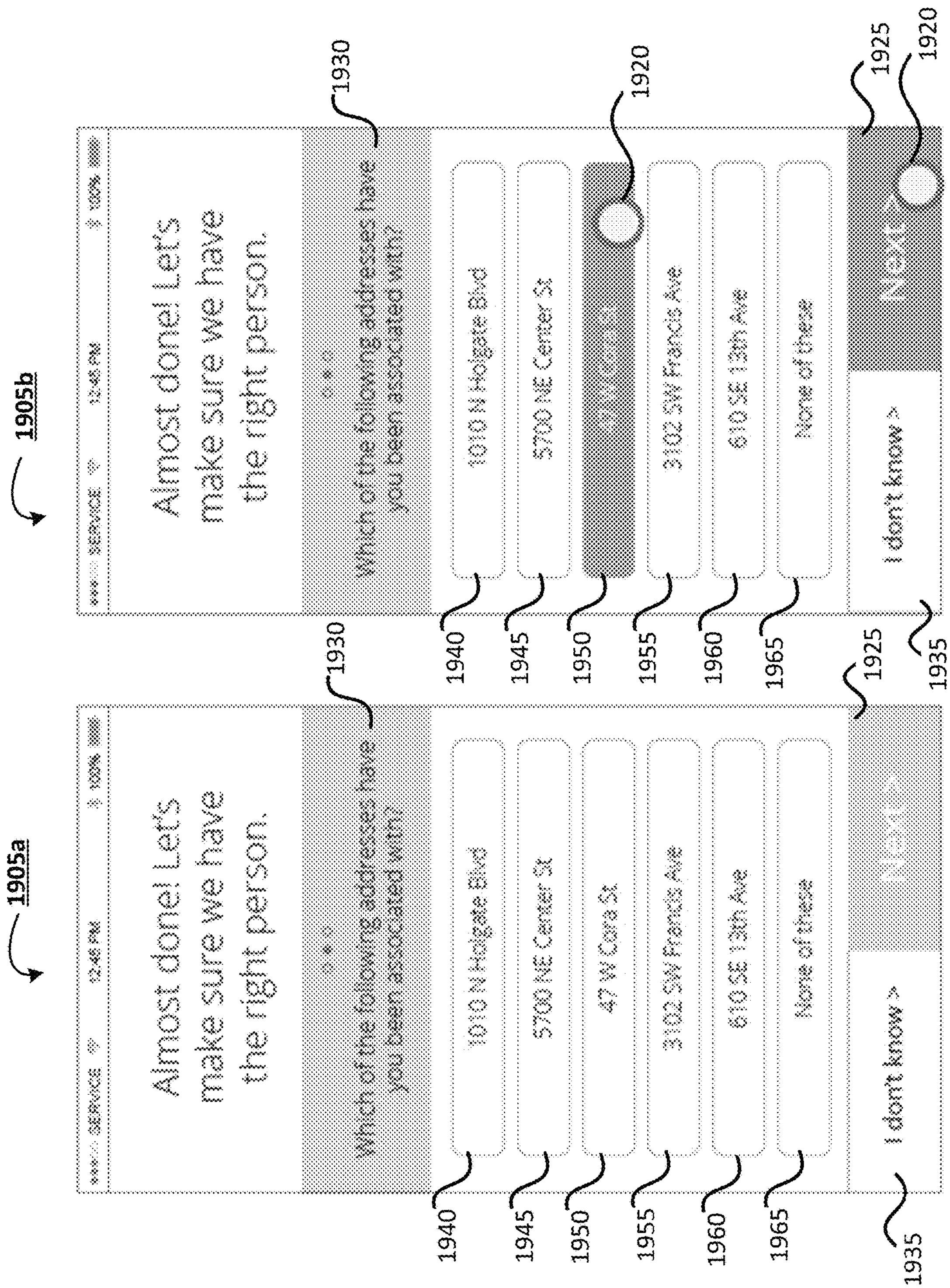
Figure 20:
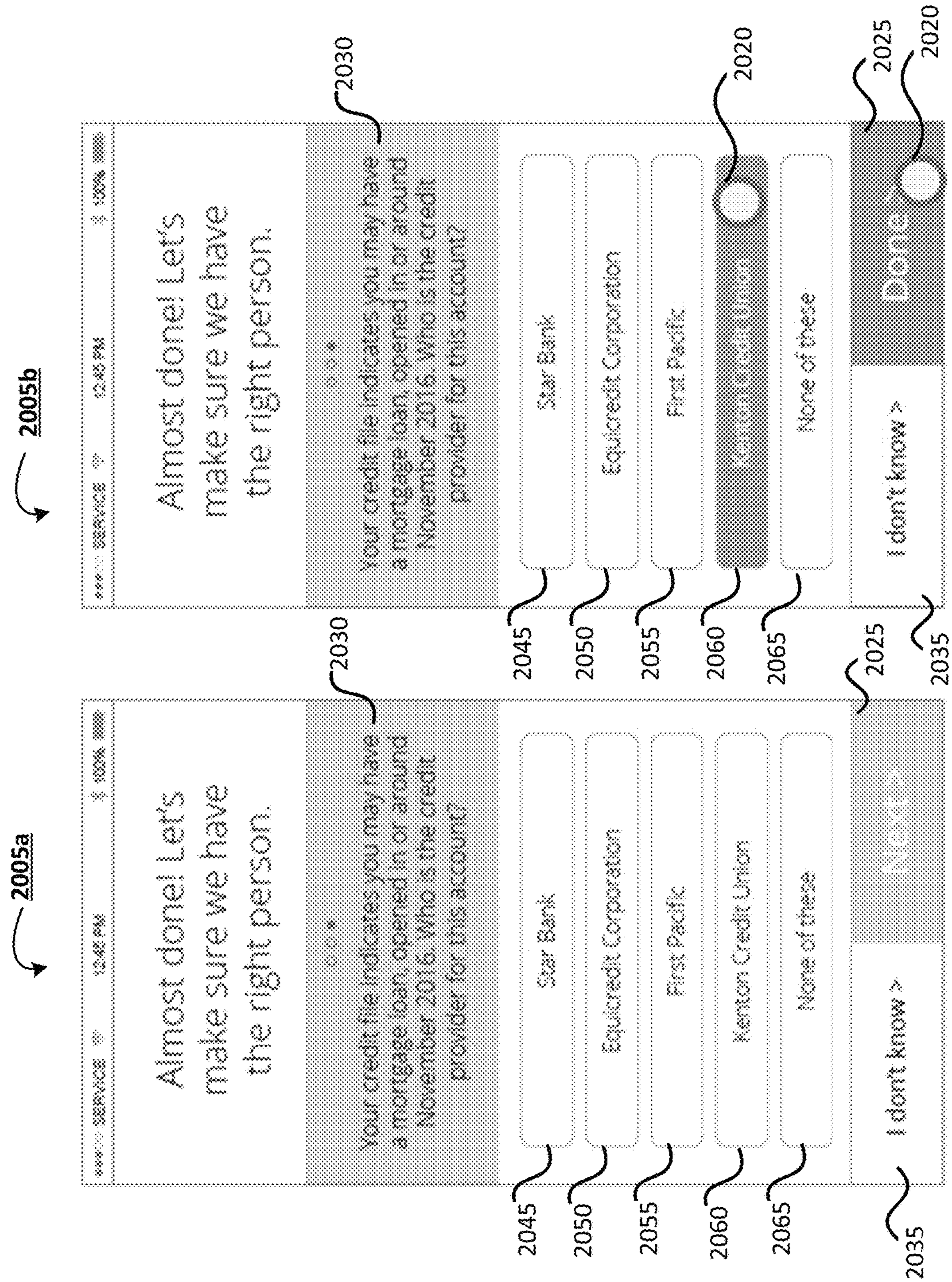

FIGS. 18-20 illustrate example instances of a knowledge-based assessment (KBA) GUI in accordance with some embodiments. FIG. 18 shows knowledge-based assessment (KBA) GUI instances 1805 (including GUI instance screens 1805*a* and 1805*b*), FIG. 19 shows KBA GUI instances 1905 (including GUI instance screens 1905*a* and 1905*b*), and FIG. 20 shows KBA GUI instances 2005 (including GUI instance screens 2005*a* and 2005*b*). In FIG. 18, GUI screen 1805*a* shows a first KBA question in text area 1830 (e.g., "Which numbers match the first two digits of your Social Security number?"). The enrollee may choose an answer choice by selecting one of the GCEs 1840-1865. Additionally, the GCE 1825 is greyed out, indicating that the enrollee cannot continue with the enrollment process until an answer choice is selected. Alternatively, the enrollee may select the GCE 1835 to proceed to a next KBA without providing an answer to the first KBA question. GUI screen 1805*b* shows that the enrollee has selected the GCE 1845 by performing a tap gesture 1820 on the GCE 1845. After the enrollee has selected the GCE 1845 (or another one of GCEs 1840 and 1850-1865), the GCE 1825 is highlighted or otherwise enabled, indicating that the enrollee may continue with the enrollment process by performing a tap gesture 1820 on the GCE 1825.

In FIG. 19, GUI screen 1905*a* shows a second KBA question in text area 1930 (e.g., "Which of the following addresses have you been associated with?"). The enrollee may choose an answer choice by selecting one of the GCEs 1940-1965. Additionally, the GCE 1925 is greyed out, indicating that the enrollee cannot continue with the enrollment process until an answer choice is selected. Alternatively, the enrollee may select the GCE 1935 to proceed to a next KBA without providing an answer to the second KBA question. GUI screen 1905*b* shows that the enrollee has selected the GCE 1950 by performing a tap gesture 1920 on the GCE 1950. After the enrollee has selected the GCE 1950 (or another one of GCEs 1940-1945 and 1955-1965), the GCE 1925 is highlighted or otherwise enabled, indicating that the enrollee may continue with the enrollment process by performing a tap gesture 1920 on the GCE 1925.

In FIG. 20, GUI screen 2005*a* shows a third KBA question in text area 2030 (e.g., "Your credit file indicates you may have a mortgage loan, opened in or around November 2016. Who is the credit provider for this account?"). The enrollee may choose an answer choice by selecting one of the GCEs 2045-2065. Additionally, the GCE 2025 is greyed out, indicating that the enrollee cannot continue with the enrollment process until an answer choice is selected. Alternatively, the enrollee may select the GCE 2035 to proceed to a next KBA (or a next portion of the enrollment process) without providing an answer to the third KBA question. GUI screen 2005*b* shows that the enrollee has selected the GCE 2060 by performing a tap gesture 2020 on the GCE 2060. After the enrollee has selected the GCE 2060 (or another one of GCEs 2045-2055 and 2065), the GCE 2025 is highlighted or otherwise enabled, indicating that the enrollee may continue with the enrollment process by performing a tap gesture 2020 on the GCE 2025.

Figure 21:
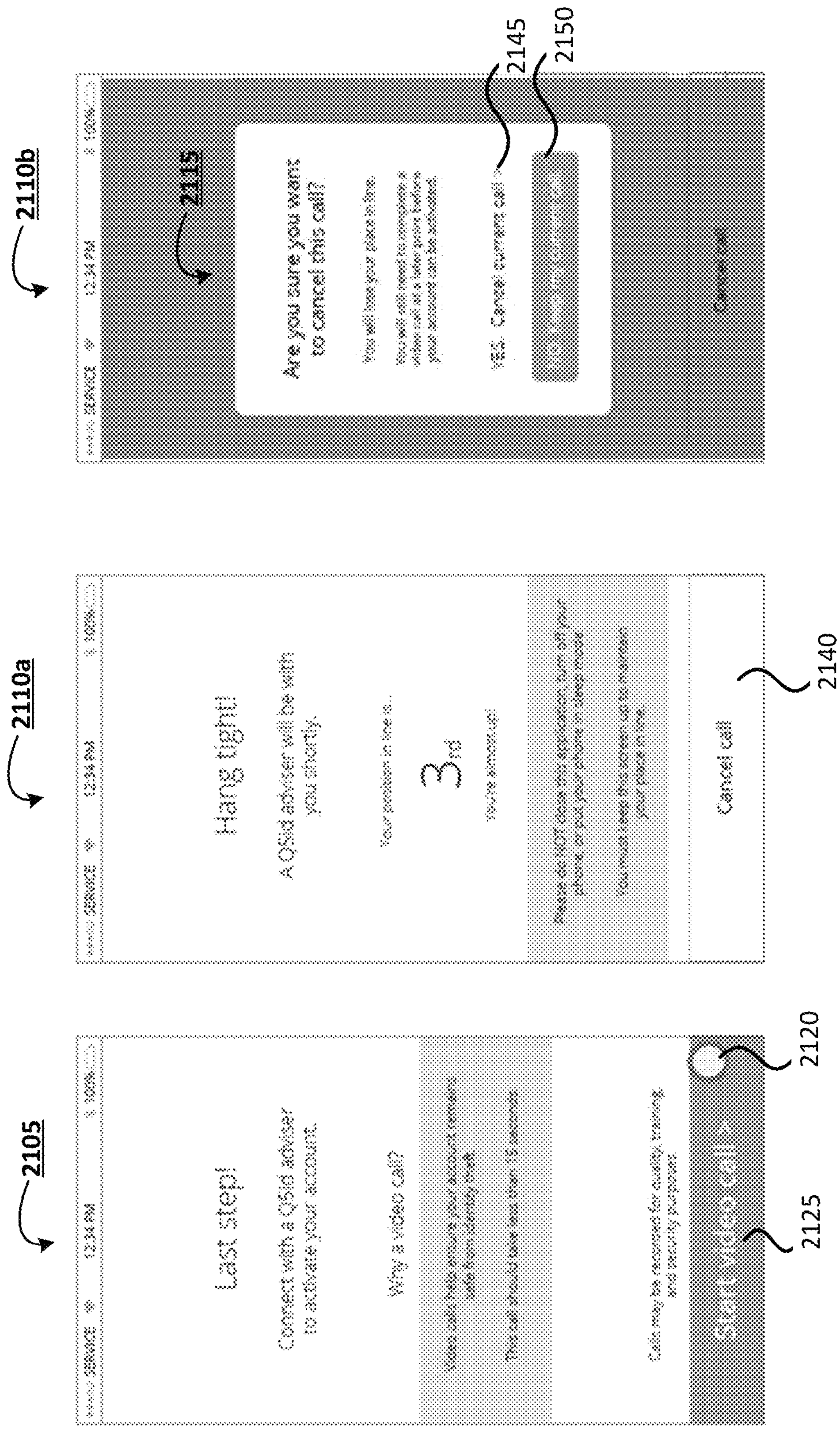

FIGS. 21-24 illustrate example instances of a live interview GUI in accordance with some embodiments. FIG. 21 shows a live interview introduction GUI instance 2105, which indicates that the enrollee may begin the live interview portion of the enrollment process when ready. To start the live interview, the enrollee may perform a tap gesture

2120 on the GCE 2125. In some embodiments, the GUI instance 2105 may include another GCE, which when selected, allows the enrollee to schedule the live interview for another time and/or date (not shown by FIG. 21). After performing the tap gesture 2120 on the GCE 2125, the GUI instance 2110*a* may be displayed, indicating that the client application 110 is connecting to an interviewer for the live interview (e.g., that a secure communication session is being established between the client system 105A and IVS 140 and/or client system 105B). The GUI instance includes a GCE 2140, which when selected by the enrollee, may cause an overlay GUI instance 2115 to be rendered and displayed on top of or within GUI instance 2110*b*. The overlay GUI instance 2115 asks the enrollee to confirm the cancellation choice, and the user may proceed to cancel the call by selecting GCE 2145. The enrollee may select the GCE 2150 if the enrollee does not wish to cancel the live interview, which will cause the overlay GUI instance 2115 to be removed from the screen. If the enrollee still wishes to cancel the live interview, the application 110 may render and display GUI instance 2105 or some other suitable GUI.

Figure 22:
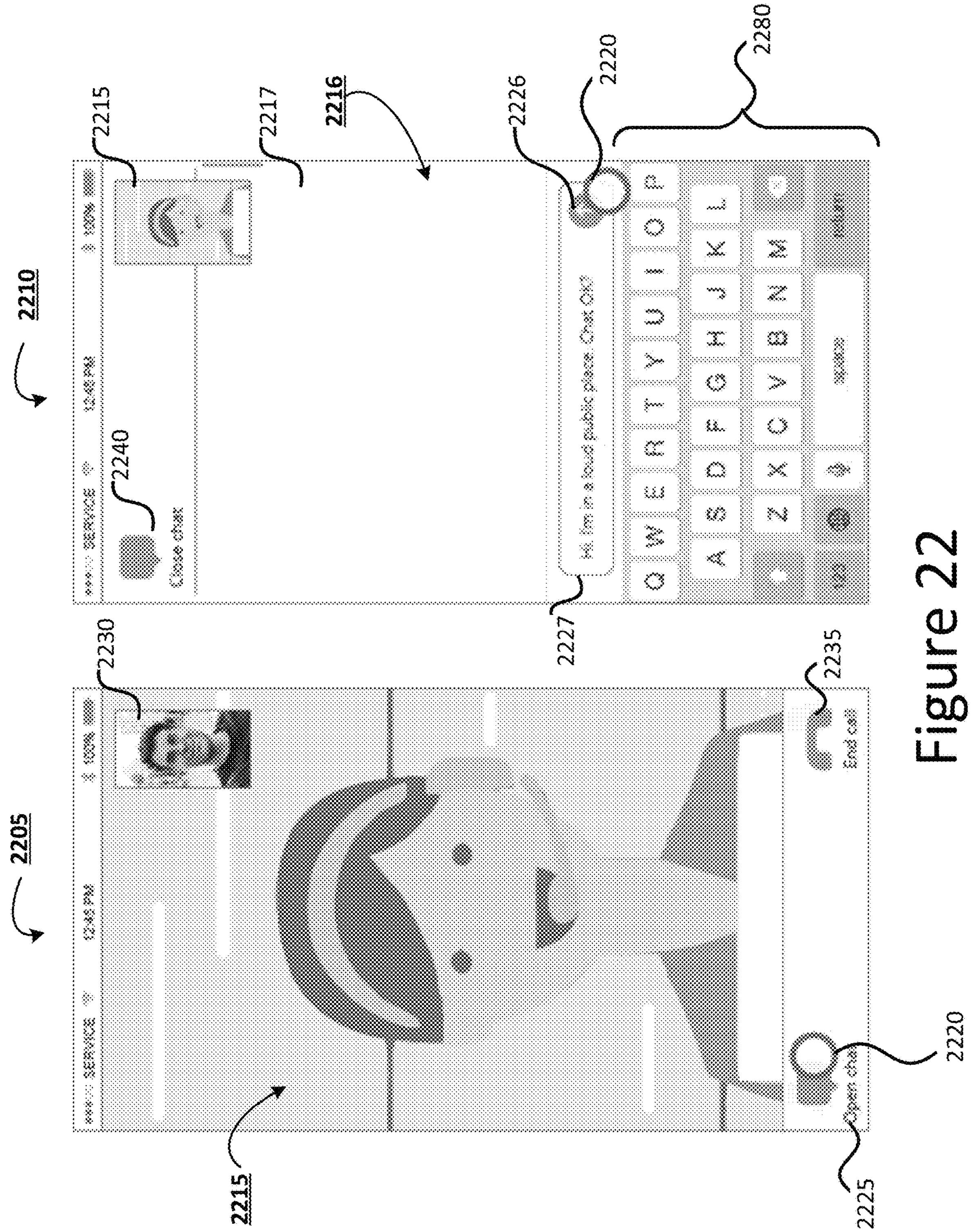

FIG. 22 shows an interview GUI instance 2205 including an interviewer video feed element 2215 showing a video of an interviewer, which may be an avatar of a chatbot or a human interviewer, or video of a human interviewer. The interview GUI instance 2205 also includes an enrollee video feed element 2230 showing a video feed being recorded by the client system 105A. The enrollee may perform a tap gesture 2220 on a GCE 2225 to begin a chat session with the interviewer. Alternatively, the enrollee may perform a tap gesture on a GCE 2235 to end the call with the interviewer. After performing the tap gesture 2220 on the GCE 2225, the interview GUI instance 2210 includes a minimized instance of the interviewer video feed element 2215, a textual chat interface element 2216, and a virtual keyboard 2280. The textual chat interface element 2216 includes a text field 2217A including textual data provided to the user by the interviewer. The enrollee may perform various tap gestures on individual GCEs within the virtual keyboard 2280 to enter text data to be sent to the interviewer (not shown by FIG. 22), which is shown in text box 2227. The user may then perform a tap gesture 2220 on a submit GCE 2226 to submit the entered text to the interviewer. Alternatively, the enrollee may perform a tap gesture on a GCE 2240 to close or end the chat session with the interviewer.

Figure 23:
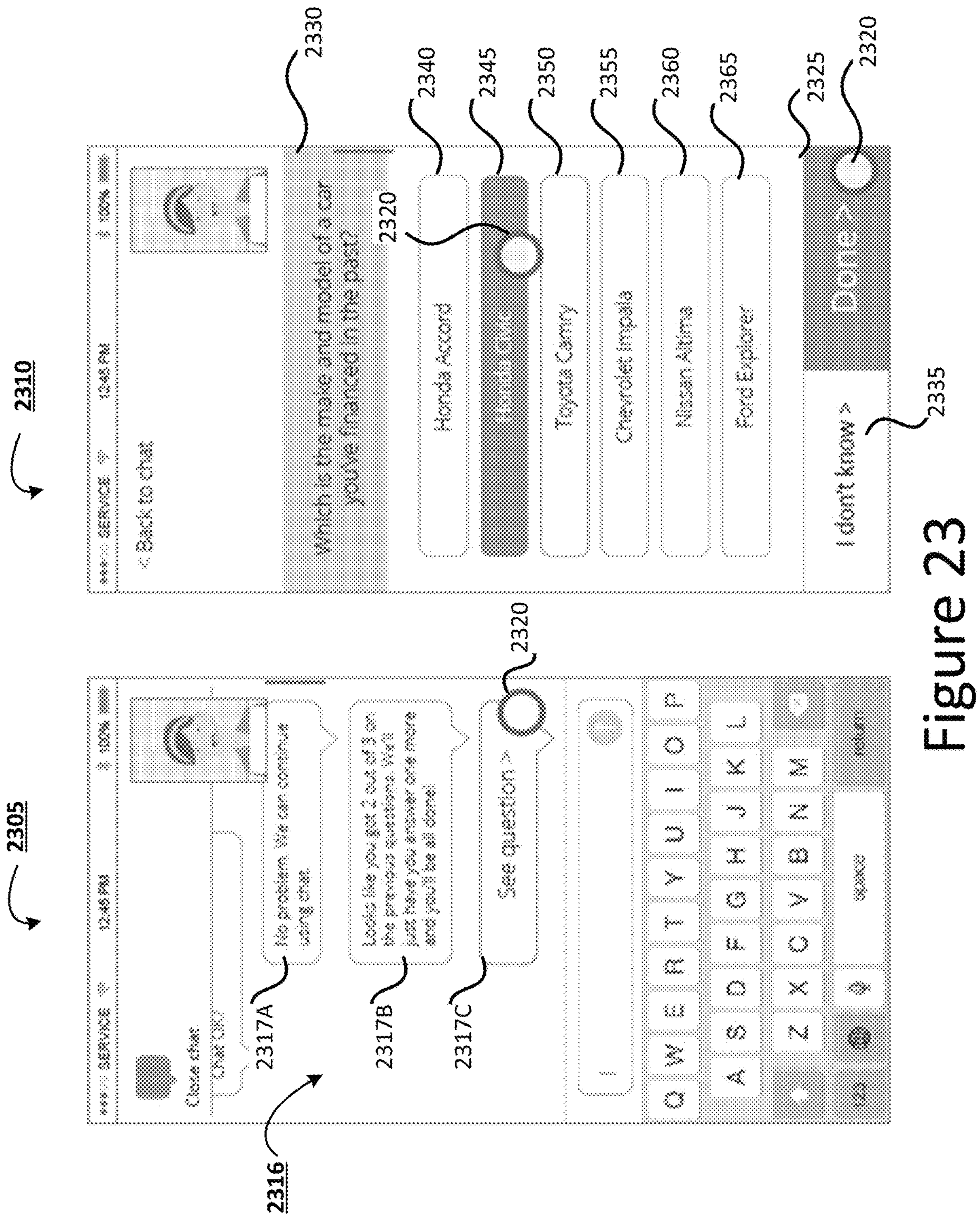
Figure 24:
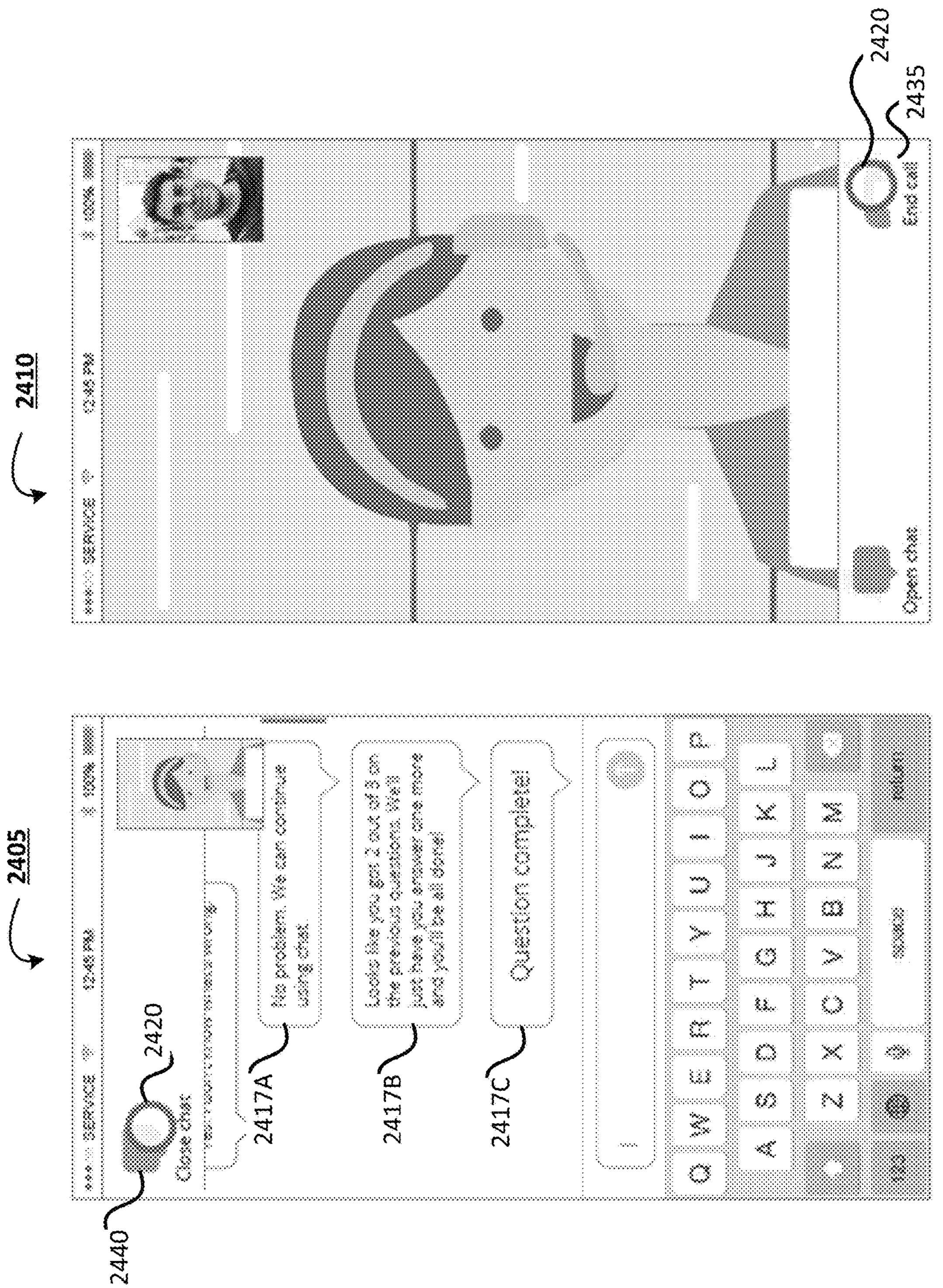

FIG. 23 shows an interview GUI instance 2305 including the textual chat interface element 2216/2316. The textual chat interface element 2216/2316 includes text fields 2317A, 2317B, and 2317C. In this example, the interviewer has indicated using text fields 2317A and 2317B that the user answers a KBA question incorrectly, and the text field 2317C includes a GCE that, when selected by the user (e.g., by performing a tap gesture 2320 on the GCE) causes GUI instance 2310 to be displayed. GUI instance 2310 shows another KBA question in text area 2330 (e.g., "Which is the make and model of a car you've financed in the past?"). The enrollee may choose an answer choice by selecting one of the GCEs 2340-2365. Alternatively, the enrollee may select the GCE 2335 to proceed to answer a different KBA (or a next portion of the enrollment process) without providing an answer to the present KBA question. GUI screen 2310 shows that the enrollee has selected the GCE 2345 by performing a tap gesture 2320 on the GCE 2345. Prior to a selection of one of the GCEs 2340-2365, the GCE 2325 may be greyed out, indicating that the enrollee cannot continue with the enrollment process until an answer choice is selected (not shown by FIG. 23). After the enrollee has selected the GCE 2345 (or another one of GCEs 2340 and 2350-2365), the GCE 2325 is highlighted or otherwise enabled, indicating that the enrollee may continue with the enrollment process by performing a tap gesture 2320 on the GCE 2325. After the enrollee submits the selected answer, the interview GUI instance 2405 of FIG. 24 may be displayed, which includes an indication that the KBA question portion of the interview is complete in the text field 2317C/2417C in place of the GCE discussed previously. GUI instance 2405 also includes text fields 2417A and 2417B, which are the same as text fields 2317A and 2317B, respectively. In this example, the enrollee may perform a tap gesture 2420 on the GCE 2440 to end the chat session with the interviewer, which causes the interview GUI instance 2410 to be displayed. Then, the enrollee may perform a tap gesture 2420 on the GCE 2435 to end the call with the interviewer. The interview GUI instance 2410 may be the same or similar as the interview GUI instance 2205 of FIG. 22.

Figure 25:
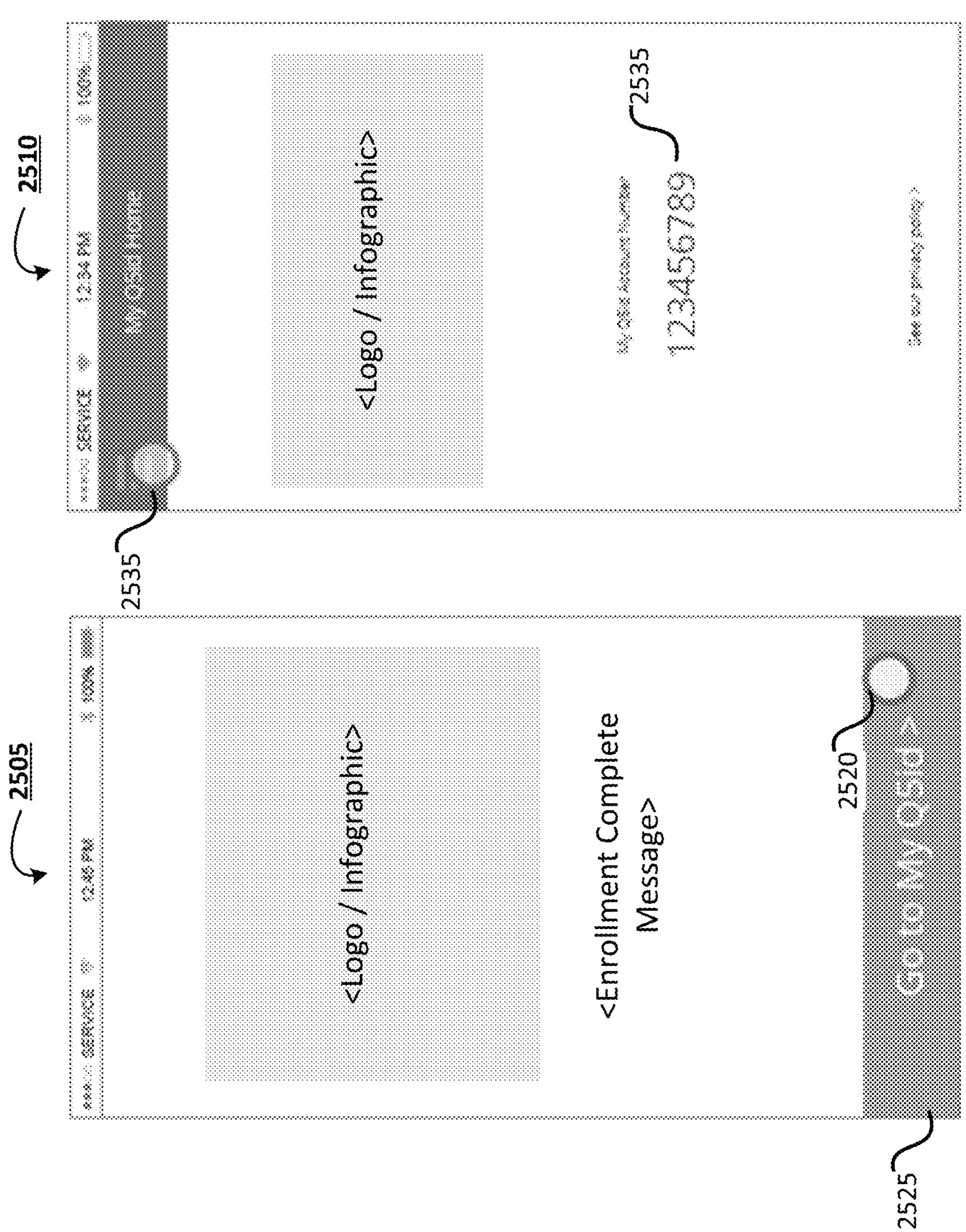
Figure 26:
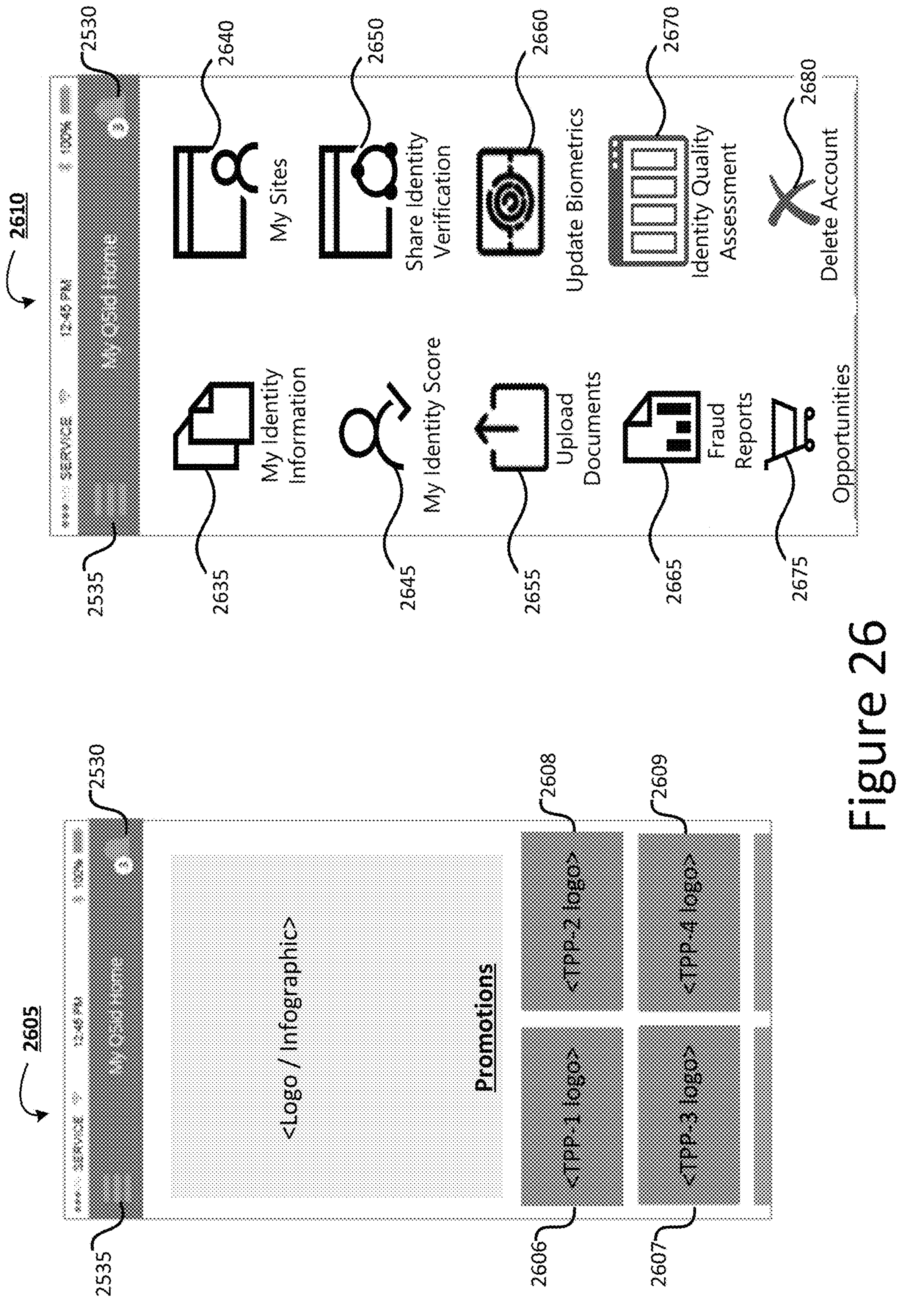

FIGS. 25-26 illustrate example instances of a user portal GUI in accordance with some embodiments. FIG. 25 shows a first example enrollment completion GUI instance 2505, which may include a message indicating that the enrollment process has been completed. The enrollment completion GUI instance 2505 may include a GCE 2525, and the enrollee may perform a tap gesture 2520 on the GCE 2525 to proceed to an IVS home screen GUI instance, such as the GUI instance 2605 or GUI instance 2610 of FIG. 26. FIG. 25 also shows a second example enrollment completion GUI instance 2510, which may include a user account number, which may indicate that the enrollment process has been completed. The GUI instance 2510 also includes a menu GCE 2535, wherein selecting the menu GCE 2535, for example, by performing a tap gesture on the menu GCE 2535 may cause a drop-down menu or other like interface to appear and display content (not shown by FIG. 25). This drop-down menu may include various GCEs, which when selected, may cause the application 110 to proceed to an IVS home screen GUI instance, such as the GUI instance 2605 or GUI instance 2610 of FIG. 26.

FIG. 26 shows example home screen GUI instances 2605 and 2610 according to some embodiments. The home screen GUI instances 2605 and 2610 include a notifications GCE 2530, wherein selecting the notifications GCE 2530, for example, by performing a tap gesture on the notifications GCE 2530, may cause a drop-down menu or other like interface to appear and display content (not shown by FIG. 26). The notifications GCE 2530 also includes a badge, which is text that is layered over the notifications GCE 2530. The badge may display text based on actions of the application 110 and/or the component 113, or based on actions or information at the IVS 140. In the example of FIG. 26, the badge displays a number of unread notifications (e.g., "3" in FIG. 26). The home screen GUI instances 2605 and 2610 also include a menu GCE 2535, wherein selecting the menu GCE 2535, for example, by performing a tap gesture on the menu GCE 2535, may cause a drop-down menu or other like interface to appear and display content (not shown by FIG. 26). Furthermore, the home screen GUI instance 2605 includes GCEs 2606-2609, each of which corresponds to different opportunities provided by individual third party platforms (TPPs) through the IVS 140. Each of the third-party platforms may be the same or similar to the SPP 120 discussed previously.

FIG. 26 also shows another example home screen GUI instance 2610, in accordance with some embodiments. In this example, the home screen GUI instance 2610 is or acts as a member/applicant portal (e.g., the secure portal discussed previously). The portal provides an enrollee or user with the ability to update their biographic data; volunteer additional information, for example, in order to increase their identity score or rating; delete their data and profile; the ability to find other customer promotions that the user is eligible for based on, for example, the user's identity rating/score; the ability to grant or revoke third party access to the user's identity data; configure notification settings; and list current active programs and/or third party platforms in which the user is enrolled.

In addition, the home screen GUI instance 2610 includes GCEs 2635-2675, each of which corresponds to different services and/or content that the user may access from the IVS 140. In the example of FIG. 26, selecting the My Identity Information GCE 2635, for example, by performing a tap gesture on the GCE 2635, may cause one or more GUIs to be displayed in which content related to the user's identity may be displayed, such as by displaying the user's biographic information (e.g., name, address, credit scores, etc.) and biographic information (e.g., the user's photos, videos, audio recordings, etc.). Selecting the My Sites GCE 2640, for example, by performing a tap gesture on the GCE 2640, may cause one or more GUIs to be displayed in which content may be displayed related to the websites or third party platforms (e.g., SPP 120) that the user has granted access to his/her identity assets and/or various GUIs/GCEs that allow the user to generate and distribute identity access certificates (or access tokens). Selecting the My Identity Score GCE 2645, for example, by performing a tap gesture on the GCE 2645, may cause one or more GUIs to be displayed in which content related to the user's identity score may be displayed, and in some embodiments, the particular data items used to calculate the user's identity score, or types of data that are positively or negatively affecting the user's identity score. Selecting the Share Identity Verification GCE 2650, for example, by performing a tap gesture on the GCE 2650, may cause a GUI to be displayed including various GCEs that allow the user to generate and distribute identity access certificates (or access tokens). In some embodiments, this GUI may include graphical indicators of requested credentials, certificates, and/or access tokens from one or more TPPs. These indicators may be graphically represented in a variety of ways including, for example, bold or flashing objects 115, which when selected by the user, would render and display another GUI including the current request(s) being asked.

Selecting the Upload Documents GCE 2655, for example, by performing a tap gesture on the GCE 2655, may cause one or more GUIs to be displayed including various GCEs that allow the user to upload new identity documents, such as the GUIs of FIGS. 13-15. Selecting the Upload Biometrics GCE 2660, for example, by performing a tap gesture on the GCE 2660, may cause one or more GUIs to be displayed including various GCEs that allow the user to upload new biometric data, such as the GUIs of FIGS. 4-12. Selecting the Fraud Reports GCE 2665, for example, by performing a tap gesture on the GCE 2665, may cause one or more GUIs to be displayed in which content is displayed related to detected attempts to use the user's identity for fraudulent purposes, as well as the third party attempts to authenticate the user's identity. Selecting the Identity Quality Assessment GCE 2670, for example, by performing a tap gesture on the GCE 2670, may cause one or more GUIs to be displayed in which content related to the quality of data used to authenticate the user's identity and content related to how the user can improve biographic and/or biometric data collection is displayed. Selecting the Opportunities GCE 2675, for example, by performing a tap gesture on the notifications GCE 2675, may cause one or more GUIs to be displayed in which content related to opportunities provided by third party platforms through the IVS 140 is displayed (e.g., the same or similar to home screen GUI instance 2605). Selecting the Delete Account GCE 2680, for example, by performing a tap gesture on the notifications GCE 2680, may cause one or more GUIs to be displayed which allow the user to delete his/her biographic and biometric data and their identity verification account. In some embodiments, the user's biographic and biometric data may be anonymized after the user deletes their account. In this way, the user's data may continue to be used to prevent the user's identity from being used for fraudulent activities. Different arrangement of the GCEs 2635-2675 and/or different GCEs may be displayed in other embodiments. For example, another GCE may be present, which when selected by the user, allows the user to adjust different notification options, such as when and how suspicious identity activity alerts are delivered to the client system 105A. In addition to the GUI instances 2605 and 2610 shown by FIG. 26, other example home screen GUIs include the home screen GUI instances 305 and 310 shown by FIG. 3.

Figure 27A:
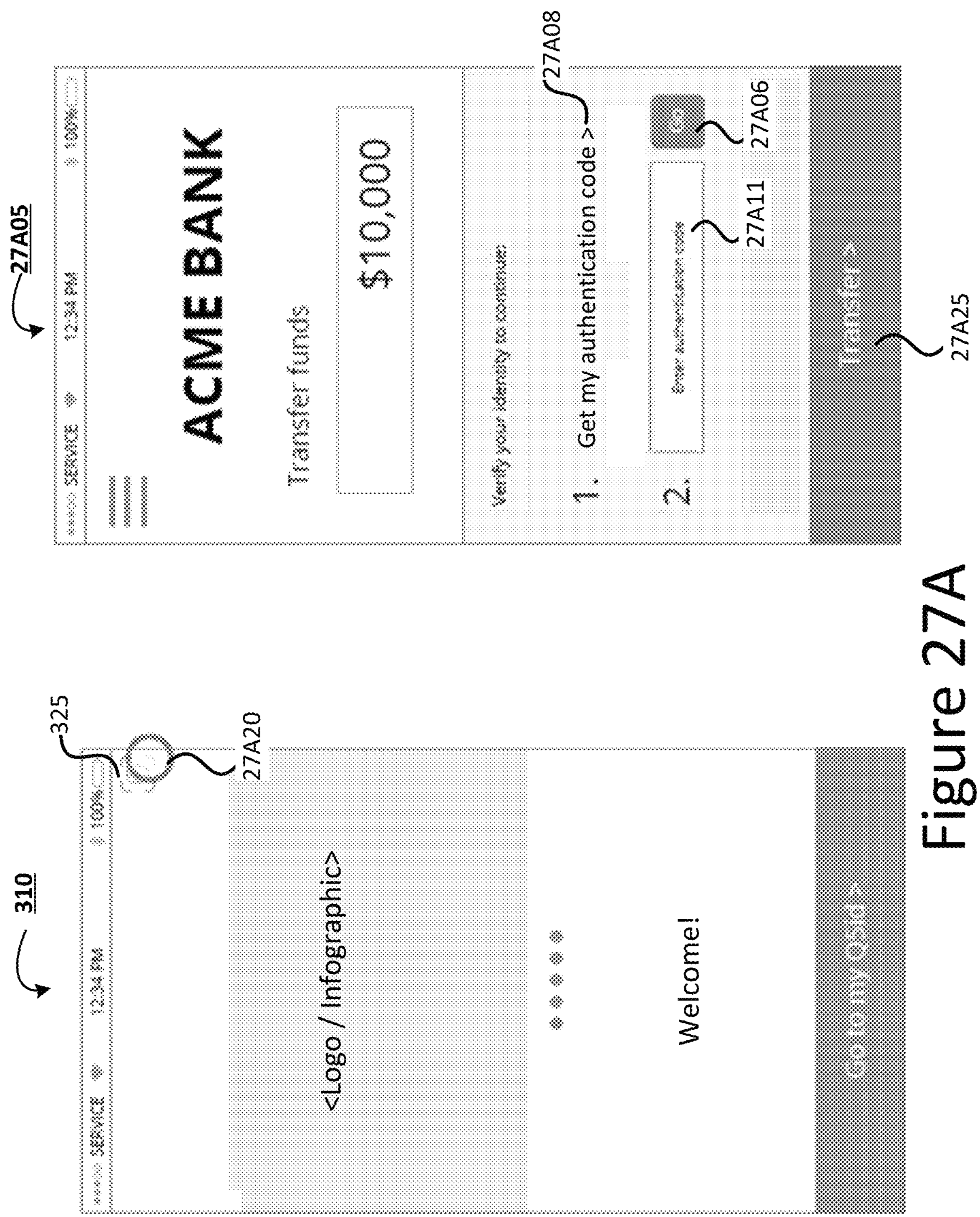
Figure 27B:
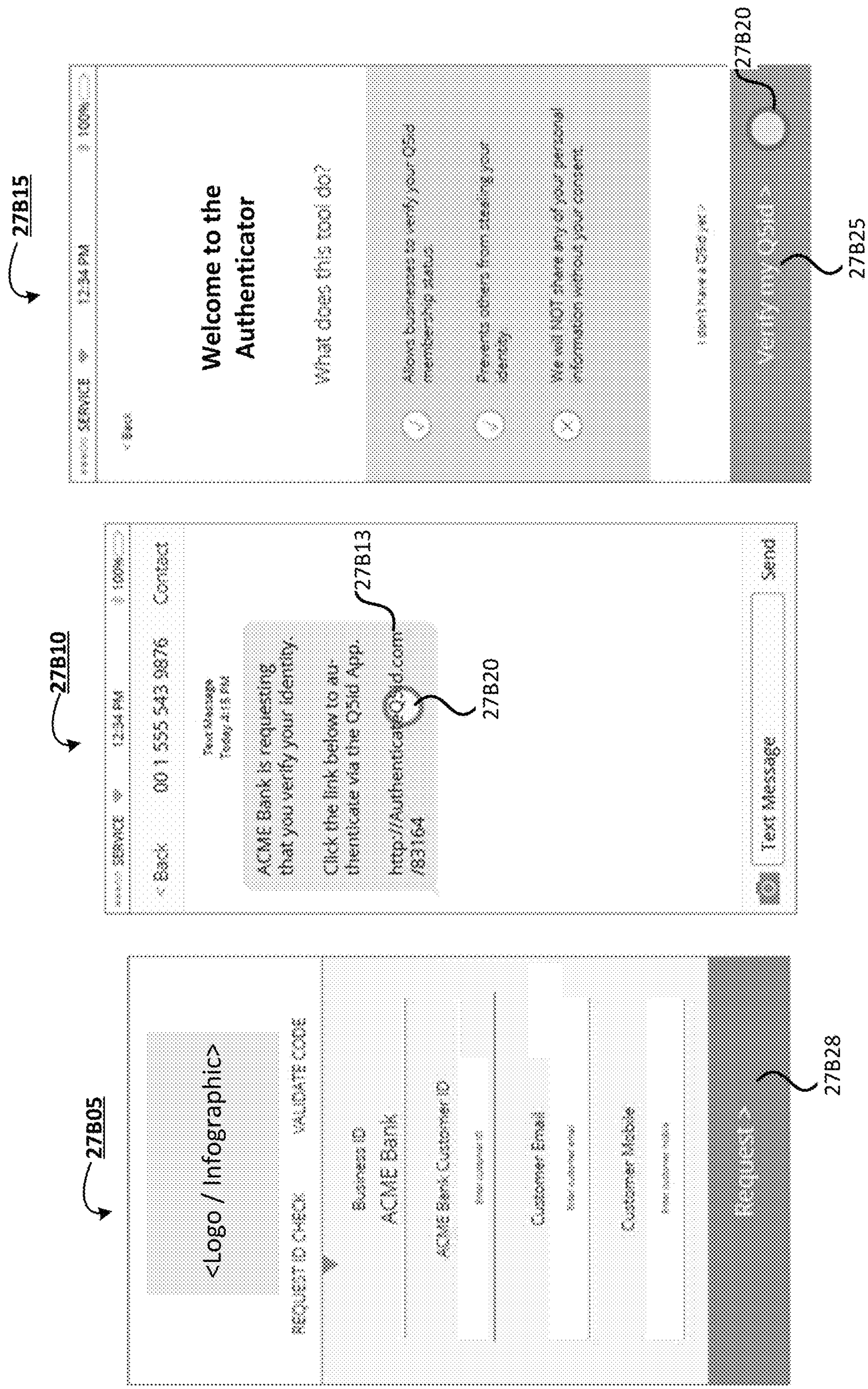
Figure 28:
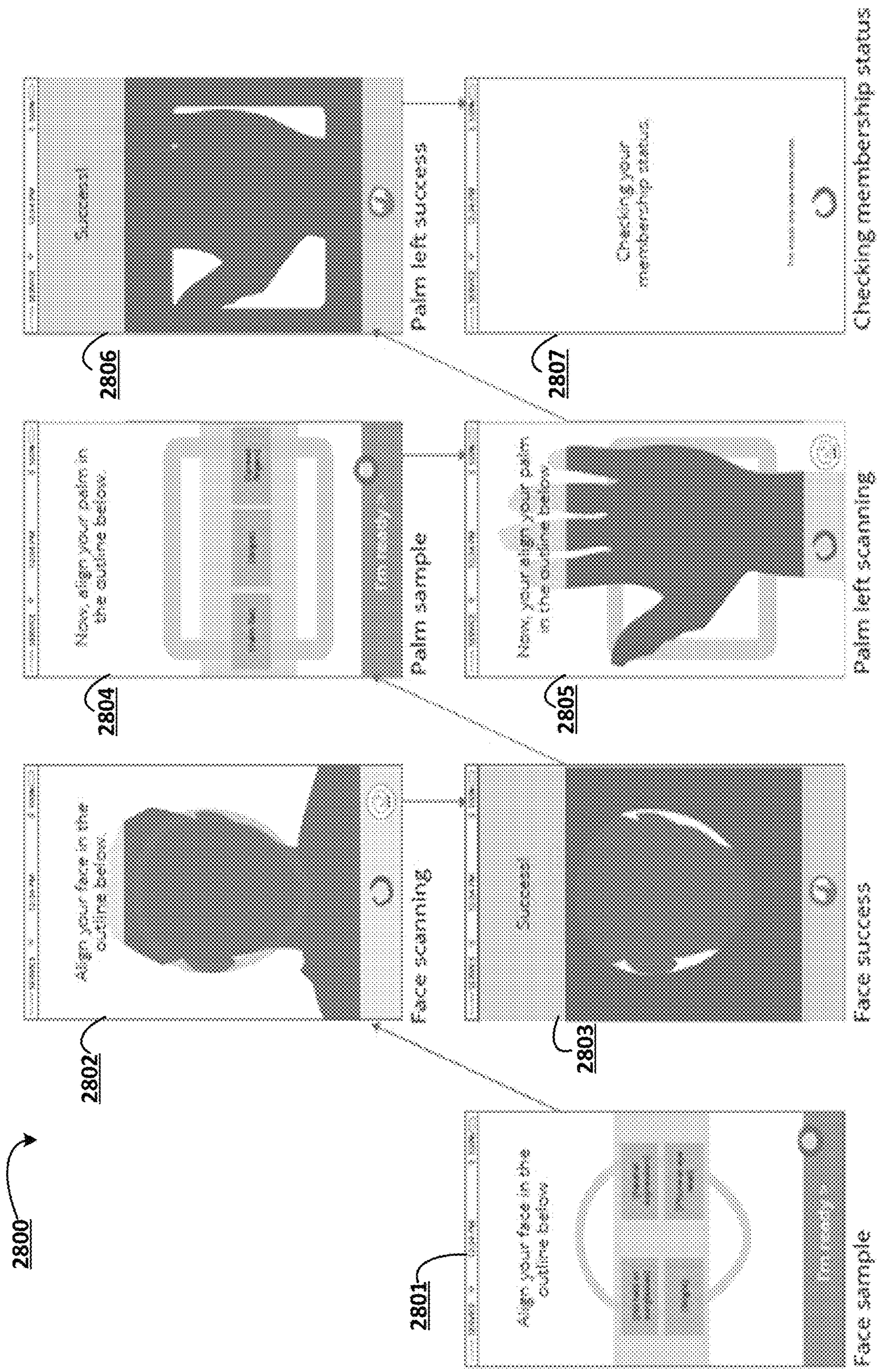
Figure 29:
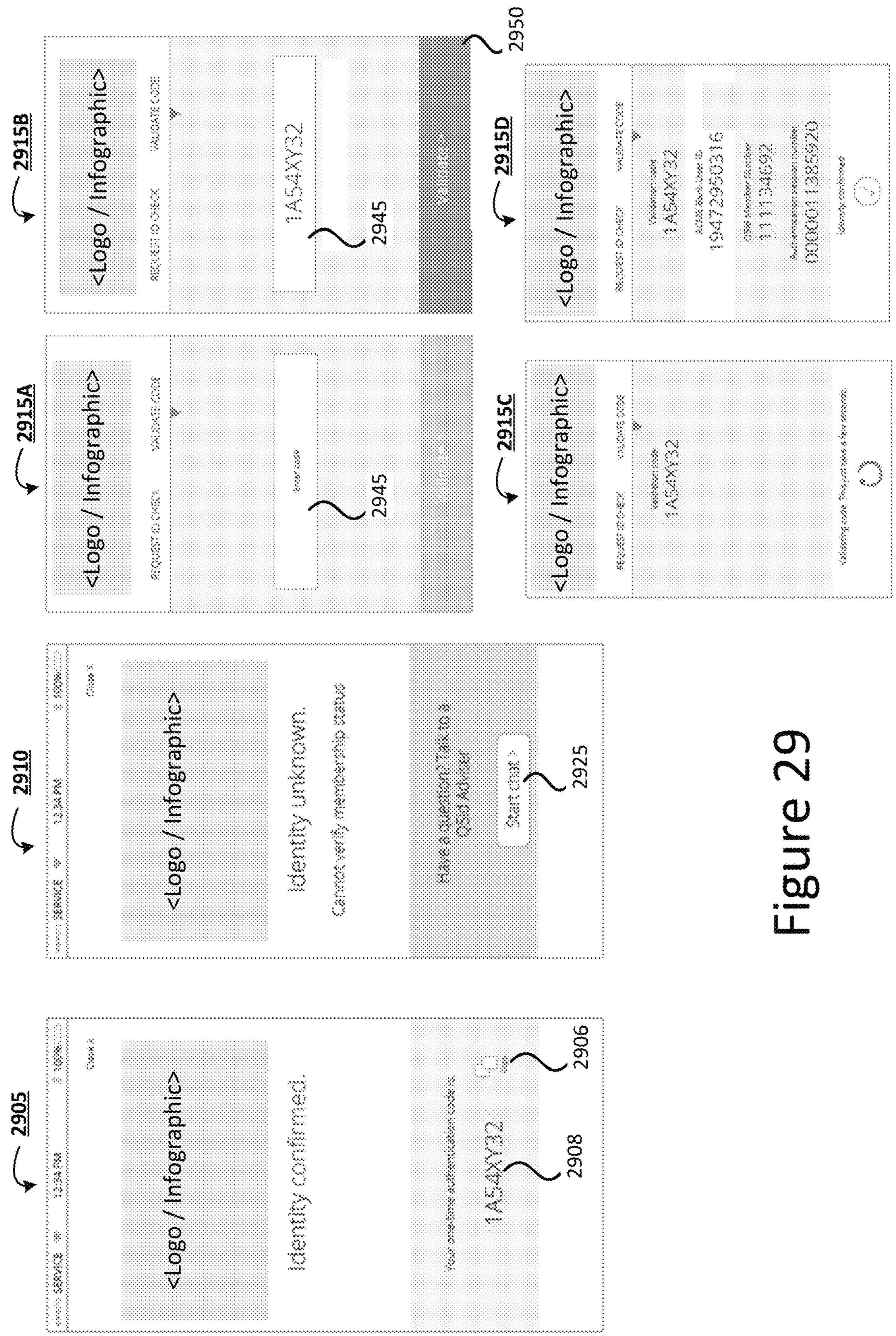

FIGS. 27A-29 show GUIs for performing authentication procedures according to some embodiments. FIGS. 27A and 27B show examples of GUIs that may be used to start or initiate the authentication procedure. FIG. 27A shows two examples. A first example involves the home screen GUI instance 310 being used during an in-person (or in-store) authentication procedure. As discussed previously, the GUI instance 310 includes an authentication GCE 325 in the top right of the GUI instance 310. In this example, the enrollee or a third party employee/staff member may initiate the authentication procedure by performing a tap gesture 27A20 on the GCE 320. After selecting the GCE 320, the client application 110 may render and display an authentication introduction (intro) GUI instance 27B05 shown by FIG. 27B. FIG. 27A also includes another example where the user of client system 105A may wish to verify his/her identity for completing a money transfer using a separate mobile banking application, which is shown by GUI instance 27A05. The GUI instance 27A05 includes a GCE 27A08, which when selected by the user, may cause the application 110 to be executed to authenticate the user's identity. The mobile banking application may be integrated with the IVS 140 using a suitable API or the like. The GUI instance 27A05 also includes a text field GCE 27A11 and a GCE 27A06. The user may paste the obtained one-time identity authentication code into the text field GCE 27A11, and then select the GCE 27A06 to validate his/her identity in a same or similar manner as discussed infra with respect to GUI instances 2915A-2915D. After the user's identity is authenticated, the user may select the GCE 27A25 to complete the money transfer.

FIG. 27B shows another example GUI for remote initiation of the authentication procedure. In this example, a third party platform employee may request to verify a user's identity for completing a money transfer using a separate mobile banking application, which is shown by GUI instance 27B05. The third party platform employee may enter various user data into respective text fields as shown by GUI instance 27B05, and may then select the GCE 27B28 to request identity authentication. Selection of the GCE 27B28 may cause the IVS 140 to trigger execution of the application 110 on the client system 105A for the user to perform an identity authentication procedure using the client system 105A. For example, the selection of the GCE 27B28 may cause the IVS 140 to send a Short Message Service (SMS) message to the client system 105A, which is shown by GUI instance 27B10. In this example, the text message may include a link 27B13, which when selected by the user by performing a tap gesture 27B20 on the link 27B13, may cause the application 110 to be executed to authenticate the user's identity.

In response to selecting any of GCEs 325, 27A25, 27B25, or 27B28, the application 110 may render and display authentication intro GUI instance 27B15 to begin the authentication procedure. As shown by FIG. 27B, authentication intro GUI instance 27B15 includes a GCE 27B25, which when selected by the enrollee, for example, by performing a tap gesture 27B20 on the GCE 27B25, may cause the authenticate process, such as process 2800 of FIG. 28, to begin.

Referring now to FIG. 28, authentication process 2800 may begin at operation 2801 where the enrollee is to perform the face scan in a same or similar manner as discussed previously with respect to FIGS. 5-6. After successfully scanning the enrollee's face at operations 2802 and 2803, the enrollee is asked to perform the palm/hand scan in a same or similar manner as discussed previously with respect to FIGS. 7-10. After successfully scanning the enrollee's hand/palm at operations 2804, 2805, and 2806, a GUI instance may be displayed at operation 2807, indicating that the user's enrollment status with the IVS 140 is being determined.

In response to receipt of an indication of the user's enrollment status from the IVS 140, the application may render and display one of the GUI instances shown by FIG. 29. FIG. 29 shows an identity confirmation GUI instance 2905 that may be displayed when the user's identity has been properly authenticated by the IVS 140 and an identity confirmation failure GUI instance 2910 that may be displayed when the user's identity has not been authenticated by the IVS 140. The identity confirmation failure GUI instance 2910 indicates that the IVS 140 was unable to verify the user's identity, and includes a GCE 2925 that may allow the user to establish a communication session with an interviewer to discuss any potential issues. This may be accomplished in a same or similar manner as discussed previously with respect to FIGS. 21-25. The identity confirmation GUI instance 2905 includes a graphical object 2908 indicating a one-time authentication code that may be used by the user for identity verification purposes, and a GCE 2906 that allows the user to copy the one-time authentication code 2908, which may then be pasted into a text box or field of an online form or some other application. In other embodiments, the one-time authorization code may be sent to the client system in an SMS message or using some other messaging system/service. As examples, the one-tine authentication code 2908 may be pasted into a separate identity verification application as shown by GUI 2915 (including GUI instances 2915A, 2915B, 2915C, and 2915D), a separate application such as a banking application (see, e.g., GUI instance 27A05 of FIG. 27A), social networking application, or the like.

The GUI 2915 of the separate identity verification application is an example where identity authentication is used for an in-person (or in-store) purchase. In this example, the one-time authentication code may be pasted into a text field GCE 2945 of a separate identity validation application, which is illustrated by GUI instance 2915A and GUI instance 2915B. Alternatively, the one-time authorization code may be transmitted (e.g., using SMS or the like) to a separate client system owned/operated by an in-store employee/staff member. When the employee/staff member user pastes or otherwise enters the one-time authentication code into the text field GCE 2945, the employee/staff member user may select the GCE 2950, which causes the separate application to render and display the GUI instance 2915C showing that the IVS 140 is validating the one-time identity authentication code 2908, and then render and display GUI instance 2915D showing validation results provided by the IVS 140.

FIG. 30 shows GUI instance 3005, which may be rendered and displayed to indicate that the user's identity is being authenticated by the IVS 140 (e.g., at operation 2807 of FIG. 28, and/or instead of GUI instances 2905 or 2910 of FIG. 29). The verifying identity GUI instance 3005 may be displayed while the IVS 140 performs various identity verification services, such as those discussed previously with respect to FIGS. 1-2. Upon proper verification of the enrollee's identity, the authenticate complete welcome screen GUI instance 3010 may be rendered and displayed. The authenticate complete welcome screen GUI instance 3010 includes a GCE instance 3035, which allows the enrollee to grant the SPP 120 access to the enrollee's identity information including the identity items listed in the GUI instance 3010 (e.g., "Your full name," "Address," "Telephone number," and "Email" in FIG. 30). Note that the GUI instance 3010 indicates that the enrollee may avoid filling out various forms provided by the SPP 120 by granting access to the listed identity items. After performing a tap gesture 3020 on the GCE 3035, the user may perform a tap gesture 3020 on a GCE 3025 to proceed to a next GUI instance, which may include, for example, a passport or dashboard GUI (e.g., GUI instance 26 of FIG. 26 or the like).

FIGS. 31-32 show example instances of fraud prevention related GUIs in accordance with various embodiments. In particular, FIG. 31 shows a previous enrollment GUI instance 3110 displayed after the IVS 140 detects a match between a user's biometric data and an existing user's biometric data, and FIG. 32 shows a fake ID GUI instance 3210 displayed after the IVS 140 detects a user's identity documents to be synthetic (or fake) or that user's identity documents belong to an existing user. In FIG. 31 after a user interacts with the various GUI instances rendered by application 110 as shown and described with respect to FIGS. 3-10 (depicted as operations 3101-3107 in FIG. 31), the IVS 140 may determine that a user having the same or similar biometric data already exists in the IVS DB 150, and may cause or instruct the application 110 to shift from the enrollment process to sign-in process by displaying the previous enrollment GUI instance 3110. The GUI instance 3110 includes text area 3130 including text indicating that the user may already have an account, and GCE 3125 that allows the user to proceed to a sign-in GUI when selected (e.g., by performing a tap gesture on the GCE 3125). Additionally, in FIG. 32 after a user interacts with the various GUI instances rendered by application 110 as shown and described with respect to FIGS. 13-15 (depicted as operations 3201-3204 in FIG. 32), the IVS 140 may determine that the scanned documents are fake or belong to another user, and may cause or instruct the application 110 to shift from the enrollment process to error indication by displaying the fake ID GUI instance 3210. The GUI instance 3210 includes text area 3230 including text indicating that the user's identity documents could not be validated, a GCE 3235 that allows the user to re-perform the identity document scanning and validation procedure when selected (e.g., by performing a tap gesture on the GCE 3235), and a GCE 3225 that allows the user to proceed to chat or call session with IVS 140 personnel (e.g., by performing a tap gesture on the GCE 3225).

FIGS. 33-55 illustrate example user interfaces that may be displayed by a client system 105B during an interview portion of an enrollment process, in accordance with various embodiments. In general, the GUIs of FIGS. 33-55 show an example identity validation process as well as the various validation steps being completed. The GUIs of FIGS. 33-55 are a dashboard for human interviewers of the IVS 140, which allow the human interviewers to perform the identity validation process as discussed previously. The GUIs of FIGS. 33-55 also allow the human interviewers to onboard at any experience level, and provide the human interviewers with a plurality of options to onboard (referred to as "multi-modal onboarding"). In the example GUIs of FIGS. 33-55, the client system 105B is a laptop, desktop computer, or workstation with display monitor and pointer (or "mouse") interfaces.

Figure 33:
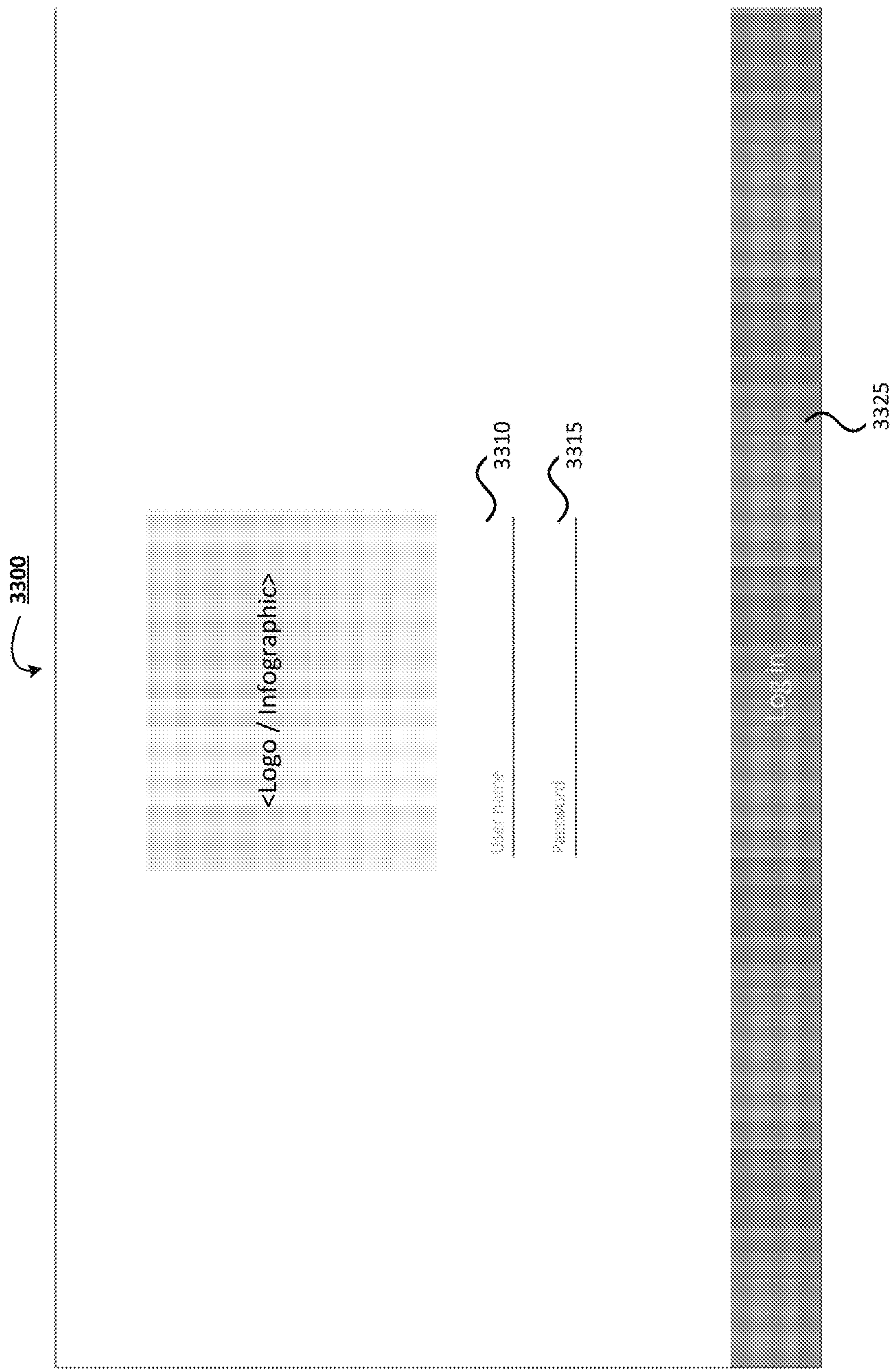

Referring now to FIG. 33, which shows an example instance of a log-in GUI 3300, which includes text boxes 3310 and 3315 for inputting a user name and password, respectively, and a GCE 3325 for submitting the entered user name and password. After the interviewer has entered and submitted his/her log-in credentials (e.g., by pointing and clicking on GCE 3325), the client system 105B may display a performance dashboard GUI instance 3400, which is shown by FIG. 34.

Figure 34:
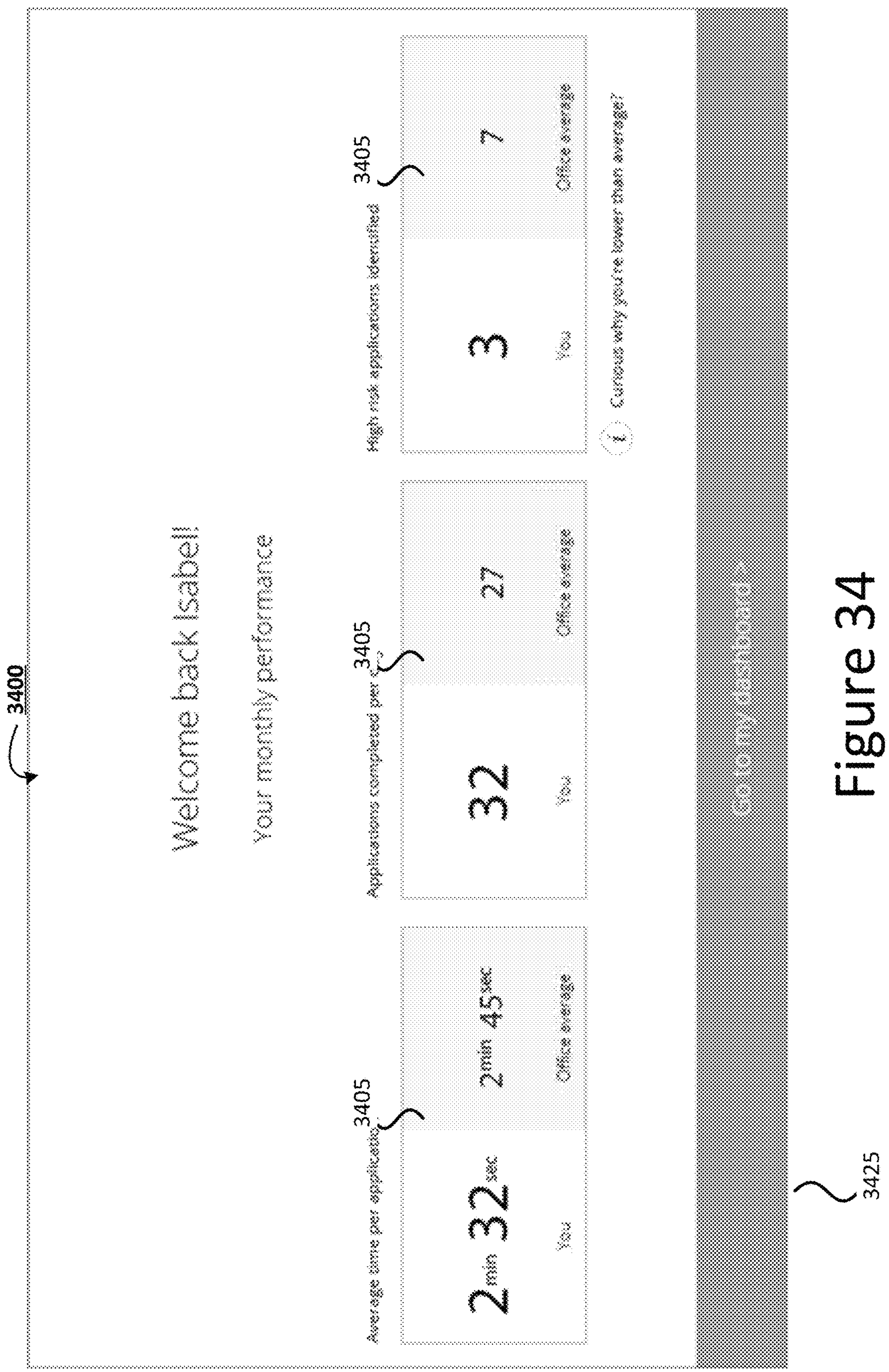
Figure 35:
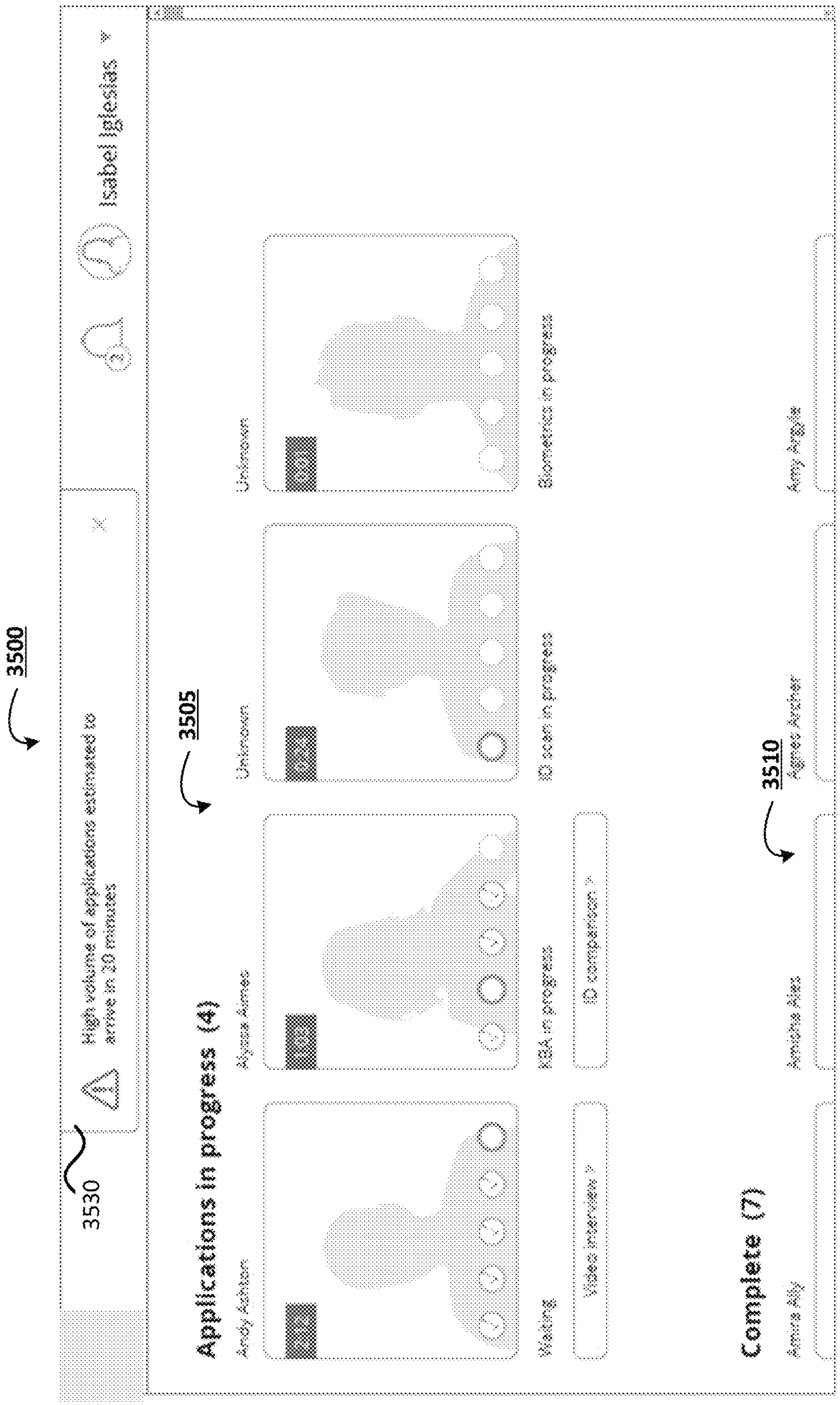

FIG. 34 shows a performance dashboard GUI instance 3400, which includes various performance metrics 3405. In this example, the metrics 3405 includes an average amount of time the interviewer takes to review enrollment applications, an amount of enrollment applications the interviewer has completed per day, and the number of high-risk enrollment applications reviewed by the interviewer. The metrics 3405 may be used to empower on site learning and promote accountability for the interviewer. After the interviewer selects the dashboard GCE 3425 (e.g., by pointing and clicking on GCE 3425), the client system 105B may display a performance dashboard GUI 3500, which is shown by FIG. 35.

Figure 36:
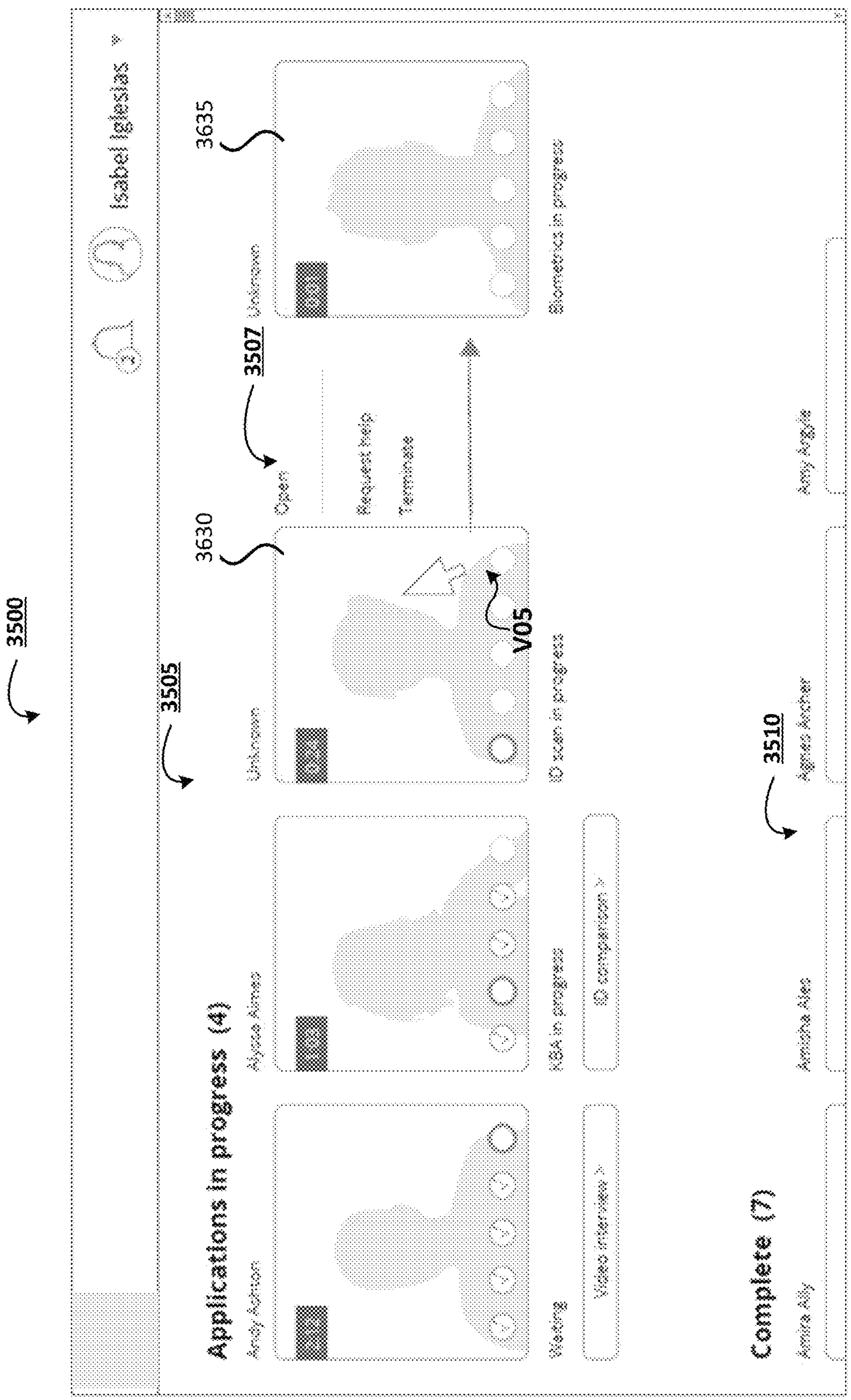

FIGS. 35-52 illustrate example instances of an application dashboard GUI in accordance with various embodiments. FIG. 35 shows application dashboard GUI instance 3500, which includes a text indicator 3530 indicating that a high volume of enrollment applications are expected to arrive, and GUI sections 3505 and 3510 that indicate individual users or enrollees assigned to the interviewer. In particular, GUI section 3505 indicates enrollees currently undergoing the enrollment process and each enrollee's progress in the enrollment process, and GUI section 3510 indicates recently completed users. Each of the GUI sections 3505 and 3510 include GCEs associated with individual enrollees/users, which when selected by the interviewer may cause additional content of corresponding enrollees/users to be displayed. Additionally, the GCEs in GUI section 3505 include progress indicators, where circles with check marks indicate completed portions of the enrollment process, emboldened circles indicate portions of the enrollment process currently in progress, and non-bold circles indicate incomplete portions of the enrollment process. In FIG. 36, the interviewer may select a GCE 3630 associated with an Unknown enrollee, for example, by using pointer V05 to point and click on the GCE 3630, which may cause an interface 3635 to appear and display content. Additionally, selection of the GCE 3630 causes GCEs 3507 to be displayed, which in this example allows the interviewer to open an enrollment application, request help, or terminate the enrollment application. After the interviewer selects the GCE to open the Unknown applicant's enrollment application (e.g., by pointing and clicking on GCE 3630 or an option 3507), the client system 105B may display an application comparison GUI instance 3700, which is shown by FIG. 37.

Figure 37:
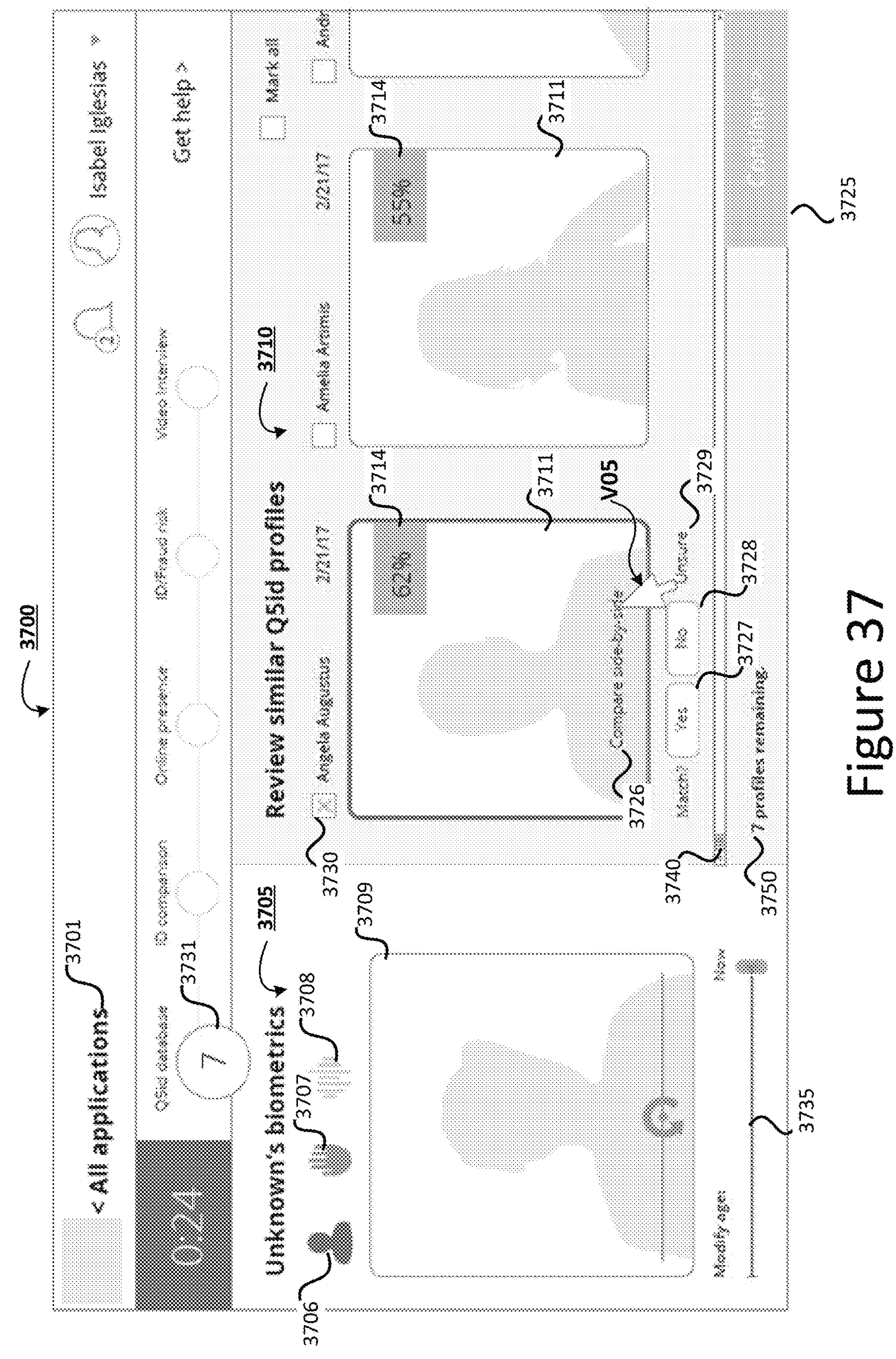

FIG. 37 shows an application comparison GUI instance 3700, which allows the interviewer to compare the Unknown applicant's identity information with other existing user's identity information. The GUI instance 3700 includes an indicator 3731, which indicates a number of profiles having an identity that has been flagged as being similar to the identity of the Unknown applicant (e.g., "7" in the example of FIG. 37). In this example, the interviewer may be required to compare the Unknown applicant's identity with other user identities, which is indicated by the GCE 3725 being greyed out, indicating that the GCE 3725 is disabled. After the comparison(s) is/are completed, the GCE 3725 may be highlighted or enabled.

To conduct the comparison(s), the GUI instance 3700 includes a GUI section 3705 that indicates the Unknown applicant's biometrics and a GUI section 3710 that indicates profiles of other users having similar identity information/data. In particular, the GUI section 3705 includes a GCE 3706, which allows the interviewer to access image or video data of the Unknown applicant's face, a GCE 3707, which allows the interviewer to access image or video data of the Unknown applicant's hand/palm, a GCE 3708, which allows the interviewer to access audio data of the Unknown applicant's voiceprint, and a content display section 3709, which may display selected biometric data or controls for accessing the biometric data. In this example, the GCE 3706 is bolded or otherwise highlighted to indicate that the GCE 3706 has been selected and that the selection of the GCE 3706 may cause image/video data of the Unknown applicant's face to be displayed in the content display section 3709. Additionally, the selection of the GCE 3706 may cause a slider GCE 3735 to be displayed, which allows the interviewer to modify the apparent age of the Unknown application, and manipulating the slider GCE 3735 may cause the image/video data of the Unknown applicant to be modified according to the selected age. The IVS 140 may utilize a suitable age reversing protocol to modify the image/video data of the Unknown applicant. In some embodiments, the IVS 140 may auto-detect the apparent age of a subject in the image in scenarios, for example, where the age of the subject was unknown when the image was taken and/or image data is not available to confirm the date that the image was captured. In these embodiments, the IVS 140 may automatically adjust the age of one picture or the other to match the age of the other image so that a correlation can be taken to determine the likelihood of a match. Additionally or alternatively, if the ages/dates of both images are known, the IVS 140 could automatically verify that the ages match, and auto-adjust one of the images to match the ages for the comparison. In such embodiments, the slider GCE 3735 may be removed from the GUI instance 3700. In some embodiments, the facial recognition services and/or the approximate age determination may be provided by a third party facial recognition solution (e.g., Azure® FaceAPI, AWS® Rekognition®, and/or the like). The GCE 3707 is non-bolded or otherwise highlighted to indicate that the GCE 3707 may be selected because the Unknown applicant's hand/palm image/video data is available for display. Selection of the GCE 3707 may cause image/video data of the Unknown applicant's hand/palm to be displayed in the content display section 3709 (see, e.g., FIG. 40). Additionally, the GCE 3708 is greyed out to indicate that the GCE 3708 may not be selected because the Unknown applicant's voiceprint data is not currently available for display or output. When the voiceprint data is available, the GCE 3708 may be enabled for selection of the GCE 3708, and selection of the enabled GCE 3708 may cause a spectrogram or other like graphical representation of the Unknown applicant's voiceprint to be displayed in the content display section 3709. Moreover, a different GCE or set of GCEs may be displayed in place of GCE 3735, which may allow the interviewer to listen to the voiceprint of the Unknown applicant such as, for example, a play button, a stop/pause button, a fast-forward button, a rewind button, and/or other like buttons.

Additionally, the application comparison GUI instance 3700 includes a GUI section 3710, which indicates individual user profiles that may be compared with the biographic and/or biometric data supplied by the Unknown applicant. In particular, GUI section 3710 includes various GCEs 3711 of facial biometric data of other user profiles that are similar to the Unknown applicant's profile/enrollment application. Each of the GCEs 3711 may include a similarity indicator 3714, which indicates an amount of similarity between the Unknown applicant and a corresponding other user; the amount of similarity may be referred to as a "similarity score" or the like. In this example, the similarity indicator 3714 of a profile associated with the user "Angela Augustus" indicates a 62% similarity with the Unknown applicant and the similarity indicator 3714 of a profile associated with the user "Amelia Artimis" indicates a 55% similarity with the Unknown applicant. In this example, the profiles in the GUI section 3710 may be arranged or sorted according to their respective similarity scores wherein a profile having a greatest similarity score occupies a left-most position within the GUI section 3710, a profile having a next greatest similarity score occupies a second to left-most position within the GUI section 3710, and so forth until a profile having a lowest similarity score occupies a right-most position within the GUI section 3710. A suitable similarity score threshold may be used to restrict the number of profiles that are populated in the GUI section 3710. The GUI section 3710 includes an indicator 3750 that indicates a number of remaining profiles to be compared with the Unknown applicant (e.g., "7 profiles remaining" in the example of FIG. 37), and a scroll GCE 3740 that allows the interviewer to view the different profiles in the GUI section 3710.

The interviewer may select one of the similar profiles in the GUI section 3710 for comparing the facial biometric data of the Unknown applicant with users that is/are the subject of the one or more similar profiles for further comparison. The interviewer may go back to the previous GUI instance by selecting the GCE 3701. In this example, the interviewer has selected the profile associated with the user "Angela Augustus" by selecting the checkbox GCE 3730 (e.g., using the pointer V05), which may cause GCEs 3726, 3727, 3728, and 3729 to be displayed. Selection of the GCE 3727 informs the IVS 140 that the Unknown applicant and the user "Angela Augustus" share a same identity, selection of the GCE 3728 informs the IVS 140 that the Unknown applicant and the user "Angela Augustus" do not share a same identity, and selection of the GCE 3729 informs the IVS 140 that the Unknown applicant and the user "Angela Augustus" may or may not share a same identity. The GCE 3726, when selected, may cause a side-by-side comparison GUI instance 3800 of FIG. 38 to be displayed.

Figure 38:
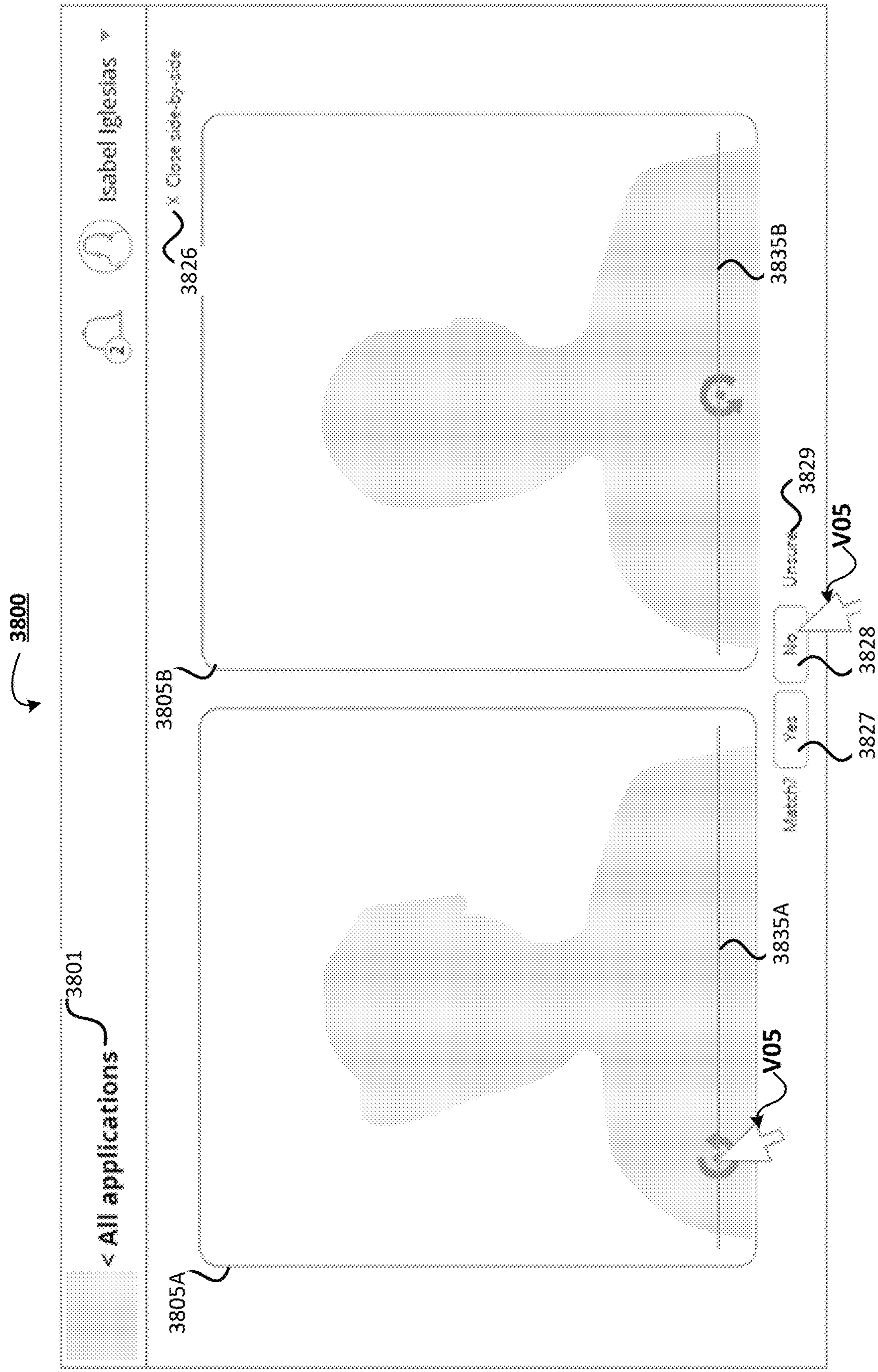

FIG. 38 shows a side-by-side comparison GUI instance 3800, which includes image display section 3805A in which a face image of the Unknown applicant may be displayed and image display section 3805B in which a face image of the user "Angela Augustus" may be displayed. Image display section 3805A includes a slider GCE 3835A, which allows the interviewer to alter the apparent age of the Unknown applicant in a same or similar manner as discussed previously, and manipulating the slider GCE 3835A may cause the apparent age of the Unknown applicant to increase or decrease. Image display section 3805B includes a slider GCE 3835B, which allows the interviewer to alter the apparent age of the image of the user "Angela Augustus" in a same or similar manner as discussed previously, and manipulating the slider GCE 3835B may cause the apparent age of the user "Angela Augustus" to increase or decrease. In some embodiments, the user may click on either of the displayed images to view in the image in greater detail such as by performing a zoom-in operation on the image data. The side-by-side comparison GUI instance 3800 also includes GCEs 3826, 3827, 3828, and 3829. Selection of the GCE 3827 informs the IVS 140 that the Unknown applicant and the user "Angela Augustus" share a same identity, selection of the GCE 3828 informs the IVS 140 that the Unknown applicant and the user "Angela Augustus" do not share a same identity, and selection of the GCE 3829 informs the IVS 140 that the Unknown applicant and the user "Angela Augustus" may or may not share a same identity. The GCE 3826, when selected, may cause the side-by-side comparison GUI instance 3800 to be closed. In this example, the interviewer may select the GCE 3828 (e.g., by using pointer V05 to point and click on the GCE 3828) to indicate that the Unknown applicant and the user "Angela Augustus" do not share a same identity, which may cause application comparison GUI instance 3900 of FIG. 39 to be displayed. Additionally, the interviewer may go back to the previous GUI instance by selecting the GCE 3801.

Figure 39:
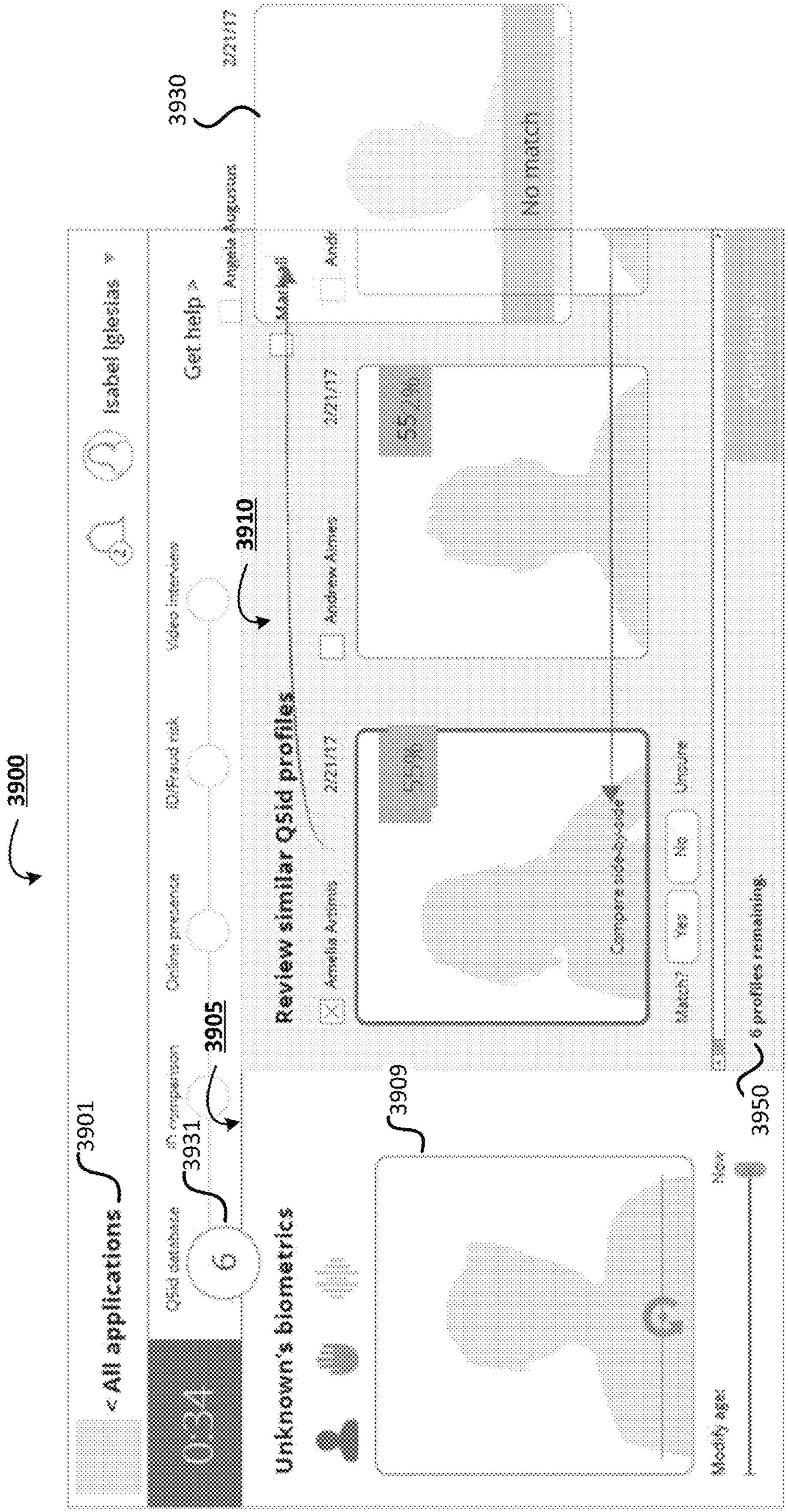

FIG. 39 shows application comparison GUI instance 3900, which may be another instance of the application comparison GUI instance 3700 of FIG. 37 wherein the profiles of other users in the GUI section 3910 are rearranged based on the comparison between the Unknown applicant and the user "Angela Augustus." In the GUI instance 3900, the GUI section 3905 may be the same or similar as the GUI section 3705 of FIG. 37, the GUI section 3910 may be the same or similar as the GUI section 3710 of FIG. 37, and the display section 3909 may be the same or similar as display section 3709 of FIG. 37. Additionally, the GCE 3901 may be the same or similar as the GCE 3701 of FIG. 37.

In this example, since the interviewer has indicated that the Unknown applicant and the user "Angela Augustus" do not share a same identity, the profile of the user "Angela Augustus" may be removed (as shown by GUI element 3930 being removed from the GUI section 3910, which may be done by a suitable animation or the like), and a profile of the user "Amelia Artimis" may move into a left-most position within the GUI section 3910, and the other remaining profiles in the GUI section 3910 may be arranged or sorted according to their respective similarity scores accordingly. Additionally, the number of similar profiles indicated by indicator 3931 and the number of remaining profiles to review as indicated by indicator 3950 have been decremented after the profile of the user "Angela Augustus" has been removed from the GUI section 3910. A suitable animation may be used to show the indicators 3931 and 3950 decrementing as the profile of the user "Angela Augustus" is removed.

Figure 40:
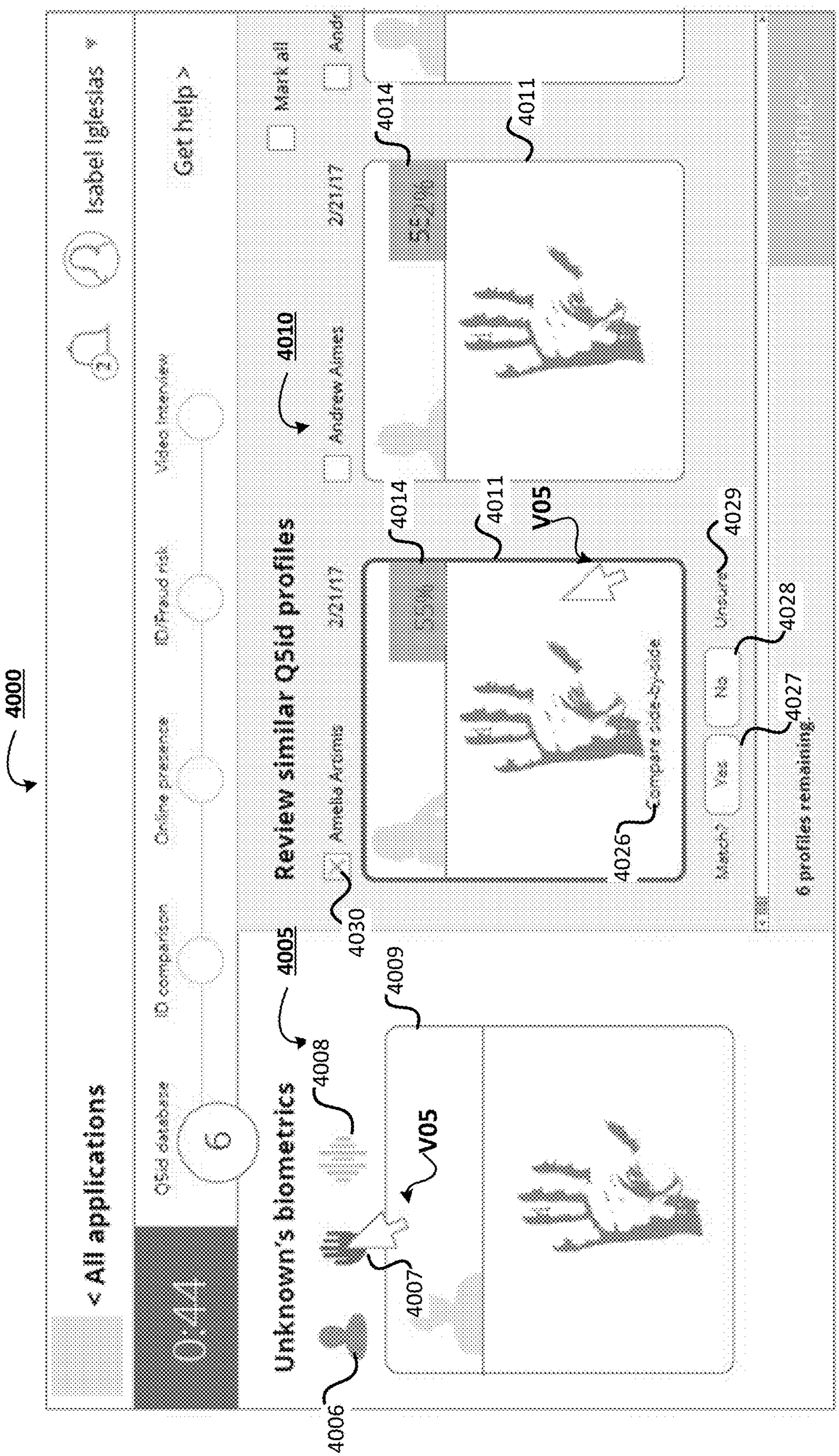

FIG. 40 shows application comparison GUI instance 4000, which may be another instance of the application comparison GUI instance 3700 of FIG. 37 wherein the interviewer has selected the GCE 4007 in the GUI section 4005 (e.g., by using pointer V05 to point and click on the GCE 4007) to display the Unknown Applicant's hand/palm image data in the content display section 4009. In the GUI 4000, the GUI section 4005 may be the same or similar as the GUI section 3705 of FIG. 37 and/or the GUI section 3905 of FIG. 39, and the GUI section 4010 may be the same or similar as the GUI section 3710 of FIG. 37 and/or the GUI section 3910 of FIG. 39. Additionally, the display section 4009 may be the same or similar as display section 3709 of FIG. 37, and GCEs 4006, 4007, and 4008 may be the same or similar as GCEs 3706, 3707, and 3708 of FIG. 37, respectively. Typically, the palm/hand images will not be manually compared palm/hand images. Instead, the IVS 140 may automatically verify matches by reducing the number of candidates matching the current enrollee to a predefined number using a primary biometric (e.g., facial biometric data), and the palm/hand biometric data may be used as a secondary biometric to verify the person from the relatively small population of candidates. Although the palm/hand biometric data could be compared against a relatively large number of candidates, in some embodiments, the number of candidates is reduced using the primary biometric so that the overall time of the verification procedure can be reduced. In these embodiments, the live interviewer may manually review the hand/palm images for troubleshooting purposes, such as when the image is too dark, corrupted, etc.

As shown by FIG. 40, selection of the GCE 4007 may cause image/video data of the Unknown applicant's hand/palm to be displayed in the content display section 4009. The application comparison GUI instance 4000 includes a GUI section 4010, which is the same or similar to the GUI section 3710 of FIG. 37 except that the GUI section 4010 includes various GCEs 4011 of hand/palm biometric data of other user profiles that are similar to the Unknown applicant's profile/enrollment application. Each of the GCEs 4011 may include a similarity indicator 4014, which indicates an amount of similarity between the Unknown applicant and a corresponding other user; the amount of similarity may be referred to as a "similarity score" or the like. In this example, the similarity indicator 4014 of a profile associated with the user "Amelia Artimis" indicates a 55% similarity with the Unknown applicant and the similarity indicator 4014 of a profile associated with the user "Andrew Aimes" indicates a 52% similarity with the Unknown applicant.

The interviewer may select one of the similar profiles in the GUI section 4010 for comparing the hand/palm biometric data of the Unknown applicant with users that is/are the subject of the one or more similar profiles for further comparison. In this example, the interviewer has selected the profile associated with the user "Amelia Artimis" by selecting the checkbox GCE 4030 (e.g., using the pointer V05), which may cause GCEs 4026, 4027, 4028, and 4029 to be displayed. The GCEs 4026, 4027, 4028, 4029, and 4030 may be the same or similar to the GCEs 3726, 3727, 3728, 3729, and 3730 of FIG. 7, respectively. The GCE 4026, when selected, may cause a comparison GUI instance 4100 of FIG. 41 to be displayed.

Figure 41:
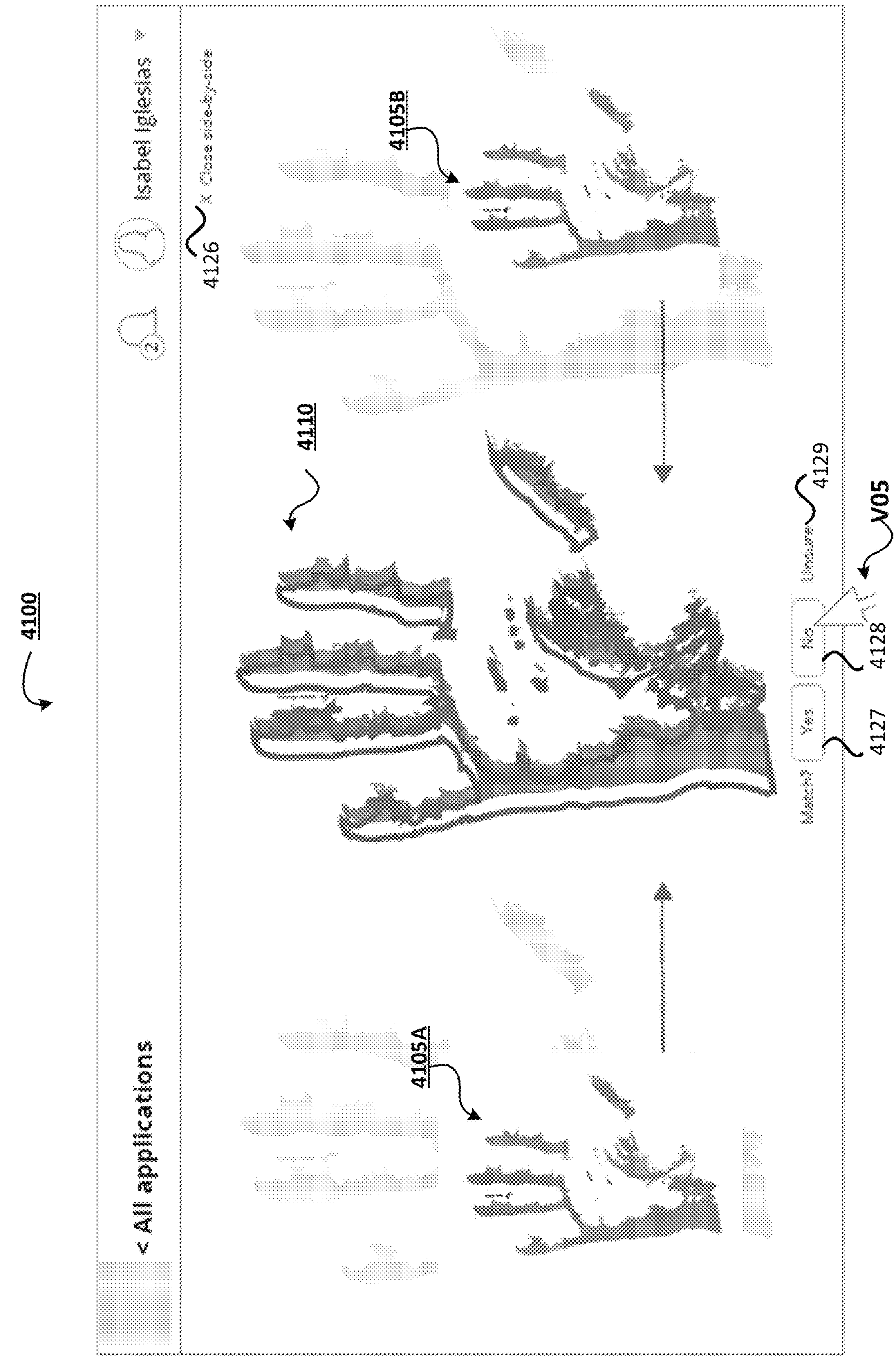

FIG. 41 shows a comparison GUI instance 4100 for comparing hand/palm biometric data in accordance with various embodiments. In this example, the GUI instance 4100 displays an animation where the two palm samples 4105A and 4105B appear apart at first, and then move toward the center of the GUI instance 4100 where the two palm samples 4105A and 4105B combine or overlap with one another to allow the interviewer to see a layered assessment 4110. The comparison GUI instance 4100 also includes GCEs 4126, 4127, 4128, and 4129, which may be the same or similar to the GCEs 3826, 3827, 3828, and 3829, of FIG. 38, respectively. In this example, the interviewer may select the GCE 4128 (e.g., by using pointer V05 to point and click on the GCE 4128) to indicate that the Unknown applicant and the user "Amelia Artimis" do not share a same identity, which may cause application comparison GUI instance 4200 of FIG. 42 to be displayed.

In most embodiments, the palm/hand comparison will be performed automatically by the IVS 140 to confirm the match without human intervention. This may be done, for example, after the interviewer confirms the facial match, and the palm/hand comparison being introduced. In these embodiments, the interviewer can merely be seen as overseeing this process in case the IVS 140 needs assistance in any way, such as for training a ML algorithm, troubleshooting image data issues, and/or the like.

Figure 42:
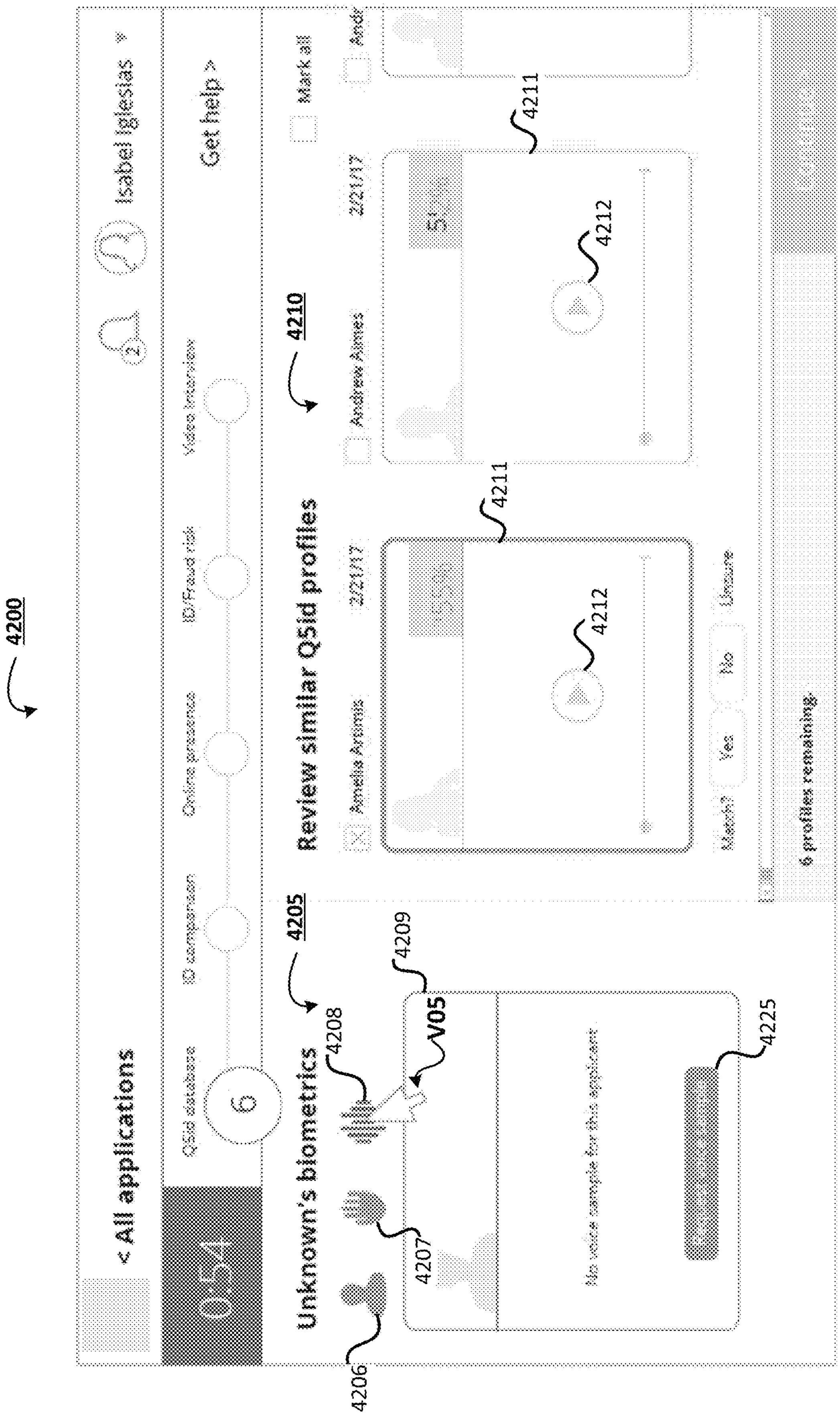

FIG. 42 shows application comparison GUI instance 4200, which may be another instance of the application comparison GUI instance 3700 of FIG. 37, application comparison GUI instance 3900 of FIG. 39, and/or application comparison GUI instance 4000 of FIG. 40 wherein the interviewer has selected the GCE 4208 in the GUI section 4205 (e.g., by using pointer V05 to point and click on the GCE 4207) to display the Unknown Applicant's voiceprint data in the content display section 4009. In the GUI instance 4200, the GUI section 4205 may be the same or similar as the GUI section 3705 of FIG. 37, the GUI section 3905 of FIG. 39, and the GUI section 4005 of FIG. 40; and the GUI section 4210 may be the same or similar as the GUI section 3710 of FIG. 37, the GUI section 3910 of FIG. 39, and/or the GUI section 4010 of FIG. 40. Additionally, the display section 4209 may be the same or similar as display section 3709 of FIG. 37 and/or display section 4009 of FIG. 40, and GCEs 4206, 4207, and 4208 may be the same or similar as GCEs 3706, 3707, and 3708 of FIG. 37, respectively, and/or GCEs 4006, 4007, and 4008 of FIG. 40, respectively.

Selection of the GCE 4208 may cause content of the Unknown applicant's voiceprint data to be displayed in the content display section 4209. In other embodiments, the GCE 4208 in the GUI section 4205 may be disabled when there is no voiceprint data available and is only enabled when voiceprint data of the Unknown applicant becomes available. As shown by FIG. 12, no voiceprint data for the Unknown applicant is available, and therefore, a GCE 4225 is displayed in the content display section 4209. Selection of the GCE 4225 may cause the IVS 140 to send a request message to the client system 105A of the Unknown applicant asking the Unknown applicant to record and submit voice biometric data. When voiceprint data is available, selection of the GCE 4208 may cause GCEs for controlling playback of the voiceprint data to be displayed in the content display section 4209.

The application comparison GUI instance 4200 includes a GUI section 4210, which is the same or similar to the GUI section 3710 of FIG. 37 and/or GUI section 4010 of FIG. 40 except that the GUI section 4210 includes various GCEs 4211 of voiceprint data of other user profiles that are similar to the Unknown applicant's profile/enrollment application. Each of the GCEs 4211 include a GCE 4212 which may be used to control playback of a corresponding voiceprint. In this example, since there is no currently available voiceprint of the Unknown applicant, the GCEs 4211 have been dimmed or greyed out to indicate that no voiceprint comparison may take place. If the voiceprint of the Unknown applicant were available, the GCEs 4211 would not be dimmed or greyed out, and the interviewer would be able to select one of the similar profiles in the GUI section 4210 for comparing the voiceprint of the Unknown applicant with users that are the subject of the one or more similar profiles for further comparison.

Figure 43:
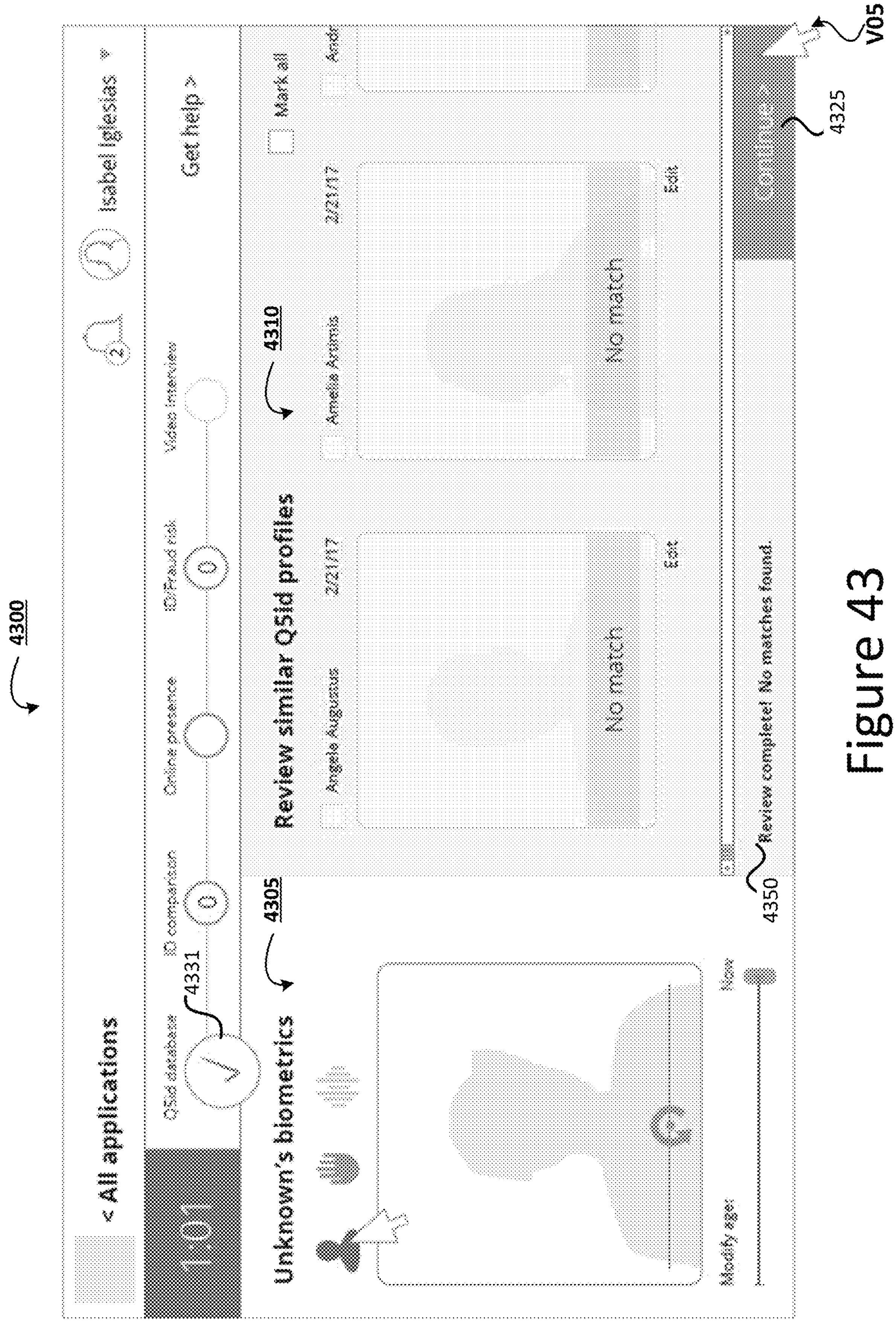

FIG. 43 shows application comparison GUI instance 4300, which may be another instance of the application comparison GUI instance 3700 of FIG. 37, application comparison GUI instance 3900 of FIG. 39, application comparison GUI instance 4000 of FIG. 40, and/or application comparison GUI instance 4200 of FIG. 42 wherein the interviewer has completed review of the user profiles in the GUI section 4310. In the GUI instance 4300, the GUI section 4305 may be the same or similar as the GUI section 3705 of FIG. 37, the GUI section 3905 of FIG. 39, and/or the GUI section 4005 of FIG. 40, and/or the GUI section 4205 of FIG. 42; and the GUI section 4310 may be the same or similar as the GUI section 3710 of FIG. 37, the GUI section 3910 of FIG. 39, the GUI section 4010 of FIG. 40, and/or the GUI section 4210 of FIG. 42. Additionally, GCEs 4331 and 4350 may be the same or similar as GCEs 3731 and 3750 of FIG. 37, respectively, and/or GCEs 4331 and 4350 may be the same or similar as GCEs 3931 and 3950 of FIG. 39, respectively.

Figure 44:
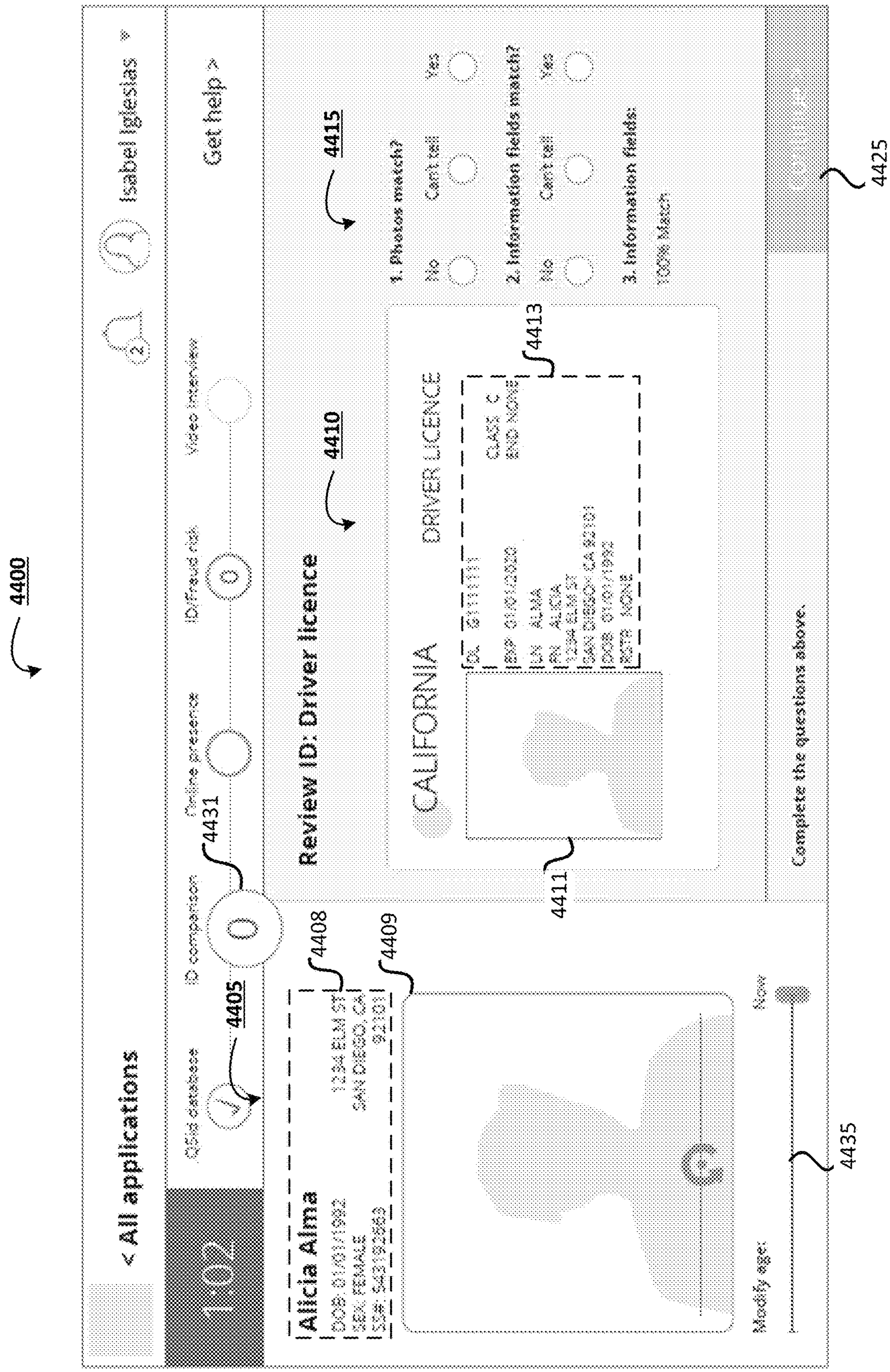

In this example, since the interviewer has completed the comparison of the Unknown applicant's identity data with the other users indicated in the GUI section 4310, the GCE 4325 has been enabled, allowing the interviewer to proceed to an identity document review GUI instance 4400, which is shown by FIG. 44. Additionally, the number of similar profiles indicated by indicator 4331 and the number of remaining profiles to review as indicated by indicator 4350 have been changed to reflect that all similar profiles have been reviewed. GCE 4225 may be the same or similar as GCE 3725 of FIG. 37.

FIG. 44 shows an identity document review GUI instance 4400 in accordance with some embodiments. The identity document review GUI instance 4400 allows the interviewer to compare the subject enrollee's scanned identity documents with other existing users' identity documents, if any exist. In this example, the subject enrollee is an enrollee named "Alicia Alma." The GUI instance 4400 includes an indicator 4431, which indicates a number of profiles having an identity document that has been flagged as being the same or similar to the identity document provided by the subject enrollee. In this example, the indicator 4431 shows a value of "0," which means that the IVS 140 did not find other identity documents to be the same or similar to the identity document provided by the subject enrollee. In this example, the interviewer may be required to compare the subject enrollee's identity document with other identity data, such as by comparing the biographic data provided by the subject enrollee with the biographic data indicated by the scanned identity document, comparing the facial biometric data provided by the subject enrollee with the biographic data indicated by the scanned identity document, etc. The comparison not being complete is indicated by the GCE 4425 being greyed out, indicating that the GCE 4425 is disabled, and after the comparison(s) is/are completed, the GCE 4425 may be highlighted or enabled.

To conduct the comparison(s), the GUI instance 4400 includes a GUI section 4405 that displays the subject enrollee's facial biometrics and biographic data, and a GUI section 4410 that displays the scanned identity document provided by the subject enrollee. In particular, the GUI section 4405 includes a content display section 4409 that displays image or video data of the subject enrollee's face, which the interviewer may compare with an image 4411 of the provided identity document in the GUI section 4410. Additionally, the GUI section 4405 includes a biographic data section 4408 that displays biographic data of the subject enrollee, which the interviewer may compare with biographic data 4413 of the provided identity document in the GUI section 4410. Furthermore, GUI section 4405 includes a slider GCE 4435, which allows the interviewer to modify the apparent age of the Unknown application, and manipulating the slider GCE 4435 may cause the image/video data of the subject enrollee to be modified according to the selected age. The IVS 140 may utilize a suitable age reversing protocol to modify the image/video data of the subject enrollee.

Additionally, the identity document review GUI instance 4400 includes a GUI section 4415, which includes questions that the interviewer is required to answer in order to complete the identity document analysis. In this example, the interviewer is required to confirm whether or not the image/video data of the subject enrollee's face in content display section 4409 matches the image 4411 of the provided identity document in the GUI section 4410 (e.g., question 1 in GUI section 4415 of FIG. 44); and whether or not the identity document appears to be modified (e.g., question 2 in GUI section 4415 of FIG. 44). Each of the questions may include a radio button GCE corresponding to an answer that may be provided by the interviewer. Additionally, as shown by FIG. 44, the IVS has detected that the biographic data provided by the subject enrollee matches the biographic data 4413 of the identity document, and therefore, the GUI section 4415 does not include a question related to the biographic data. Other questions and arrangements of questions may be included in other embodiments.

Figure 45:
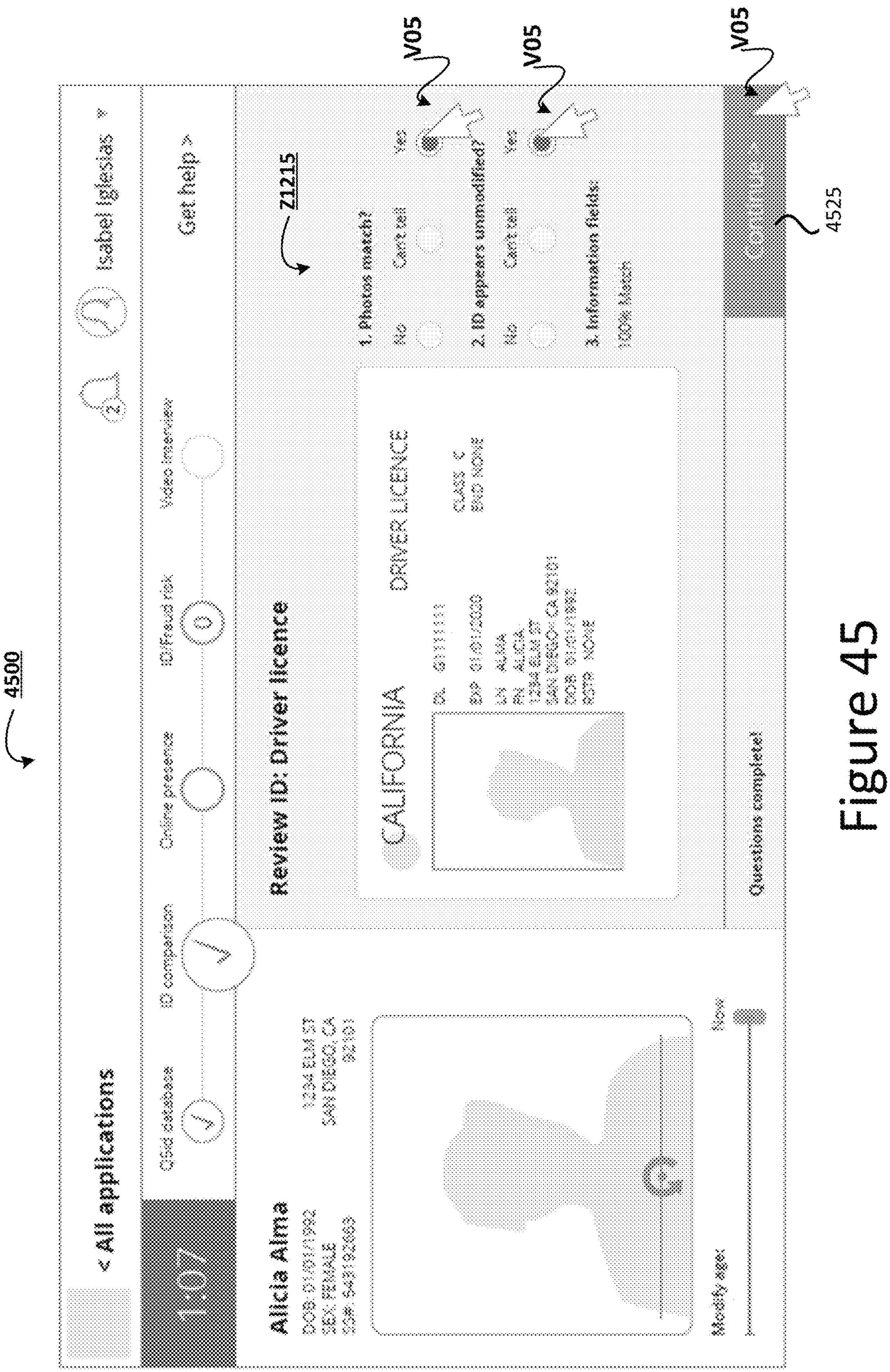

FIG. 45 shows an identity document review GUI instance 4500, which may be another instance of the identity document review GUI instance 4400 of FIG. 44. As shown by FIG. 45, the interviewer has selected, using the pointer V05 and pointing and clicking an appropriate radio button GCE, an appropriate answer to each of the questions in the GUI section 4515. In response to selection of appropriate answers, the GCE 4525 may be highlighted or enabled, indicating that the interviewer may proceed to an online presence verification GUI instance 4600 of FIG. 46.

Figure 46:
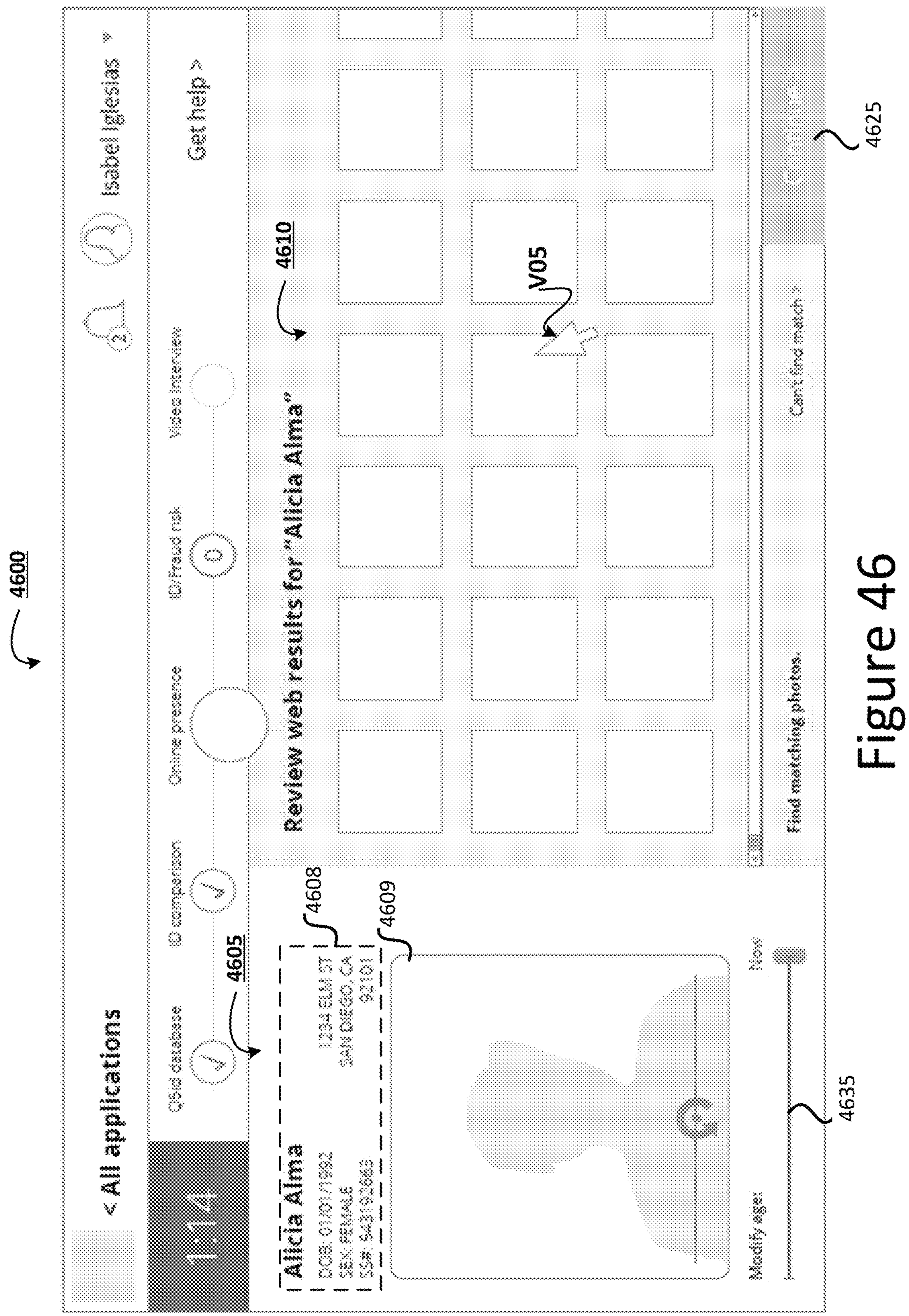

FIG. 46 shows an online presence verification GUI instance 4600 in accordance with some embodiments. The online presence verification GUI instance 4600 allows the interviewer to compare the subject enrollee's identity information with various online profiles from various external platforms, such as social networking platforms, search engine results pages (SERPs), and/or the like. In this example, the interviewer may be required to compare the subject enrollee's facial biometric data with facial data included with various online profiles and/or web search results, such as by comparing the facial biometric data provided by the subject enrollee with the facial images in the online profiles and/or SERPs. The comparison not being complete is indicated by the GCE 4625 being greyed out, indicating that the GCE 4625 is disabled, and after the comparison(s) is/are completed, the GCE 4625 may be highlighted or enabled.

To conduct the comparison(s), the GUI instance 4600 includes a GUI section 4605 that displays the subject enrollee's facial biometrics and biographic data, and a GUI section 4610 that displays thumbnails or other like images from various online profiles and/or SERPs related to the subject user. The GUI section 4605, content display section 4609, biographic data section 4608, and GCE 4635 in FIG. 46 may be the same or similar as the GUI section 4405, content display section 4409, biographic data section 4408, and GCE 4435 in FIG. 44, respectively. In this example, the interviewer may select a thumbnail image in the GUI section 4610 (e.g., by using pointer V05 to point and click on a desired thumbnail) for further analysis of the online profile or SERP associated with the selected thumbnail. Selection of a thumbnail may cause online profile data and/or search results associated with that thumbnail to become expanded in the GUI section 4610 as is shown by FIG. 47.

Figure 47:
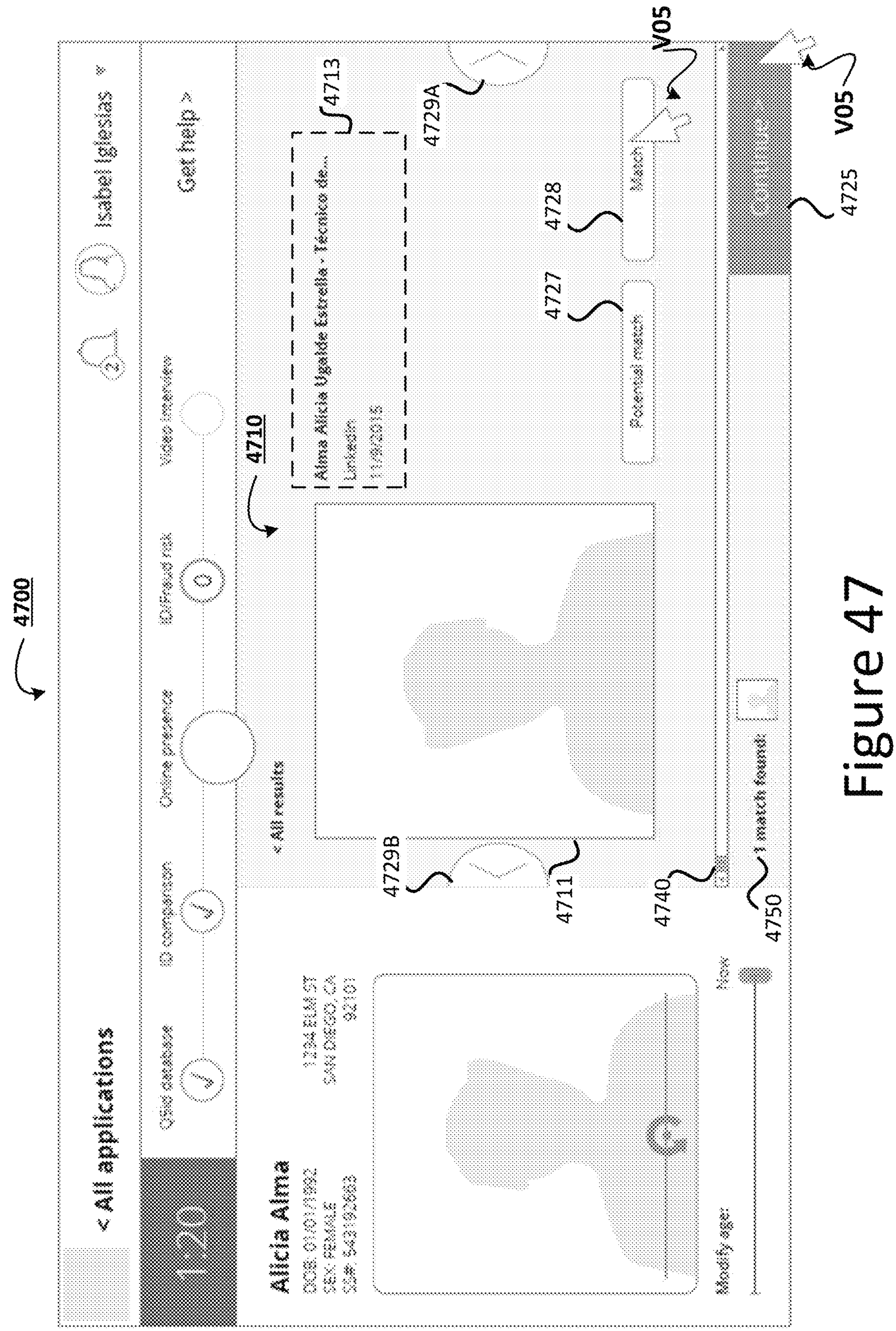

FIG. 47 shows an online presence verification GUI instance 4700, which may be another instance of the online presence verification GUI instance 4600 of FIG. 46. As shown by FIG. 47, the interviewer has selected a thumbnail, using the pointer V05 and pointing and clicking on the thumbnail as shown in FIG. 46, which has caused an online profile associated with that thumbnail to be displayed within the GUI section 4710. The instance of the online presence verification GUI instance 4700 includes a profile image 4711, profile information 4713, GCEs 4727 and 4728, GCEs 4729A-B, scroll GCE 4740, and indicator 4750. The indicator 4750 indicates a number of matching search results and/or matching online profiles related to the subject enrollee that have been found (e.g., "1 match found" in the example of FIG. 47). The GCEs 4729A-B and the scroll GCE 4740 allow the interviewer to view a different search result related to the subject enrollee within the GUI section 4710. GCEs 4727 and 4728 allow the interviewer to indicate whether the subject enrollee matches the search result/online profile currently displayed in the GUI sections 4710. For example, selection of the GCE 4727 informs the IVS 140 that the online profile displayed in the GUI section 4710 may potentially belong to the subject enrollee, and selection of the GCE 4728 informs the IVS 140 that the online profile displayed in the GUI section 4710 does belong to the subject enrollee. In this example, the interviewer has selected GCE 4728 (e.g., by using pointer V05 to point and click on GCE 4728). In response to selection of GCE 4728, the GCE 4725 may be highlighted or enabled, indicating that the interviewer may proceed to a fraud risk GUI instance 4800 of FIG. 48.

Figure 48:

FIG. 48 shows an example fraud risk GUI instance 4800 in accordance with some embodiments. The GUI instance 4800 includes an indicator 4831, which indicates a number of identity items that have been flagged as being potentially fraudulent. In this example, the indicator 4831 shows a value of "0," which means that the IVS 140 did not find any potentially fraudulent identity items. The fraud risk GUI instance 4800 includes a GUI section 4805, which includes a content display section 4809, a biographic data section 4808, and a GCE 4835. The GUI section 4805, content display section 4809, biographic data section 4808, and GCE 4835 in FIG. 48 may be the same or similar as the GUI section 4405, content display section 4409, biographic data section 4408, and GCE 4435 in FIG. 44, respectively, and/or the GUI section 4605, content display section 4609, biographic data section 4608, and GCE 4635 in FIG. 46, respectively. The fraud risk GUI instance 4800 also includes GUI section 4810, which displays data/information that the IVS 140 has flagged as being potentially fraudulent. In this example, the GUI section 4810 shows that no fraud warnings are displayed because the IVS 140 did not flag any identity items as being potentially fraudulent. This is also reflected by the indicator 4814 in the GUI section 4810, which indicates a "Low-risk" of fraud for the subject enrollee. Since there are no potentially fraudulent items to review, the GCE 4825 may be highlighted or enabled, indicating that the interviewer may proceed to the live interview portion of the enrollment process (see, e.g., FIG. 50).

Figure 49:
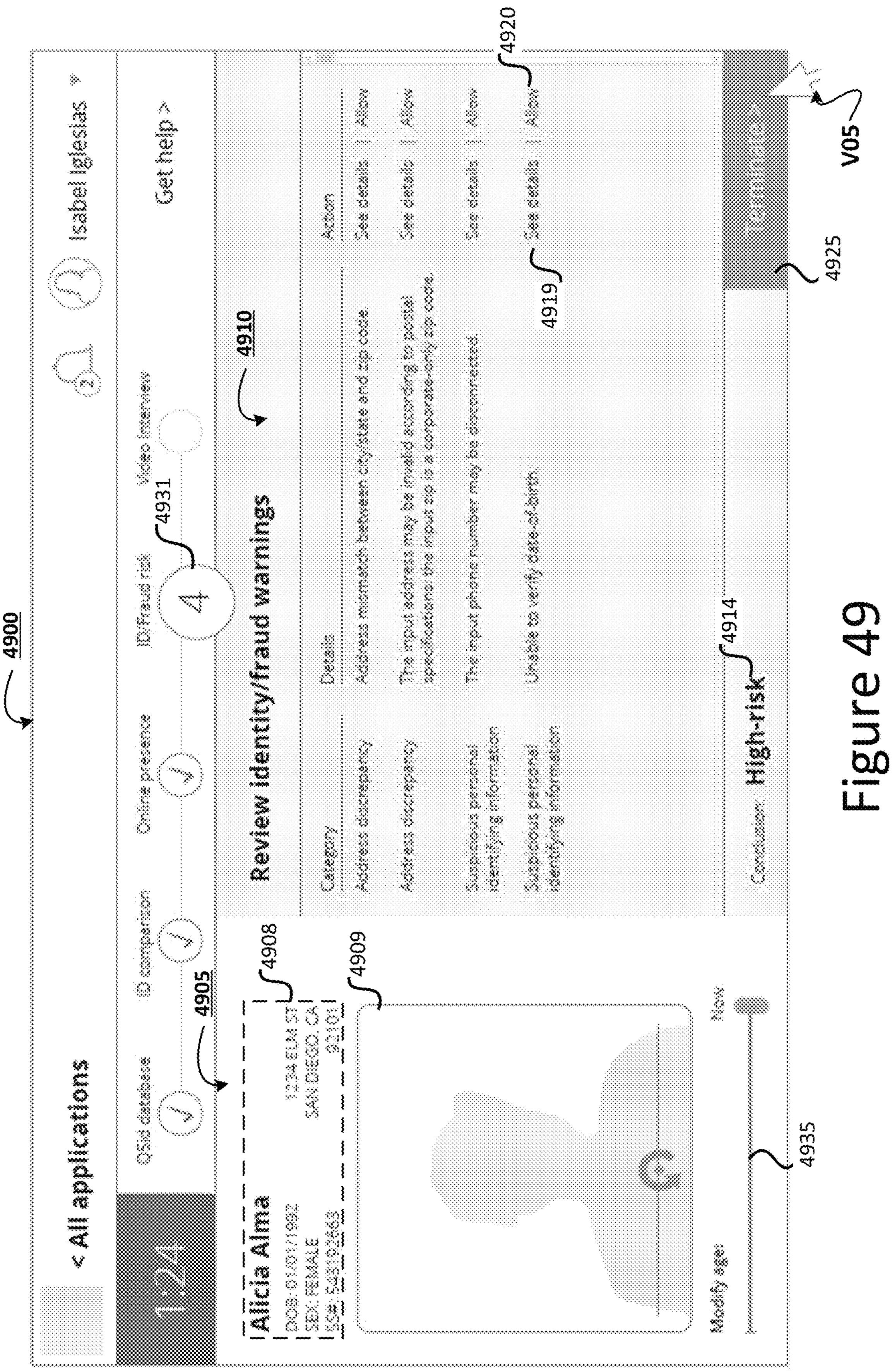

FIG. 49 shows another example fraud risk GUI instance 4900 in accordance with some embodiments. Similar to the fraud risk GUI instance 4800 of FIG. 48, the fraud risk GUI instance 4900 includes an indicator 4931, which indicates a number of identity items that have been flagged as being potentially fraudulent. In this example, the indicator 4831 shows a value of "4," which means that the IVS 140 discovered four potentially fraudulent identity items. The fraud risk GUI instance 4900 includes a GUI section 4905, which includes a content display section 4909, a biographic data section 4908, and a GCE 4935. The GUI section 4905, content display section 4909, biographic data section 4908, and GCE 4935 in FIG. 49 may be the same or similar as the GUI section 4405, content display section 4409, biographic data section 4408, and GCE 4435 in FIG. 44, respectively, and/or the GUI section 4605, content display section 4609, biographic data section 4608, and GCE 4635 in FIG. 46, respectively. The fraud risk GUI instance 4900 also includes GUI section 4910, which displays data/information that the IVS 140 has flagged as being potentially fraudulent. In this example, the GUI section 4910 shows four identity items that have been flagged as being potentially fraudulent. The GUI section 4910 also includes indicator 4914, which indicates the subject enrollee has a "High-risk" of fraud. Each flagged item in the GUI section 4910 includes a category description, details of the reasons for the item being flagged, and action GCEs 4919 and 4920. Note that not all action GCEs for each flagged item have been labeled in FIG. 49. In particular, GCE 4919 allows the interviewer to view more details about the potentially fraudulent item, and GCE 4920 allows the interviewer to allow or discard the fraud/warning flag for that item. If the interviewer decides not to allow any of the flagged items, the interviewer may select the GCE 4925 using pointer V05 to terminate the application for the subject enrollee. Alternatively, the interviewer could decide to allow some or all of the flagged items by selecting respective GCEs 4920 using pointer V05. After a sufficient number of flagged items are removed from the GUI section 4910, the GCE 4925 may be highlighted or enabled, indicating that the interviewer may proceed to the live interview portion of the enrollment process (see, e.g., FIG. 50).

Figure 50:
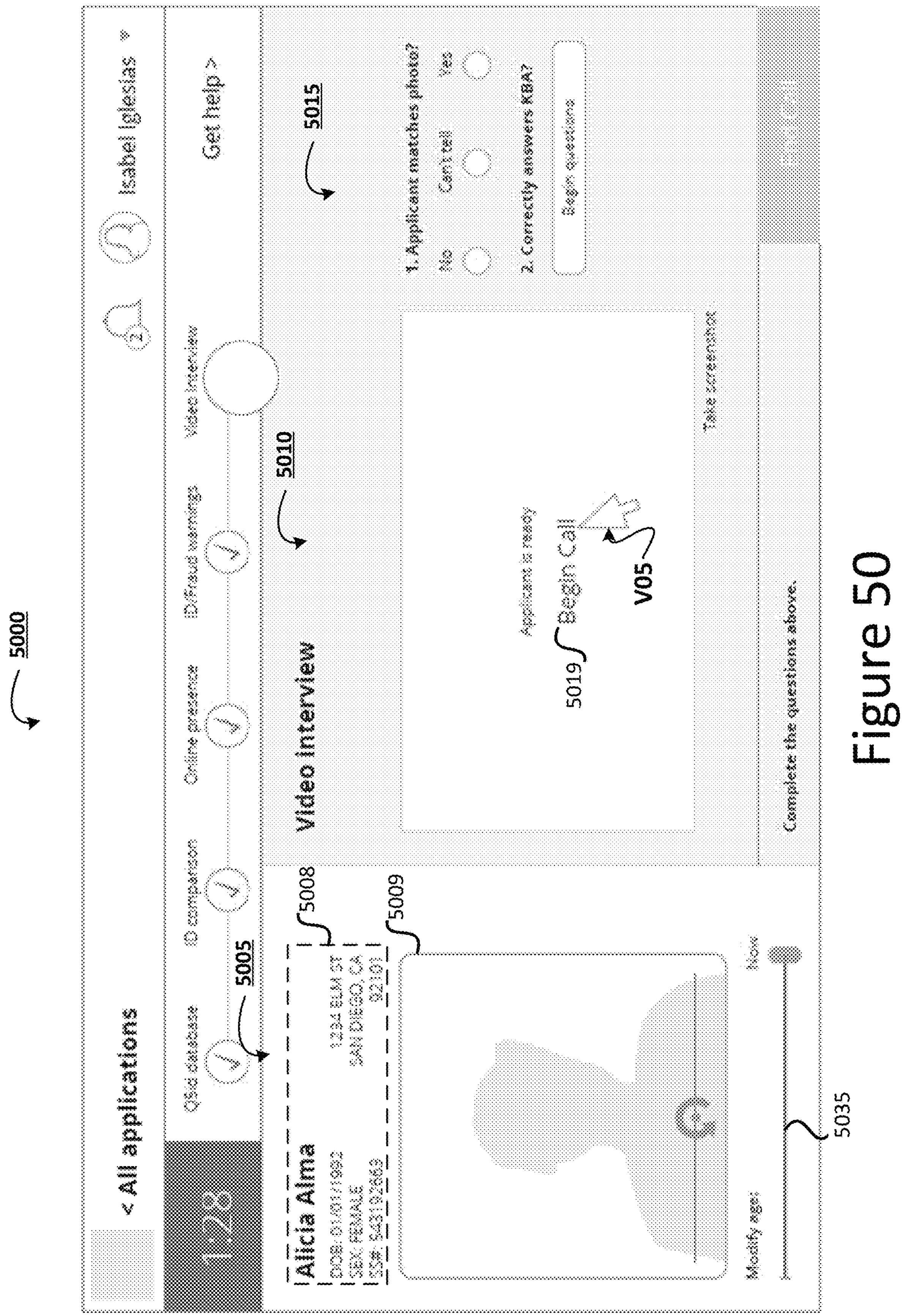

FIG. 50 shows an example live interview GUI instance 5000 in accordance with some embodiments. The live interview GUI instance 5000 includes a GUI section 5005, a content display section 5009, a biographic data section 5008, and a GCE 5035. The GUI section 5005, content display section 5009, biographic data section 5008, and GCE 5035 in FIG. 50 may be the same or similar as the GUI section 4405, content display section 4409, biographic data section 4408, and GCE 4435 in FIG. 44, respectively, and/or the GUI section 4605, content display section 4609, biographic data section 4608, and GCE 4635 in FIG. 46, respectively. The live interview GUI instance 5000 includes GUI section 5010, which is used for establishing a call/chat session for the live interview portion of the enrollment process. The GUI section 5010 includes a GCE 5019, which when selected by the interviewer (e.g., by using pointer V05 to point and click on the GCE 5019) causes the client system 105B to establish a communication session with the client system 105A operated by the subject enrollee. Additionally, the live interview GUI instance 5000 includes a GUI section 5015, which includes questions that the interviewer is required to answer during or after the live interview in order to complete the live interview. In this example, the interviewer is required to confirm whether or not the image/video data of the subject enrollee's face in content display section 5009 matches the image of the of the enrollee during the live interview (e.g., question 1 in GUI section 5015 of FIG. 50); and whether or not the subject enrollee answers KBA questions correctly (e.g., question 2 in GUI section 5015 of FIG. 50). The questions may include radio button GCEs corresponding to an answer that may be provided by the interviewer. Other questions and arrangement of questions may be included in other embodiments.

Figure 51:
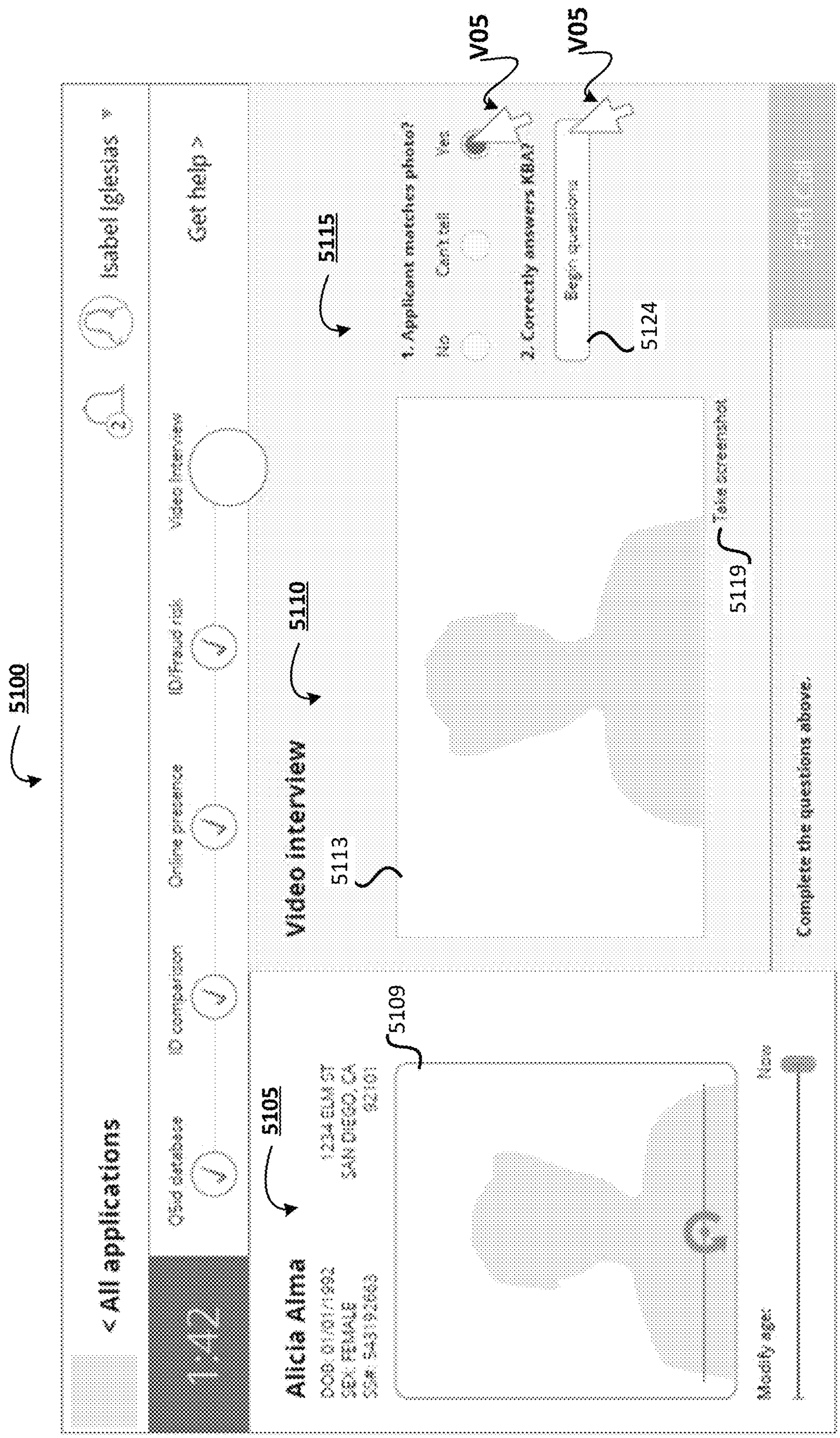

FIG. 51 shows a live interview GUI instance 5100 in accordance with some embodiments. The live interview GUI instance 5100 may be displayed after the communication session between the client system 105B and the client system 105A operated by the subject enrollee. The live interview GUI instance 5100 includes GUI sections 5105 and 5115, which may be the same or similar as GUI sections 5005 and 5015, respectively. The content display section 5109 may be the same or similar to the content display section 5009. The GUI section 5110 includes a content display section 5113, which includes an image of the subject enrollee and/or a video feed provided by the client system 105A. The GUI section 5110 also includes a GCE 5119, which allows the interviewer to take a screenshot image of the image/video data displayed in the content display section 5113. In this example, the interviewer may confirm that the facial data of the subject enrollee in the content display section 5109 matches the image/video data of the subject enrollee's face in content display section 5009 (e.g., question 1 in GUI section 5115 of FIG. 51) by selecting the appropriate radio button using pointer V05. Additionally, the interviewer may select a GCE 5124 to view KBA questions to ask the subject enrollee. In some embodiments, selection of GCE 5124 may cause the KBA questions to be sent to the client system 105A, for example, in a chat session GUI displayed by the client system 105A.

Figure 52:
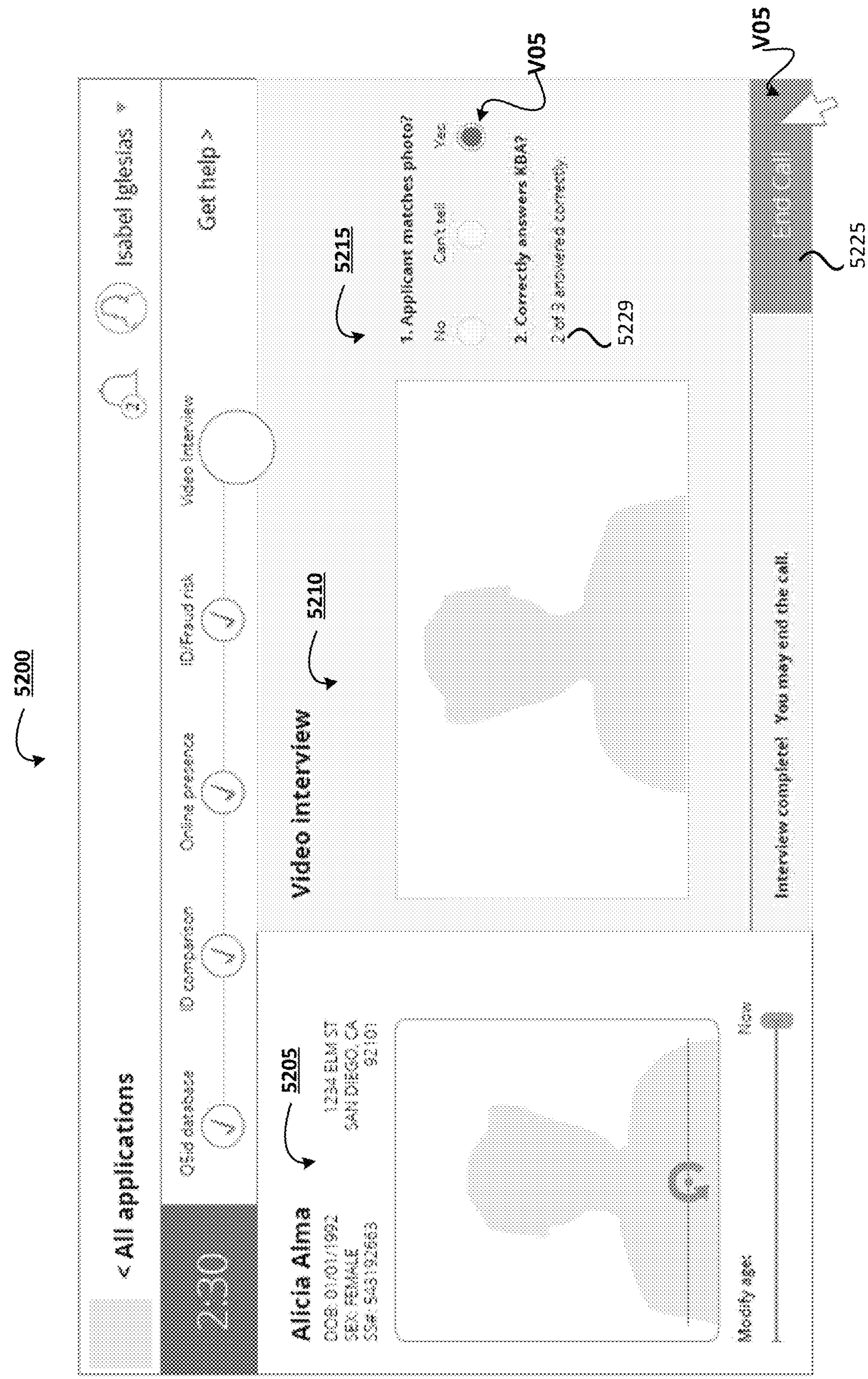

FIG. 52 shows a live interview GUI instance 5200 in accordance with some embodiments. The live interview GUI instance 5200 may be displayed after the subject enrollee answers the KBA questions. The live interview GUI instance 5200 includes GUI sections 5205, 5210, and 5215, which may be the same or similar as GUI sections 5005, 5010, and 5015, respectively, and/or GUI sections 5105, 5110, and 5115, respectively. The live interview GUI instance 5200 includes an indicator 5229, which indicates the number of correctly answer KBA questions (e.g., "2 of 3 answered correctly" in GUI section 5215 of FIG. 52). The questions may include radio button GCEs corresponding to an answer that may be provided by the interviewer. Furthermore, after the subject enrollee has answered the KBA questions, the GCE 5225 may be highlighted or enabled, indicating that the interviewer may end the call session by selecting the GCE 5225 using pointer V05.

Figure 53:
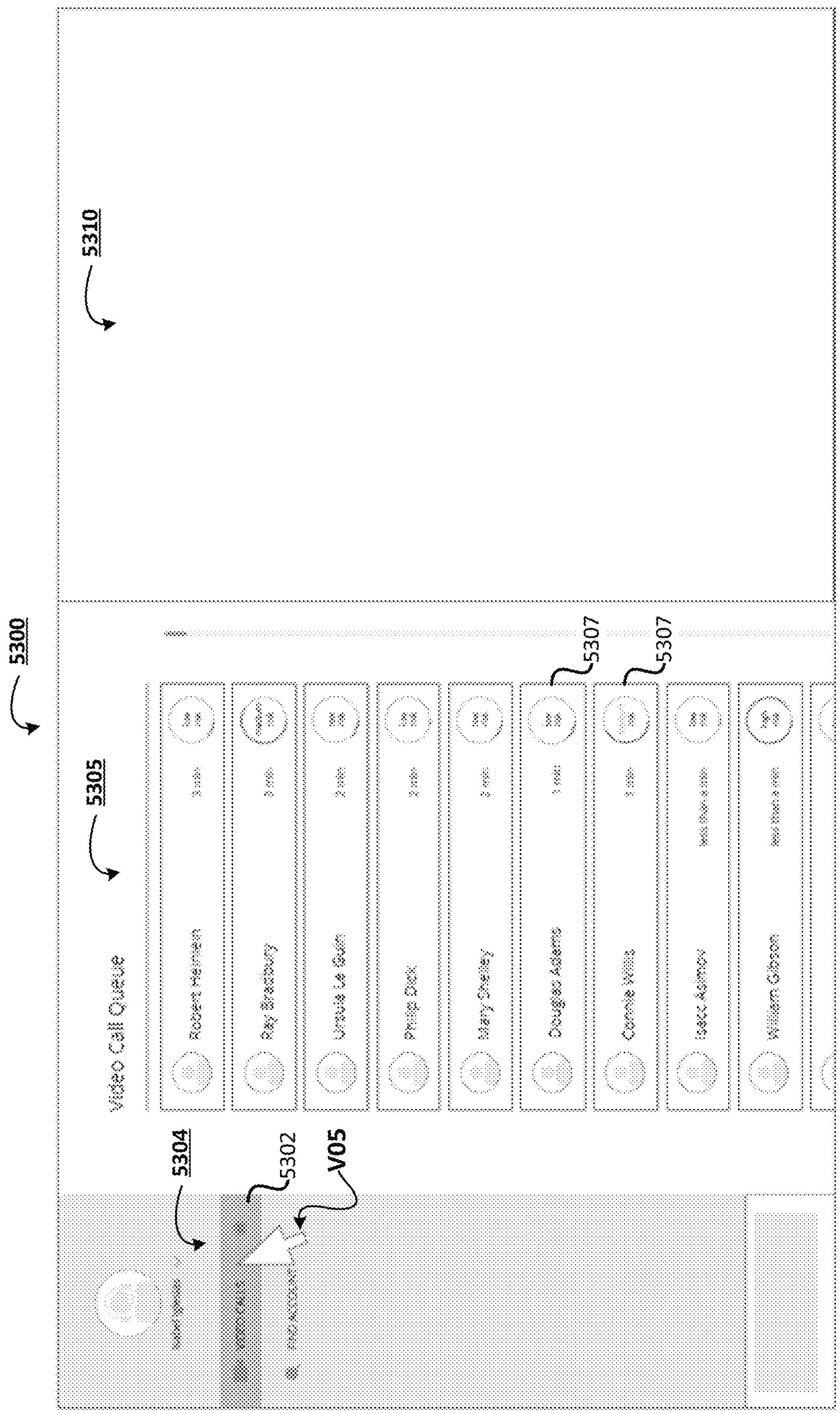

FIGS. 53-60 illustrate another example of live interview GUIs in accordance with various embodiments. FIG. 53 shows a live interview GUI instance 5300, which includes a navigation GCE 5304, a GUI section 5305, and a GUI section 5310, and is used for establishing a call/chat session for the live interview portion of the enrollment process. The navigation GCE 5304 includes a GCE 5302, which in this example is selected by the interviewer using pointer V05 causing a live interview queue GUI to be displayed in the GUI section 5305. In this example, a numeral appears in or adjacent to the GCE 5302, which indicates the total number of calls waiting for service. In this example embodiment, the live interview queue is global and shared across all live interviewers (also referred to as "advisors"). The live interview queue GUI displayed in the GUI section 5305 includes a plurality of GCEs 5307, each of which corresponds to an individual enrollee (note that not all of the GCEs 5307 are not labelled in FIG. 53 for purposes of clarity). The GCEs 5307 include risk indicators labelled with one of "Low risk," "Medium risk," and "High risk" roughly indicating a fraud risk/potential. These indicators are not disqualifiers themselves, but show how much or how little online data corroborates an enrollee's identity. In embodiments, the risk level increases as the amount of data associated with an enrollee is collected. This metric can be referred to by advisers before they start a live interview, which may assist advisers in scaling their attention to certain details. Additionally, each of the GCEs 5307 includes a time indicator indicating a length of time the enrollee has been waiting to begin their live interview.

Figure 54:
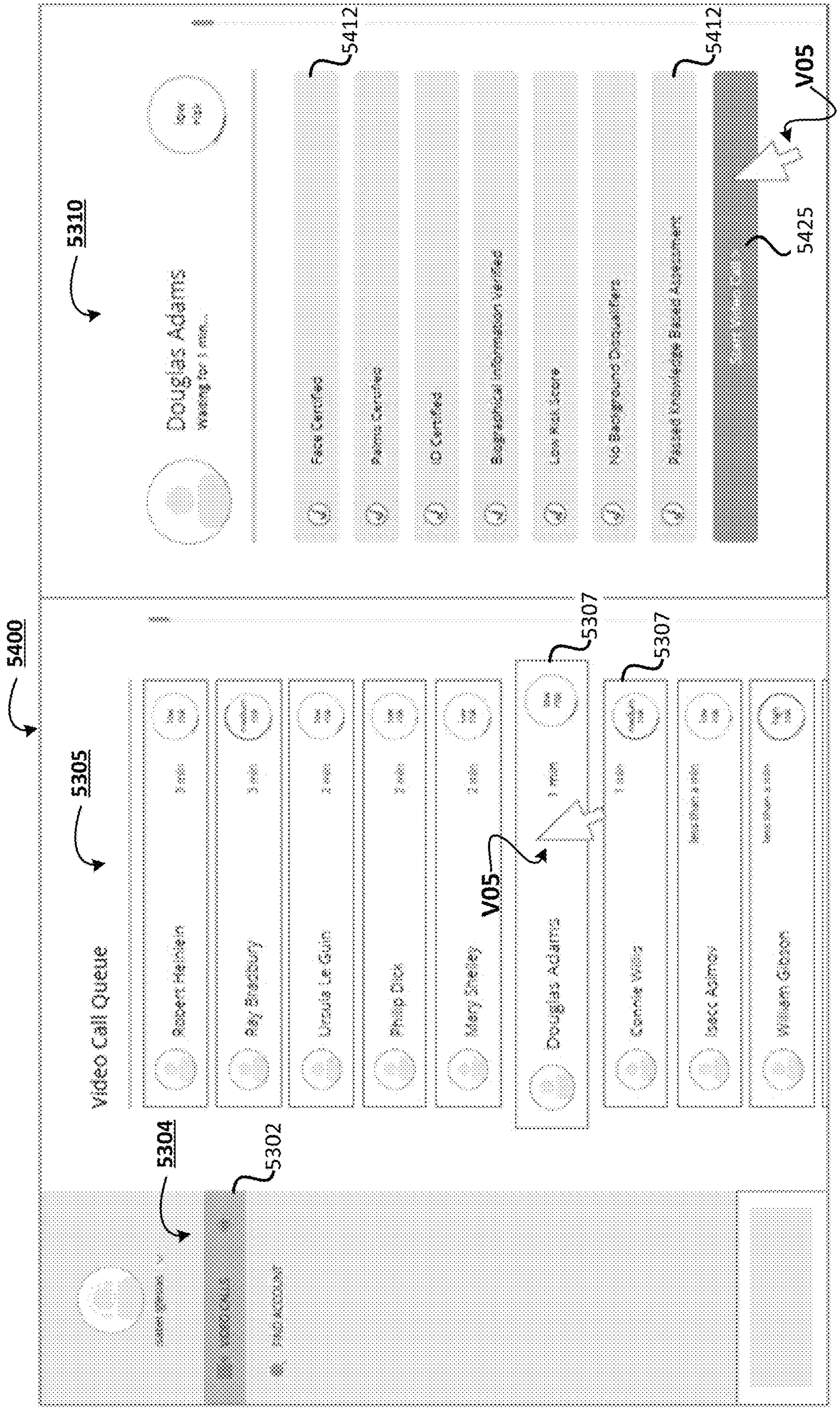

Referring to FIG. 54, which shows a GUI instance 5400, the user has selected a GCE 5307 associated with the enrollee "Douglas Adams" using pointer V05 causing that GCE 5307 to be visually distinguished from unselected GCEs 5307. Selection of the "Douglas Adams" GCE 5307 causes an enrollment data GUI to be displayed in the GUI section 5310, which is populated with identity data collected for Douglas Adams. The enrollment data GUI displayed in the GUI section 5310 includes a plurality of GCEs 5412, each of which corresponds to an individual identity data type (note that not all of the GCEs 5412 are not labelled in FIG. 54 for purposes of clarity). Each of the GCEs 5412 show the sections of the enrollment process successfully completed by the Enrollee (e.g., indicated by the check marks in FIG. 54). Each of the GCEs 5412 may be drop down GCEs, which when selected, may display the collected data of that type. The enrollment data GUI also includes a GCE 5425, which when selected by the user using pointer V05, causes the client system 105B to establish a communication session with the enrollee's client system 105A. Selecting the GCE 5425 may remove that enrollee from the live interview call queue so that other advisers will no longer be able to see that enrollee in the queue.

Figure 55:
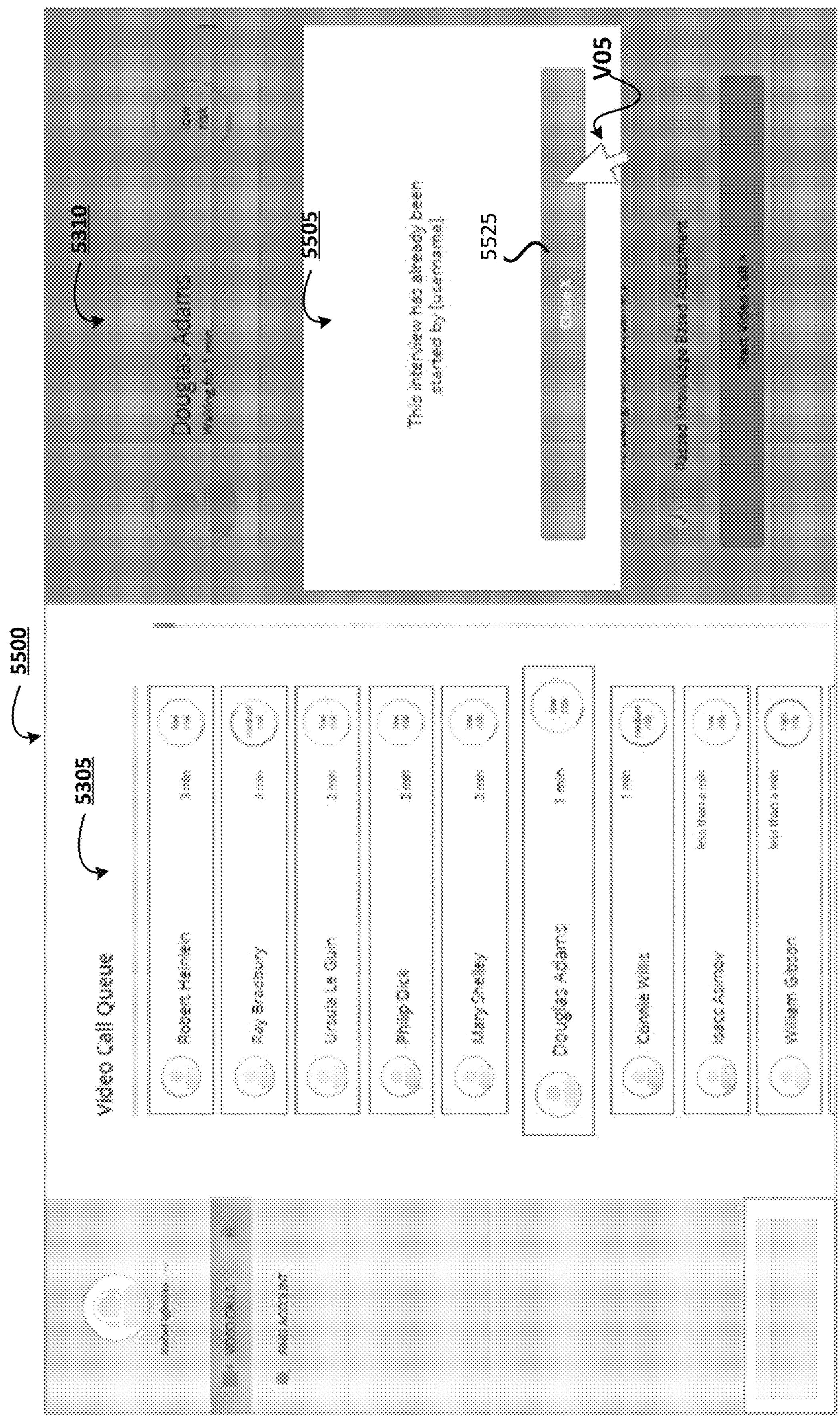

FIG. 55 shows an example in which the advisor was reviewing an enrollee's details from the live interview call queue, where another adviser happened to initiate the live interview with the same enrollee before the subject advisor. In this case, the application 110 renders and displays GUI instance 5500 including greying out the enrollee's identity data so that the identity data is no longer viewable, and an overlay GUI instance 5505 indicating that a live interview with this enrollee has already begun with the other adviser. The advisor may select GCE 5525 using pointer V05 to remove the enrollee's enrollment data from the GUI section 5310. Simultaneously, the corresponding Enrollee card disappears from the queue on the left. Remaining Enrollee cards reposition to fill this gap.

Figure 56:
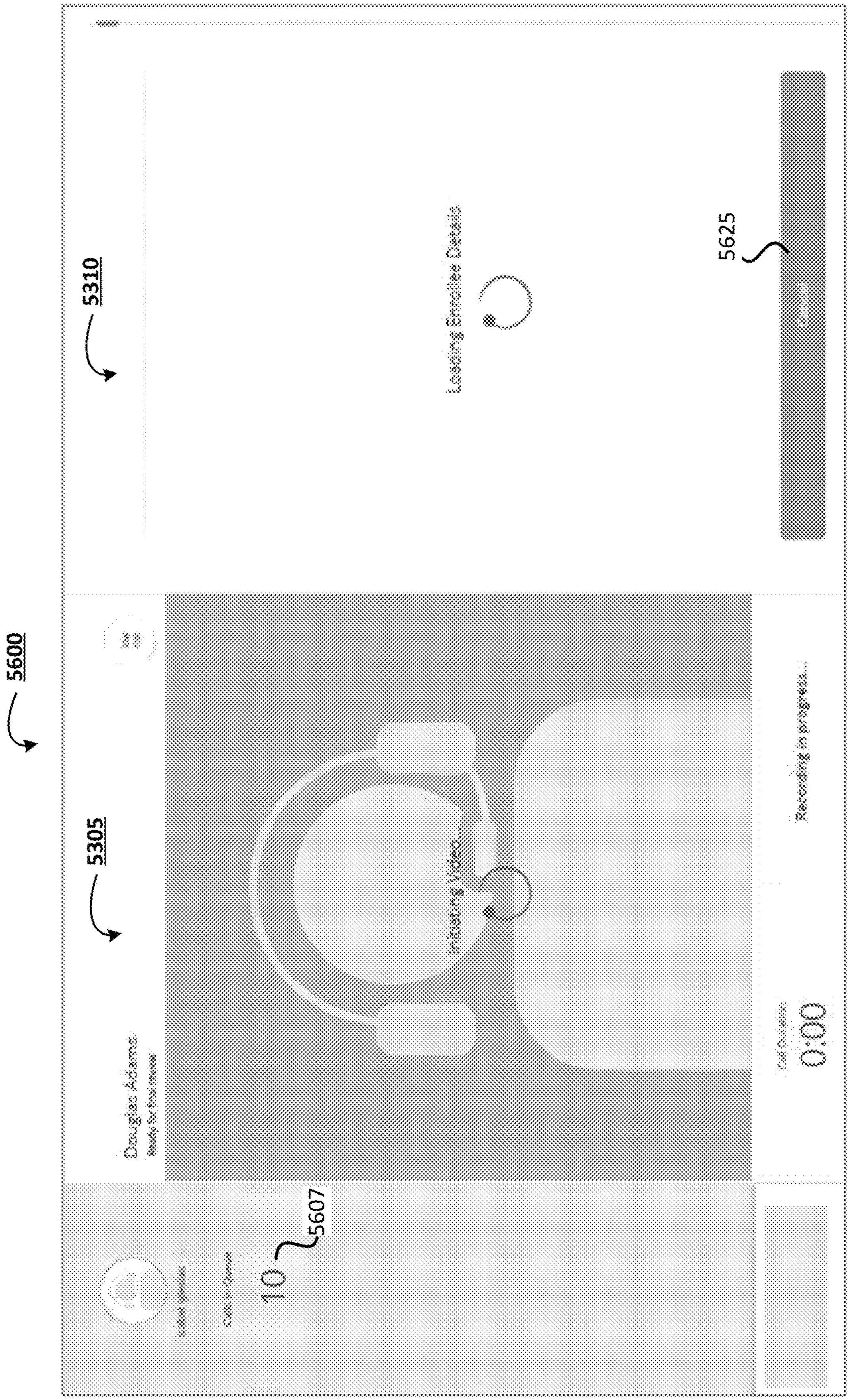

FIG. 56 shows an example GUI instance 5600 that may be rendered and displayed while the live interview is being initiated (e.g., after selecting GCE 5425 of FIG. 54). In this example, a video feed for the enrollee is being loaded for display in the GUI section 5305, while a enrollee identity data is being loaded in the GUI section 5310. Should anything appear problematic with their video feed, the advisor may select the "Cancel" GCE 5625 to terminate the video call before it begins. While the video feed and enrollee data are being loaded, the advisor may monitor the number of live interviews remaining in the live interview queue via indicator GCE 5607.

Figure 57:
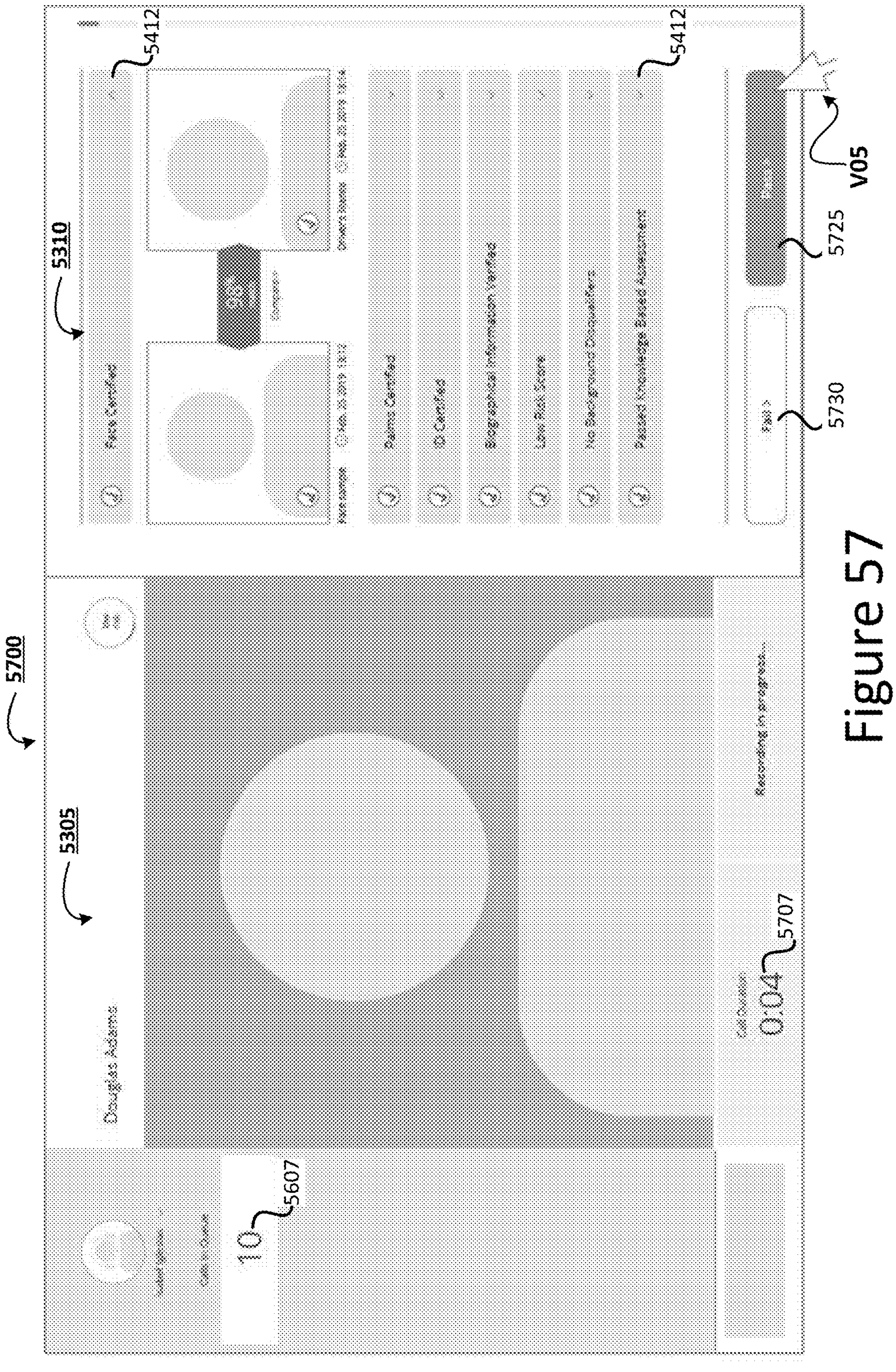

FIG. 57 shows an example GUI instance 5700 where the enrollee's video feed has been loaded into the GUI section 5305 and the enrollee's identity data has been populated in the GUI section 5310. During the live interview, an indicator 5707 indicates the duration of the video call. In some embodiments, the color, shape, font, etc. of the indicator 5707 may change if the live interview reaches or exceeds some preconfigured threshold. The enrollee's identity data is available for review via drop-down menu GCEs 5412 for each data type. In this example, the advisor has selected the "Face Certified" GCE 5412 to display the enrollee's face biometric data, which displays the enrollee's scanned face image(s) and image data from the scanned identity document. This allows the advisor to visually compare these two images to the enrollee's face in the video feed. A timestamp of when the images were sampled may also be displayed at or near the images. In most cases, the adviser will not need to review the enrollee's identity information to make a pass/fail determination. However, in various embodiments, the enrollee's identity data is displayed so that advisers will be able to simply look for signs of fraud or other deceptive behaviors in the video call itself. Based on the live interview, the adviser may Pass or Fail the enrollee by selecting GCE 5725 or GCE 5730, respectively. Although not shown by FIG. 57, in some embodiments, additional GCEs may be present, such as GCEs to generate and/or display KBAs, GCEs to escalate to a superior or supervisory adviser, GCEs to record and/or stop recording the live interview, and/or the like.

Figure 58:
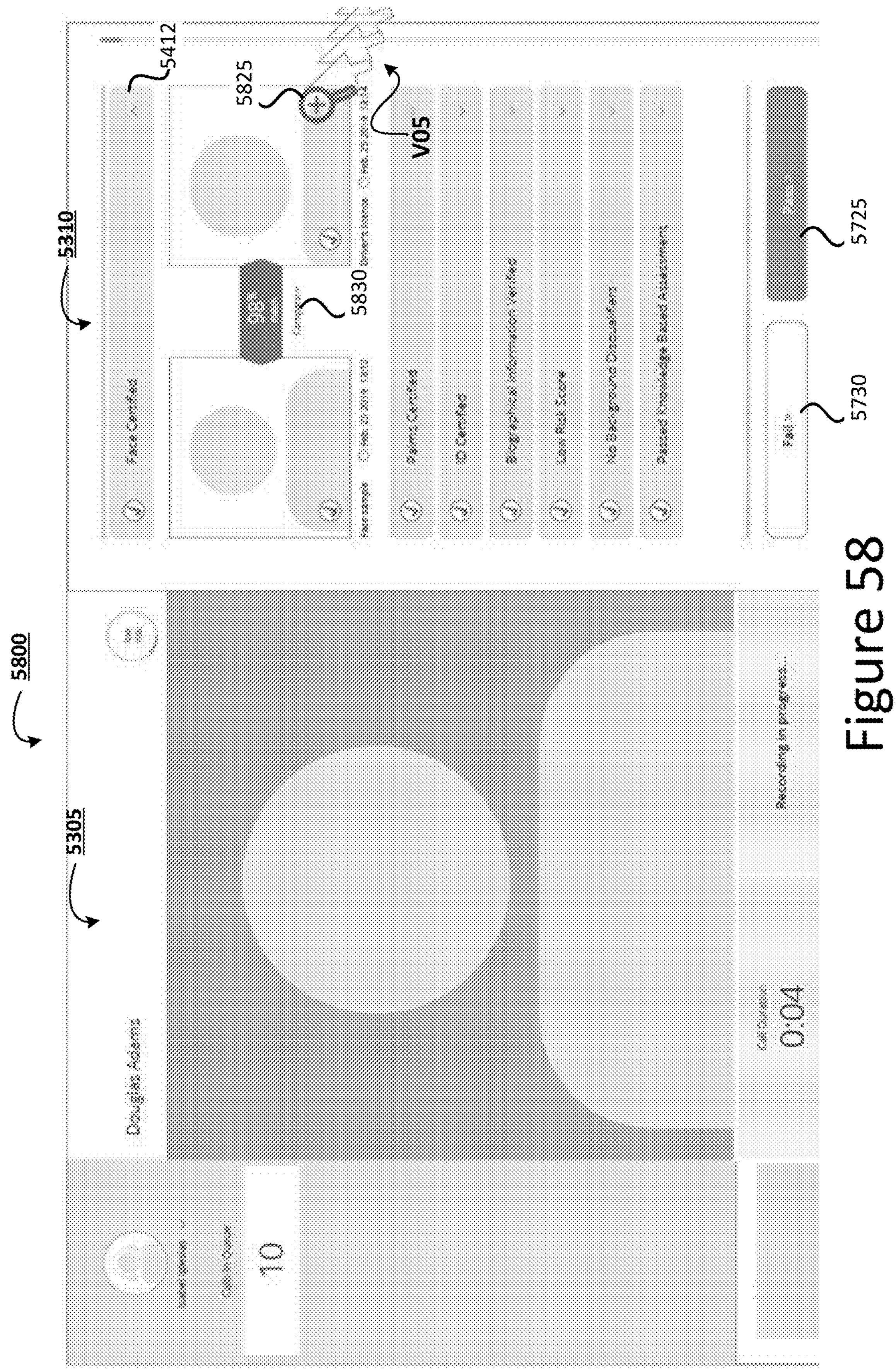
Figure 59:
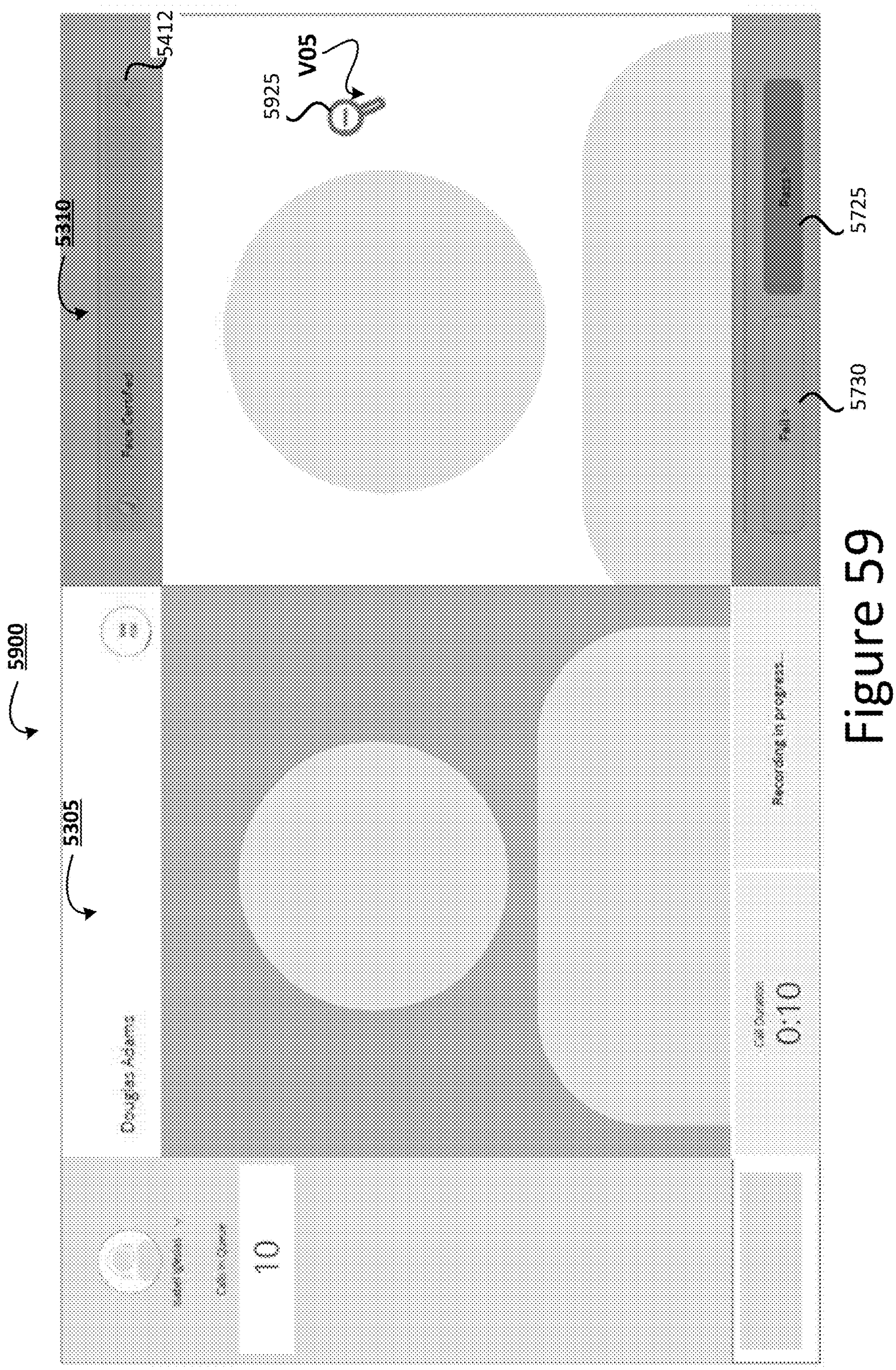

If the adviser is suspicious that a face biometric sample or identity document photo does not match the person on the video call, then as shown by GUI instance 5800 of FIG. 58, the advisor may expand the facial image data by selecting the GCE 5825 using pointer V05 to see it in an enlarged form as shown by GUI instance 5900 of FIG. 59. Additionally, the advisor may select the GCE 5830 to view the comparison between the face sample and the identity document photo. Selecting GCE 5830 expands both photos for comparison with each other, whereas selecting a GCE 5825 of a corresponding image only expands that image. As shown by FIG. 59, the expanded image appears as an overlay GUI in the GUI section 5310 and the other content and buttons in the GUI section 5310 are greyed out and/or deactivated. Additionally, the pointer V05 has changed into an image of a magnifying glass with a minus ("−") sign, indicating that clicking anywhere outside of the expanded image closes the expanded image.

Figure 60:
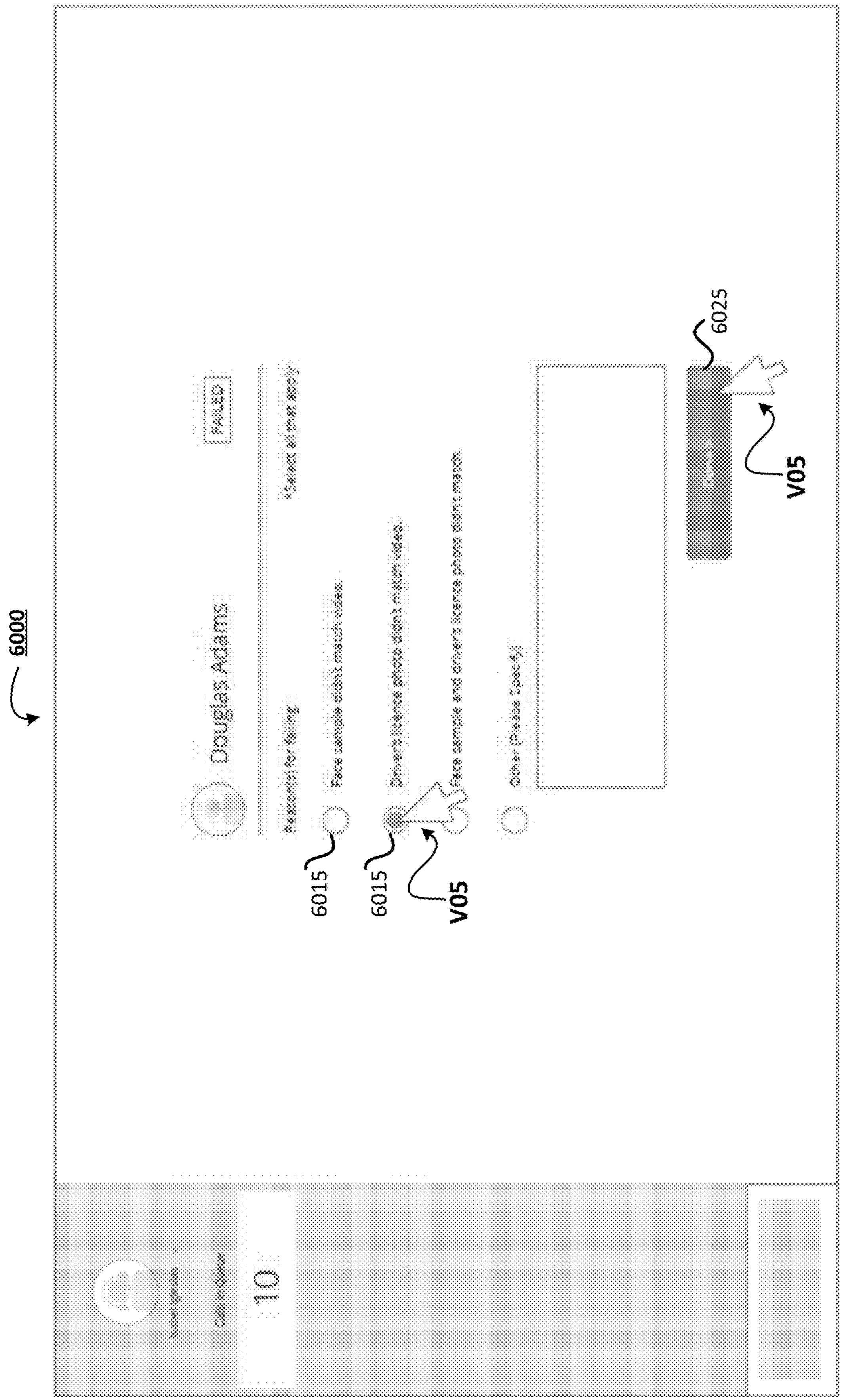

FIG. 60 shows an example failed enrollment GUI instance 6000 in which the advisor has selected the GCE 5730 of FIGS. 57-59 to fail the enrollee's enrollment. The GUI instance 6000 includes radio buttons GCEs 6015, each of which corresponds to a reason for failing the enrollee (note that not all of the GCEs 6015 are not labelled in FIG. 60 for purposes of clarity). In this example, the advisor has selected the GCE 6015 for the reason labelled "Driver's license photo didn't match video." After the advisor has selected a reason for the failure, the advisor may use pointer V05 to select the GCE 6025 to submit the selected reason to the IVS 140.

Figure 61:
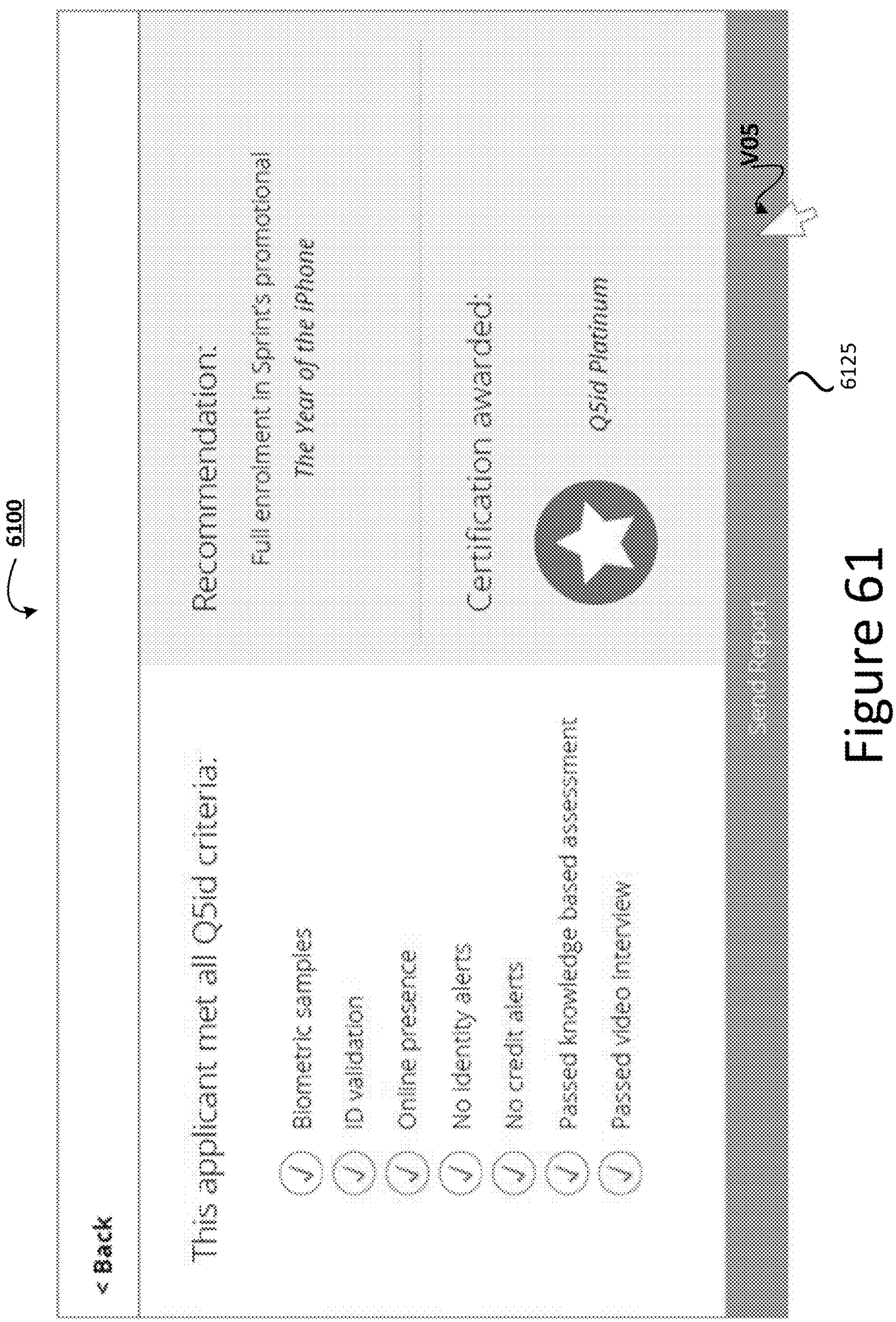
Figure 62:
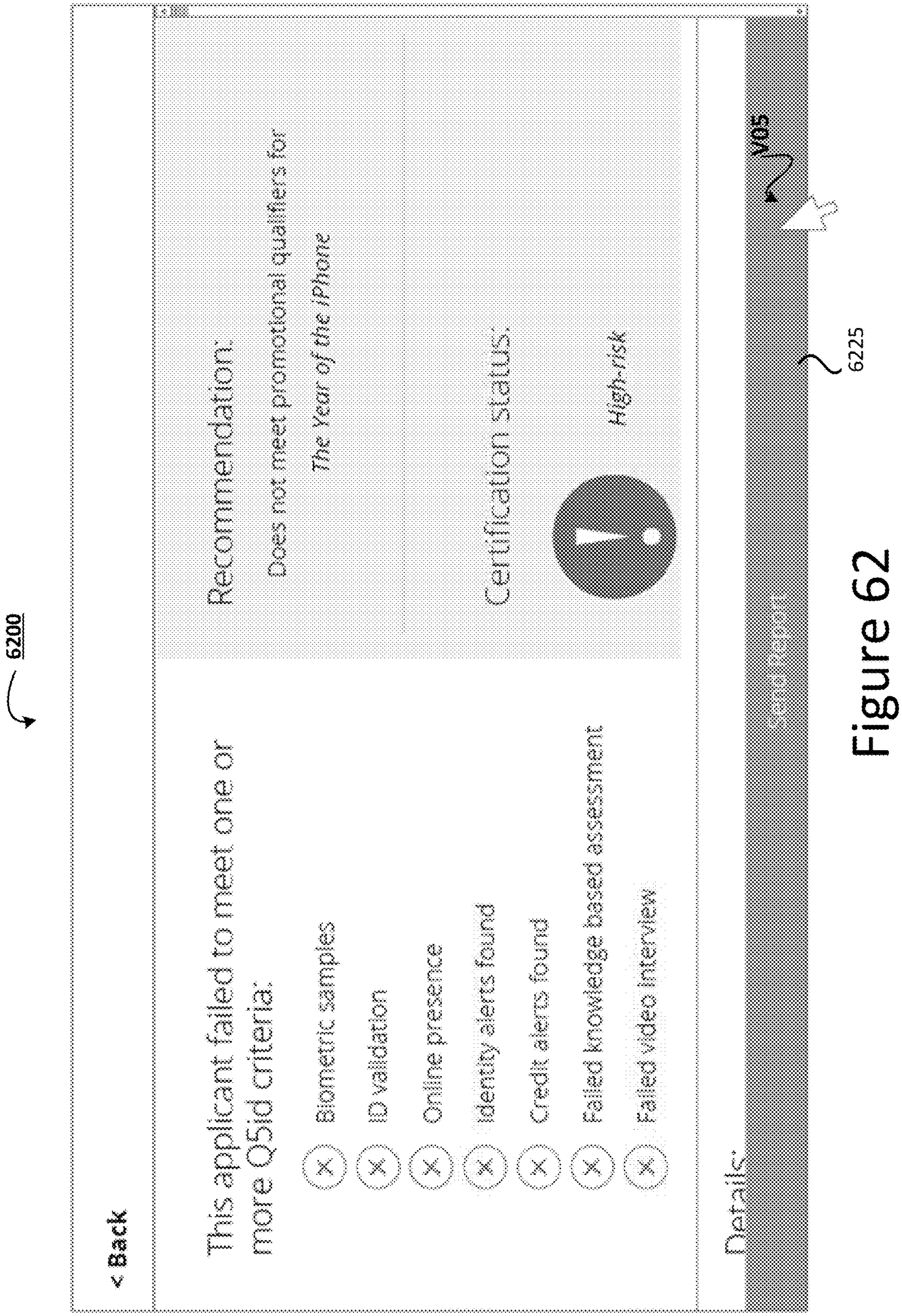
Figure 63:
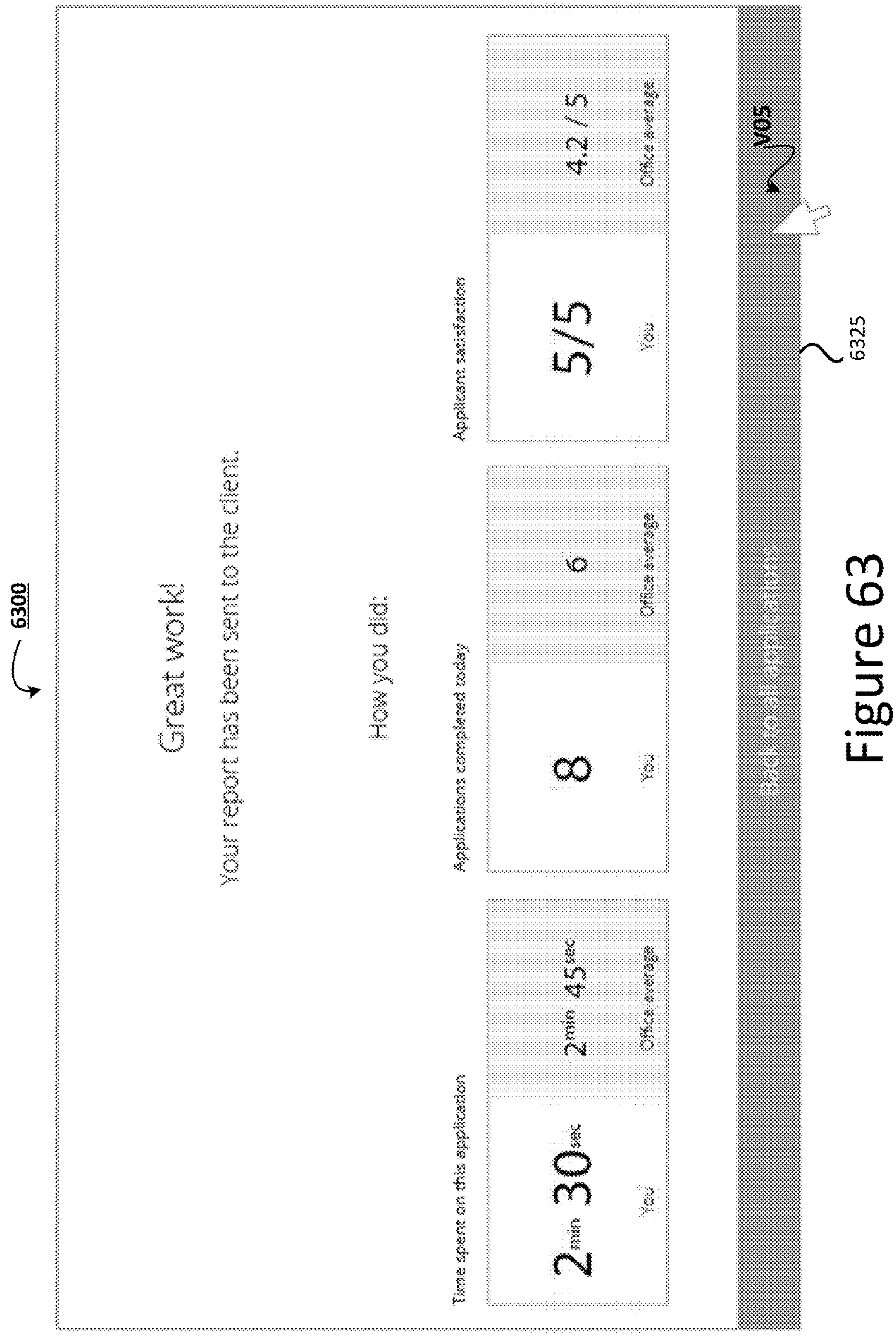

FIGS. 61-63 illustrate example instances of an application report GUI in accordance with some embodiments. FIG. 61 shows an application report GUI instance 6100, which may be displayed upon completion of an application of a low fraud risk enrollee. The application report GUI instance 6100 includes a GCE 6125, which when selected by the interviewer using pointer V05, may send results of the enrollment application to the enrollee's client system 105A or to the SPP 120. FIG. 62 shows an application report GUI instance 6200, which may be displayed upon completion of an application of a high fraud risk enrollee. The application report GUI instance 6200 includes a GCE 6225, which when selected by the interviewer using pointer V05, may send results of the enrollment application to the enrollee's client system 105A or to the SPP 120. It should be noted that it is unlikely that the high-risk enrollee would have made it through all rounds of the enrollment process before being terminated, and in such cases, the GUI instance 6200 may not be reached. FIG. 63 shows an application report GUI instance 6300, which may be displayed after the enrollment report has been sent to the enrollee or SPP 120. The application report GUI instance 6300 includes a GCE 6325, which when selected by the interviewer using pointer V05, may cause the application dashboard GUI (see, e.g., FIG. 35) to be displayed.

III. Example Computing Systems and Configurations

Figure 64:
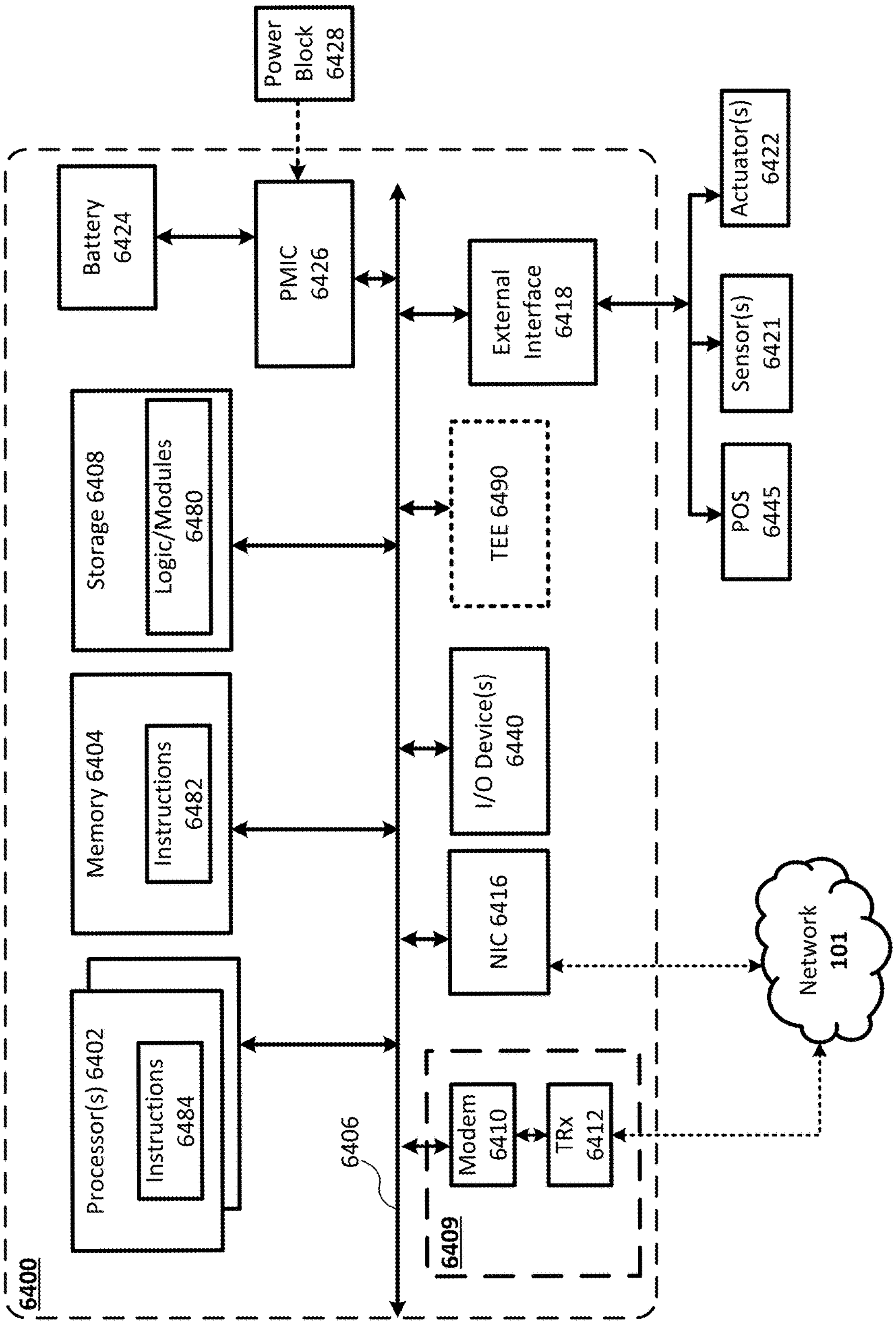
FIG. 64 illustrates an example computing system suitable for practicing various aspects of the present disclosure in accordance with various embodiments.

FIG. 64 illustrates an example of a computing system 6400 (also referred to as "platform 6400," "device 6400," "appliance 6400," or the like) in accordance with various embodiments. In FIG. 64, like numbered items are the same as discussed previously with respect to FIGS. 1-63. The system 6400 may be suitable for use as any of the computer devices discussed herein, such as the client systems 105, servers of the SPP 120, and the IVS servers 145. The components of system 6400 may be implemented as an individual computer system, or as components otherwise incorporated within a chassis of a larger system. The components of system 6400 may be implemented as integrated circuits (ICs) or other discrete electronic devices, with the appropriate logic, software, firmware, or a combination thereof, adapted in the computer system 6400. Additionally or alternatively, some of the components of system 6400 may be combined and implemented as a suitable SoC, SiP, MCP, and/or the like.

Referring now to system 6400, the system 6400 includes processor circuitry 6402, which is configured to execute program code, and/or sequentially and automatically carry out a sequence of arithmetic or logical operations; record, store, and/or transfer digital data. The processor circuitry 6402 includes circuitry such as, but not limited to, one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock, timer-counters including interval and watchdog timers, general purpose input/output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 6402 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein. Individual processors (or individual processor cores) of the processor circuitry 6402 may be coupled with or may include memory/storage and may be configured to execute instructions stored in the memory/storage to enable various applications or operating systems to run on the system 6400. In these embodiments, the processors (or cores) of the processor circuitry 6402 are configured to operate application software (e.g., logic/modules 6480) to provide specific services to a user of the system 6400. In some embodiments, the processor circuitry 6402 may include a special-purpose processor/controller to operate according to the various embodiments herein.

In various implementations, the processor(s) of processor circuitry 6402 may include, for example, one or more processor cores (CPUs), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), SoCs and/or programmable SoCs, microprocessors or controllers, or any suitable combination thereof. As examples, the processor circuitry 6402 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; or the like. Other examples of the processor circuitry 6402 may be mentioned elsewhere in the present disclosure.

In some implementations, the processor circuitry 6402 may include one or more hardware accelerators (e.g., where the system 6400 is a server computer system). The hardware accelerators may be microprocessors, configurable hardware (e.g., FPGAs, programmable ASICs, programmable SoCs, DSPs, etc.), or some other suitable special-purpose processing device tailored to perform one or more specific tasks or workloads, for example, specific tasks or workloads of the subsystems of the IVS 140, which may be more efficient than using general-purpose processor cores. In some embodiments, the specific tasks or workloads may be offloaded from one or more processors of the processor circuitry 6402. In these implementations, the circuitry of processor circuitry 6402 may comprise logic blocks or logic fabric including some other interconnected resources that may be programmed to perform various functions, such as the procedures, methods, functions, etc. of the various embodiments discussed herein. Additionally, the processor circuitry 6402 may include memory cells (e.g., EPROM, EEPROM, flash memory, static memory (e.g., SRAM, antifuses, etc.) used to store logic blocks, logic fabric, data, etc., in look-up tables (LUTs) and the like.

In some implementations, the processor circuitry 6402 may include hardware elements specifically tailored for AI, ML, and/or deep learning functionality, such as for operating the subsystems of the IVS 140 discussed previously with regard to FIGS. 1-63. In these implementations, the processor circuitry 6402 may be, or may include, an AI engine chip that can run many different kinds of AI instruction sets once loaded with the appropriate weightings and training code. Additionally or alternatively, the processor circuitry 6402 may be, or may include, AI accelerator(s), which may be one or more of the aforementioned hardware accelerators designed for hardware acceleration of AI applications, such as one or more of the subsystems of IVS 140. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 6402 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

In some implementations, the processor(s) of processor circuitry 6402 may be, or may include, one or more custom-designed silicon cores specifically designed to operate corresponding subsystems of the IVS 140. These cores may be designed as synthesizable cores comprising hardware description language logic (e.g., register transfer logic, verilog, Very High Speed Integrated Circuit hardware description language (VHDL), etc.); netlist cores comprising gate-level description of electronic components and connections and/or process-specific very-large-scale integration (VLSI) layout; and/or analog or digital logic in transistor-layout format. In these implementations, one or more of the subsystems of the IVS 140 may be operated, at least in part, on custom-designed silicon core(s). These "hardware-ized" subsystems may be integrated into a larger chipset but may be more efficient than using general purpose processor cores.

The system memory circuitry 6404 comprises any number of memory devices arranged to provide primary storage from which the processor circuitry 6402 continuously reads instructions 6482 stored therein for execution. In some embodiments, the memory circuitry 6404 is on-die memory or registers associated with the processor circuitry 6402. As examples, the memory circuitry 6404 may include volatile memory such as random access memory (RAM), dynamic RAM (DRAM), synchronous DRAM (SDRAM), etc. The memory circuitry 6404 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 6404 may also comprise persistent storage devices, which may be temporal and/or persistent storage of any type, including, but not limited to, non-volatile memory, optical, magnetic, and/or solid-state mass storage, and so forth.

Storage circuitry 6408 is arranged to provide persistent storage of information such as data, applications, operating systems (OS), and so forth. As examples, the storage circuitry 6408 may be implemented as hard disk drive (HDD), a micro HDD, a solid-state disk drive (SSDD), flash memory cards (e.g., SD cards, microSD cards, xD picture cards, and the like), USB flash drives, on-die memory or registers associated with the processor circuitry 6402, resistance change memories, phase change memories, holographic memories, or chemical memories, and the like.

The storage circuitry 6408 is configured to store computational logic 6480 (or "modules 6480") in the form of software, firmware, microcode, or hardware-level instructions to implement the techniques described herein. The computational logic 6480 may be employed to store working copies and/or permanent copies of programming instructions, or data to create the programming instructions, for the operation of various components of system 6400 (e.g., drivers, libraries, application programming interfaces (APIs), etc.), an OS of system 6400, one or more applications, and/or for carrying out the embodiments discussed herein. The computational logic 6480 may be stored or loaded into memory circuitry 6404 as instructions 6482, or data to create the instructions 6482, which are then accessed for execution by the processor circuitry 6402 to carry out the functions described herein. The processor circuitry 6402 accesses the memory circuitry 6404 and/or the storage circuitry 6408 over the interconnect (IX) 6406. The instructions 6482 to direct the processor circuitry 6402 to perform a specific sequence or flow of actions, for example, as described with respect to flowchart(s) and block diagram(s) of operations and functionality depicted previously. The various elements may be implemented by assembler instructions supported by processor circuitry 6402 or high-level languages that may be compiled into instructions 6484, or data to create the instructions 6484, to be executed by the processor circuitry 6402. The permanent copy of the programming instructions may be placed into persistent storage devices of storage circuitry 6408 in the factory or in the field through, for example, a distribution medium (not shown), through a communication interface (e.g., from a distribution server (not shown)), or over-the-air (OTA).

In some embodiments, the instructions 6484 on the processor circuitry 6402 (separately, or in combination with the instructions 6482 and/or logic/modules 6483 stored in computer-readable storage media) may configure execution or operation of a trusted execution environment (TEE) 6490. The TEE 6490 operates as a protected area accessible to the processor circuitry 6402 to enable secure access to data and secure execution of instructions. In some embodiments, the TEE 6490 may be a physical hardware device that is separate from other components of the system 6400 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 6490 may be implemented as secure enclaves, which are isolated regions of code and/or data within the processor and/or memory/storage circuitry of the system 6400. Only code executed within a secure enclave may access data within the same secure enclave, and the secure enclave may only be accessible using the secure application (which may be implemented by an application processor or a tamper-resistant microcontroller). Various implementations of the TEE 6490, and an accompanying secure area in the processor circuitry 6402 or the memory circuitry 6404 and/or storage circuitry 6408 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 6400 through the TEE 6490 and the processor circuitry 6402.

In some embodiments, the memory circuitry 6404 and/or storage circuitry 6408 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 6404 and/or storage circuitry 6408 may be divided into one or more trusted memory regions for storing applications or software modules of the TEE 6490.

The memory circuitry 6404 and/or storage circuitry 6408 may store program code of an operating system (OS), which may be a general purpose OS or an OS specifically written for and tailored to the computing platform 6400. For example, when the system 6400 is a server system or a desktop or laptop system 6400, the OS may be Unix or a Unix-like OS such as Linux e.g., provided by Red Hat Enterprise, Windows 10™ provided by Microsoft Corp.®, macOS provided by Apple Inc.®, or the like. In another example where the system 6400 is a mobile device, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. The OS manages computer hardware and software resources, and provides common services for various applications (e.g., application 110). The OS may include one or more drivers or APIs that operate to control particular devices that are embedded in the system 6400, attached to the system 6400, or otherwise communicatively coupled with the system 6400. The drivers may include individual drivers allowing other components of the system 6400 to interact or control various I/O devices that may be present within, or connected to, the system 6400. For example, the drivers may include a display driver to control and allow access to a display device, a touchscreen driver to control and allow access to a touchscreen interface of the system 6400, sensor drivers to obtain sensor readings of sensor circuitry 6421 and control and allow access to sensor circuitry 6421, actuator drivers to obtain actuator positions of the actuators 6422 and/or control and allow access to the actuators 6422, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 6400, such as the various subsystems of the IVS 140 discussed previously.

The components of system 6400 communicate with one another over the interconnect (IX) 6406. The IX 6406 may include any number of IX technologies such as industry standard architecture (ISA), extended ISA (EISA), inter-integrated circuit ($I^2C$), serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 6406 may be a proprietary bus, for example, used in a SoC based system.

The communication circuitry 6409 is a hardware element, or collection of hardware elements, used to communicate over one or more networks (e.g., network 101) and/or with other devices. The communication circuitry 6409 includes modem 6410 and transceiver circuitry ("TRx") 6412. The modem 6410 includes one or more processing devices (e.g., baseband processors) to carry out various protocol and radio control functions. Modem 6410 may interface with application circuitry of system 5600 (e.g., a combination of processor circuitry 5602, memory circuitry 6404, and/or storage circuitry 6408) for generation and processing of baseband signals and for controlling operations of the TRx 6412. The modem 6410 may handle various radio control functions that enable communication with one or more radio networks via the TRx 6412 according to one or more wireless communication protocols. The modem 6410 may include circuitry such as, but not limited to, one or more single-core or multi-core processors (e.g., one or more baseband processors) or control logic to process baseband signals received from a receive signal path of the TRx 6412, and to generate baseband signals to be provided to the TRx 6412 via a transmit signal path. In various embodiments, the modem 6410 may implement a real-time OS (RTOS) to manage resources of the modem 6410, schedule tasks, etc.

The communication circuitry 6409 also includes TRx 6412 to enable communication with wireless networks using modulated electromagnetic radiation through a non-solid medium. The TRx 6412 may include one or more radios that are compatible with, and/or may operate according to any one or more of the radio communication technologies and/or standards including discussed herein. TRx 6412 includes a receive signal path, which comprises circuitry to convert analog RF signals (e.g., an existing or received modulated waveform) into digital baseband signals to be provided to the modem 6410. The TRx 6412 also includes a transmit signal path, which comprises circuitry configured to convert digital baseband signals provided by the modem 6410 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 6412 using metal transmission lines or the like.

Network interface circuitry/controller (NIC) 6416 may be included to provide wired communication to the network 101 or to other devices using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 6400 via NIC 6416 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 6416 may include one or more dedicated processors and/or FPGAs to communicate using one or more of the aforementioned network interface protocols. In some implementations, the NIC 6416 may include multiple controllers to provide connectivity to other networks using the same or different protocols. For example, the system 6400 may include a first NIC 6416 providing communications to the cloud over Ethernet and a second NIC 6416 providing communications to other devices over another type of network. In some implementations, the NIC 6416 may be a high-speed serial interface (HSSI) NIC to connect the system 6400 to a routing or switching device.

The external interface 6418 (also referred to as "I/O interface circuitry" or the like) is configured to connect or coupled the system 6400 with external devices or subsystems. The external interface 6418 may include any suitable interface controllers and connectors to couple the system 6400 with the external components/devices. As an example, the external interface 6418 may be an external expansion bus (e.g., Universal Serial Bus (USB), FireWire, Thunderbolt, etc.) used to connect system 100 with external (peripheral) components/devices. The external devices include, inter alia, sensor circuitry 6421, actuators 6422, and positioning circuitry 6445, but may also include other devices or subsystems not shown by FIG. 64.

The sensor circuitry 6421 may include devices, modules, or subsystems whose purpose is to detect events or changes in its environment and send the information (sensor data) about the detected events to some other device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 6418 connects the system 6400 to actuators 6422, allowing system 6400 to change its state, position, and/or orientation, or move or control a mechanism or system. The actuators 6422 comprise electrical and/or mechanical devices for moving or controlling a mechanism or system, and convert energy (e.g., electric current or moving air and/or liquid) into some kind of motion. The actuators 6422 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 6422 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 6400 may be configured to operate one or more actuators 6422 based on one or more captured events and/or instructions or control signals received from a service provider and/or various client systems. In embodiments, the system 6400 may transmit instructions to various actuators 6422 (or controllers that control one or more actuators 6422) to reconfigure an electrical network as discussed herein.

The positioning circuitry 6445 includes circuitry to receive and decode signals transmitted/broadcasted by a positioning network of a GNSS. Examples of such navigation satellite constellations include United States' GPS, Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 6445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 6445 may include a Micro-Technology for Positioning, Navigation, and Timing (Micro-PNT) IC that uses a master timing clock to perform position tracking/estimation without GNSS assistance. The positioning circuitry 6445 may also be part of, or interact with, the communication circuitry 6409 to communicate with the nodes and components of the positioning network. The positioning circuitry 6445 may also provide position data and/or time data to the application circuitry, which may use the data to synchronize operations with various infrastructure (e.g., radio base stations), for turn-by-turn navigation, or the like.

The input/output (I/O) device(s) 6440 may be present within, or connected to, the system 6400. The I/O devices 6440 include input device circuitry and output device circuitry including one or more user interfaces designed to enable user interaction with the system 6400 and/or peripheral component interfaces designed to enable peripheral component interaction with the system 6400. The input device circuitry includes any physical or virtual means for accepting an input including, inter alia, one or more physical or virtual buttons, a physical or virtual keyboard, keypad, mouse, touchpad, touchscreen, microphones, scanner, headset, and/or the like. In embodiments where the input device circuitry includes a capacitive, resistive, or other like touch-surface, a touch signal may be obtained from circuitry of the touch-surface. The touch signal may include information regarding a location of the touch (e.g., one or more sets of (x,y) coordinates describing an area, shape, and/or movement of the touch), a pressure of the touch (e.g., as measured by area of contact between a user's finger or a deformable stylus and the touch-surface, or by a pressure sensor), a duration of contact, any other suitable information, or any combination of such information. In these embodiments, one or more applications operated by the processor circuitry 6402 may identify gesture(s) based on the information of the touch signal, and utilizing a gesture library that maps determined gestures with specified actions.

The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED and/or OLED displays, quantum dot displays, projectors, etc.), with the output of characters, graphics, multimedia objects, and the like being generated or produced from operation of the system 6400. The output device circuitry may also include speakers or other audio emitting devices, printer(s), and/or the like. In some embodiments, the sensor circuitry 6421 may be used as the input device circuitry (e.g., an image capture device, motion capture device, or the like) and one or more actuators 6422 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 6424 may be coupled to the system 6400 to power the system 6400, which may be used in embodiments where the system 6400 is not in a fixed location, such as when the system 6400 is a mobile or laptop client system. The battery 6424 may be a lithium ion battery, a lead-acid automotive battery, or a metal-air battery, such as a zinc-air battery, an aluminum-air battery, a lithium-air battery, a lithium polymer battery, and/or the like. In embodiments where the system 6400 is mounted in a fixed location, such as when the system is implemented as a server computer system, the system 6400 may have a power supply coupled to an electrical grid. In these embodiments, the system 6400 may include power tee circuitry to provide for electrical power drawn from a network cable to provide both power supply and data connectivity to the system 6400 using a single cable.

Power management integrated circuitry (PMIC) 6426 may be included in the system 6400 to track the state of charge (SoCh) of the battery 6424, and to control charging of the system 6400. The PMIC 6426 may be used to monitor other parameters of the battery 6424 to provide failure predictions, such as the state of health (SoH) and the state of function (SoF) of the battery 6424. The PMIC 6426 may include voltage regulators, surge protectors, power alarm detection circuitry. The power alarm detection circuitry may detect one or more of brown out (under-voltage) and surge (over-voltage) conditions. The PMIC 6426 may communicate the information on the battery 6424 to the processor circuitry 6402 over the IX 6406. The PMIC 6426 may also include an analog-to-digital (ADC) convertor that allows the processor circuitry 6402 to directly monitor the voltage of the battery 6424 or the current flow from the battery 6424. The battery parameters may be used to determine actions that the system 6400 may perform, such as transmission frequency, mesh network operation, sensing frequency, and the like.

A power block 6428, or other power supply coupled to an electrical grid, may be coupled with the PMIC 6426 to charge the battery 6424. In some examples, the power block 6428 may be replaced with a wireless power receiver to obtain the power wirelessly, for example, through a loop antenna in the system 6400. In these implementations, a wireless battery charging circuit may be included in the PMIC 6426. The specific charging circuits chosen depend on the size of the battery 6424 and the current required.

The system 6400 may include any combinations of the components shown by FIG. 64; however, some of the components shown may be omitted, additional components may be present, and different arrangement of the components shown may occur in other implementations. In one example where the system 6400 is or is part of a server computer system, the battery 6424, communication circuitry 6409, the sensors 6421, actuators 6422, and/or POS 6445, and possibly some or all of the I/O devices 6440, may be omitted.

Figure 65:
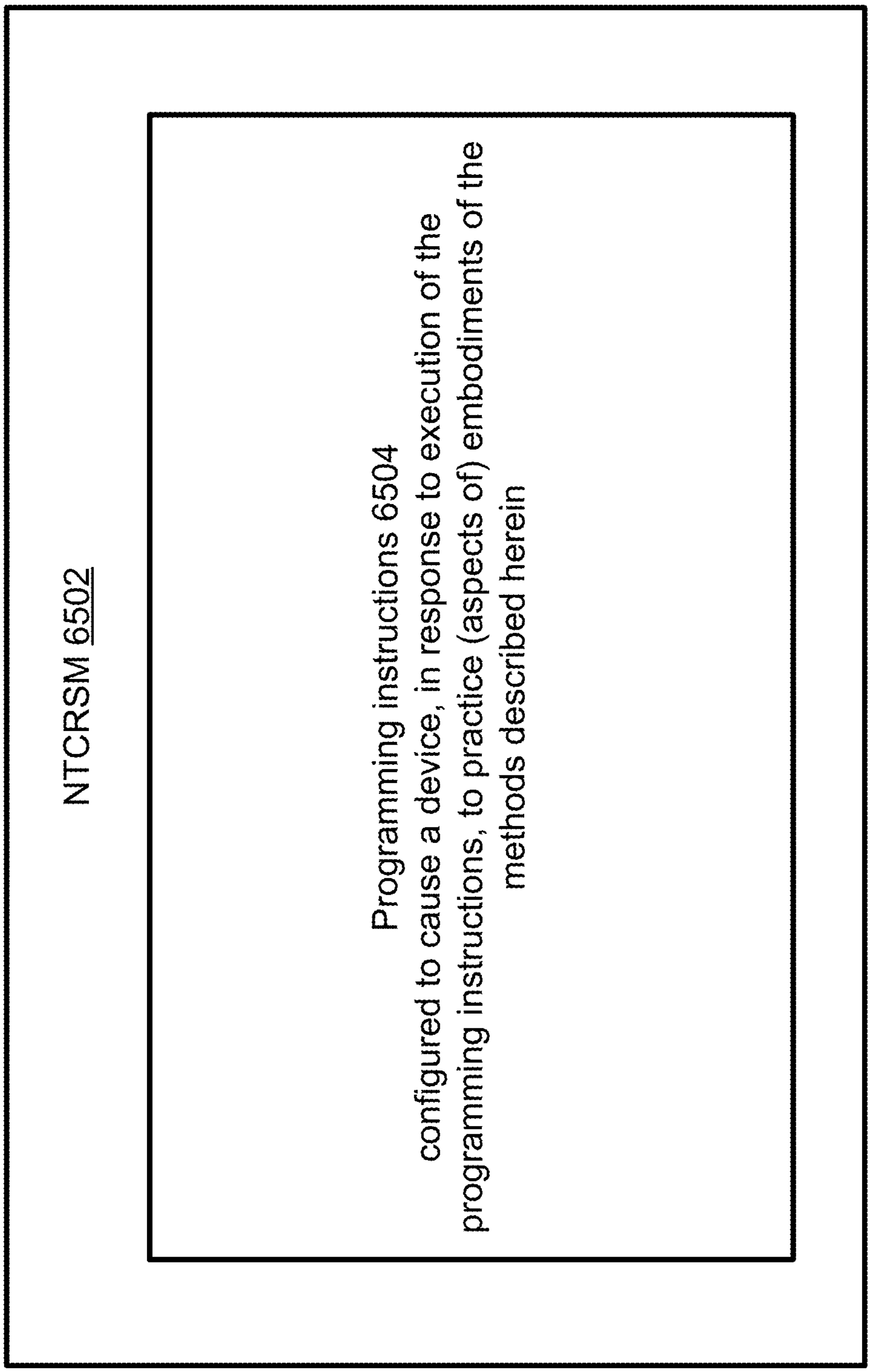
FIG. 65 illustrates an example non-transitory computer-readable storage media that may be suitable for use to store instructions (or data that creates the instructions) that cause an apparatus, in response to execution of the instructions by the apparatus, to practice selected aspects of the present disclosure.

Furthermore, the embodiments of the present disclosure may take the form of a computer program product or data to create the computer program, with the computer program or data embodied in any tangible or non-transitory medium of expression having the computer-usable program code (or data to create the computer program) embodied in the medium. FIG. 65 illustrates an example non-transitory computer-readable storage media (NTCRSM) that may be suitable for use to store instructions (or data that creates the instructions) that cause an apparatus (such as any of the devices/components/systems described with regard to FIGS. 1-9), in response to execution of the instructions by the apparatus, to practice selected aspects of the present disclosure. As shown, NTCRSM 6502 may include a number of programming instructions 6504 (or data to create the programming instructions). Programming instructions 6504 may be configured to enable a device (e.g., any of the devices/components/systems described with regard to FIGS. 1-64), in response to execution of the programming instructions 6504, to perform various programming operations associated with operating system functions, one or more applications, and/or aspects of the present disclosure (including various programming operations associated with FIGS. 1-64). In various embodiments, the programming instructions 6504 may correspond to any of the computational logic 6480, instructions 6482 and 6484 discussed previously with regard to FIG. 64.

In alternate embodiments, programming instructions 6504 (or data to create the instructions 6504) may be disposed on multiple NTCRSM 6502. In alternate embodiments, programming instructions 6504 (or data to create the instructions 6504) may be disposed on computer-readable transitory storage media, such as signals. The programming instructions 6504 embodied by a machine-readable medium may be transmitted or received over a communications network using a transmission medium via a network interface device (e.g., communication circuitry 6409 and/or NIC 6416 of FIG. 64) utilizing any one of a number of transfer protocols (e.g., HTTP, etc.).

Any combination of one or more computer usable or computer readable media may be utilized as or instead of the NTCRSM 6502. The computer-usable or computer-readable medium may be, for example, but not limited to one or more electronic, magnetic, optical, electromagnetic, infrared, or semiconductor systems, apparatuses, devices, or propagation media. For instance, the NTCRSM 6502 may be embodied by devices described for the storage circuitry 6408 and/or memory circuitry 6404 described previously with regard to FIG. 64. More specific examples (a non-exhaustive list) of a computer-readable medium may include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. In the context of the present disclosure, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (e.g., including programming instructions 6504) or data to create the program code embodied therewith, either in baseband or as part of a carrier wave. The computer usable program code or data to create the program may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (e.g., programming instructions 6504) or data to create the program code as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an application programming interface (API), etc. in order to execute the instructions on a particular computing device or other device. In another example, the program code or data to create the program code may need to be configured (e.g., settings stored, data input, network addresses recorded, etc.) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including, for example, programming instructions 6504, computational logic 6480, instructions 6482, and/or instructions 6484, may be written in any combination of one or more programming languages, including an object oriented programming language such as Python, PyTorch, Ruby, Scala, Smalltalk, Java™, Kotlin, C++, C#, or the like; a procedural programming language, such as the "C" programming language, the Go (or "Golang") programming language, or the like; a scripting language such as JavaScript, Server-Side JavaScript (SSJS), PHP, Pearl, Python, PyTorch, Ruby or Ruby on Rails, Lua, Torch/Lua with Just-In Time compiler (LuaJIT), Accelerated Mobile Pages Script (AMPscript), VBScript, and/or the like; a markup language such as HTML, XML, wiki markup or Wikitext, Wireless Markup Language (WML), etc.; a data interchange format/definition such as Java Script Object Notion (JSON), Apache® MessagePack™, etc.; a stylesheet language such as Cascading Stylesheets (CSS), extensible stylesheet language (XSL), or the like; an interface definition language (IDL) such as Apache® Thrift, Abstract Syntax Notation One (ASN.1), Google® Protocol Buffers (protobuf), etc.; or some other suitable programming languages including proprietary programming languages and/or development tools, or any other languages or tools as discussed herein. The computer program code for carrying out operations of the present disclosure may also be written in any combination of the programming languages discussed herein. The program code may execute entirely on the system 6400, partly on the system 6400 as a stand-alone software package, partly on the system 6400 and partly on a remote computer (e.g., IVS 140 and/or SPP 120), or entirely on the remote computer (e.g., IVS 140 and/or SPP 120). In the latter scenario, the remote computer may be connected to the system 6400 through any type of network (e.g., network 101).

Figure 66:
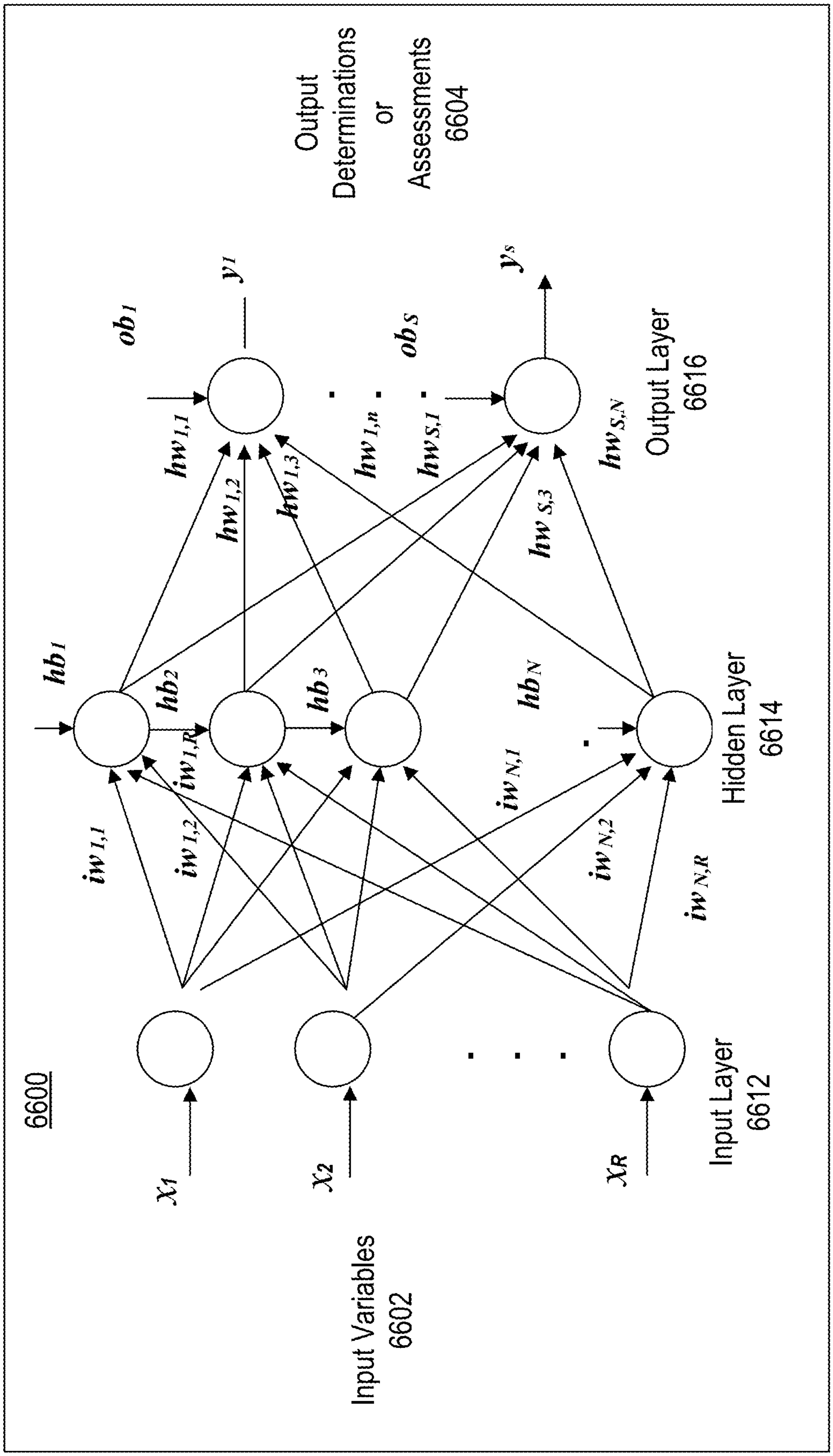
FIG. 66 illustrates an example neural network suitable for practicing various aspects of the present disclosure in accordance with various embodiments.

FIG. 66 illustrates an example NN 6600 suitable for use by the IVS and/or related services discussed previously according to various embodiments. NN 6600 may be suitable for use by one or more of the subsystems and/or the various embodiments disussed herein, implemented in part by a hardware accelerator of the IVS or portions thereof.

The NN 6600 may represent one or more ML models that are trained using training data. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models," "models," or the like) based on sample data (referred to as "training data," "model training information," or the like) in order to make predictions, inferences, or decisions. Generally, an ML algorithm is a computer program that learns from experience with respect to some task and some performance measure, and an ML model is any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

ML algorithms build or develop ML models using supervised learning (e.g., linear regression, k-nearest neighbor (KNN), decision tree algorithms, support machine vectors, Bayesian algorithm, ensemble algorithms, etc.), unsupervised learning (e.g., K-means clustering, principle component analysis (PCA), etc.), reinforcement learning (e.g., Q-learning, multi-armed bandit learning, deep RL, etc.), and the like. After the model is trained on some training data, the model can be used to process additional data to make predictions. The training may be supervised or unsupervised training depending on the particular ML algorithm used.

As shown, example NN 6600 may be a multi-layer feedforward NN (FNN) comprising an input layer 6612, one or more hidden layers 6614, and an output layer 6616. Input layer 6612 receives data of input variables ($x_i$) 6602. Hidden layer(s) 6614 processes the inputs, and eventually, output layer 6616 outputs the determinations or assessments ($y_i$) 6604. In one example implementation the input variables ($x_i$) 6602 of the NN are set as a vector containing the relevant variable data, while the output determination or assessment ($y_i$) 6604 of the NN are also as a vector. As an example, the multi-layer FNN 6600 may be expressed through the following equations:

$$ho_i = f(\Sigma_{j=1}^{R}(iw_{i,j}x_j) + hb_i), \text{ for } i = 1, \ldots, N$$

$$y_i = f(\Sigma_{k=1}^{N}(hw_{i,k}ho_k) + ob_i), \text{ for } i = 1, \ldots, S$$

In the above equation, $ho_i$ and $y_i$ are the hidden layer variables and the final outputs, respectively; f( ) is typically a non-linear function, such as the sigmoid function or rectified linear (ReLu) function that mimics the neurons of the human brain; R is the number of inputs; N is the size of the hidden layer, or the number of neurons; and S is the number of the outputs.

In one example, the input variables ($x_i$) 6602 are set as a vector containing the relevant variable data, and the output determination or assessment ($y_i$) 6604 is also a vector. The input variables may be restricted to a limited set of quantifiable properties, which are referred to as "features." In the context of ML, a feature is an individual measureable property or characteristic of a phenomenon being observed. Features are usually represented using numbers/numerals (e.g., integers), strings, variables, ordinals, real-values, categories, Boolean values, and/or the like. A set of features may be referred to as a "feature vector." A vector is a tuple of one or more values called scalars, and a feature vector may include a tuple of one or more features.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

In the above equation, $y_{kp}$ and $t_{kp}$ are the predicted and the target values of pth output unit for sample k, respectively, and m is the number of samples.

In one example, the input variables ($x_i$) 6602 may include various sensor (biometric) data collected by various sensors 6421, biographical data collected from various sources as discussed herein, as well as data describing relevant factors to a decision. The output variables ($y_i$) 6604 may include a determined response (e.g., whether an image or audio data is spoofed or spliced, whether fraudulent activity is detected, and so forth). The network variables of the hidden layer(s) for the NN, are determined by the training data.

In the example of FIG. 66, for simplicity of illustration, there is only one hidden layer in the NN. In some other embodiments, there can be many hidden layers. Furthermore, the NN can be implemented using some other type of topology, such as a deep NN, deep FNN (DFN), convolution NN (CNN), deep CNN (DCN), deconvolutional NN (DNN), a deep belief NN, a perception NN, recurrent NN (RNN) such as a Long Short Term Memory (LSTM) algorithm and/or gated recurrent units (GRUs), and/or the like. In other embodiments, other ML techniques may be used such as deep learning matrix factorization algorithms, a deep stacking network, Markov chains, Bayesian Networks (BN), dynamic BNs (DBNs), Bayesian classifiers, Linear Dynamical Systems (LDS), Switching LDS (SLDS), k-nearest neighbor (kNN), logistic regression, decision trees, random forests, support vector machines (SVMs), among many others.

The ML models are then used by the component 113 and/or IVS 140 to detect malicious/fraudulent behaviors, and/or perform various identity verification tasks as discussed herein. After the ML models are trained, the ML models may be utilized for the various services discussed herein.

IV. Extensions to the Example Embodiments

An example implementation of the embodiments discussed herein utilizes at least five identity assessment parameters/tools during the enrollment process, the IVS solution ensures the protection and authenticity of the true identity of all active users. A step-by-step procedure of how this example implementation works is as follows.

Users (enrollees or authenticated users) start their Proven Identity journey through a rapid authentication process that is unlike any other existing solution. The Identity enrollment begins when users open the IVS app on their mobile device. The IVS app is fully functional for any type of mobile platform/device that meet minimum hardware requirements (e.g., capable of capturing sufficient quality voice, video, and/or image data). The IVS app is used for both enrolling new users into the IVS system, and for authenticating active users for various transactions.

Biometric data is utilized to lock down each user's account. The users' biometrics makeup their login/authentication credentials, eliminating any need for passwords or the like. This ensures that every user can only have one identity enrolled in the IVS, which frustrates the ability for malicious actors from creating synthetic identities and/or stealing identities from other individuals. Users can also authenticate/verify their identity whenever and wherever needed.

When the IVS app is opened/executed, high definition (HD) quality images welcome the user and assure them of the security and privacy have built into the authentication process. Then the user simply clicks a button labeled to initiate the ID authentication journey.

The first step of the verification process in this implementation involves collecting facial biometrics. Biometric collection begins by asking the user to do something they are quite familiar with—taking a selfie. They simply align their face in a graphical outline and blink one or both eyes when prompted (to verify liveness). The time required to perform this step should be only a few seconds. Each face contains unique elements (or features), and a collection of these elements is sometimes called a biometric signature. Law enforcement, technology companies and others use this biometric signature as an authentication tool. This is, however, only one piece of biometric data utilized to build a Proven Identity with the IVS.

The second step of the verification process in this implementation involves collecting hand (palm) biometrics. The IVS app guides the user's mobile device to photograph both of palms, one at a time. The time required to perform this step is a few seconds for each palm. After the first palm is scanned, the user waits a brief period of time for the mobile device to send the facial biometric and the initial palm images to the IVS. When the user is an enrollee, then the IVS app prompts the user to collect second palm biometric data. For active users, the second palm is skipped and they are presented with a "Welcome back" screen. Palm images are used in this implementation as they are easily captured with a mobile device and are very difficult to imitate since approximately 1 in 20 million palms look similar to each other. Liveness checks are also used during the palm capture proces,s which makes spoofing virtually impossible. The facial biometrics are combined with palm biometrics to verify the user's biometric identity, creating a false acceptance rate of 1 in 4,000,000,000,000.

From each photo of a palm, the IVS uses machine learning and machine visioning techniques to create an authentication-ready palm image, or "biometric template" which is unique to that user. Multi-modal biometric verification happens within a few seconds after the initial palm is collected (as discussed above). The second palm is then collected to create a second biometric palm template for future authentication. As the second palm scan is sent to the system, the IVS applicant has already moved on to the next step.

The third step of the verification process in this implementation involves collecting voice biometrics. The IVS app records the user's voice while reading a phrase displayed on screen. In this implementation, the user reads the phrase three times in a row into the microphone of their mobile device. The phrase could be something like "My identity is secure because my voice is my passport." The time required to perform this step is approximately 30 seconds. The voice recording may be stored in a suitable audio file format (e.g., way, mp4, .m4a, etc.) and sent to the IVS, or the audio recording may be streamed using real-time transport protocol (RTP) with session initiation protocol (SIP) and/or the like. The voice element of authentication is combined into the multi-modal biometric process. This enables the IVS to offer a highest level of Proven Identity possible.

The IVS instantly analyzes a speaker's voice for both anatomy (e.g., throat and/or mouth shape) and behavior (e.g., pitch, style, etc.) uniqueness, while confirming the spoken phrase is accurately recorded. The IVS also implements multiple Anti-Spoofing processes (e.g., splice detection and the like) to fight against "Deep Fakes". This technology can uncover signs that a provided voice sample is the result of multiple voices recordings being spliced together.

The fourth step of the verification process in this implementation involves identity document and biographical data authentication. The VS app guides the user to photograph or otherwise scan of one or more issued identification documents such as a passport, driver's license, birth certificate, employee badge (for an enterprise), debit or credit card, and/or other identity document/card. Depending on the type of identity document to be scanned, the VS app may guide the user to scan both the front and back of the document(s). The time required to perform this step is several seconds. The VS app or the VS analyzes the scanned identity document(s) to identify/determine the user's biographical data. This biographical data is then combined with additional data not included on the scanned identity document(s) such as the user's email address, phone number, last 4 digits of their SSN, and/or the like. Identity documentation allows the VS to cross-reference the collected information (including the biographical data in the scanned documents and the additional supplied data) against multiple database. Collectively, these are additional unique indicators of an individual that provides sufficient data points to conduct thorough fraud and identity assessments. In this implementation, the VS uses the scanned identity document(s) and instantly performs over 50 forensic authentication tests, including photo analysis and the like. When the identity document includes a photo of the user, the IVS compares the image of the user to the facial biometrics captured in the first step of the verificatin process, as well as with images captured during a live video portion of the enrollment process for enrollees (see the sixth step below).

A fifth step of the verification process in this implementation involves performing user device authentication. From the user's perspective, the user device authentication happens "invisibly" by the IVS during the enrollment process and is not noticed by the user. The IVS interrogates the mobile device being used to enroll or authenticate the user, and verifies that the mobile device belongs to the user. Additionally or alternatively, the IVS confirms the location of the mobile device and confirms whether it is being used in an expected location, such as in a same or similar geographic area as the user's home address, within a known georgraphic area of a location the user is known to have travelled, or the like. This is done to pierce fake or spoofed IP addresses used to hide or fake the location of malicious actors. This process also leverages the device's built-in GPS to determine the geolocation of the device during the verification process. This helps reveal if the device has been forwarded, spoofed or cloned (which are all high-risk indicators of malicious activity), and the IVS assesses more than 1,500 database sources to verify other device attributes. After the device is used for identity verification a predefined number of times, device authentication security can be employed, which ensures only authorized devices can connect to a given network, site or service. This ensures that only authorized devices can be used for enrollment, enforcement, authentication, and authorization.

A sixth step of the verification process in this implementation involves performing a live video authentication. The live interview is the culmination of the enrollment process, and is usually not performed for authenticating active users. The user begins a secure, live interview directly on the applicant's mobile device with one of the highly trained advisors or an automated agent, such as a chatbot or virtual assistant. The time required to perform this step is approximately 15 to 30 seconds for most users. Once the live interview is begun, the applicant's live video appears in the app along with an image or video of the agent. As soon as the interview is requested on the IVS app, results of the applicant's full enrollment record is shared with the agent for quick previewing and assessment. In just a few seconds, the agent determines if the applicant has passed all phases of enrollment or has issues to resolve. The agent may ask follow up questions to the collected data, if necessary, before approving the user. Globally distributed media servers (e.g., CDN nodes, or the like) with intelligent bandwidth allocation mechanisms may be used to deliver resilient, quality connections. This makes high quality authentication and enrollment video calls from around the world possible. The live video provides an additional source of image data of the user's face to compare with the facial image and identity document captured previously, and also serves as a final check that the user is an actual human. The interview is also recorded for future authentication needs. Further, the live interview can be combined with customer support/help services to meet "Know Your Customer" requirements in the Banking and Financial Services industry, for example.

The IVS App provides an initial interaction between subscribing enterprises and their customers. The IVS architecture ensures a positive user experience. For example, the IVS provides an easy and intuitive enrollment process (e.g., an average total time to enroll is less than 3 minutes). The IVS provides a rapid authentication—following enrollment, average total time from authentication request to account access is less than 5 seconds, significantly faster than with a PIN or passphrase. This greatly reduces the friction caused by traditional authentication, yet it is exponentially more secure and protects both the individual and the company like never before. The IVS provides improved customer satisfaction—Fast, easy and secure accessing of the user's account information (e.g., financial, telecom accounts, etc.) improves overall satisfaction within the customer base. The IVS reduces identity theft, fraud, and associated costs—this is extremely valuable to corporations and businesses as identity theft is consistently the leading complaint filed with the Federal Trade Commission. The IVS maintains and/or improves brand loyalty since user accounts become more convenient to access and utilize, and are also more secure at the same time USE OF AI AN ML TECHNIQUES. Once the biographical information is collected from the Applicant, the IVS cross-references that information with various identity databases and systems. In various embodiments, the IVS employs a Digital Identity Network (DIN) for this purpose. The ability to understand a user's true digital identity and assess the validity of an online interaction requires a platform that unites a wide range of capabilities or "elements" that span the entire customer lifecycle, diverse use cases and both on and offline channels. The IVS uses the largest and richest global repository of online digital identity data in the world to filter through over 600,000 known physical addresses, 700,000 unique IP addresses, 800,000 unique email addresses and 40 billion annual network transactions.

The identity assessment processes, including this cross-referencing of data discussed above, is strengthened with AI and ML capabilities. While leveraging the data received through the device assessment referenced above (including the device location) the IVS is also powered by shared intelligence from over 40,000 websites and apps across industries and geographies to recognize the one unique digital identity associated with every Applicant. Using AI and ML, the IVS tracks authenticity metrics and reputational integrity to separate synthetic and fraudulent identities in real time from the 1.4 billion real identities verified by the system. In various embodiments, the IVS includes or otherwise utilizes a Digital Identity Intelligence (DII) system for this purpose. The DIN collects and processes global shared intelligence from millions of daily consumer interactions including logins, payments, and new account applications. The DII is trained on the DIN data to detect behaviors that deviate from trusted digital identity behaviors during each Applicants' enrollment into the IVS. Suspicious behavior is flagged for manual review or rejection before the enrollment process is completed. The DII may detect anomolies or suspecious behaviors based on device intelligence, the true location of the user device, identity and link analysis, and/or bot/malware threat intelligence.

DEVICE INTELLIGENCE: As mentioned previously, an Applicant's computing device 105 is assessed to verify it is associated with the Applicant and not a device known to be associated with fraudulent activities, even if private browsing or other attempts to obscure device identity are employed. This could involve obtaining and analyzing data obtained from the user device during the identity verification process as discussed previously.

TRUE LOCATION: Fraudsters often attempt to hide behind location and identity cloaking services such as hidden proxies, VPNs and the TOR browsers. Profiling tags can detect a unique domain name. Proxy piercing & VPN detection examines TCP/IP packet header information to expose both the Proxy IP address and True IP address. The IVS detects the use of VPNs and captures WiFi, cellular, and/or GPS details which are compared to IP address information. A recursive call through various intermediate DNS Servers is performed to reveal the IP address of the ISP's DNS Server. The IVS accurately detects the use of these technologies, and in the case of proxies and VPNs, reveals the true IP address, geolocation, and other attributes for each Applicant during Enrollment, even if attempts are made to hide or modify this information.

Identity and Link Analysis: The DII defines or discovers patterns of trusted user behavior by combining identity and transactional metadata with device identifiers, and connection and location characteristics. Transactions are compared against the trusted digital identity of the real user to identify anomalies that might indicate the use of stolen identity data, for example a mismatch between devices and locations or identity information usually associated with a digital identity.

Bot and Malware Threat Intelligence: The IVS also employs actionable threat detection mechanism to detect malware, Remote Access Trojans (RATs), automated bot attacks, session hijacking, and phished accounts, combined with global threat information such as known fraudsters and botnet participation.

FRAUD AND IDENTITY DATABASES AND ASSESSMENTS. As mentioned previously, the IVS incorporates multiple identity and fraud database searches and assessments, including thousands of identity attributes throughout the enrollment process. The primary focus of these searches includes:

Identity Verification: dentity records on individuals have greater positive indications for identity the longer they have had verifiable data and activity. All individuals are initially assessed by the amount, number and type of data sources and history of data records associated with them. Once the records are identified, the Applicant's address, SSN, name, DOB, and phone number(s) are compared against known information to identity any identity issues. Consistency of data throughout reporting sources provides corroboration and increases the confidence in the Applicant's identity.

Identity Fraud Risk Condmons: Beyond verifying that the biographical data is matches the Applicant's provided data, certain information is given further scrutiny to assess conditions that raise fraud risk, including:

SSN Validtiy: Ensures the SSN is a valid number, does not belong to a deceased person, was not issued prior to the Applicant's DOB and is not being used by multiple identities.

Address Validity: Identifies if multiple suspicious identities reside at the Applicant's address, the length of time at the current residence, the number of address moves and number of utility service connections and disconnections.

Fraud Risk Indices: Provides additional insights into the likelihood of fraud based upon data collected on the Applicant during enrollment. Low fraud risk scores further strengthen the confidence in the Applicant's identity. Information reviewed includes comparisons of data that should be associated with other data elements (good if they are, bad if they are not) and data that appears to be unverifiable by trusted sources (e.g., fake information), data that appears to have been manipulated to create a variation of a real identity to create a new, synthetic identity. Also, any irregularities involving potentially vulnerable victims (e.g., elderly or minors), data improperly shared among siblings (e.g., family fraud), and other known activities that correlate to known fraud.

Thousands of attributes are reviewed and aggregated into an empirically derived and statistically-sound algorithm to determine if there is the need to dig deeper, which in various embodiments, adds the KBA process to the enrollment as further detailed below.

OTHER FRAUD DETECTION ELEMENTS. The identity assessment processes also include the following capabilities and features that can be utilized as appropriate to strengthen the ability to separate real from fraudulent identities.

Deep Behavioral Analytics: Evaluating user and device interactions against historical interactions and known bad behaviors creates another valuable identity metric. Variables include frequency and timing of transactions; average time between events, velocity and frequency on a global, per site, per event type, per device and per identity basis unique to each Applicant.

Cookie Wiping: Detects devices that are repeatedly wiping cookies, which can sometimes be indicative of fraudulent behavior.

Alias Search: ML/AI algorithms are employed to identify individuals who have changed their name, either legally or illegally, and completes a thorough search of resources available to identify every possible alias.

Watch List Checks: As part of the financial industry's need to verify customers to meet the requirements of government regulations such as anti-money laundering (AML), bank secrecy act (BSA), the Patriot Act, and others, the enrollment process includes over 20 global watch lists (OFAC, FBI, etc.) designed to identify anyone who does not qualify for opening an account in the U.S.

PhotoDNA: The IVS may use Microsoft® PhotoDNA Cloud Service, which uses artificial intelligence and computer learning to match current digital images of an individual (e.g., Driver's License Picture) with other images such as those on social media, mug shots, and yearbook photos. PhotoDNA allows for matching of a current image with an older image or an image where a person's appearance has changed (e.g., new beard, shaved head, wearing glasses, etc.) This advanced technology significantly enhances visual authentication of an individual across time and space.

Social Networks: Rapid scanning of a user's social network information (e.g., Facebook®, Instagram®, Twitter®, Linkedin®, etc.) enables the IVS to compare biometric and biographic information against the user's biometric and biographic information they presented to during enrollment or in conjunction with PhotoDNA.

Mug Shots: Facial biometric data within mug shot databases is used to verify a user's identity and detect use of names the Applicant has not disclosed and can also be used with PhotoDNA. The collection of assets included in the identity assessment process represents the largest known collection of proprietary and public identity information available, compiled directly from thousands of reliable and trusted sources. This includes all national consumer credit reporting agencies, online, utility, phone and other consumer-behavior data sources; license, registration and court filings (e.g., local, state and Federal); several global identity networks, and more.

Knowledge Based Authentications (KBAS): KBAs are common in the identity verification industry, representing a method to authenticate an individual based on knowledge of personal information, substantiated by a real-time interactive question and answer process. KBAs are designed to help confirm a consumer's identity in seconds by leveraging access to billions of public records and non-credit data to generate non-intrusive authentication questions that should be top-of-mind for an Applicant, but primarily using unique identity information not easily accessible, even for sophisticated fraudsters. The IVS incorporates KBAs in situations where our other assessments indicate the need for additional diligence or investigation.

In addition to all of the elements discussed previously, the IVS incorporates the following characteristics, which are used to achieving certainty in the identities of IVS active users:

INDEPENDENCE: the IVS ensures that the theft or compromise of any one element of authentication does not allow a multi-factor authentication to be completed (e.g., theft of the mobile device would not allow the biometric or knowledge data to be used and use of biometric or knowledge data is not possible without one or more specific mobile devices). Authentications can be processed on the device or on the server, which may be appropriate to support transactions initiated using multi-purpose devices.

CONFIDENTIALITY OF AUTHENTICATION DATA: Use of strong encryption and signing protects authentication (e.g., biometric and/or identity) data when it is stored and transmitted and needs only biometric templates (e.g., data points, not identifiable data) to authenticate customers.

MULTI-PURPOSE DEVICES: For multi-purpose devices, biometrics are processed in an execution environment, which differs from where payment instructions are issued. Q5idworks with biometric authentication implementations in Trusted Execution Environments (TEEs), where available. Support also extends to other mobile devices by allowing processing to take place in the payment app, the authentication app or on a server.

RESISTANCE AGAINST UNAUTHORIZED USE: the IVS biometric or knowledge data can only be used with a customer's known mobile device. This provides protection for authentication data and prevents attackers from using misappropriated authenticationdata.

INHERENCE-SPECIFIC REQUIREMENTS: the IVS employs robust measures to protect biometric methods to meet the most rigorous standards, including: Range of acceptable methods. Face, voice, fingerprint, iris, eye print, etc. (e.g., Accurate biometrics: Top-tier biometric algorithms; Capture mechanisms including anti-spoofing options: A range of anti-spoofing ("liveness detection") methods, and Security measures: Cryptographic protection for stored and transmitted data).

DYNAMIC LINKING: the IVS supports transaction confirmation, where data, such as the payee and amount of a payment are signed by a key that is stored on the mobile device and unlocked with a biometric or knowledge factor.

AUDITS. Details of all authentications and digital signatures are stored within the IVS (e.g., stored on/by IVS servers 145 and IVS DBs 150) to ensure a record is kept of all authentication events for compliance, audit, fraud and management information needs.

FIDO INTEROPERABILITY: the IVS is also interoperable with Fast Identity Online (FIDO) Universal Authentication Framework (UAF), the World's Largest Ecosystem for Standards-Based, Interoperable Authentication. The FIDO Alliance has created open and scalable standards that enable simpler, more secure user authentication experiences across many websites and mobile services. FIDO is the open standard for authentication.

BLOCKCHAIN. Blockchain Enabled-Blockchain is a disruptive platform that increases transactions with greater security and more trust. In some implementations, cloud-based blockchain services may be utilized with irrevocable recordation of transactions (access) employing private and public key access capability, increasing the security of stored data. Blockchain technology enables active users to share biographical information, for example, with a company of their choosing to expedite a new account process or to determine which companies are authorized to request and/or receive identity authentications.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Also, it is noted that example embodiments may be described as a process depicted as successive operations and/or with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function or a main function.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of or include one or more hardware components, such as a logic circuit, a processor (shared, dedicated, or group) and/or memory (shared, dedicated, or group) that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "module" may refer to one or more independent electronic circuits packaged onto a circuit board, System-on-Chip (SoC), System-in-Package (SiP), Multi-Chip-Package (MCP), etc., configured to provide a basic function within a computer system. The term "module" may refer to, be part of, or include an FPGA, ASIC, a processor (shared, dedicated, or group) and/or memory (shared, dedicated, or group) that execute one or more software or firmware programs, a combinational logic circuit, and/or other suitable components that provide the described functionality.

As used herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. Example embodiments described herein may be implemented by computer hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and/or any other type of computer-executable instructions or combinations thereof. The computer-executable instructions for the disclosed embodiments and implementations can be realized in any combination of one or more programming languages that can be executed on a computer system or like device such as, for example, an object oriented programming language such as Python, PyTorch, Ruby, Scala, Smalltalk, Java™, C++, C#, or the like; a procedural programming language, such as the "C" programming language, Go (or "Golang"), or the like; a scripting language such as JavaScript, Server-Side JavaScript (SSJS), PHP, Pearl, Python, PyTorch, Ruby or Ruby on Rails, Lua, Torch/Lua with Just-In Time compiler (LuaJIT), Accelerated Mobile Pages Script (AMPscript), VBScript, and/or the like; a markup language such as Hypertext Markup Language (HTML), Extensible Markup Language (XML), wiki markup or Wikitext, Wireless Markup Language (WML), etc.; a data interchange format/definition such as Java Script Object Notion (JSON), Apache® MessagePack™, etc.; a stylesheet language such as Cascading Stylesheets (CSS), extensible stylesheet language (XSL), or the like; an interface definition language (IDL) such as Apache® Thrift, Abstract Syntax Notation One (ASN.1), Google® Protocol Buffers (protobuf), etc.; or some other suitable programming languages including proprietary programming languages and/or development tools, or any other languages or tools as discussed herein.

As used herein, the terms "instantiate," "instantiation," and the like may refer to the creation of an instance, and an "instance" may refer to a concrete occurrence of an object, which may occur, for example, during execution of program code. Additionally, an "application instance" may be a realized software program executed in mobile edge host, which can provide service(s) to serve consumer(s). As used herein, the term "sampling" refers to a process of converting an analog signal into a number of data points at different times, and the term "quantization" refers to the number of data points used in a given sample.

As used herein, a "database object," "data structure," or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in blockchain implementations, and/or the like. Data structures and/or database objects may be any suitable collection of data or information, and may comprise, for example, arrays, linked lists, multimaps, multisets, records, tuples, structs, containers, and/or the like. A "table" is a viewable representation of one or more database objects that are logically arranged as rows or records and include one or more data categories logically arranged as columns or fields. Each element of a table includes an instance of data for each category defined by the fields.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, webpages, web applications, and/or the like. The term "network resource" may refer to a resource hosted by a remote entity and accessible over a network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a mobile edge application.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents; audio files such as MPEG-4 audio files and WebM audio and/or video files; etc.). The term "document" may refer to a computer file or resource used to record data, and includes various file types or formats such as word processing, spreadsheet, slide presentation, multimedia items, and the like. As used herein, the term "service" refers to a particular functionality or a set of functions to be performed on behalf of a requesting party, such as any of the computing systems or devices discussed herein. A service may include or involve the retrieval of specified information or the execution of a set of operations.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. The various wireless communications discussed herein may include or be compatible with, but not limited to, any one or more of the following radio communication technologies and/or standards including: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example, Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 8 (3rd Generation Partnership Project Release 8), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, I600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), LoRaWAN™ (Long Range Wide Area Network), Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (e.g., the European flavor of IEEE 802.11p based DSRC, including ITS-G5A (e.g., Operation of ITS-G5 in European ITS frequency bands dedicated to ITS for safety related applications in the frequency range 5,875 GHz to 5,905 GHz), ITS-G5B (e.g., Operation in European ITS frequency bands dedicated to ITS non-safety applications in the frequency range 5,855 GHz to 5,875 GHz), ITS-G5C (e.g., Operation of ITS applications in the frequency range 5,470 GHz to 5,725 GHz)), etc. In addition to the standards listed above, any number of satellite uplink technologies may be used for the TRx 1212 including, for example, radios compliant with standards issued by the ITU (International Telecommunication Union), or the ETSI (European Telecommunications Standards Institute), among others, both existing and not yet formulated.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to a distinct component of an architecture or device, or information transferred as a payload.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. Additionally, the terms "computer system" may be considered synonymous to, and may hereafter be occasionally referred to, as a computer device, computing device, computing platform, client device, client, mobile, mobile device, user equipment (UE), terminal, receiver, server, etc., and may describe any physical hardware device capable of sequentially and automatically carrying out a sequence of arithmetic or logical operations; equipped to record/store data on a machine readable medium; and transmit and receive data from one or more other devices in a communications network.

Examples of "computer devices," "computer systems," "user equipment," etc. may include cellular phones or smartphones, feature phones, tablet personal computers, wearable computing devices, an autonomous sensors, laptop computers, desktop personal computers, video game consoles, digital media players, handheld messaging devices, personal data assistants, electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

The term "server" as used herein refers to a computing device or system, including processing hardware and/or process space(s), an associated storage medium such as a memory device or database, and, in some instances, suitable application(s) as is known in the art. The terms "server system" and "server" may be used interchangeably herein, and these terms refer to one or more computng system(s) that provide access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with, one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for transmitting and receiving information.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. One or more non-transitory computer-readable media (NTCRM) comprising instructions, wherein execution of the instructions by one or more processors of a client system is operable to cause the client system to:

generate a first graphical user interface (GUI), the first GUI including a first graphical control element (GCE);

enable a first sensor to capture primary biometric data in response to selection of the first GCE;

attempt to detect the primary biometric data from first sensor data obtained from the first sensor;

in response to proper detection of the primary biometric data from the first sensor data, send the primary biometric data to an identity verification system (IVS) over a secure channel between the client system and the IVS, and generate a second GUI during or after the primary biometric data is sent to the IVS, the second GUI including a second GCE;

enable a second sensor to capture secondary biometric data in response to selection of the second GCE;

attempt to detect the secondary biometric data from second sensor data obtained from the second sensor; and in response to proper detection of the secondary biometric data from the second sensor data, send the secondary biometric data to the IVS over the secure channel between the client system and the IVS.

2. The one or more NTCRM of claim 1, wherein, to generate the first GUI, execution of the instructions is operable to cause the client system to:

generate a first instance of the first GUI, wherein the first instance of the first GUI comprises the first GCE; and in response to improper detection of the primary biometric data from the first sensor data, generate a second instance of the first GUI to recapture additional or alternative primary biometric data.

3. The one or more NTCRM of claim 2, wherein the first instance of the first GUI comprises an outline graphical element, the first sensor is an image capture device, and the first sensor data comprises image data of a user of the client system, and wherein the outline graphical element is to act as a reference point to capture a desired body part of the user using the image capture device.

4. The one or more NTCRM of claim 3, wherein, to attempt to detect the primary biometric data from first sensor data, execution of the instructions is operable to cause the client system to:

determine whether the desired body part of the user is represented within the image data.

5. The one or more NTCRM of claim 1, wherein execution of the instructions is operable to cause the client system to, in response to the proper detection of the secondary biometric data from the second sensor data:

generate a third GUI, the third GUI including a third GCE; and enable a third sensor to capture non-biometric data.

6. The one or more NTCRM of claim 1, wherein, to generate the second GUI, execution of the instructions is operable to cause the client system to:

generate a first instance of the second GUI, wherein the first instance of the second GUI comprises the second GCE; and in response to improper detection of the secondary biometric data from the second sensor data, generate a second instance of the second GUI to recapture additional or alternative secondary biometric data.

7. The one or more NTCRM of claim 6, wherein the first instance of the second GUI comprises another second GCE, the second sensor is an audio capture device, and the second sensor data comprises audio data, and wherein the second GCE is to control the audio capture device to begin recording the audio data, and the other second GCE is to control the audio capture device to stop recording the audio data.

8. The one or more NTCRM of claim 7, wherein execution of the instructions is operable to cause the client system to:

display a spectrogram within the first instance of the second GUI, the spectrogram graphically representing an audio signal captured by the audio capture device.

9. The one or more NTCRM of claim 8, wherein, to send the secondary biometric data to the IVS, execution of the instructions is operable to cause the client system to:

send the audio signal to the IVS over the secure channel between the client system and the IVS; and receive, from the IVS over the secure channel, program code for rendering the spectrogram within the first instance of the second GUI.

10. The one or more NTCRM of claim 8, wherein execution of the instructions is operable to cause the client system to:

generate the spectrogram based on the captured audio data; and wherein, to send the secondary biometric data to the IVS, execution of the instructions is to cause the client system to send one or both of the audio signal and the spectrogram to the IVS over the secure channel.

11. The one or more NTCRM of claim 1, wherein execution of the instructions by one or more processors of the client system is further operable to cause the client system to:

receive at least one question from the IVS during a live interview; and transmit to the IVS at least one answer to the at least one received question, wherein the received at least one question is at least partially based on the received primary and the secondary biometric data.

12. The one or more NTCRM of claim 11, wherein in addition to the primary and the secondary biometric data, the received at least one question is at least partially based on (a) an independently collected biographic information about a subject of the primary and the secondary biometric data; or (b) an independently obtained information about the client system.

13. The one or more NTCRM of claim 12, wherein execution of the instructions by one or more processors of the client system is further operable to cause the client system to:

perform lie detection processing by cross-referencing and comparing the primary and the secondary biometric data with the independently collected biographic information and the independently obtained information about the client system, wherein the received at least one question is at least partially based on a determined result of the lie detection processing.

14. The one or more NTCRM of claim 11, wherein execution of the instructions by one or more processors of the client system is further operable to cause the client system to:

perform reverse aging processing on the facial features obtained using the primary of the secondary biometric data, wherein the received at least one question is at least partially based on a determined result of the reverse aging processing.

15. A client computing system, comprising:

a display device;

sensor circuitry;

communication circuitry; and processor circuitry communicatively coupled with the display device, the sensor circuitry, and the communication circuitry, and the processor circuitry is configurable to:

render a first instance of a graphical user interface (GUI) for display on the display device, the first GUI comprising one or more graphical control element (GCEs); and in response to each detected selection of a first GCE of the one or more GCEs, perform operations until a predetermined number of biometric data is captured, to:

enable the sensor circuitry to capture biometric data;

detect the biometric data from sensor data obtained from the sensor circuitry; and render a second instance of the GUI during or after the biometric data detected from the first instance of the GUI is sent to an identity verification service (IVS), for display on the display device, wherein the second instance of the GUI includes at least one GCE to control capture of respective biometric data of the predetermined number of biometric data using the sensor circuitry; and wherein the communication circuitry is configurable to:

establish a secure channel between the client computing system and the IVS; and send, in response to proper detection of the biometric data, the detected biometric data to the IVS over the secure channel before or while the second instance of the GUI is being rendered.

16. The client computing system of claim 15, wherein the processor circuitry is configurable to:

render another instance of the GUI for display on the display device to recapture additional or alternative biometric data in response to improper detection of the biometric data from the sensor data.

17. The client computing system of claim 16, wherein the sensor circuitry is an image capture device, and the sensor data comprises image data, and wherein, to attempt to detect the biometric data from the sensor data, the processor circuitry is configurable to:

determine whether a desired body part of a user of the client computing system is represented within the image data, wherein a different desired body part is to be represented within the image data for each rendered instance of the GUI.

18. The client computing system of claim 15, wherein:

after the predetermined number of biometric data is captured and sent to the IVS, the processor circuitry is configurable to:

render another instance of the GUI for display on the display device; and in response to each detected selection of the first GCE until a predetermined number of non-biometric data is captured, enable the sensor circuitry to capture non-biometric data;

detect the non-biometric data from additional sensor data obtained from the sensor circuitry; and render yet another instance of the GUI for display on the display device; and the communication circuitry is configurable to send the detected non-biometric data to the IVS over the secure channel before rendering the yet another instance of the GUI.

19. The client computing system of claim 15, wherein the sensor circuitry comprises first sensor circuitry and second sensor circuitry, and the processor circuitry is configurable to:

enable the first sensor circuitry to capture first biometric data after rendering the instance of the GUI; and enable the second sensor circuitry to capture second biometric data after rendering the other instance of the GUI.

20. The client computing system of claim 19, wherein the first sensor circuitry is an image capture device or an infrared sensor, and the second sensor circuitry is an audio capture device.

21. The client computing system of claim 20, wherein:

the processor circuitry is configurable to render a spectrogram within the other instance of the GUI, the spectrogram graphically representing one or more audio signals captured by the audio capture device; and the communication circuitry is configurable to send the audio signal to the IVS over the secure channel or send the spectrogram to the IVS over the secure channel.

22. The client computing system of claim 15, wherein the sensor circuitry is configured to:

capture primary biometric data and secondary biometric data of a user of the client computing system, wherein:

the primary biometric data is for determining one or more matching users from among a set of other users, the secondary biometric data for determining a set of candidate identities via refinement of the one or more matching users, and the secondary biometric data is different than the primary biometric data.

23. The client computing system of claim 22, wherein the communication circuitry is configurable to:

send the primary biometric data and the secondary biometric data to the IVS over the secure channel between the client computer system and the IVS; and receive a message from the IVS based on the primary and secondary biometric data.

24. The client computing system of claim 23, wherein the message is a resume enrollment message when a user identifier (ID) associated with the primary biometric data and the secondary biometric data is associated with an ongoing enrollment process for enrolling with the IVS, wherein the resume enrollment message includes program code for rendering a resume enrollment GUI.

25. The client computing system of claim 23, wherein the message is a new enrollment message when a user ID associated with the primary biometric data and the secondary biometric data is associated with an ongoing enrollment process, and the new enrollment message includes program code for rendering a new enrollment GUI.

26. The client computing system of claim 23, wherein the message is a member authentication message when a user ID associated with the primary biometric data and the secondary biometric data is associated with an enrolled member of the IVS, and the member authentication message includes program code for rendering a secure portal GUI, and the processor circuitry is configurable to:

render the secure portal GUI to be displayed by the display device, wherein:

the secure portal GUI includes a first set of GCEs and a second set of GCEs, the first set of GCEs are configured to enable the user to select individual third party organizations with which to verify an identity of the user, and the second set of GCEs are configured to enable the user to provide updated primary biometric data or updated secondary biometric data.

27. The client system of claim 15, wherein the processor circuitry is further configurable to:

receive at least one question from the IVS during a live interview; and transmit to the IVS at least one answer to the at least one received question, wherein the received at least one question is at least partially based on the biometric data received from the sensor data obtained from the sensor circuitry.

28. The client system of claim 27, wherein in addition to the biometric data, the received at least one question is at least partially based on (a) an independently collected biographic information about a subject of the primary and the secondary biometric data; or (b) an independently obtained information about the client system.

29. The client system of claim 28, wherein the processor circuitry is further configurable to:

perform lie detection processing by cross-referencing and comparing the biometric data with the independently collected biographic information and the independently obtained information about the client system, wherein the received at least one question is at least partially based on a determined result of the lie detection processing.

30. The client system of claim 27, wherein the processor circuitry is further configurable to:

perform reverse aging processing on a facial features obtained using the biometric data, wherein the received at least one question is at least partially based on a determined result of the reverse aging processing.

31. One or more non-transitory computer-readable media (NTCRM) comprising instructions, wherein execution of the instructions by one or more processors of a client system is operable to cause the client system to:

generate a first graphical user interface (GUI), the first GUI comprising a first graphical control element (GCE), and in response to selection of the first GCE, execution of the instructions is to cause the client system to enable a first sensor to capture primary biometric data;

attempt to detect the primary biometric data from first sensor data obtained from the first sensor;

in response to proper detection of the primary biometric data from the first sensor data, send the primary biometric data to an identity verification system (IVS) over a secure channel between the client system and the IVS, and generate a first instance of a second GUI, wherein the first instance of the second GUI includes a second GCE and another second GCE, and in response to selection of the second GCE, execution of the instructions is to cause the client system to enable an audio capture device to capture secondary biometric data, wherein the second GCE is configured to control the audio capture device to begin recording an audio signal and the other second GCE is configured to control the audio capture device to stop recording the audio signal, cause display of a spectrogram within the first instance of the second GUI, wherein the spectrogram graphically represents the audio signal captured by the audio capture device;

attempt to detect the secondary biometric data from the audio signal obtained from the audio capture device;

in response to improper detection of the secondary biometric data from the audio data, generate a second instance of the second GUI to recapture additional or alternative secondary biometric data;

in response to proper detection of the secondary biometric data from the audio data, send the audio signal to the IVS over the secure channel between the client system and the IVS, receive, from the IVS over the secure channel, program code for rendering the spectrogram within the first instance of the second GUI, and generate a third GUI, the third GUI including a third GCE, and in response to selection of the third GCE, execution of the instructions is to cause the client system to capture non-biometric data.

32. The one or more NTCRM of claim 31, wherein, to generate the first GUI, execution of the instructions is operable to cause the client system to:

generate a first instance of the first GUI, wherein the first instance of the first GUI comprises the first GCE; and in response to improper detection of the primary biometric data from the first sensor data, generate a second instance of the first GUI to recapture additional or alternative primary biometric data.

33. The one or more NTCRM of claim 32, wherein the first instance of the first GUI includes an outline graphical element, the first sensor is an image capture device, and the first sensor data comprises image data of a user of the client system, and wherein the outline graphical element is to act as a reference point to capture a desired body part of the user using the image capture device.

34. The one or more NTCRM of claim 33, wherein, to attempt to detect the primary biometric data from first sensor data, execution of the instructions is operable to cause the client system to:

determine whether the desired body part of the user is represented within the image data.

35. The one or more NTCRM of claim 31, wherein execution of the instructions is operable to cause the client system to:

receive a message from the IVS based on the primary and secondary biometric data, the message including program code for rendering a fourth GUI.

36. The one or more NTCRM of claim 35, wherein the primary biometric data is for determining one or more matching users from among a set of other users, and the secondary biometric data is for determining a set of candidate identities via refinement of the one or more matching users.

37. The one or more NTCRM of claim 36, wherein the message is one of:

a resume enrollment message when a user identifier (ID) matching a candidate identity having a highest calculated confidence score among calculated confidence scores of a set of candidate identities has begun an enrollment process for enrolling with the IVS;

a new enrollment message when the user ID matching the candidate identity having the highest calculated confidence score has not begun the enrollment process, and a member authentication message when the user ID matching the candidate identity having the highest calculated confidence score is an enrolled member of the IVS.

38. The one or more NTCRM of claim 37, wherein, when the message is the member authentication message, the processor circuitry is configurable to:

render a secure portal GUI, the secure portal GUI comprising one or more graphical control elements to enable the user to select individual entities with which to verify the user's identity.

* * * * *